(12) United States Patent
Shimoda et al.

(10) Patent No.: US 10,812,228 B2
(45) Date of Patent: Oct. 20, 2020

(54) COMMUNICATION SYSTEM USING A SELF-CONTAINED SUBFRAME INCLUDING DOWNLINK AND UPLINK SIGNALS

(71) Applicant: Mitsubishi Electric Corporation, Chiyoda-ku (JP)

(72) Inventors: Tadahiro Shimoda, Tokyo (JP); Mitsuru Mochizuki, Tokyo (JP); Masayuki Nakazawa, Tokyo (JP); Fumihiro Hasegawa, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/329,916

(22) PCT Filed: Aug. 3, 2017

(86) PCT No.: PCT/JP2017/028223
§ 371 (c)(1),
(2) Date: Mar. 1, 2019

(87) PCT Pub. No.: WO2018/061476
PCT Pub. Date: Apr. 5, 2018

(65) Prior Publication Data
US 2019/0222364 A1    Jul. 18, 2019

(30) Foreign Application Priority Data
Sep. 28, 2016  (JP) ................. 2016-190003

(51) Int. Cl.
*H04W 72/04*    (2009.01)
*H04L 1/18*    (2006.01)
(Continued)

(52) U.S. Cl.
CPC ............ *H04L 1/1819* (2013.01); *H04L 1/189* (2013.01); *H04L 5/005* (2013.01); *H04L 5/0055* (2013.01);
(Continued)

(58) Field of Classification Search
CPC .................. H04W 76/27; H04W 72/0446; H04L 1/1819; H04L 1/189; H04L 5/0055
See application file for complete search history.

(56) References Cited

U.S. PATENT DOCUMENTS

| 2019/0037640 A1* | 1/2019 | Xiong | H04L 1/1861 |
| 2019/0165891 A1* | 5/2019 | Iwai | H04L 1/0083 |
| 2019/0190636 A1* | 6/2019 | Kim | H04J 11/0056 |

OTHER PUBLICATIONS

International Search Report dated Oct. 24, 2017 in PCT/JP2017/028223 filed Aug. 3, 2017.
(Continued)

*Primary Examiner* — Wei Zhao
(74) *Attorney, Agent, or Firm* — Oblon, McClelland, Maier & Neustadt, L.L.P.

(57) ABSTRACT

Provided is a communication system capable of suppressing decrease in a transmission rate. An eNB communicates with a UE using a self-contained subframe. The self-contained subframe includes a downlink signal to be transmitted from the eNB to the UE, and an uplink signal to be transmitted from the UE to the eNB in response to the downlink signal. The uplink signal has a structure including an uplink control signal indicating information for controlling transmission of the uplink signal, and uplink user data to be transmitted before and after the uplink control signal. The eNB notifies the UE of a structure of the uplink signal.

4 Claims, 63 Drawing Sheets

(51) Int. Cl.
| | |
|---|---|
| H04L 25/02 | (2006.01) |
| H04L 5/00 | (2006.01) |
| H04W 80/02 | (2009.01) |
| H04W 24/10 | (2009.01) |
| H04W 74/08 | (2009.01) |
| H04W 76/27 | (2018.01) |
| H04W 48/10 | (2009.01) |
| H04W 28/04 | (2009.01) |
| H04W 28/06 | (2009.01) |

(52) U.S. Cl.
CPC ......... *H04L 25/0226* (2013.01); *H04W 24/10* (2013.01); *H04W 28/04* (2013.01); *H04W 28/06* (2013.01); *H04W 48/10* (2013.01); *H04W 72/04* (2013.01); *H04W 72/0446* (2013.01); *H04W 74/0833* (2013.01); *H04W 76/27* (2018.02); *H04W 80/02* (2013.01)

(56) References Cited

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.4.0, Jun. 2016, pp. 1-310.
"LS on HNB/HeNB Open Access Mode," 3GPP TSG-SA1 #42 S1-083461, Oct. 2008, 2 Pages.
"3rd Generation Partnership Project; Technical Specification Group Radio Access Network; Evolved Universal Terrestrial Radio Access (E-UTRA); Further advancements for E-UTRA physical layer aspects (Release 9)," 3GPP TR 36.814 V9.0.0, Mar. 2010, pp. 1-100.
"3rd Generation Partnership Project; Technical Specification Group Radio Access Network; Feasibility study for Further Advancements for E-UTRA (LTE-Advanced) (Release 13)," 3GPP TR 36.912 V13.0.0, Dec. 2015, 252 Pages.
"Deliverable D1.1 Scenarios, requirements and KPIs for 5G mobile and wireless system," ICT-317669-METIS/D1.1, Mobile and wireless communications Enablers for the Twenty-twenty Information Society (METIS) , Apr. 2013, 84 Pages.
"3rd Generation Partnership Project; Technical Specification Group Services and System Aspects; Study on Architecture for Next Generation System (Release 14)," 3GPP TR 23.799 V0.7.0, Aug. 2016, pp. 1-322.
"3rd Generation Partnership Project; Technical Specification Group Radio Access Network; Study on New Radio Access Technology (Release 14)," 3GPP TR 38.912 V0.0.1, Jun. 2016, pp. 1-10.
"Status Report for RAN WG1 to TSG-RAN #72," 3GPP TSG RAN #72 RP-160697, Jun. 2016, pp. 1-38.
Huawei, et al., "Discussion on frame structure for NR," 3GPP TSG RAN WG1 Meeting #85 R1-164032, May 2016, 8 Pages.
LG Electronics, et al., "WF on minimum HARQ Timing," 3GPP TSG RAN WG1 Meeting #85 R1-165887, May 2016, 4 Pages.
LG Electronics, "Discussion on minimum HARQ-ACK and retransmission timing," 3GPP TSG RAN WG1 Meeting #86 R1-166880, Aug. 2016, 4 Pages.
"3rd Generation Partnership Project; Technical Specification Group Radio Access Network; Evolved Universal Terrestrial Radio Access (E-UTRA); Medium Access Control (MAC) protocol specification (Release 13)," 3GPP TS 36.321 V13.2.0, Jun. 2016, 91 Pages.
ZTE, et al., "Consideration on URLLC in NR frame structure," 3GPP TSG-RAN WG1 Meeting #86 R1-166410, Aug. 2016, pp. 1-5.
"3rd Generation Partnership Project; Technical Specification Group Radio Access Network; Evolved Universal Terrestrial Radio Access (E-UTRA); Radio Resource Control (RRC); Protocol specification (Release 13)," 3GPP TS 36.331 V13.2.0, Jun. 2016, pp. 1-623.
"3rd Generation Partnership Project; Technical Specification Group Radio Access Network; Evolved Universal Terrestrial Radio Access (E-UTRA); Physical channels and modulation (Release 13)," 3GPP TS 36.211 V13.2.0, Jun. 2016, pp. 1-170.
"3rd Generation Partnership Project; Technical Specification Group Radio Access Network; Evolved Universal Terrestrial Radio Access (E-UTRA); Physical layer procedures (Release 13)," 3GPP TS 36.213 V13.2.0, Jun. 2016, pp. 1-381.
Huawei, et al., "Discussion on control channel design," 3GPP TSG RAN WG1 Meeting #86 R1-167203, Aug. 2016, 5 Pages.
Huawei, et al, "RRM Measurement for NR," 3GPP TSG RAN WG1 Meeting #86 R1-167200, Aug. 2016, 4 Pages.
Qualcomm Incorporated, "High speed mobility performance evaluations," 3GPP TSG-RAN WG1 #86 R1-166393, Aug. 2016, 9 Pages.
Qualcomm Incorporated, "Uplink based mobility physical channels," 3GPP TSG-RAN WG1 #86 R1-166387, Aug. 2016, 5 Pages.
NTT Docomo, Inc., "Views on sTTI length," 3GPP TSG RAN WG1 Meeting #85 R1-165213, May 2016, pp. 1-3.
Samsung, "Function split between central and remote node," 3GPP TSG-RAN WG3 Meeting #91bis R3-161013, Apr. 2016, 2 Pages.

\* cited by examiner

F I G . 1
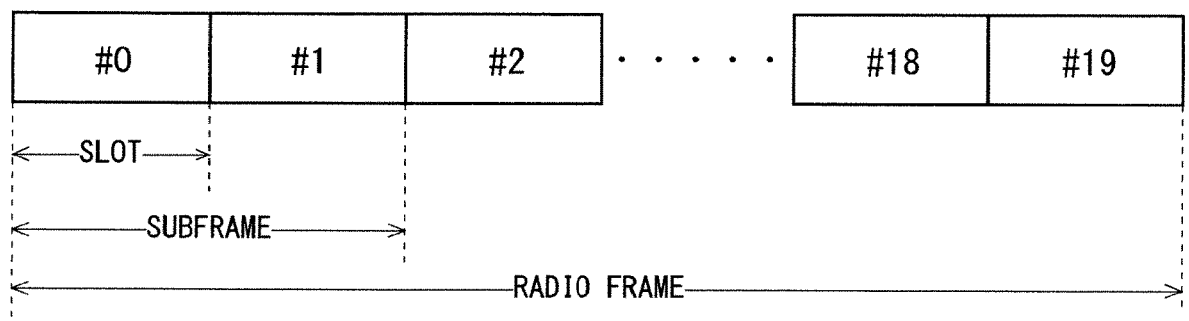

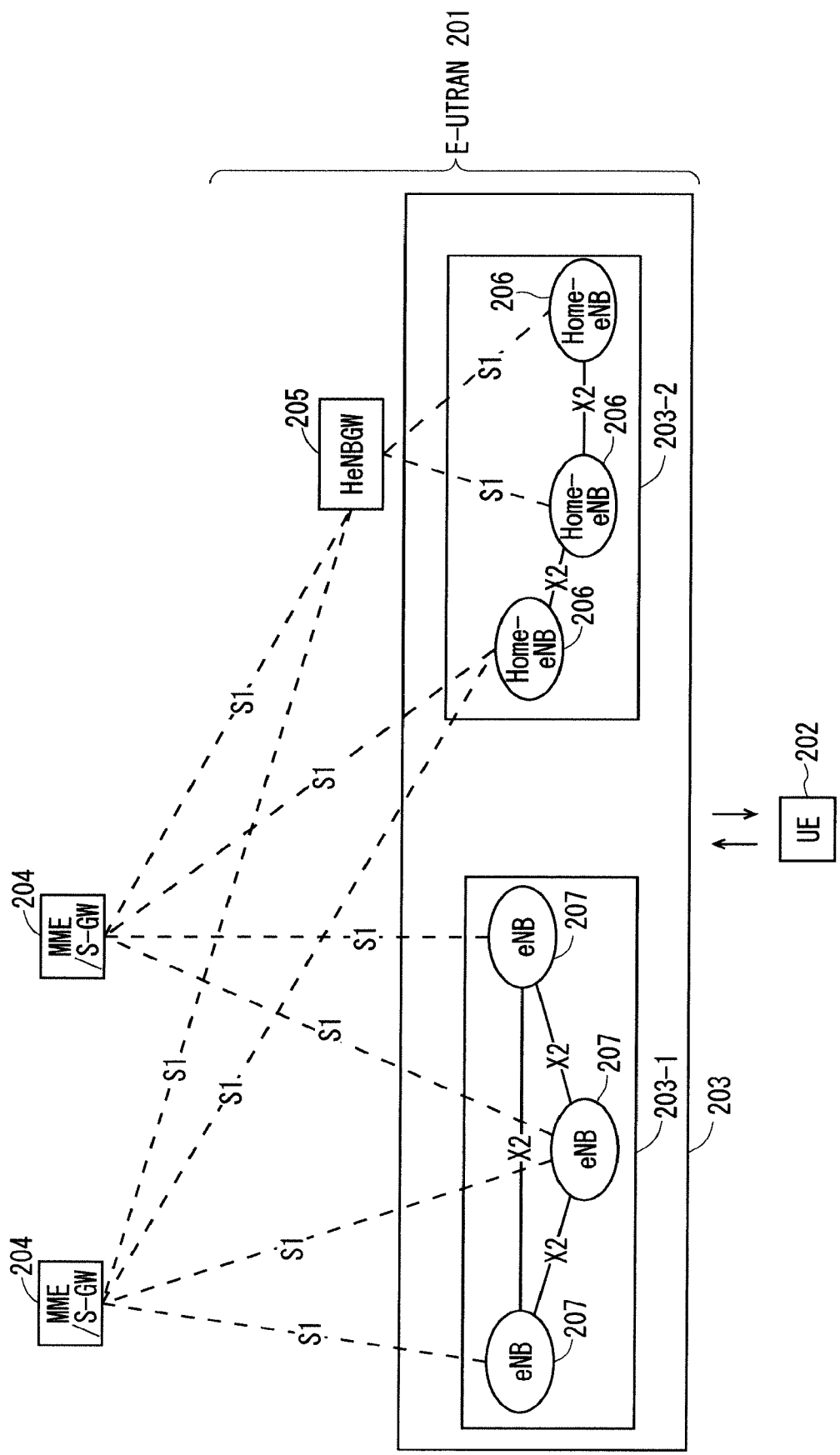
F I G. 2

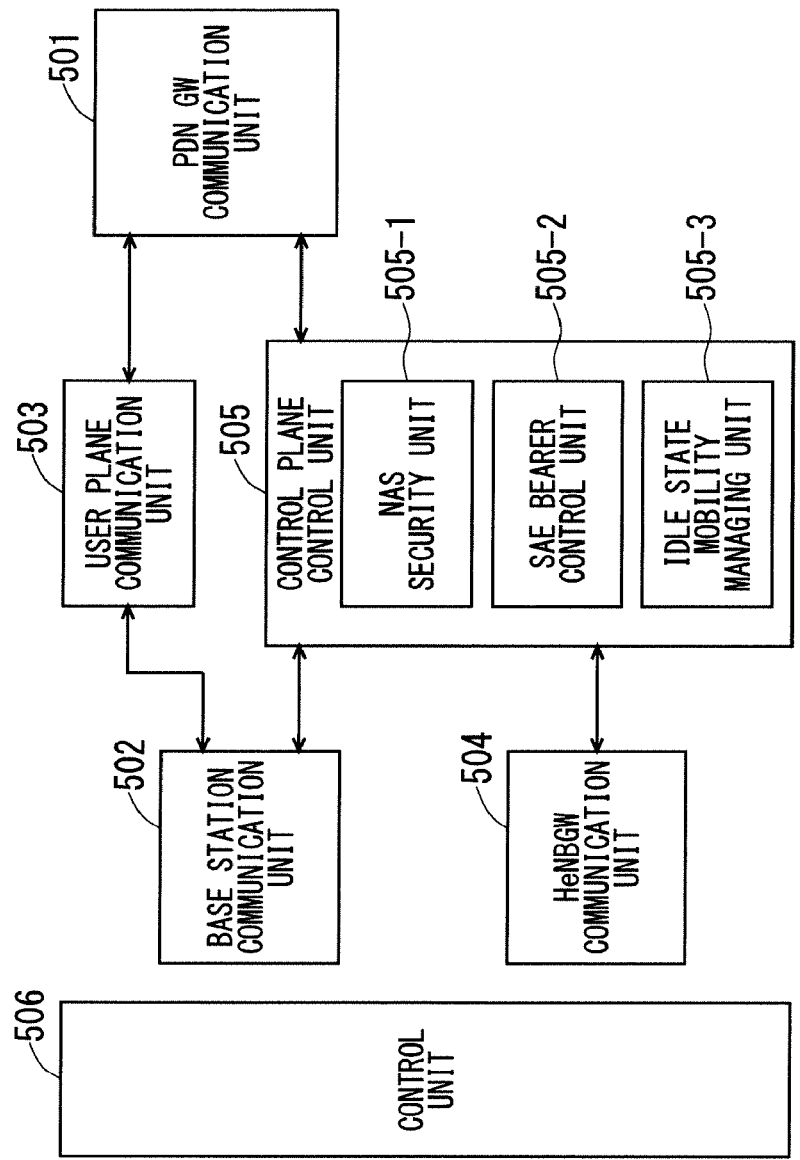

F I G . 6
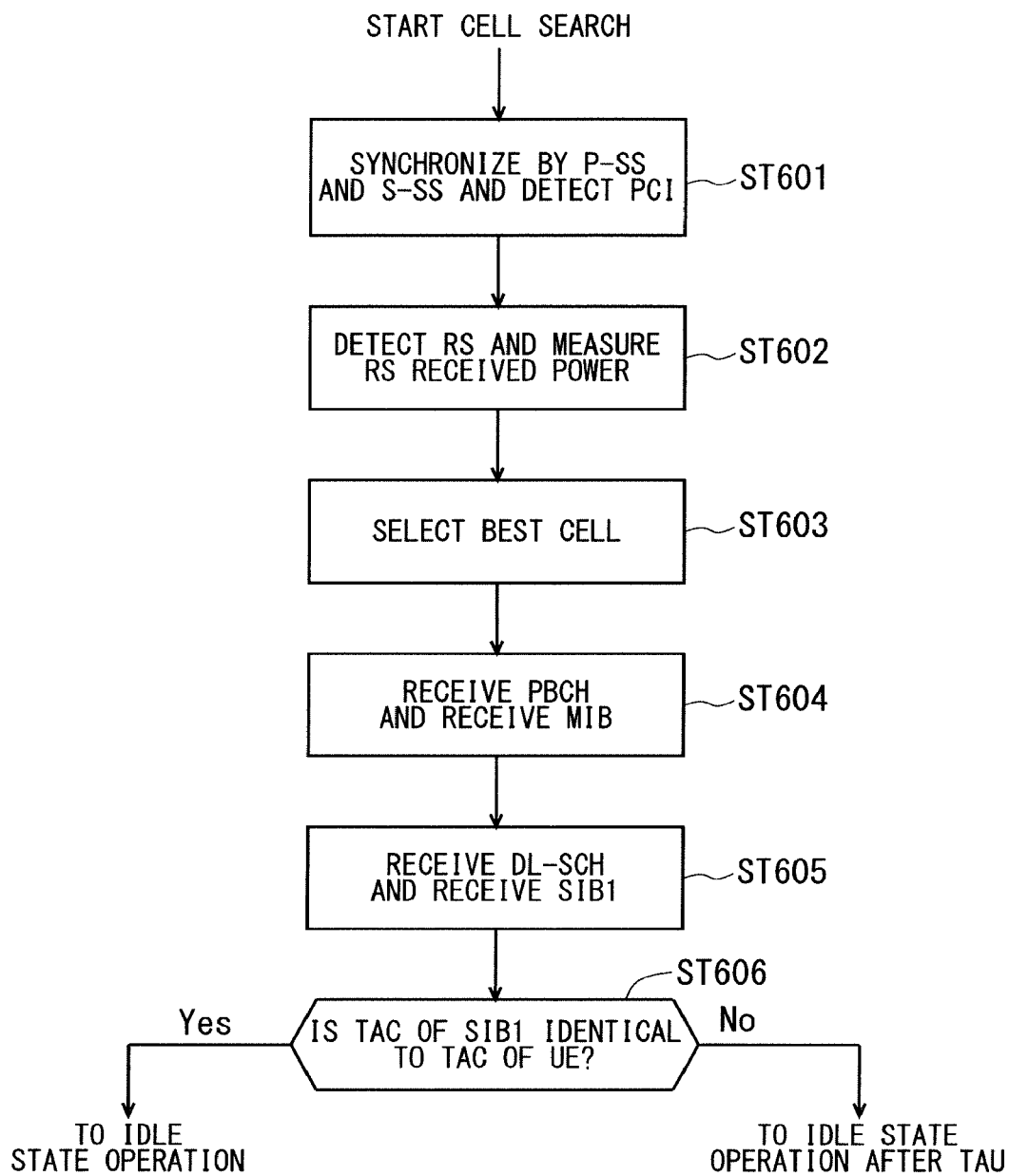

F I G. 7
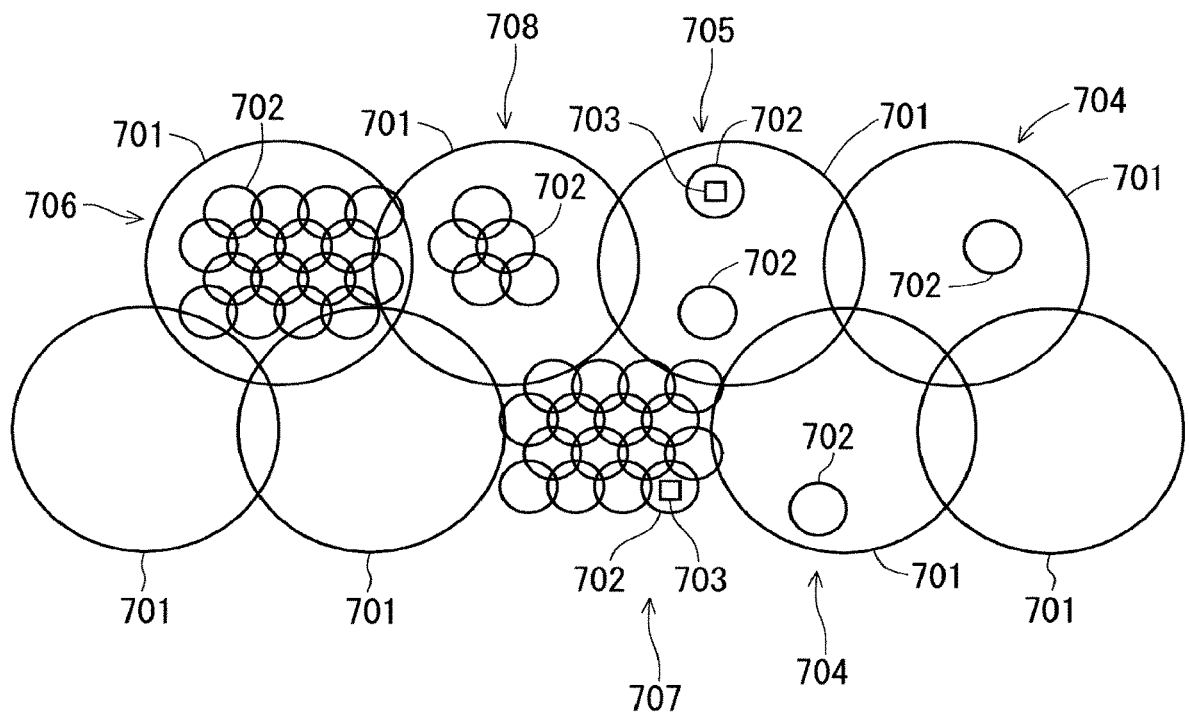

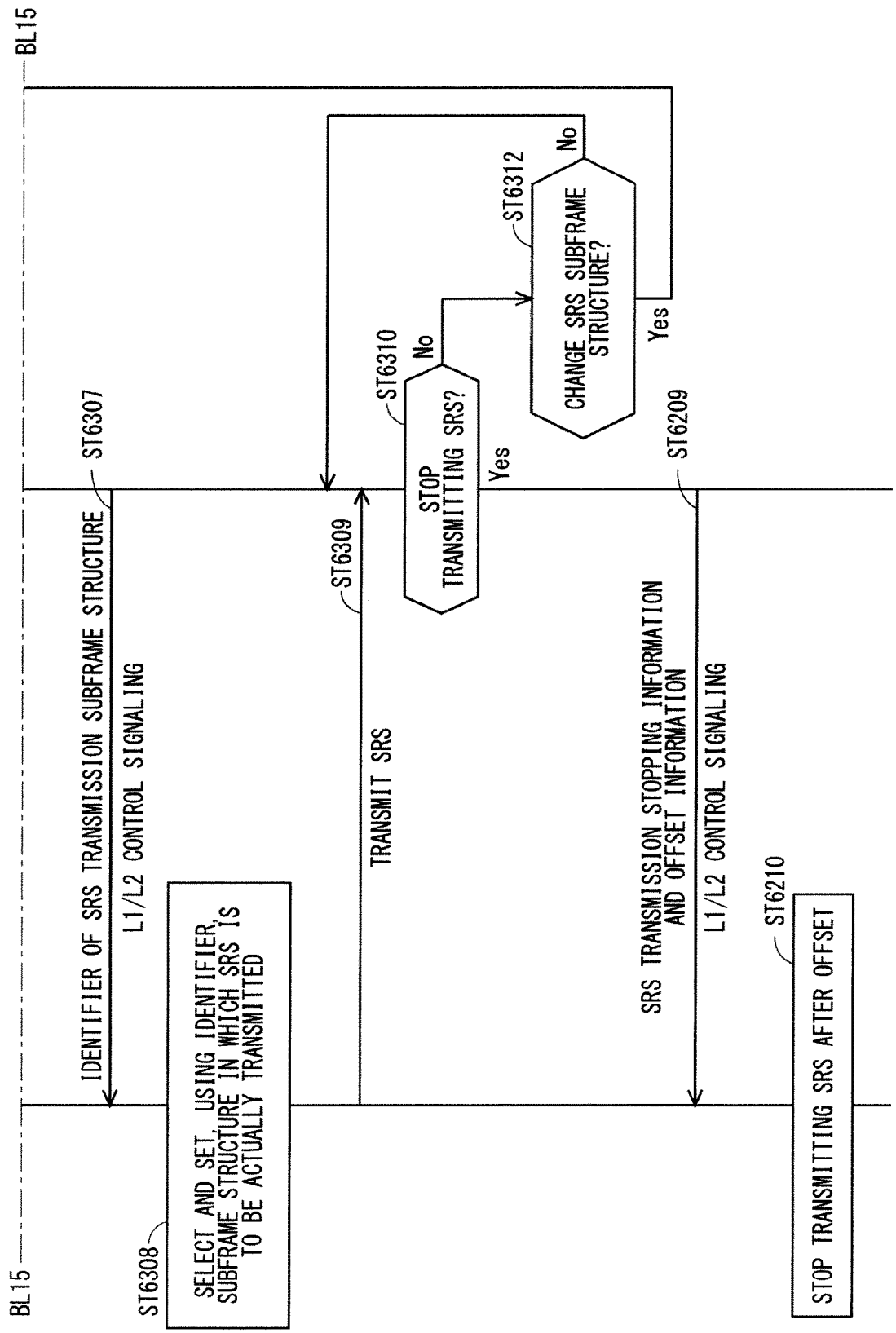
F I G. 46

F I G . 4 9
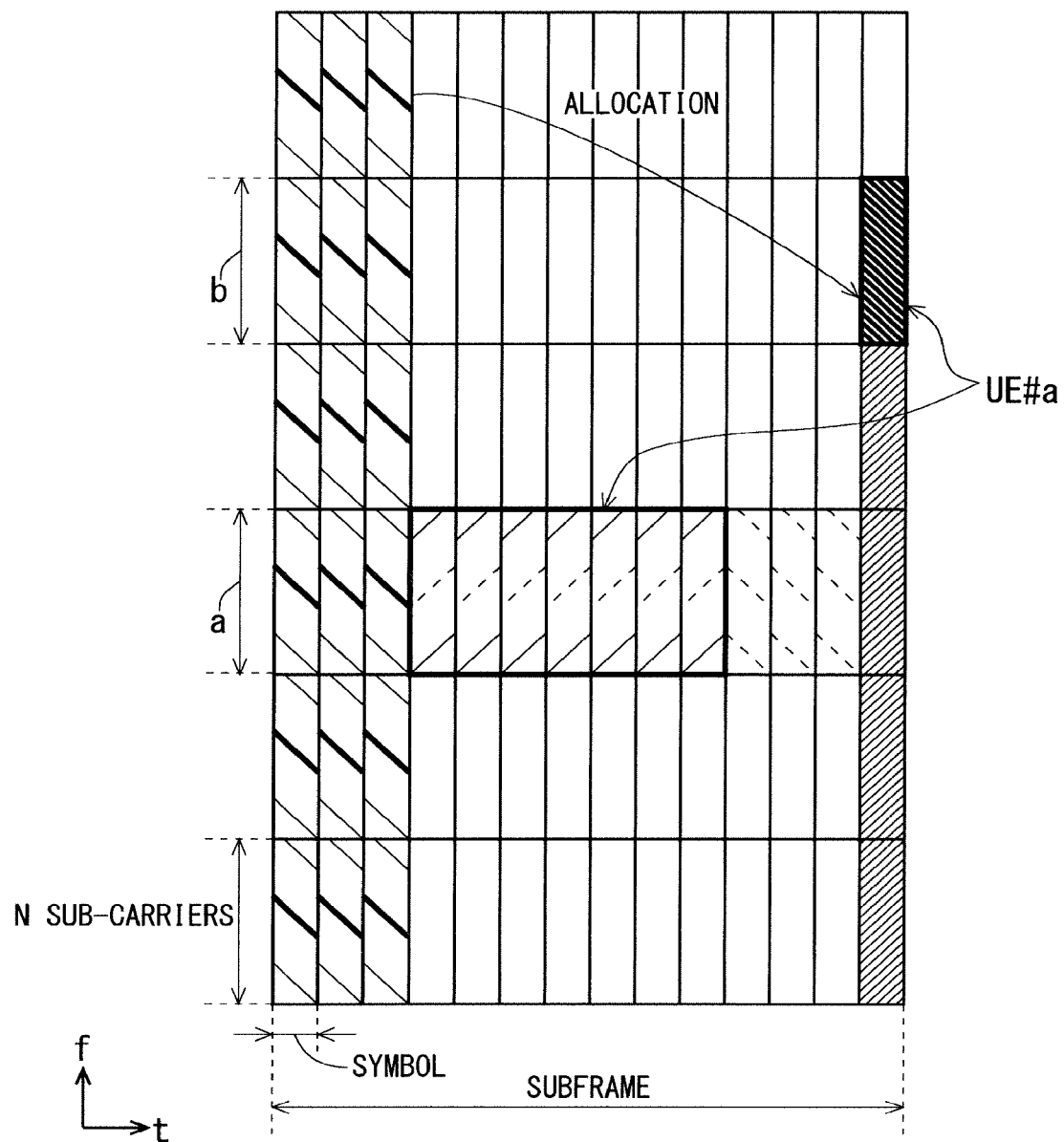

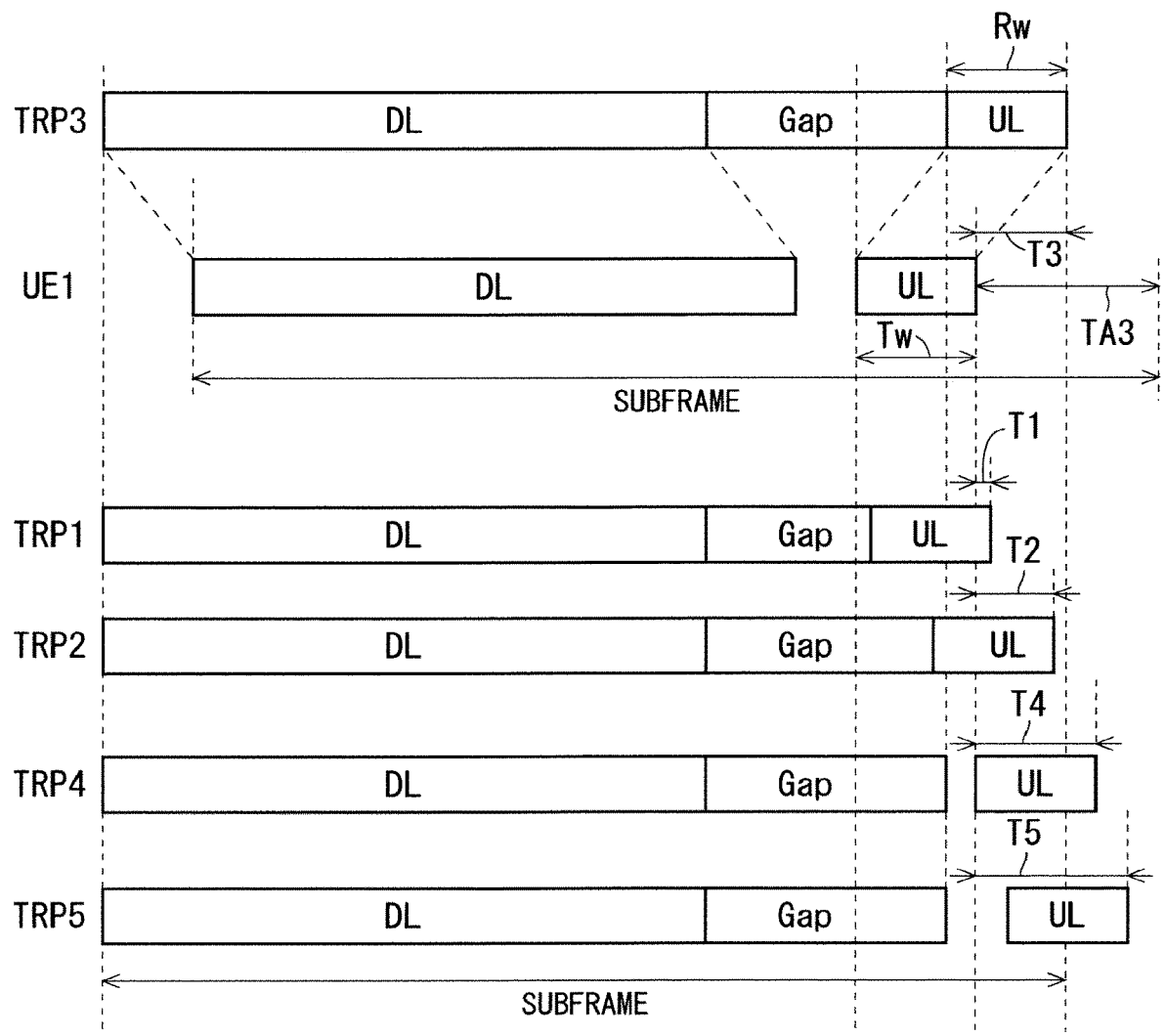
F I G. 5 5

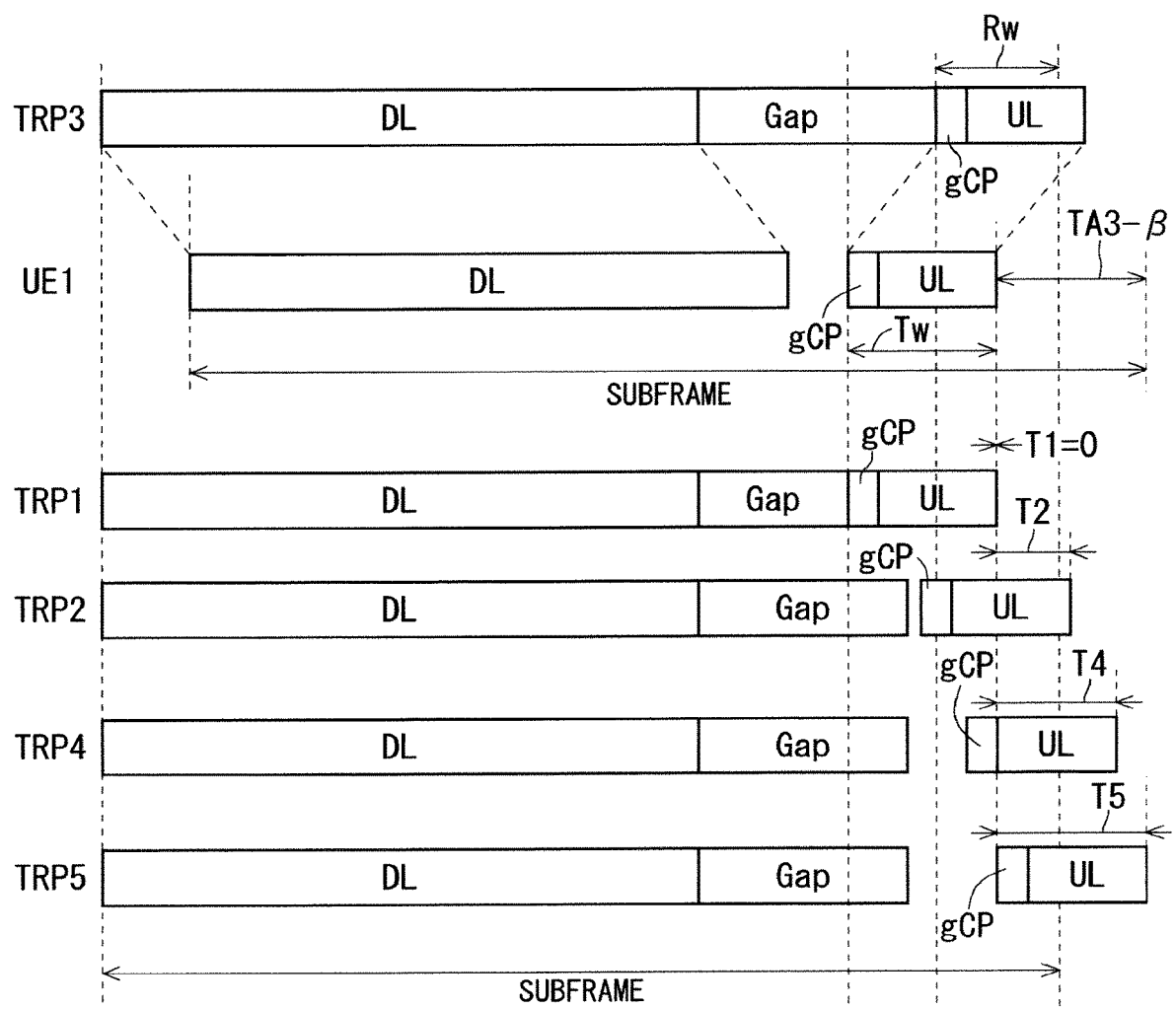
F I G . 6 1

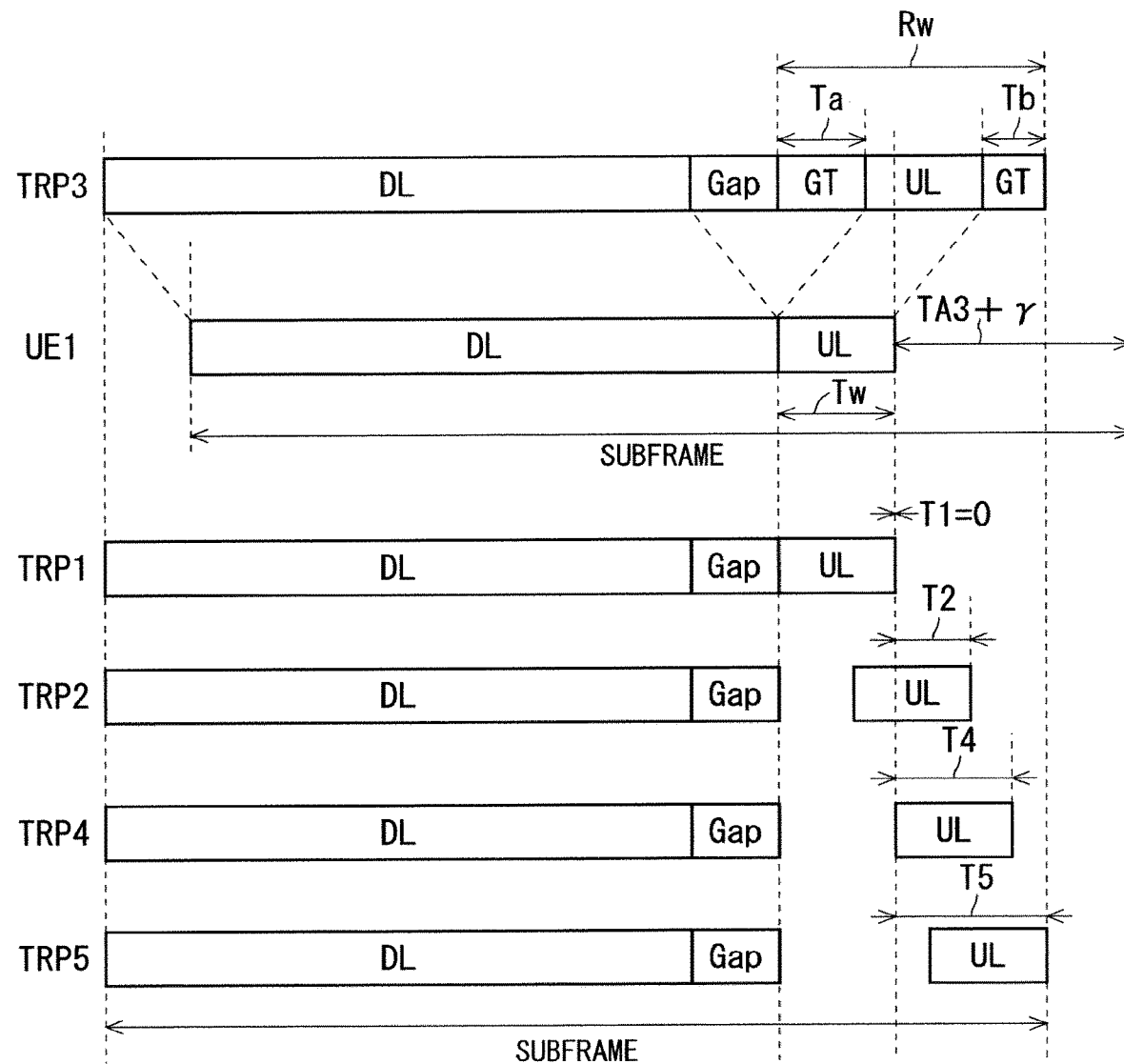

COMMUNICATION SYSTEM USING A SELF-CONTAINED SUBFRAME INCLUDING DOWNLINK AND UPLINK SIGNALS

TECHNICAL FIELD

The present invention relates to a communication system in which radio communication is performed between a communication terminal device such as a user equipment device and a base station device.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network, which will be hereinafter collectively referred to as a network as well (for example, see Non-Patent Documents 1 to 5). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions by 3GPP regarding the frame configuration in the LTE system described in Non-Patent Document 1 (Chapter 5) will be described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies of the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in the LTE communication system. The following five types of downlink reference signals are defined: a cell-specific reference signal (CRS), an MBSFN reference signal, a data demodulation reference signal (DM-RS) being a UE-specific reference signal, a positioning reference signal (PRS), and a channel state information reference signal (CSI-RS). The physical layer measurement objects of a communication terminal include reference signal received power (RSRP).

The transport channels described in Non-Patent Document 1 (Chapter 5) will be described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ will be described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method will be described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) will be described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in the case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced in the LTE, and the long term evolution advanced (LTE-A) and universal mobile telecommunication system (UMTS) described below.

The closed subscriber group (CSG) cell is a cell in which subscribers who are allowed use are specified by an operator (hereinafter, also referred to as a "cell for specific subscribers"). The specified subscribers are allowed to access one or more cells of a public land mobile network (PLMN). One or more cells to which the specified subscribers are allowed access are referred to as "CSG cell(s)". Note that access is limited in the PLMN.

The CSG cell is part of the PLMN that broadcasts a specific CSG identity (CSG ID) and broadcasts "TRUE" in a CSG indication. The authorized members of the subscriber group who have registered in advance access the CSG cells using the CSG ID that is the access permission information.

The CSG ID is broadcast by the CSG cell or cells. A plurality of CSG IDs exist in the LTE communication system. The CSG IDs are used by communication terminals (UEs) for making access from CSG-related members easier.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 2 discloses three different modes of the access to the HeNB and HNB. Specifically, an open access mode, a closed access mode, and a hybrid access mode are disclosed.

Further, 3GPP is pursuing specifications standard of long term evolution advanced (LTE-A) as Release 10 (see Non-Patent Documents 3 and 4). The LTE-A is based on the LTE radio communication system and is configured by adding several new techniques to the system.

Carrier aggregation (CA) is studied for the LTE-A system, in which two or more component carriers (CCs) are aggregated to support wider transmission bandwidths up to 100 MHz. Non-Patent Document 1 describes the CA.

In the case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 1.

Furthermore, 3GPP is studying the use of small eNBs (hereinafter also referred to as "small-scale base station devices") configuring small cells to satisfy tremendous traffic in the future. In an example technique under study, etc., a large number of small eNBs will be installed to configure a large number of small cells, thus increasing spectral efficiency and communication capacity. The specific techniques include dual connectivity (abbreviated as DC) in which a UE communicates with two eNBs through connection thereto. Non-Patent Document 1 describes the DC.

Among eNBs that perform dual connectivity (DC), one of them may be referred to as a master eNB (abbreviated as MeNB), and the other may be referred to as a secondary eNB (abbreviated as SeNB).

The traffic flow of a mobile network is on the rise, and the communication rate is also increasing. It is expected that the communication rate will be further increased when the operations of the LTE and the LTE-A are fully initiated.

For increasingly sophisticated mobile communications, the fifth generation (hereinafter also referred to as "5G") radio access system is studied, whose service is aimed to be launched in 2020 and afterward. For example, in the Europe, an organization named METIS summarizes the requirements for 5G (see Non-Patent Document 5).

Among the requirements in the 5G radio access system are a system capacity 1000 times as high as, a data transmission rate 100 times as high as, a data latency one tenth ($1/10$) as low as, and simultaneously connected communication terminals 100 times as many as those in the LTE system, to further reduce the power consumption and device cost.

To satisfy such requirements, 3GPP is pursuing the study of 5G standards as Release 14 (see Non-Patent Documents 6 and 7). The techniques on 5G radio sections are referred to as "New Radio (abbreviated as NR) Access Technology", and the several new techniques are being studied (see Non-Patent Documents 8 to 11). Examples of the techniques include a NR frame structure using a self-contained subframe, and precoding using an uplink sounding reference signal (SRS).

PRIOR-ART DOCUMENTS

Non-Patent Documents

Non-Patent Document 1: 3GPP TS36.300 V 13.4.0
Non-Patent Document 2: 3GPP S 1-083461
Non-Patent Document 3: 3GPP TR 36.814 V9.0.0
Non-Patent Document 4: 3GPP TR 36.912 V13.0.0
Non-Patent Document 5: "Scenarios, requirements and KPIs for 5G mobile and wireless system", [online], Apr. 30, 2013, ICT-317669-METIS/D1.1, [Searched on Sep. 16, 2016], Internet <https://www.metis2020.com/documents/deliverables/>
Non-Patent Document 6: 3GPP TR 23.799 V0.7.0
Non-Patent Document 7: 3GPP TR 38.912 V0.0.1
Non-Patent Document 8: 3GPP RP-160697
Non-Patent Document 9: 3GPP R1-164032
Non-Patent Document 10: 3GPP R1-165887
Non-Patent Document 11: 3GPP R1-166880

SUMMARY

Problems to be Solved by the Invention 5G requires performance, for example, a data transmission rate 100 times as high as and a data latency one tenth ($1/10$) as low as those in the LTE system.

To reduce latency, a proposal is made on a self-contained subframe consisting of downlink and uplink in one subframe as an NR frame structure. A response to the downlink is returned in the same subframe in the self-contained subframe (see Non-Patent Document 9).

The self-contained subframe has an interval (hereinafter also referred to as a "gap") for a UE during a shift from the downlink to the uplink to demodulate and decode a downlink signal, generate an uplink signal to be coded, and code and modulate the uplink signal.

Another proposal is made on retransmission from an eNB to the UE in the next subframe in the self-contained subframe, in response to the PUCCH from the UE, particularly, in response to a Nack signal. For example, Non-Patent Document 11 proposes providing a gap for the eNB to demodulate and decode the PUCCH, generate a retransmission signal, and code and modulate the retransmission signal after the UE transmits the uplink signal.

Thus, when the self-contained subframe is used, the gap duration is useless, and the use efficiency of resources decreases. Providing the gap duration reduces the number of symbols allocable to an uplink signal. This causes overlap in transmission timing between an uplink control signal such as Ack/Nack and the SRS, and decrease in the number of transmissions of the SRS. Thus, the precoding performance will degrade. Consequently, a problem of decrease in the transmission rate occurs.

The object of the present invention is to provide a communication system capable of suppressing decrease in the transmission rate.

Means to Solve the Problems

A communication system according to the present invention includes a base station device and a communication terminal device capable of radio communication with the base station device, wherein the base station device communicates with the communication terminal device using a self-contained subframe, the self-contained subframe including a downlink signal to be transmitted from the base station device to the communication terminal device, and an uplink signal to be transmitted from the communication terminal device to the base station device in response to the downlink signal, the uplink signal has a structure including an uplink control signal indicating information for controlling transmission of the uplink signal, and uplink user data to be transmitted before and after the uplink control signal, and the base station device notifies the communication terminal device of the structure of the uplink signal.

Effects of the Invention

In a communication system according to the present invention, a base station device communicates with a communication terminal device using a self-contained subframe including a downlink signal and an uplink signal. The base station device notifies the communication terminal device of a structure of the uplink signal. This enables the communication terminal device to recognize the structure of the uplink signal in the self-contained subframe. Thus, the communication terminal device can transmit the uplink signal using the self-contained subframe.

Since the uplink signal includes an uplink control signal, and uplink user data to be transmitted before and after the uplink control signal, a gap duration between the downlink signal and the uplink signal during which the uplink signal and the downlink signal are not transmitted can be reduced. The retransmission of the downlink signal in the next self-contained subframe can be performed with the gap duration after transmitting the uplink signal eliminated or reduced. Consequently, the radio resources can be efficiently used. Thus, decrease in the transmission rate with the self-contained subframe can be suppressed.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of a radio frame for use in an LTE communication system.

FIG. 2 is a block diagram showing the overall configuration of an LTE communication system 200 under discussion of 3GPP.

FIG. 5 is a block diagram showing the configuration of an MME according to the present invention.

FIG. 6 is a flowchart showing an outline from a cell search to an idle state operation performed by a communication terminal (UE) in the LTE communication system.

FIG. 7 shows the concept of a cell configuration when macro eNBs and small eNBs coexist.

FIG. 46 illustrates the example SRS transmission sequence when the plurality of subframes in which the SRS can be transmitted are configured to change the SRS subframe structure.

FIG. 49 illustrates one example of frequency-division multiplexing an uplink control signal with the SRS in the same symbol and transmitting the resulting signal according to the third embodiment.

FIG. 55 illustrates the timing of receiving, by TRPs, the uplink signal transmitted from a UE 1.

FIG. 61 illustrates the reception timing by the TRPs when an adjustment value β is provided for the uplink signal which is transmitted from the UE 1 and to which a gCP has been added.

FIG. 64 illustrates the timing of receiving, by the TRPs, the uplink signal transmitted from the UE 1 when an adjustment value γ is provided in a structure with GTs.

DESCRIPTION OF EMBODIMENTS

First Embodiment

Figure 3:
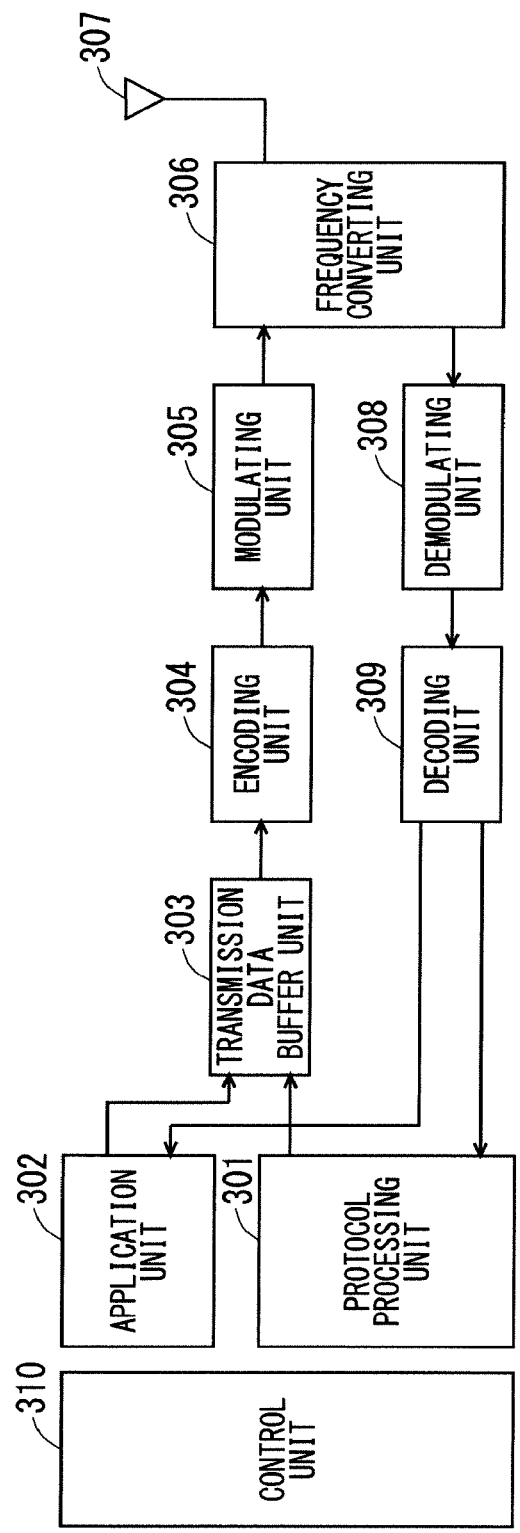
FIG. 3 is a block diagram showing the configuration of a user equipment 202 shown in FIG. 2, which is a communication terminal according to the present invention.

FIG. 2 is a block diagram showing an overall configuration of an LTE communication system 200, which is under discussion of 3GPP. FIG. 2 will be described. A radio access network is referred to as an evolved universal terrestrial radio access network (E-UTRAN) 201. A user equipment device (hereinafter, referred to as a "user equipment (UE)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a movable mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs broadcast, paging, RRC connection management, and the like. The states of the base station 203 and the user equipment 202 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 are classified into eNBs 207 and Home-eNBs 206. The communication system 200 includes an eNB group 203-1 including a plurality of eNBs 207 and a Home-eNB group 203-2 including a plurality of Home-eNBs 206. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW), or an MME and an S-GW by means of an S1 interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The Home-eNB 206 is connected to the MME unit 204 by means of an S1 interface, and control information is communicated between the Home-eNB 206 and the MME unit 204. A plurality of Home-eNBs 206 are connected to one MME unit 204.

Or, the Home-eNBs 206 are connected to the MME units 204 through a Home-eNB gateway (HeNBGW) 205. The Home-eNB 206 is connected to the HeNBGW 205 by means of an S1 interface, and the HeNBGW 205 is connected to the MME unit 204 by means of an S1 interface.

One or a plurality of Home-eNBs 206 are connected to one HeNBGW 205, and information is communicated therebetween through an S1 interface. The HeNBGW 205 is connected to one or a plurality of MME units 204, and information is communicated therebetween through an S1 interface.

The MME units 204 and HeNBGW 205 are entities of higher layer, specifically, higher nodes, and control the connections between the user equipment (UE) 202 and the eNB 207 and the Home-eNB 206 being base stations. The MME units 204 configure an EPC being a core network. The base station 203 and the HeNBGW 205 configure the E-UTRAN 201.

Further, 3GPP is studying the configuration below. The X2 interface between the Home-eNBs 206 is supported. In other words, the Home-eNBs 206 are connected to each other by means of an X2 interface, and control information is communicated between the Home-eNBs 206. The HeNBGW 205 appears to the MME unit 204 as the Home-eNB 206. The HeNBGW 205 appears to the Home-eNB 206 as the MME unit 204.

The interfaces between the Home-eNBs 206 and the MME units 204 are the same, which are the S1 interfaces, in both cases where the Home-eNB 206 is connected to the MME unit 204 through the HeNBGW 205 and it is directly connected to the MME unit 204.

The base station device 203 may configure a single cell or a plurality of cells. Each cell has a range predetermined as a coverage in which the cell can communicate with the user equipment 202 and performs radio communication with the user equipment 202 within the coverage. In the case where one base station device 203 configures a plurality of cells, every cell is configured so as to communicate with the user equipment 202.

FIG. 3 is a block diagram showing the configuration of the user equipment 202 of FIG. 2 that is a communication terminal according to the present invention. The transmission process of the user equipment 202 shown in FIG. 3 will be described. First, a transmission data buffer unit 303 stores the control data from a protocol processing unit 301 and the user data from an application unit 302. The data stored in the transmission data buffer unit 303 is passed to an encoding unit 304 and is subjected to an encoding process such as error correction. There may exist the data output from the transmission data buffer unit 303 directly to a modulating unit 305 without the encoding process. The data encoded by the encoding unit 304 is modulated by the modulating unit 305. The modulated data is converted into a baseband signal, and the baseband signal is output to a frequency converting unit 306 and is then converted into a radio transmission frequency. After that, a transmission signal is transmitted from an antenna 307 to the base station 203.

The user equipment 202 executes the reception process as follows. The radio signal from the base station 203 is received through the antenna 307. The received signal is converted from a radio reception frequency into a baseband signal by the frequency converting unit 306 and is then demodulated by a demodulating unit 308. The demodulated data is passed to a decoding unit 309 and is subjected to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 3, the control unit 310 is connected to the individual units 301 to 309.

Figure 4:
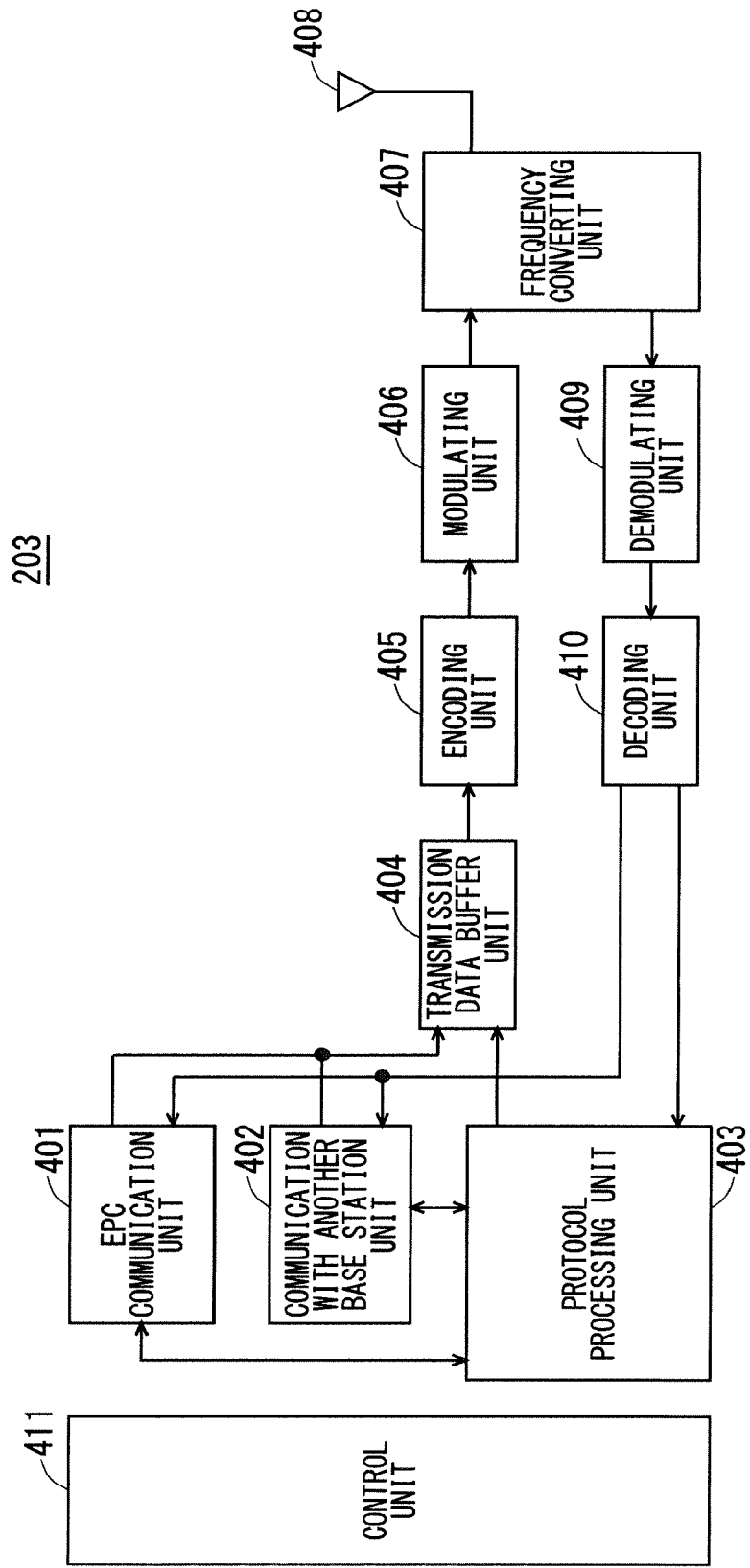
FIG. 4 is a block diagram showing the configuration of a base station 203 shown in FIG. 2, which is a base station according to the present invention.

FIG. 4 is a block diagram showing the configuration of the base station 203 of FIG. 2 that is a base station according to the present invention. The transmission process of the base station 203 shown in FIG. 4 will be described. An EPC communication unit 401 performs data transmission and reception between the base station 203 and the EPC (such as the MME unit 204), HeNBGW 205, and the like. A communication with another base station unit 402 performs data transmission and reception to and from another base station. The EPC communication unit 401 and the communication with another base station unit 402 each transmit and receive information to and from a protocol processing unit 403. The control data from the protocol processing unit 403, and the user data and the control data from the EPC communication unit 401 and the communication with another base station unit 402 are stored in a transmission data buffer unit 404.

The data stored in the transmission data buffer unit 404 is passed to an encoding unit 405 and is then subjected to an encoding process such as error correction. There may exist the data output from the transmission data buffer unit 404 directly to a modulating unit 406 without the encoding process. The encoded data is modulated by the modulating unit 406. The modulated data is converted into a baseband signal, and the baseband signal is output to a frequency converting unit 407 and is then converted into a radio transmission frequency. After that, a transmission signal is transmitted from an antenna 408 to one or a plurality of user equipments 202.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and is then subjected to a decoding process such as error correction. Among the pieces of decoded data, the control data is passed to the protocol processing unit 403, the EPC communication unit 401, or the communication with another base station unit 402, and the user data is passed to the EPC communication unit 401 and the communication with another base station unit 402. A series of processes by the base station 203 is controlled by a control unit 411. This means that, though not shown in FIG. 4, the control unit 411 is connected to the individual units 401 to 410.

FIG. 5 is a block diagram showing the configuration of the MME according to the present invention. FIG. 5 shows the configuration of an MME 204a included in the MME unit 204 shown in FIG. 2 described above. A PDN GW communication unit 501 performs data transmission and reception between the MME 204a and the PDN GW. A base station communication unit 502 performs data transmission and reception between the MME 204a and the base station 203 by means of the S1 interface. In the case where the data received from the PDN GW is user data, the user data is passed from the PDN GW communication unit 501 to the base station communication unit 502 via a user plane communication unit 503 and is then transmitted to one or a plurality of base stations 203. In the case where the data received from the base station 203 is user data, the user data is passed from the base station communication unit 502 to the PDN GW communication unit 501 via the user plane communication unit 503 and is then transmitted to the PDN GW.

In the case where the data received from the PDN GW is control data, the control data is passed from the PDN GW communication unit 501 to a control plane control unit 505. In the case where the data received from the base station 203 is control data, the control data is passed from the base station communication unit 502 to the control plane control unit 505.

A HeNBGW communication unit 504 is provided in the case where the HeNBGW 205 is provided, which performs data transmission and reception between the MME 204a and the HeNBGW 205 by means of the interface (IF) according to an information type. The control data received from the HeNBGW communication unit 504 is passed from the HeNBGW communication unit 504 to the control plane control unit 505. The processing results of the control plane control unit 505 are transmitted to the PDN GW via the PDN GW communication unit 501. The processing results of the control plane control unit 505 are transmitted to one or a plurality of base stations 203 by means of the S1 interface via the base station communication unit 502, and are transmitted to one or a plurality of HeNBGWs 205 via the HeNBGW communication unit 504.

The control plane control unit 505 includes a NAS security unit 505-1, an SAE bearer control unit 505-2, and an idle state mobility managing unit 505-3, and performs an overall process for the control plane. The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state, which is merely referred to as idle as well), generation and control of a paging signal in the idle state, addition, deletion, update, and search of a tracking area of one or a plurality of user equipments 202 being served thereby, and tracking area list management.

The MME 204a distributes a paging signal to one or a plurality of base stations 203. In addition, the MME 204a performs mobility control of an idle state. When the user equipment is in the idle state and an active state, the MME 204a manages a list of tracking areas. The MME 204a begins a paging protocol by transmitting a paging message to the cell belonging to a tracking area in which the UE is registered. The idle state mobility managing unit 505-3 may manage the CSG of the Home-eNBs 206 to be connected to the MME 204a, CSG IDs, and a whitelist.

An example of a cell search method in a mobile communication system will be described next. FIG. 6 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is derived from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME and the like to change a tracking area through the cell for performing tracking area update (TAU).

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

Widespread use of smartphones and tablet terminal devices explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively wide coverage, such as a cell configured by a conventional eNB, and a "macro eNB" refers to an eNB configuring a macro cell. A "small cell" refers to a cell having a relatively narrow coverage, such as a downsized cell, and a "small eNB" refers to an eNB configuring a small cell.

The macro eNB may be, for example, a "wide area base station" described in Non-Patent Document 7.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 7.

FIG. 7 shows the concept of the cell configuration in which macro eNBs and small eNBs coexist. The macro cell configured by a macro eNB has a relatively-wide-range coverage 701. A small cell configured by a small eNB has a coverage 702 whose range is narrower than that of the coverage 701 of a macro eNB (macro cell).

When a plurality of eNBs coexist, the coverage of the cell configured by an eNB may be included in the coverage of the cell configured by another eNB. In the cell configuration shown in FIG. 7, as indicated by a reference "704" or "705", the coverage 702 of the small cell configured by a small eNB may be included in the coverage 701 of the macro cell configured by a macro eNB.

As indicated by the reference "705", the coverages 702 of a plurality of, for example, two small cells may be included in the coverage 701 of one macro cell. A user equipment (UE) 703 is included in, for example, the coverage 702 of the small cell and performs communication via the small cell.

In the cell configuration shown in FIG. 7, as indicated by a reference "706", the coverage 701 of the macro cell configured by a macro eNB may overlap the coverages 702 of the small cells configured by small eNBs in a complicated manner.

As indicated by a reference "707", the coverage 701 of the macro cell configured by a macro eNB may not overlap the coverages 702 of the small cells configured by small eNBs.

Further, as indicated by a reference "708", the coverages 702 of a large number of small cells configured by a large number of small eNBs may be configured in the coverage 701 of one macro cell configured by one macro eNB.

In the LTE, asynchronous and adaptive scheduling is performed in the downlink, and synchronous and adaptive or non-adaptive scheduling is performed in the uplink (see Non-Patent Document 1).

Here, the synchronous scheduling means scheduling in which the retransmission timing is predetermined by a relative position with respect to the initial transmission timing. The asynchronous scheduling means scheduling for instructing the retransmission timing by including a process number in the downlink control information (DCI) and transmitting the process number to a recipient because the retransmission timing is not predetermined in the scheduling.

In the adaptive scheduling, the Modulation and Coding Scheme (MCS) and the frequency resource allocation can be changed for each retransmission. In the non-adaptive scheduling, the MCS and the frequency resource allocation for retransmission can be changed in a method identical to that for the initial transmission or for the previous retransmission, or in a predefined method (see 3GPP TS 36.321 V13.2.0 (hereinafter referred to as "Reference 1")).

In the self-contained subframe proposed as the NR, a structure principally involving downlink user data and Ack/Nack in response to the downlink user data, a structure principally involving an uplink grant and uplink user data according to the uplink grant, a structure principally involving a downlink reference signal and a measurement result on the downlink reference signal, and a structure principally involving a downlink control signal and the CQI or the sounding reference signal (SRS) instructed by the downlink control signal are proposed. A structure in which the downlink is synchronous with the uplink, that is, a structure in which the times to be allocated to the downlink and the uplink are the same is also proposed (see Non-Patent Document 9).

Another proposal is made on providing a gap in a portion after transmission of an uplink signal in the self-contained subframe to enable downlink retransmission in the next subframe upon receipt of Nack and minimize the latency from the receipt of Nack to the downlink retransmission (see Non-Patent Document 11).

However, Non-Patent Document 11 fails to disclose a method for providing a gap in the portion after transmission of the uplink signal in a subframe. This causes a problem with the UE which can neither recognize the subframe structure nor receive the downlink signal and transmit the uplink signal.

The first embodiment will disclose a method for solving such a problem. An eNB (a 5G base station will be also referred to as an "eNB" in the Description) sets, to the UE, a gap after transmission of the uplink signal according to the first embodiment.

For example, a gap length after transmission of the uplink signal may be used in setting the gap after transmission of the uplink signal. The gap length of the uplink signal may be given, for example, per minimum time, per symbol, or per another unit in the 5G radio access system. The gap length after transmission of the uplink signal may be given as a ratio to the length of the subframe.

The gap length after transmission of the uplink signal may be selected from several options. For example, the eNB may notify the UE of a list of the options and an identifier indicating a selection from the list. The list of the options and the identifier may be notified simultaneously or separately.

The gap length after transmission of the uplink signal may have a default value. Examples of a situation requiring the default value include a time when the UE is connected to the eNB. When being connected to the eNB, the UE needs to receive the broadcast information and a paging signal and also to transmit a physical random access channel. Here, the UE may communicate with the eNB using a subframe structure corresponding to the default value.

The default value may be statically determined in a standard or changeable.

An absolute value, that is, a necessary length may be directly given or a relative value may be given as the gap length after transmission of the uplink signal. For example, a default value may be used as a basis for giving the gap length using the relative value, or a difference from the previous setting value may be given.

When the gap after transmission of the uplink signal is set, the gap length to be set may be immediately validated.

Alternatively, when the gap length to be set is validated may be notified. The notification may, for example, directly specify the time when the gap length is validated or specify the time difference required from the notification to the validation of the gap length. A subframe number may be used as the time. The number of subframes may be used as the time difference. This enables the eNB and the UE to share the timing to change the gap length, which can prevent the transmission/reception loss between the eNB and the UE when the gap setting is changed.

The following (1) to (3) will be disclosed as specific examples of a method for notifying the gap setting after transmission of the uplink signal:

(1) a semi-static setting;
(2) a dynamic setting; and
(3) a combination of (1) and (2) above.

For example, the eNB may broadcast the semi-static setting in (1) to the UEs being served thereby. The broadcasting may be performed via, for example, the RRC common signaling. SIB1 or SIB2 may be used as an example of the RRC common signaling.

The RRC-dedicated signaling may be used as another example of the semi-static setting in (1). For example, RRC connection reconfiguration may be used as the RRC-dedicated signaling. Alternatively, a message 4 in a random access process may be used.

For example, the L1/L2 signaling may be used for the dynamic setting in (2). Since the gap setting can be changed per Transmission Time Interval (TTI) or per subframe, the gap setting can be changed with a short period.

MAC signaling (a MAC control element) may be used as another example of the dynamic setting in (2). Since retransmission is controlled in the MAC signaling, the setting can be notified with high reliability.

The eNB may make the semi-static and dynamic settings in (3) for the UE, using different setting details as one combination. For example, a list of the options of the gap length may be semi-statically given, and an identifier indicating a selection may be dynamically given. For example, a default value of the gap length may be semi-statically notified, and a difference from the default value may be dynamically set. Consequently, the gap length after transmission of the uplink signal can be flexibly set with less amount of signaling.

The eNB may notify the UE of each piece of configuration information of a downlink signal, a gap between the downlink signal and an uplink signal, and the uplink signal to set the gap after transmission of the uplink signal. The UE may calculate the gap length after transmission of the uplink signal, based on each piece of the configuration information. The gap length after transmission of the uplink signal may be obtained by, for example, subtracting, from the self-contained subframe, a sum of the lengths of the downlink signal, the gap between the downlink signal and the uplink signal, and the uplink signal as a calculation method thereof. The UE may use a result of the calculation as the gap setting after transmission of the uplink signal.

The eNB may notify the UE of each piece of the configuration information of the downlink signal, the gap between the downlink signal and the uplink signal, and the uplink signal to set the gap after transmission of the uplink signal. The UE may calculate the gap length after transmission of the uplink signal, based on each piece of the configuration information. The gap length after transmission of the uplink signal may be obtained by, for example, subtracting, from the self-contained subframe, a sum of the lengths of the downlink signal, the gap between the downlink signal and the uplink signal, and the uplink signal as a calculation method thereof. The UE may use a result of the calculation as the gap setting after transmission of the uplink signal.

The gap after transmission of the uplink signal, the downlink signal, the gap between the downlink signal and the uplink signal, and the uplink signal may be set simultaneously or separately.

In setting the gap after transmission of the uplink signal and the gap between the downlink signal and the uplink signal, the eNB and the UE may change the length of one of the gaps to follow the change in length of the other gap. For example, a sum of the lengths of the gap after transmission of the uplink signal and the gap between the downlink signal and the uplink signal may be constant.

The UE may change each piece of the configuration information of the downlink signal, the gap between the downlink signal and the uplink signal, and the uplink signal, using the gap length after transmission of the uplink signal that has been notified from the eNB. When the eNB notifies the UE of change in the gap length of the uplink signal, the UE may change the length of the downlink signal. Alternatively, the gap length between the downlink signal and the uplink signal may be changed. Alternatively, the length of the uplink signal may be changed. Alternatively, the length of the downlink signal, the gap length between the downlink signal and the uplink signal, and the length of the uplink signal may be changed in combination. Here, a sum of the length of the downlink signal, the gap length between the downlink signal and the uplink signal, the length of the uplink signal, and the gap length after transmission of the uplink signal may be constant.

The following (1) to (4) will be disclosed as specific examples of a unit for setting a gap after transmission of the uplink signal:

(1) constant setting within the eNB;
(2) setting per UE;
(3) setting for each HARQ process; and
(4) combinations of (1) to (3) above.

(1) may be broadcast to the UE in the eNB. The broadcast information may be used. The broadcast information may be SIB1 or SIB2. (1) may be notified to each UE. The notification for each UE may be made via the RRC-dedicated signaling, the MAC signaling, or the L1/L2 signaling.

(2) may be notified to each UE. (2) may be broadcast to the UE in the eNB. The broadcast information may be used. The notification for each UE may be made via the RRC-dedicated signaling, the MAC signaling, or the L1/L2 signaling.

(3) may be notified to each UE. In the notification for each UE, the gap lengths may be collectively or separately transmitted after transmission of the uplink signal in each HARQ process. In the notification for each UE, an identifier indicating each HARQ process may be used. The notification for each UE may be made via the RRC-dedicated signaling, the MAC signaling, or the L1/L2 signaling.

(3) may be notified for each HARQ process. The notification for each HARQ process may be made via the MAC signaling or the L1/L2 signaling. Consequently, Ack/Nack can be transmitted earlier in a subframe with less downlink data, and the eNB can perform processes for decoding and scheduling the Ack/Nack with sufficient leeway. The sufficient leeway in the processing time allows the eNB to perform the other processes such as device control.

The following (1) to (9) will be disclosed as specific examples of information necessary for the eNB to determine the gap length after transmission of the uplink signal:

(1) capability of decoding Ack/Nack by the eNB, for example, the time required for the decoding by the eNB;
(2) scheduling capability of the eNB, for example, the time required for the scheduling by the eNB;
(3) coding capability of the eNB, for example, the time required for coding the downlink user data by the eNB;
(4) decoding capability of the UE, for example, the time required for decoding the downlink user data by the UE;
(5) capability of coding Ack/Nack by the UE, for example, the time required for the coding by the UE;
(6) the length of the downlink signal;
(7) the gap length between the downlink signal and the uplink signal;
(8) the length of the uplink signal; and
(9) combinations of (1) to (8) above.

In (9), for example, the eNB may determine the gap length after uplink transmission, in consideration of each leeway in the time from reception of the downlink signal to transmission of Ack/Nack by the UE and in the time from reception of Ack/Nack to transmission of the downlink user data in the next subframe by the eNB.

A high-level network device may mainly determine the gap length after transmission of the uplink signal. The high-level network device may transmit the gap length after transmission of the uplink signal to the UE via the eNB.

The following (1) to (3) will be disclosed as specific examples of a judgment condition for the high-level network device to mainly determine the gap length after transmission of the uplink signal:

(1) the gap length after transmission of the uplink signal in a neighboring eNB of the eNB;
(2) a default value of the gap length after transmission of the uplink signal in the neighboring eNB of the eNB; and
(3) a combination of (1) and (2) above.

The high-level network device may transmit a request for information on (1) to the neighboring eNB of the eNB. The neighboring eNB of the eNB may transmit the information on (1) to the high-level network device.

The high-level network device may transmit a request for information on (2) to the eNB. The eNB may transmit the information on (2) to the high-level network device.

The inter-cell interference can be reduced because the gap setting after transmission of the uplink signal mainly made by the high-level network device allows for the setting with consideration given to states of the other eNBs.

The eNB and the UE may change a method for scheduling the downlink signal simultaneously when the eNB sets the gap length after transmission of the uplink signal to the UE. The eNB may transmit an identifier indicating the scheduling method to the UE. Examples of the identifier indicating the scheduling method may include a flag indicating whether the retransmission in the next subframe is possible. The identifier indicating the scheduling method may include the flag.

The eNB and the UE may change the scheduling method simultaneously when setting of the gap length after uplink transmission is validated. The associations of changing the method for scheduling the downlink signal according to change in setting of the gap length after uplink transmission may be defined in a standard. For example, no retransmission allowed in the next subframe when the gap length after uplink transmission is less than a predefined threshold may be defined in a standard.

The eNB and the UE may not change the scheduling for the downlink signal when the eNB sets the gap length after transmission of the uplink signal to the UE. The UE may receive the downlink user data according to a downlink control signal to be transmitted from the eNB, regardless of whether the eNB sets the gap length after transmission of the uplink signal to the UE. Alternatively, the UE may receive the downlink user data according to the scheduling given from the eNB in advance.

The scheduling method may be changed for the uplink signal. The scheduling methods for the downlink signal and the uplink signal may be changed simultaneously or separately.

Figure 8:
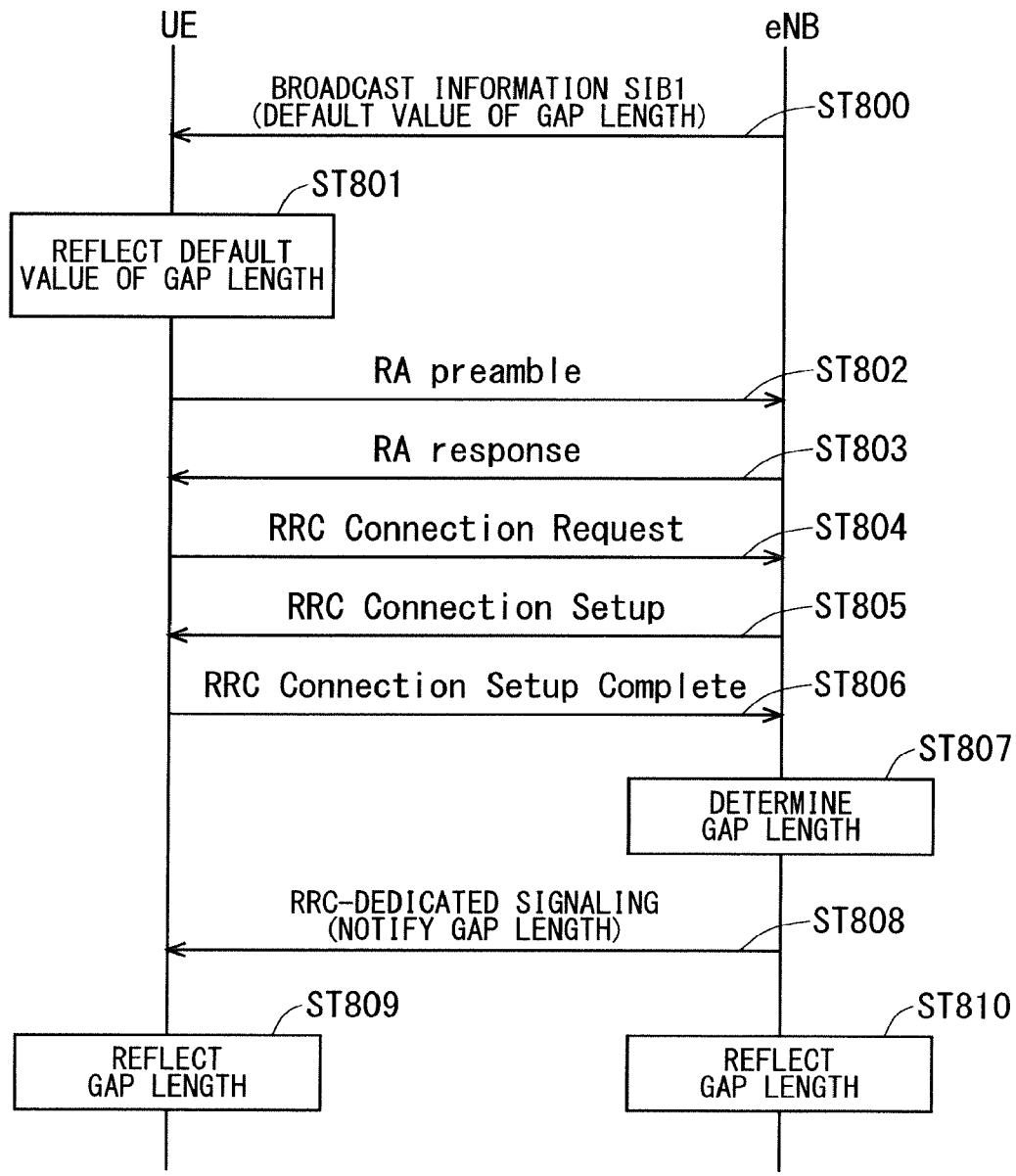
FIG. 8 illustrates an example sequence on setting a gap length after transmission of an uplink signal in a self-contained subframe.

FIG. 8 illustrates an example sequence on setting the gap length after transmission of the uplink signal in the self-contained subframe. FIG. 8 illustrates an example where in an initial connection of the UE, the eNB sets a default value of the gap length after transmission of the uplink signal using the broadcast information, and semi-statically sets, after RRC connection establishment, a UE-dedicated gap length after transmission of the uplink signal.

In Step ST800, the eNB broadcasts the default value of the gap length after uplink transmission to the UE. The broadcast information may be used in the broadcasting. The broadcast information may be, for example, SIB1.

In Step ST801, the UE reflects the default value of the gap length after uplink transmission. Then, the UE starts RRC connection processes with the eNB.

Steps ST802 to ST806 denote random access processes and the RRC connection processes.

In Step ST802, the UE notifies the eNB of an RA preamble. The RA preamble is notified using, for example, the PRACH.

In Step ST803, the eNB transmits an RA response to the UE. The eNB simultaneously notifies the uplink grant information to be used for transmitting an RRC Connection Request from the UE.

In Step ST804, the UE transmits the RRC Connection Request to the eNB. The RRC Connection Request may be transmitted using radio resources designated by the uplink grant information.

In Step ST805, the eNB transmits the RRC Connection Setup to the UE. The RRC Connection Setup may be transmitted together with a Contention Resolution in a series of the RA sequences of Step ST802 to ST804.

In Step ST806, the UE notifies the eNB of RRC Connection Setup Complete. Consequently, the RRC connection between the eNB and the UE is completed.

In Step ST807, the eNB determines the gap length after uplink transmission for the UE.

In Step ST808, the eNB transmits the determined gap length after uplink transmission to the UE. The gap length after uplink transmission may be transmitted via the RRC-dedicated signaling. The eNB may simultaneously notify information on when the gap length after uplink transmission is validated.

In Step ST809, the UE reflects the gap length after uplink transmission that has been received from the eNB. In Step ST810, the eNB reflects the gap length after uplink transmission that has been transmitted to the UE. Consequently, the UE and the eNB communicate with each other using the new gap length.

The gap length after uplink transmission may be changed according to a type of the uplink signal. Examples of the type of the uplink signal may include uplink user data, Ack/Nack, CQI, CSI, SRS, and PRACH. Changing the gap length after uplink transmission according to a type of the uplink signal enables the gap length after uplink transmission to be set based on a difference in processing time between uplink signals in the eNB without any waste.

The eNB may notify the UE of the gap length after uplink transmission for each type of the uplink signal as necessary. The notification may be made via the L1/L2 signaling. Alternatively, the eNB may notify the UE of a list of gap lengths for the respective types of the uplink signals. The notification may be made via the RRC-dedicated signaling, the MAC signaling, or the L1/L2 signaling. The eNB may simultaneously notify the UE of identifiers indicating the types of the uplink signals.

The identifiers may be notified via the L1/L2 signaling. Alternatively, the eNB may notify the UE of patterns of the types of the uplink signals for each subframe. The patterns may be notified via the RRC-dedicated signaling, the MAC signaling, or the L1/L2 signaling.

The gap length after uplink transmission may be changed according to a communication service between the eNB and the UE. Examples of the service may include enhanced Mobile BroadBand (eMBB), Ultra-Reliable and Low Latency Communication (URLLC), and massive Machine Type Communication (mMTC).

Changing the gap length after uplink transmission according to a communication service between the eNB and the UE enables setting of the optimal gap length to satisfy the requirements in each of the services. For example, setting the gap length after uplink transmission in the URLLC enables the eNB to perform retransmission in a subframe next to a subframe in which Nack has been received from the UE. In the eMBB, shortening or eliminating the gap length after uplink transmission can reduce useless communication due to the gap and increase the communication rate.

The eNB may determine the gap length after uplink transmission for each service, during the communication between the eNB and the UE. Alternatively, the gap length may be predetermined in a standard. The eNB may broadcast the gap length after uplink transmission for each service, or notify the gap length to each UE. The broadcast information may be used in the broadcasting. The broadcast information may be, for example, SIB1 or SIB2. The notification may be made via the RRC-dedicated signaling. Alternatively, the notification may be made via the MAC signaling. Consequently, the eNB and the UE can find the gap setting in a service to be used, from a combination with the identifier.

The eNB may notify the UE of a plurality of identifiers indicating the services. Consequently, when the eNB and the UE simultaneously adopt a plurality of services, the appropriate gap setting can be given to each of the services, thus increasing efficiency in the communication.

The eNB may notify the UE of an identifier indicating a service to be used with the UE. The notification may be made via the RRC-dedicated signaling, the MAC signaling, or the L1/L2 signaling.

The first embodiment enables the scheduling in the self-contained subframe using the subframe structure in which a gap is formed after uplink transmission. Thus, the eNB can perform retransmission in the next subframe in response to the Ack/Nack from the UE. This enables communication with low latency.

First Modification of First Embodiment

The first modification will describe a setting method to reduce a gap in the self-contained subframe.

A proposal is made on a frame structure in the NR to reduce a gap between the downlink signal and the uplink signal and eliminate a gap after uplink transmission, for example, through allocation of uplink user data before and after an uplink control signal such as Ack/Nack (see 3GPP R1-166410 (hereinafter referred to as "Reference 2")).

However, Reference 2 fails to disclose a method for allocating the uplink user data before and after the uplink control signal, thus causing a problem with the UE which can neither recognize the subframe structure nor transmit the uplink signal.

The first modification will disclose a method for solving such a problem.

The eNB notifies the UE of a structure of the uplink signal.

The following (1) to (4) will be disclosed as specific examples of information to be notified as the structure of the uplink signal:

(1) the type of the uplink signal;
(2) the length of the uplink signal;
(3) the start timing of the uplink signal; and
(4) combinations of (1) to (3) above.

The type of the uplink signal in (1) may be communicated using an identifier. Examples of the type of the uplink signal may include uplink user data, uplink control information, an uplink reference signal, and a gap. The uplink control information may include Ack/Nack, CQI, and CSI. Examples of the uplink reference signal may include a reference signal for demodulating uplink data and an uplink sounding reference signal.

The length of the uplink signal in (2) may be given, for example, per minimum time, per symbol, or per another unit in the 5G radio access system. The length of the uplink signal may be given as a ratio to the length of the subframe.

The start timing of the uplink signal in (3) may be given as, for example, a time from the beginning of a subframe. The start timing may be given as a time measured backward from the end of the subframe. The start timing may be given as a time from the end of the downlink signal.

The start timing of the uplink signal in (3) may be given, for example, per minimum time, per symbol, or per another unit in the 5G radio access system. The start timing of the uplink signal may be given as a ratio to the length of the subframe.

A plurality of settings may be possible in (1) to (3) above. For example, when there are a plurality of types of the uplink signals to be transmitted in a subframe, the settings in (1) to (3) above may be used for each of the types of the uplink signals.

In a structure of the uplink signal according to the first modification, a signal that does not require a response in the next subframe may be placed close to the end of the subframe. For example, the structure of the uplink signal may include the uplink user data, Ack/Nack, and the uplink user data, and the uplink user data may be placed at the end of the subframe. Alternatively, an uplink reference signal may be placed instead of the uplink user data at the end of the subframe.

Figure 9:
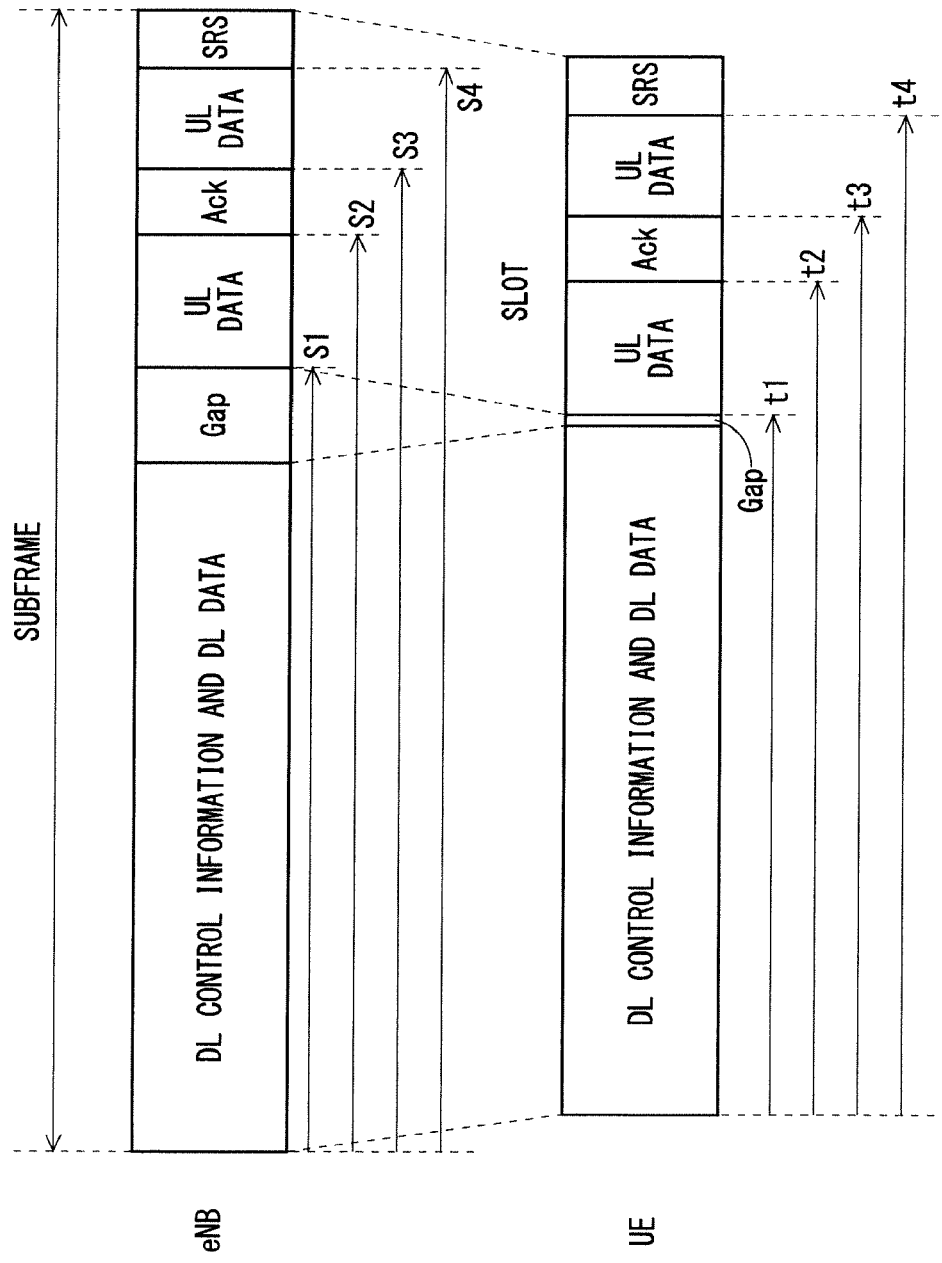
FIG. 9 illustrates an example uplink signal structure in the self-contained subframe.

FIG. 9 illustrates one example of a structure of the uplink signal (hereinafter may be referred to as an "uplink signal structure") in the self-contained subframe. In FIG. 9, the uplink signal includes the uplink user data, Ack/Nack, the uplink user data, and the uplink sounding reference signal. In FIG. 9, the start timing of each of the uplink signals is given as the timing for reception in the eNB and as a time from the beginning of the subframe. For example, the start timing of the first uplink user data is given as s1, that of Ack/Nack is given as s2, that of the second uplink user data is given as s3, and that of the uplink sounding reference signal is given as s4.

In the first modification, the timing of the uplink signal may be given as the timing of transmission by the UE. For example, the start timing of the first uplink user data may be given as t1, that of Ack/Nack may be given as t2, that of the second uplink user data may be given as t3, and that of the uplink sounding reference signal may be given as t4 in the example of FIG. 9.

In the first modification, when the structure of the uplink signal to be notified from the eNB to the UE is validated may be notified together. The notification on when the structure is validated may, for example, directly specify the time of the validation or specify the time difference required from the notification to the validation. A subframe number may be used as the time. The number of subframes may be used as the time difference. This enables simultaneous switching of the structure of the uplink signal between the eNB and the UE, which can prevent the transmission/reception loss between the eNB and the UE in switching of the structure of the uplink signal.

The structure of the uplink signal may be selected from several options. For example, the eNB may notify the UE of a list of the options and an identifier indicating a selection from the list. The list of the options and the identifier may be notified simultaneously or separately.

The following (1) to (3) will be disclosed as specific examples of a method for notifying the structure of the uplink signal:

(1) a semi-static setting;
(2) a dynamic setting; and
(3) a combination of (1) and (2) above.

For example, the eNB may broadcast the semi-static setting in (1) to the UEs being served thereby. The broadcasting may be performed via, for example, the RRC common signaling. SIB1 or SIB2 may be used as an example of the RRC common signaling.

The RRC-dedicated signaling may be used as another example of the semi-static setting in (1). For example, RRC connection reconfiguration may be used as the RRC-dedicated signaling. Alternatively, the message 4 in a random access process may be used.

The semi-static setting in (1) enables the eNB to notify the UE of the structure of the uplink signal with less amount of signaling.

For example, the L1/L2 signaling may be used for the dynamic setting in (2). Since the uplink signal structure can be changed per TTI or per subframe, the uplink signal structure can be changed with a short period.

MAC signaling (a MAC control element) may be used as another example of the dynamic setting in (2). Since retransmission is controlled in the MAC signaling, the setting can be notified with high reliability.

The eNB may make the semi-static and dynamic settings in (3) for the UE, using different setting details as one combination. For example, the uplink signal structure to be mainly used may be semi-statically specified, and the uplink signal structure to be suddenly used may be dynamically set. Consequently, the gap length after transmission of the uplink signal can be flexibly set with less amount of signaling.

In the first modification, the eNB may collectively notify the UE of uplink signal structures for a plurality of subframes. In the uplink signal structures, the uplink signal structures for the subframes may be different from each other. The uplink signal structures for the plurality of subframes may be notified using an identifier indicating a selection from the options. The uplink signal structures for the plurality of subframes may be notified together with a subframe number to be a notification target.

The uplink signal structures for the plurality of subframes may be notified via the RRC-dedicated signaling, the MAC signaling, or the L1/L2 signaling. The RRC connection reconfiguration may be used as an example of the RRC-dedicated signaling.

The eNB may transmit the downlink signals and receive the uplink signals for the plurality of subframes, using the uplink signal structures for the plurality of subframes.

The UE may receive the downlink signals and transmit the uplink signals for the plurality of subframes, using the uplink signal structures for the plurality of subframes.

The uplink signal structures for the plurality of subframes may or may not have a validity time limit. When the uplink signal structures do not have the validity time limit, the eNB and the UE periodically communicate with each other according to the notified uplink signal structures. When the uplink signal structures have the validity time limit, the validity time limit may be once (one period), or the eNB may notify the UE of a valid number of times or a validity time separately. Since the communication can be continued by notifying the uplink signal structures for the plurality of subframes once from the eNB to the UE, the amount of signaling can be reduced.

A default setting for the uplink signal structure may be provided. Examples of a situation requiring the default setting include a time when the UE is connected to the eNB. When being connected to the eNB, the UE needs to receive the broadcast information and a paging signal and also to transmit a physical random access channel. Here, the UE may communicate with the eNB using a subframe structure corresponding to the default structure.

The following (1) to (4) will be disclosed as specific examples of information for the eNB to determine the uplink signal structure:

(1) a buffer status of the uplink user data in the UE: the buffer status is indicated by, for example, information indicating an amount of remaining buffer or information indicating an amount of accumulated buffer;

(2) a channel state between the eNB and the UE;

(3) the switching time between transmission and reception in the UE; and (4) combinations of (1) to (3) above.

The UE may notify the eNB of the buffer status of the uplink user data in (1). The Uplink Control Information (UCI) may be used for notifying the buffer status. Alternatively, the notification may be made via the MAC signaling.

The eNB may make a determination on (2) above based on an uplink reference signal from the UE. Examples of the uplink reference signal to be used may include a reference signal for demodulating uplink data, an uplink sounding reference signal, and another uplink reference signal. The eNB may use the CQI to be transmitted from the UE.

The eNB may inquire of the UE about information indicating the switching time between transmission and reception in the UE in (3) above. The UE may notify the eNB of the information indicating the switching time between transmission and reception in the UE. The inquiry may be made via the RRC-dedicated signaling. The notification may be made via the RRC-dedicated signaling. The UE capability may be used as one example of the information indicating the switching time between transmission and reception in the UE.

In the first modification, information to be used for the eNB to determine the uplink structure, a method for notifying necessary information from the UE to the eNB, and a method for notifying the uplink structure from the eNB to the UE may be coordinated with one another. For example, the method for notifying necessary information from the UE to the eNB may be identical to the method for notifying the uplink structure from the eNB to the UE. For example, when the eNB determines the uplink structure based on a buffer status of the uplink user data in the UE, the MAC signaling may be used as a method for notifying the buffer status from the UE to the eNB and for notifying the uplink structure from the eNB to the UE. Consequently, the eNB can determine the uplink structure and notify the UE of the uplink structure in a method that follows change in the necessary information with less wasteful signaling.

Figure 10:
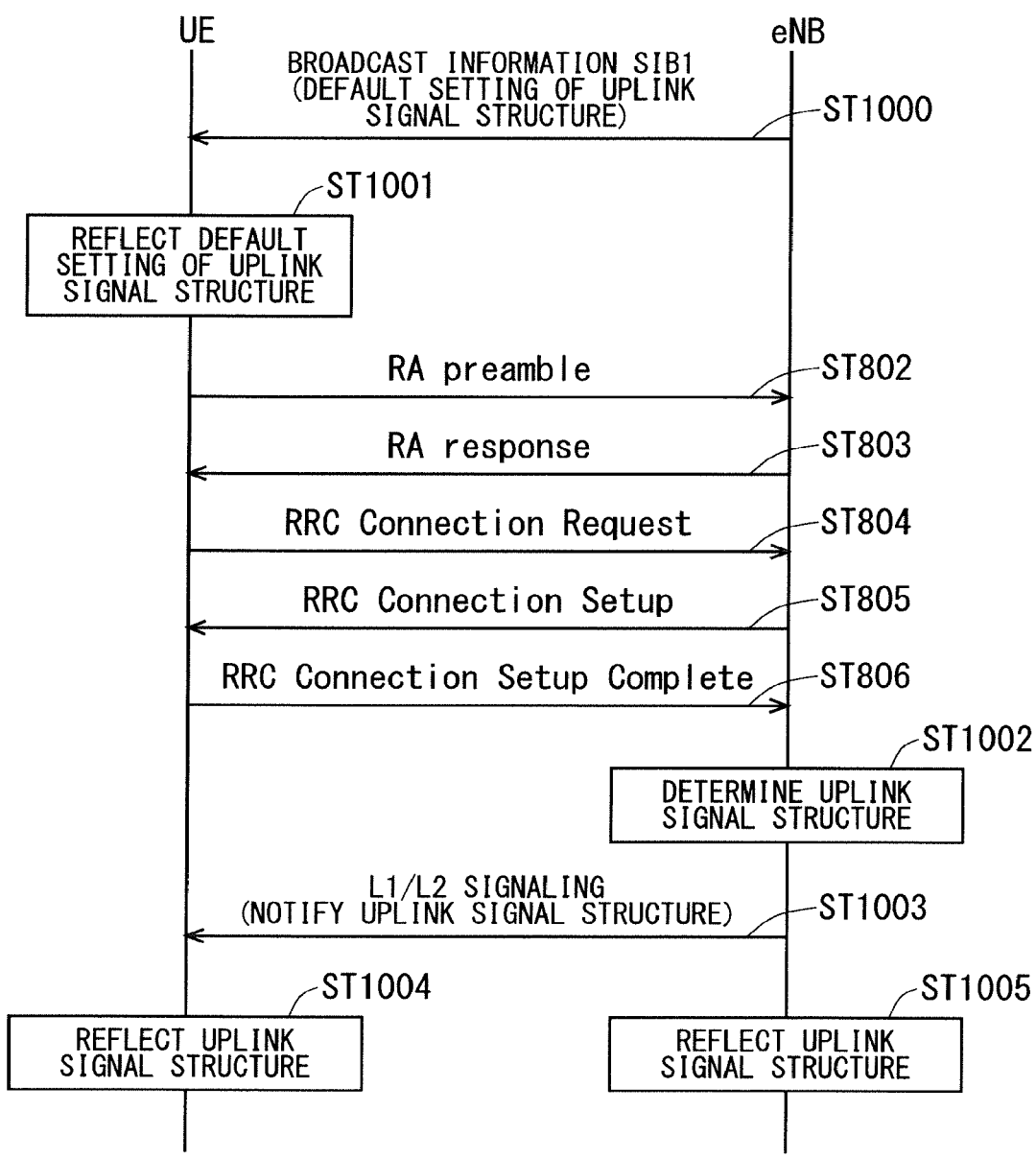
FIG. 10 illustrates an example sequence on setting the uplink signal structure in the self-contained subframe.

FIG. 10 illustrates an example sequence on setting the uplink signal structure in the self-contained subframe. FIG. 10 illustrates an example where in an initial connection of the UE, the eNB sets a default value of the gap length after transmission of the uplink signal in the broadcast information, and dynamically sets a UE-dedicated uplink signal structure after RRC connection establishment. Since the sequence illustrated in FIG. 10 includes the same Steps as those in the sequence illustrated in FIG. 8, the same step numbers will be assigned to the same Steps and the common description thereof will be omitted.

In FIG. 10, Step ST1000 replaces Step ST800 in FIG. 8. In Step ST1000, the eNB notifies the UE of the broadcast information SIB1 including the default setting of the uplink signal structure. The UE obtains the default setting of the uplink signal structure that is included in the broadcast information SIB1 transmitted from the eNB.

In FIG. 10, Step ST1001 replaces Step ST801 in FIG. 8. In Step ST1001, the UE reflects the default setting of the uplink signal structure.

In FIG. 10, Step ST1002 replaces Step ST807 in FIG. 8. In Step ST1002, the eNB determines the uplink signal structure.

In FIG. 10, Step ST1003 replaces Step ST808 in FIG. 8. In Step ST1003, the eNB notifies the UE of the uplink signal structure via the L1/L2 signaling.

In FIG. 10, Step ST1004 replaces Step ST809 in FIG. 8. In Step ST1004, the UE reflects the uplink signal structure received from the eNB.

In FIG. 10, Step ST1005 replaces Step ST810 in FIG. 8. In Step ST1005, the eNB reflects the uplink signal structure.

In the first modification, the UE may determine the uplink signal structure. The UE may notify the eNB of the uplink signal structure determined as above. The eNB may notify the UE of an acceptance response or a rejection response to the uplink signal structure notified from the UE. When simultaneously communicating with a plurality of eNBs, the UE only needs to notify the plurality of eNBs of the uplink signal structure once. Thus, signaling to be generated between the eNBs can be reduced.

Alternatively, the eNB may not notify the UE of the rejection response to the uplink signal structure notified from the UE according to the first modification. Consequently, since the UE can automatically determine the rejection response, the amount of signaling can be reduced.

For another example, the eNB may notify the UE of the uplink signal structure that can be set, together with the rejection response. Consequently, the repetition of notification of the uplink signal structure from the UE and the rejection response from the eNB can be prevented. Thus, the amount of signaling can be reduced, and the structure of the uplink signal can be promptly set.

The eNB may use a subframe structure of another UE connected to the UE to determine acceptance or rejection to the uplink signal structure.

The following (1) to (4) will be disclosed as specific examples of information necessary for the UE to determine the uplink signal structure:

(1) a buffer status of the uplink user data in the UE: the buffer status is indicated by, for example, information indicating an amount of remaining buffer or information indicating an amount of accumulated buffer;

(2) a channel state between the eNB and the UE;

(3) the switching time between transmission and reception in the UE; and (4) combinations of (1) to (3) above.

The eNB may notify the UE of an uplink channel state in (2). For example, the MCS may be used as the uplink channel state. For example, the uplink grant information may include the MCS. The uplink channel state may be notified via the RRC-dedicated signaling, using MAC control information, or via uplink L1/L2 signaling.

The UE may use a downlink channel state in (2). The CQI may be used as the downlink channel state.

The UE may notify the eNB of the uplink signal structure via the RRC-dedicated signaling. Alternatively, the MAC control information may be used. Alternatively, the L1/L2 signaling may be used.

When the uplink signal structure includes the uplink user data, the eNB may notify the UE of the scheduling information in the subframe. The L1/L2 signaling may be used as the scheduling information.

Since the first modification can reduce a gap between the downlink signal and the uplink signal in the self-contained subframe and eliminate a gap after transmission of the uplink signal, the radio resources can be efficiently used.

Moreover, the structure of the uplink signal can be flexibly set in the self-contained subframe.

Second Modification of First Embodiment

The second modification will describe a scheduling method to reduce a gap in the self-contained subframe.

In the conventional scheduling, the eNB accepts a gap duration after receiving Ack/Nack to perform retransmission to the UE in a subframe next to a subframe in which Nack has been received from the UE (see Non-Patent Document 11).

However, the gap after receiving Ack/Nack reduces the use efficiency of the resources. According to the methods disclosed in the first modification of the first embodiment, the gap after receiving Ack/Nack can be allocated to the uplink signal. If there is no uplink signal that can be transmitted from the UE, a problem with the remaining gap after receiving Ack/Nack occurs.

The second modification will disclose a method for solving such a problem. In the second modification, the eNB predetermines the scheduling for retransmission n subframes ahead. Here, n is an integer larger than or equal to 1. The synchronous scheduling may be performed. The eNB may use the scheduling for initial transmission or the scheduling for retransmission. The eNB may use both of the scheduling for initial transmission and the scheduling for retransmission. Which scheduling the eNB uses may be determined using Ack/Nack to be transmitted from the UE.

For example, when n=1, the scheduling for retransmission is performed in advance in a subframe in which the initial transmission data is transmitted.

For example, when n=2, the scheduling for retransmission is performed in a subframe before transmission of the initial transmission data. Here, the scheduling for the initial transmission data may be simultaneously performed.

In the second modification, the scheduling for initial transmission n subframes ahead may be simultaneously performed. For example, when n=2, the scheduling for the initial transmission data two subframes ahead may be performed.

The adaptive scheduling may be performed in the retransmission. In other words, scheduling different from that for the initial transmission may be performed. The non-adaptive scheduling may be performed.

In the second modification, the structure of the uplink signal may be set with application of the first embodiment or the first modification of the first embodiment. The structure of the uplink signal may include a gap after receiving Ack/Nack. This holds true for the following modifications and the following embodiments.

The operations of the eNB and the UE when n=1 according to the second modification will be described.

The eNB determines the scheduling for initial transmission.

In the next subframe, the eNB transmits information on the scheduling for initial transmission to the UE. The information on the scheduling for initial transmission may be transmitted using a downlink control signal. The eNB transmits the initial transmission data to the UE. The eNB schedules the retransmission data for the initial transmission data. The eNB may simultaneously schedule the next initial transmission data.

The retransmission data may overlap the next initial transmission data in frequency resources. Here, the eNB may transmit, in the next subframe, one of the next initial transmission data and the retransmission data using Ack/Nack from the UE. The retransmission data may be different from the next initial transmission data in frequency resources. Here, the eNB may transmit, in the next subframe, the retransmission data and the next initial transmission data simultaneously, or only one of them.

The UE receives the downlink control signal. The UE obtains information on the scheduling for initial transmission from the downlink signal. The UE receives the initial transmission data according to the information on the scheduling. The UE transmits, to the eNB, Ack/Nack in response to the initial transmission data.

The UE releases received data for HARQ if transmitting Ack in response to the initial transmission data. The UE holds the received data for HARQ if not transmitting Ack in response to the initial transmission data. The received data for HARQ to be held is combined with the retransmission data received from the eNB to be decoded. The received data for HARQ is held until Ack is returned in response to the retransmission or until expiration of the number of retransmissions.

The eNB receives Ack/Nack from the UE. The eNB determines scheduling to be used in the next subframe, based on the Ack/Nack from the UE. For example, upon receipt of Ack, the eNB uses the next scheduling for initial transmission in the next subframe. For example, upon receipt of Nack, the eNB uses the scheduling for retransmission in the next subframe.

In the next subframe, the eNB transmits information on the scheduling determined in a subframe immediately preceding the next subframe. The eNB transmits, to the UE, the downlink user data indicated by the information on the scheduling. The eNB also schedules the downlink user data to be transmitted in the subframe after the next. The scheduling method is the same as that for the subframe immediately preceding the subframe after the next.

The eNB and the UE subsequently repeat the aforementioned operations.

Figure 11:
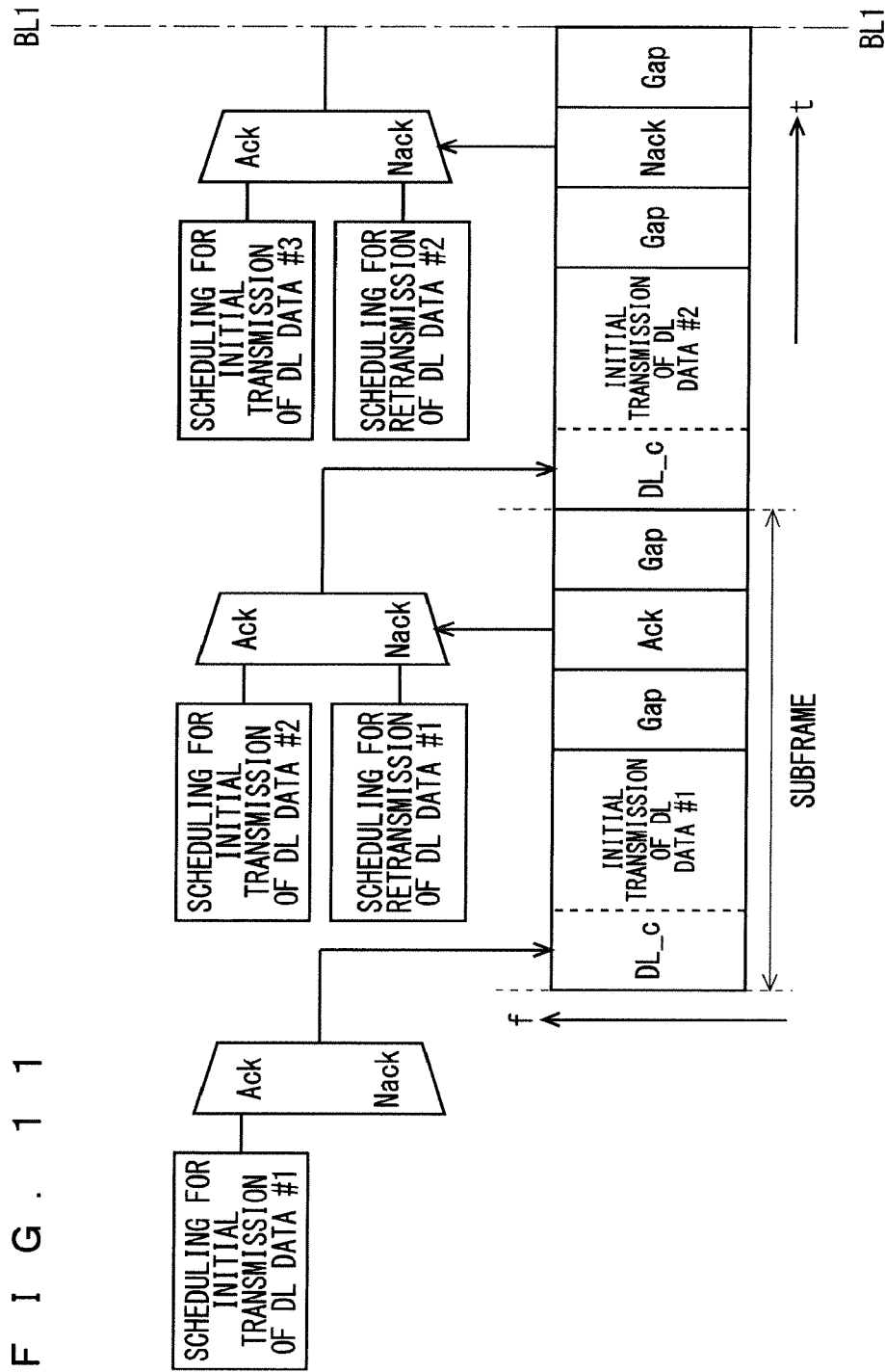
FIG. 11 illustrates an example method for scheduling one frame ahead according to the second modification of the first embodiment.
Figure 12:
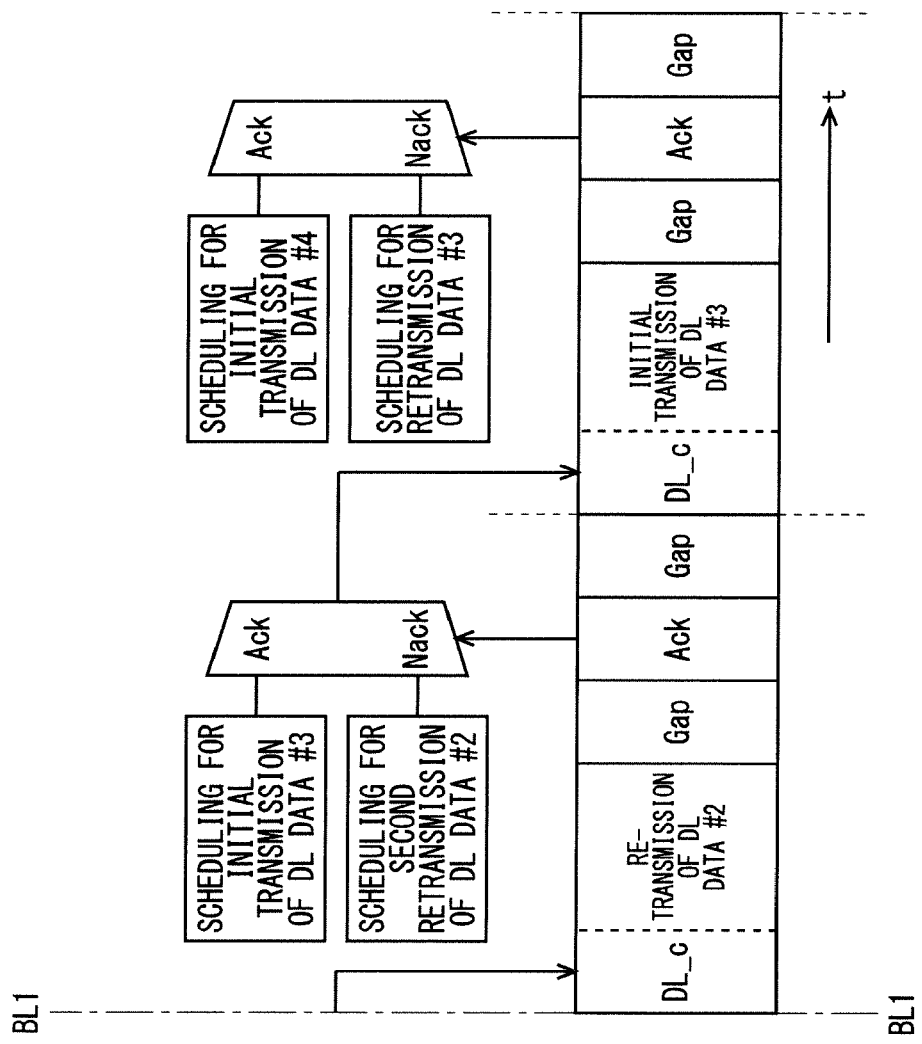
FIG. 12 illustrates the example method for scheduling one frame ahead according to the second modification of the first embodiment.

FIGS. 11 and 12 illustrate an example method for scheduling one frame ahead according to the second modification of the first embodiment. FIGS. 11 and 12 illustrate one example of the scheduling according to the second modification of the first embodiment when n=1. FIGS. 11 and 12 are connected across a location of a border BL1. In FIGS. 11 and 12, the horizontal axis represents time t, and the vertical axis represents a frequency f. In FIGS. 11 and 12, scheduling corresponding to each of Ack and Nack in the current subframe is performed in advance. Then, scheduling to be applied is switched depending on Ack/Nack from the UE, and is used in the next subframe.

Figure 13:
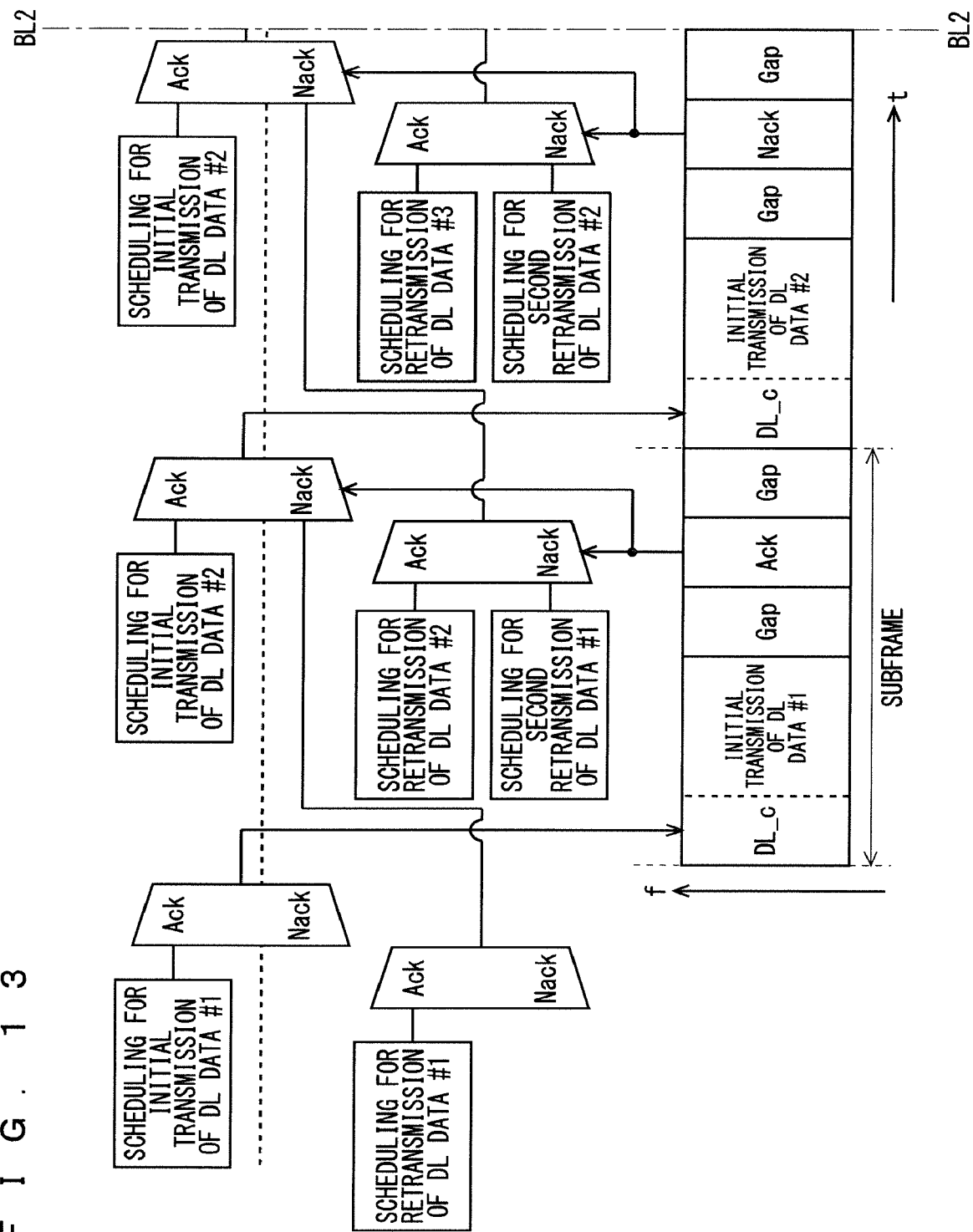
FIG. 13 illustrates an example method for scheduling retransmission two frames ahead according to the second modification of the first embodiment.
Figure 14:
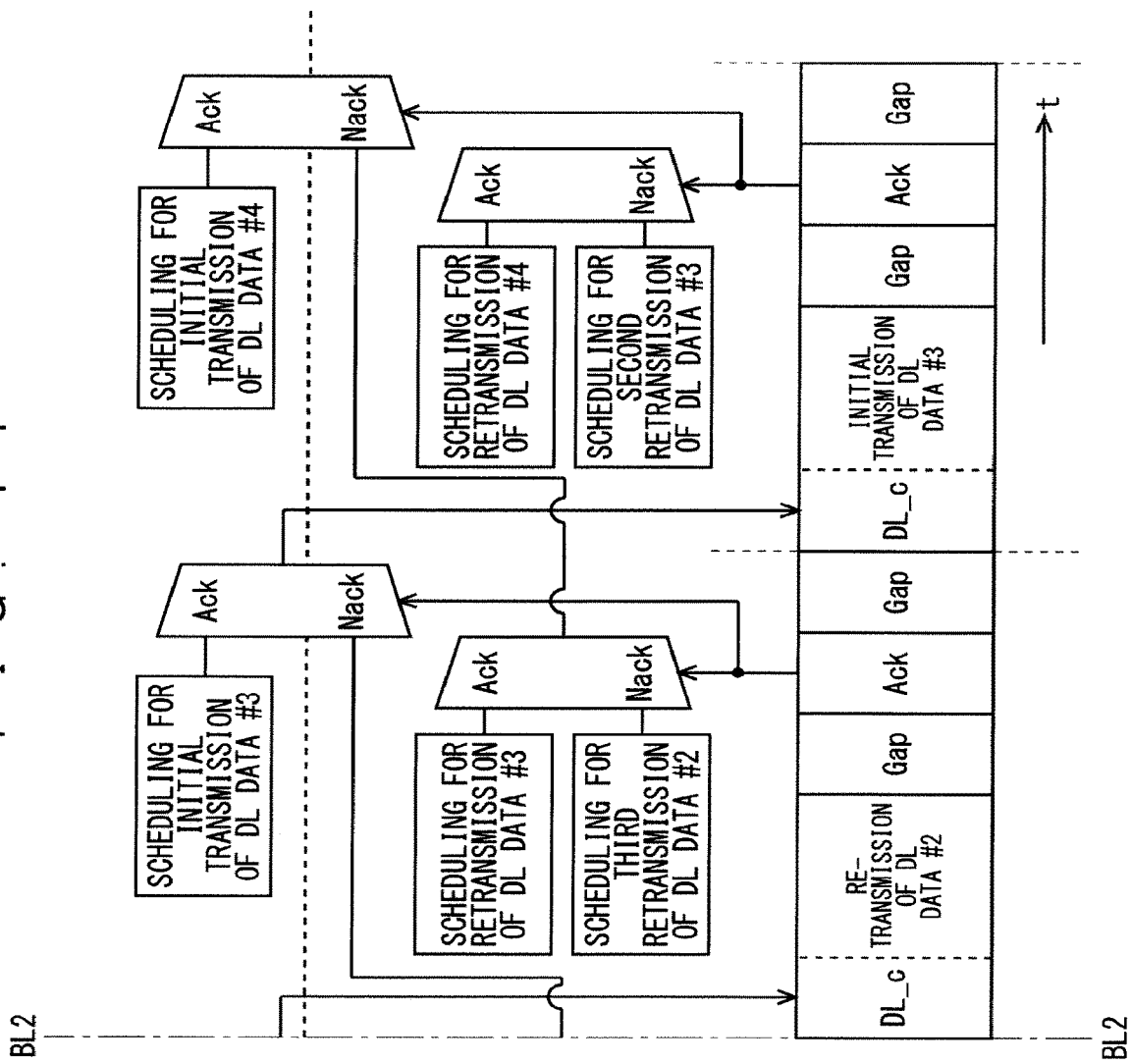
FIG. 14 illustrates the example method for scheduling retransmission two frames ahead according to the second modification of the first embodiment.

FIGS. 13 and 14 illustrate an example method for scheduling retransmission two frames ahead according to the second modification of the first embodiment. FIGS. 13 and 14 illustrate one example of the scheduling according to the second modification of the first embodiment when n=2. FIGS. 13 and 14 are connected across a location of a border BL2. In FIGS. 13 and 14, the horizontal axis represents time t, and the vertical axis represents a frequency f.

In FIGS. 13 and 14, the scheduling for initial transmission to be used in the next subframe and the scheduling for retransmission to be used in a subframe after the next are performed in advance. Then, which scheduling is used is switched depending on Ack/Nack in the subframe and Ack/Nack in the next subframe. The scheduling for retransmission is performed for the subframe after the next. Thus, the scheduling for retransmission is scheduling for the retransmission data for the next initial transmission, and scheduling for the second retransmission data for the current initial transmission data.

Figure 15:
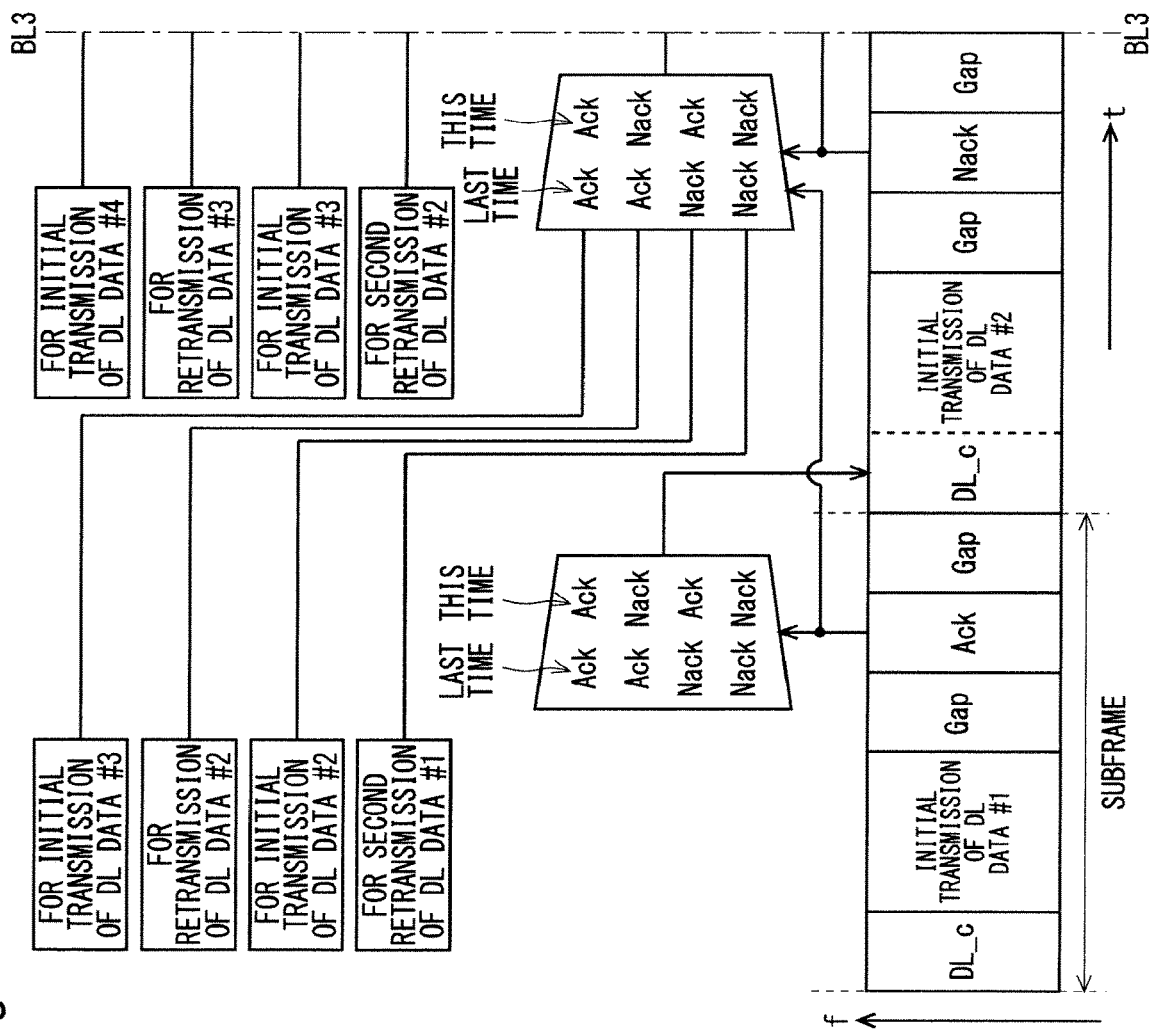
FIG. 15 illustrates an example method for scheduling the initial transmission and retransmission two frames ahead according to the second modification of the first embodiment.
Figure 16:
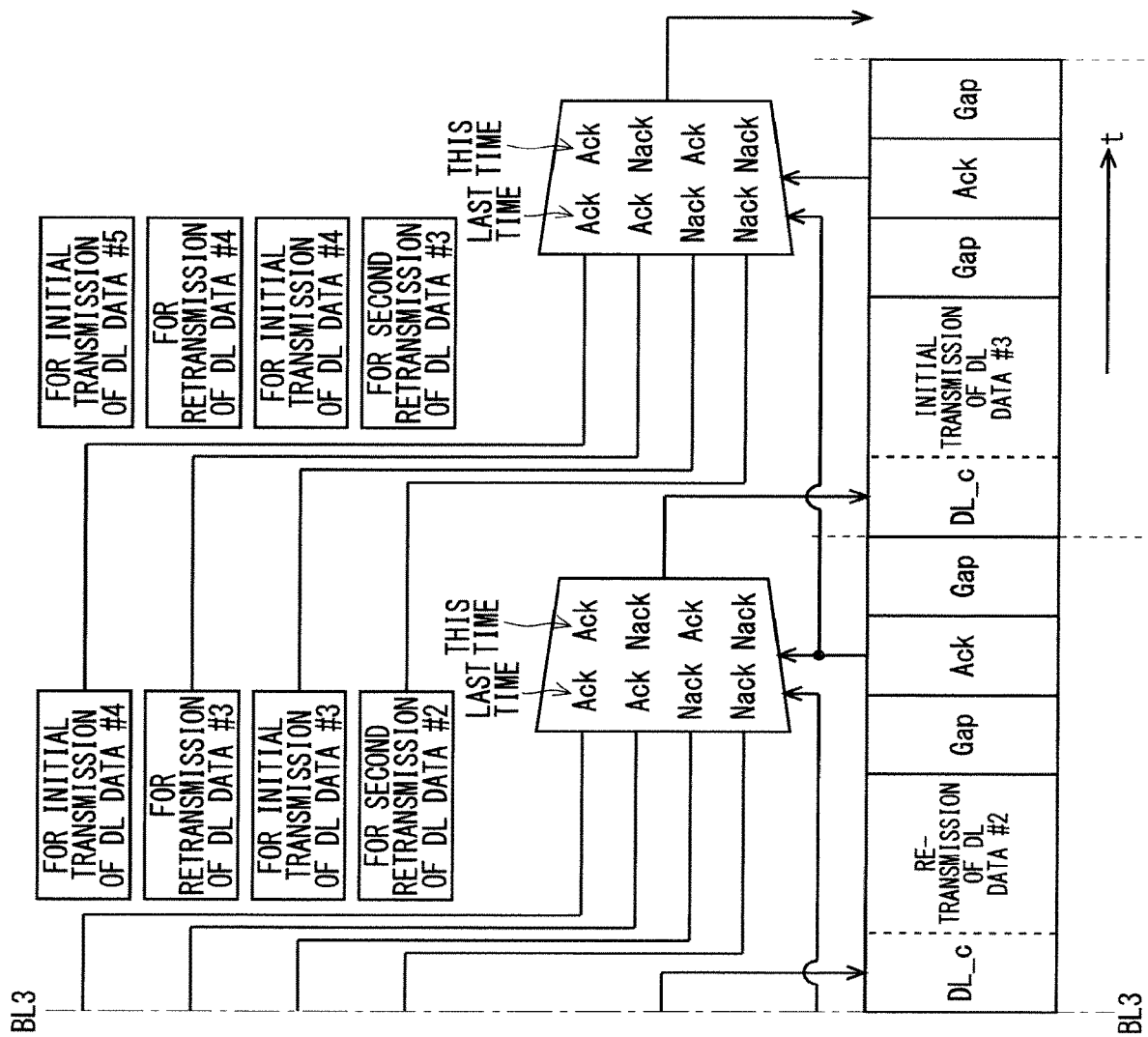
FIG. 16 illustrates the example method for scheduling the initial transmission and retransmission two frames ahead according to the second modification of the first embodiment.

FIGS. 15 and 16 illustrate an example method for scheduling the initial transmission and retransmission two frames ahead according to the second modification of the first embodiment. FIGS. 15 and 16 illustrate one example of scheduling the initial transmission n subframes ahead in the scheduling according to the second modification of the first embodiment. FIGS. 15 and 16 illustrate the case where n=2. FIGS. 15 and 16 are connected across a location of a border BL3. In FIGS. 15 and 16, the horizontal axis represents time t, and the vertical axis represents a frequency f.

In FIGS. 15 and 16, scheduling to be used in the subframe after the next is performed for both the initial transmission and the retransmission. Then, which scheduling is used is switched, depending on Ack/Nack in the subframe and in the next subframe. The number of schedulings to be performed in one subframe is the n-th power of 2. Thus, the number of schedulings to be performed in one subframe is the second power of 2, that is, 4.

The following (1) to (5) will be disclosed as specific examples of information necessary for determining the value n according to the second modification:

(1) the uplink signal structure, for example, the Ack/Nack timing or the gap length after transmission of the uplink signal;

(2) the time required for decoding the Ack/Nack by the eNB;

(3) the time required for encoding the downlink signal by the eNB;

(4) the subframe length; and (5) combinations of (1) to (4) above.

The uplink signal structure in (1) may have the same format as that according to, for example, the first modification of the first embodiment. The uplink signal structure may be, for example, information including at least one of the start timing, the length, and the end timing of an Ack/Nack symbol.

The time required for encoding the downlink signal in (3) to determine the value n according to the second modification may be the time required for encoding the downlink control information. The time required for encoding the downlink signal in (3) may be the time required for encoding the downlink user data. Alternatively, the time required for encoding the downlink signal in (3) may be both the time required for encoding the downlink control information and the time required for encoding the downlink user data.

The value n may be fixedly given in a standard according to the second modification. The eNB may broadcast the value n to the UE. The broadcast information may be used for the broadcasting. The broadcast information may be SIB1 or SIB2. The eNB may notify the UE of the value n via the RRC-dedicated signaling. The value n may be set only once when the UE is connected to the eNB, or may be changed after the connection.

Since the second modification enables the eNB to retransmit the downlink user data to the UE in a subframe next to a subframe in which Ack/Nack has been received, the communication latency can be reduced. Since the gap after transmission of the uplink signal can be reduced, the efficiency in communication can be increased.

Third Modification of First Embodiment

The third modification will describe a scheduling method to enable retransmission in a subframe next to a subframe in which Ack/Nack has been received, without any gap after transmission of the uplink signal in the self-contained subframe.

Although the method according to the second modification of the first embodiment enables reduction in the gap after transmission of the uplink signal, the time required for decoding Ack and Nack from the UE cannot be completely eliminated. Thus, a problem of failing to completely eliminate the gap after transmission of the uplink signal occurs.

The third modification will disclose a method for solving such a problem.

The eNB performs retransmission in m subframes after initial transmission. Here, m is an integer larger than or equal to 1. The synchronous scheduling may be performed. The eNB may apply Ack/Nack from the UE to data to be transmitted in the (m+1)-th subframe after initial transmission.

The third modification of the first embodiment is the same as the TTI bundling (for example, see Reference 1) that is a conventional technique in that the eNB transmits desired data to the UE in a plurality of subframes. However, the third modification differs from the TTI bundling in enabling different scheduling for the retransmission data from that for the initial transmission.

For example, when m=1, the eNB performs scheduling after receiving the Ack/Nack. Upon receipt of Ack, the eNB starts scheduling for the next initial transmission data. The eNB transmits the retransmission data to the UE in the next subframe. Then in the subframe after the next, the eNB transmits the next initial transmission data to the UE. Upon receipt of Nack, the eNB starts scheduling for the second retransmission data. The eNB transmits the retransmission data to the UE in the next subframe. Then in the subframe after the next, the eNB transmits the second retransmission data to the UE.

The eNB predetermines the scheduling for retransmission n subframes ahead, similarly as the second modification of the first embodiment. Here, n is an integer larger than or equal to 1. Which scheduling the eNB uses may be determined using Ack/Nack to be transmitted from the UE.

For example, when n=1, the scheduling for retransmission is performed in advance in a subframe in which the initial transmission data is transmitted.

For example, when n=2, the scheduling for retransmission is performed in a subframe before transmission of the initial transmission data. Here, the scheduling for the initial transmission data may be simultaneously performed.

In the third modification, the scheduling for initial transmission n subframes ahead may be simultaneously performed. For example, when n=2, the initial transmission data two subframes ahead may be scheduled.

The adaptive scheduling may be performed in the retransmission. In other words, scheduling different from that for the initial transmission may be performed. The adaptive scheduling enables the eNB to perform scheduling that flexibly responds to change in the radio environment. The non-adaptive scheduling may be performed. The non-adaptive scheduling eliminates the need for the UE to perform the decoding process on the downlink control information upon receipt of retransmission, thus reducing the processing load in the UE.

The operations of the eNB and the UE when m=1 and n=1 according to the third modification will be described.

The eNB determines the scheduling for initial transmission.

In the next subframe, the eNB transmits information on the scheduling for initial transmission to the UE. The information on the scheduling for initial transmission may be transmitted using a downlink control signal. The eNB transmits the initial transmission data to the UE. The eNB also schedules the retransmission data for the initial transmission data.

The UE receives the downlink control signal. The UE obtains information on the scheduling for initial transmission from the downlink signal. The UE receives the initial transmission data according to the information on the scheduling. The UE transmits, to the eNB, Ack/Nack in response to the initial transmission data.

The UE releases the received data for HARQ if transmitting Ack in response to the initial transmission data. The UE holds the received data for HARQ if not transmitting Ack in response to the initial transmission data. The received data for HARQ to be held is combined with the retransmission data received from the eNB to be decoded. The received data for HARQ is held until Ack is returned in response to the retransmission or until expiration of the number of retransmissions.

The eNB receives Ack/Nack from the UE. The eNB determines scheduling to be used in the next subframe, based on the Ack/Nack from the UE. For example, upon receipt of Ack, the eNB uses the next scheduling for initial transmission in the next subframe. For example, upon receipt of Nack, the eNB uses the scheduling for the second retransmission in the next subframe.

In the next subframe, the eNB transmits, to the UE, information on the scheduling determined in a subframe immediately preceding the next subframe. The eNB also transmits, to the UE, the downlink user data indicated by the information on the scheduling. The eNB also schedules the downlink user data to be transmitted in the subframe after the next. The scheduling method is the same as that for the subframe immediately preceding the subframe after the next.

The eNB and the UE subsequently repeat the aforementioned operations.

In the third modification, the eNB may not receive Ack/Nack in response to the retransmission data for which Ack has been received in the initial transmission. Alternatively, the eNB may not decode the Ack/Nack.

In the third modification, the UE may not transmit, to the eNB, Ack/Nack in response to the retransmission data on or before the (m−1)-th time. The eNB may not receive Ack/Nack in response to the retransmission data on or before the (m−1)-th time. Consequently, the process of coding the Ack/Nack by the UE can be reduced. Moreover, the process of decoding the Ack/Nack by the eNB can be reduced.

In the third modification, the UE may not receive the retransmission data after transmitting Ack in response to the initial transmission. Alternatively, the UE may not decode the retransmission data. Alternatively, the UE may or may not transmit, to the eNB, the Ack/Nack in response to the retransmission data.

Alternatively, the eNB may not retransmit the data for which Ack has been received from the UE before the m-th retransmission in the third modification. For example, upon receipt of Ack from the UE in response to the initial transmission where m=2, the eNB may transmit the next initial transmission data without transmitting the second retransmission data to the UE. This can prevent the eNB from repeatedly transmitting the data that the UE has accurately received, and increase the efficiency in communication between the eNB and the UE.

Figure 17:
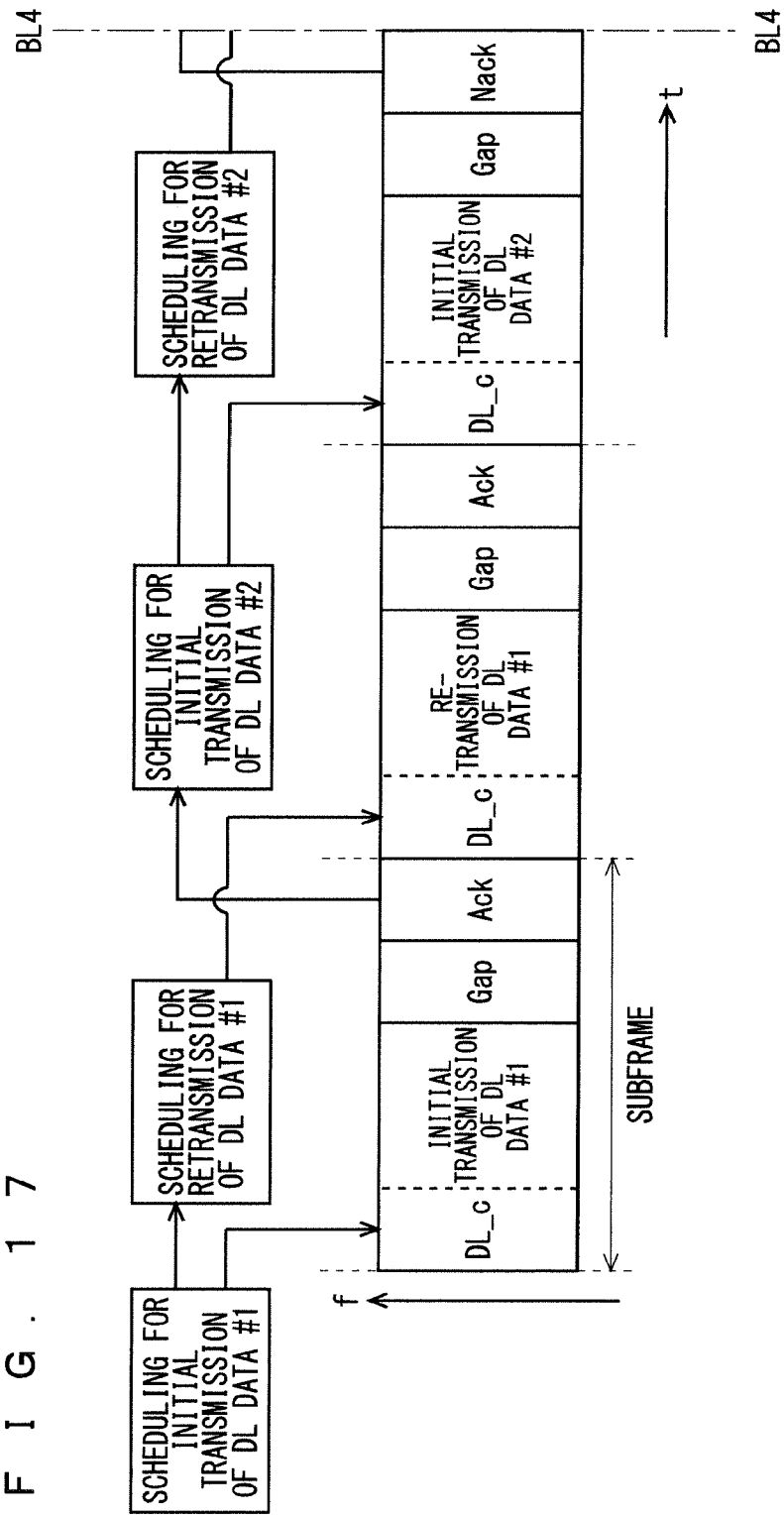
FIG. 17 illustrates an example method for scheduling one frame ahead when retransmission is performed once according to the third modification of the first embodiment.
Figure 18:
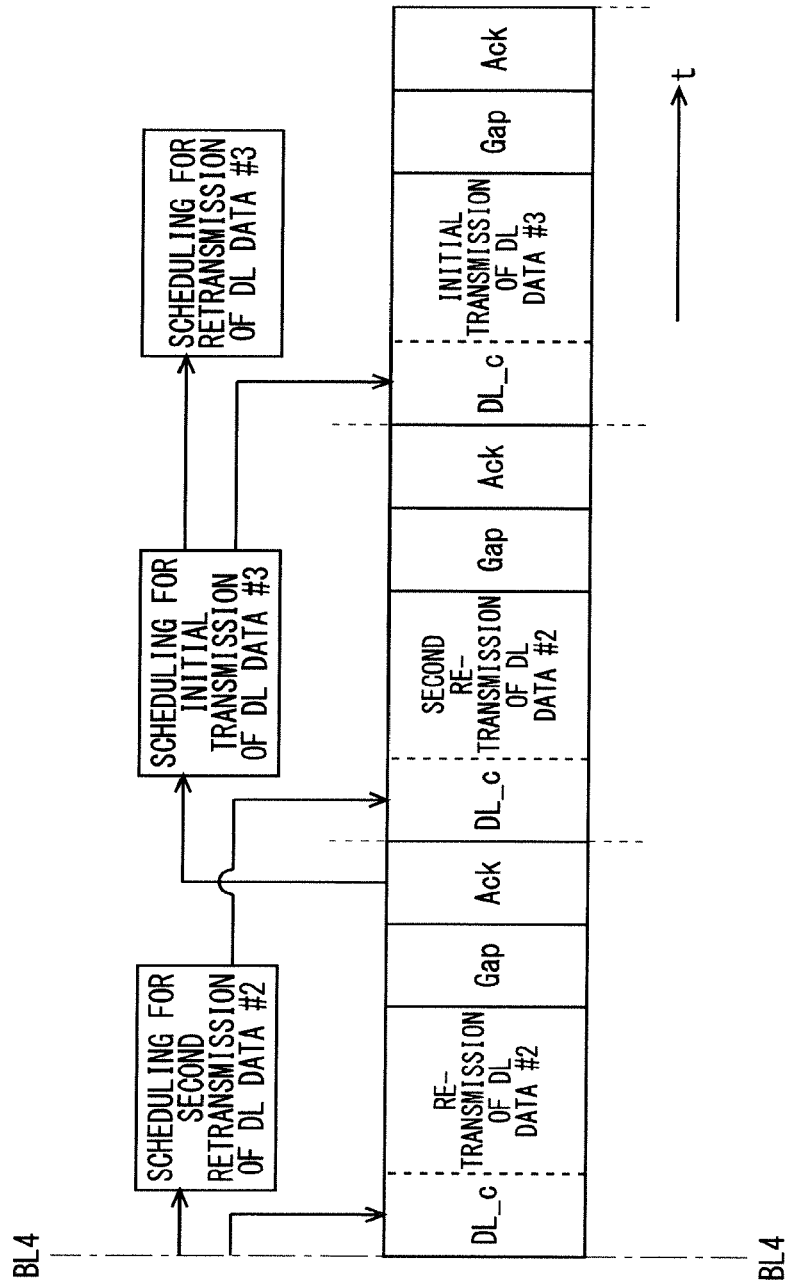
FIG. 18 illustrates the example method for scheduling one frame ahead when retransmission is performed once according to the third modification of the first embodiment.

FIGS. 17 and 18 illustrate an example method for scheduling one frame ahead when retransmission is performed once according to the third modification of the first embodiment. FIGS. 17 and 18 illustrate one example of the scheduling where m=1 and n=1 according to the third modification of the first embodiment. FIGS. 17 and 18 are connected across a location of a border BL4. In FIGS. 17 and 18, the horizontal axis represents time t, and the vertical axis represents a frequency f.

In FIGS. 17 and 18, the eNB transmits the initial transmission data to the UE in a subframe next to the subframe in which the scheduling for initial transmission has been performed. Since the retransmission is performed once, the eNB schedules retransmission in the subframe next to the subframe in which the scheduling for initial transmission has been performed, and transmits the retransmission data in the subframe after the next.

In FIGS. 17 and 18, upon receipt of Ack from the UE in response to the initial transmission, the eNB schedules the next initial transmission data in the next subframe, that is, in the subframe in which the retransmission data is to be transmitted, and transmits the next initial transmission data in the subframe after the next. Upon receipt of Nack from the UE in response to the initial transmission, the eNB schedules the second retransmission data in the next subframe, and transmits the second retransmission data in the subframe after the next.

Figure 19:
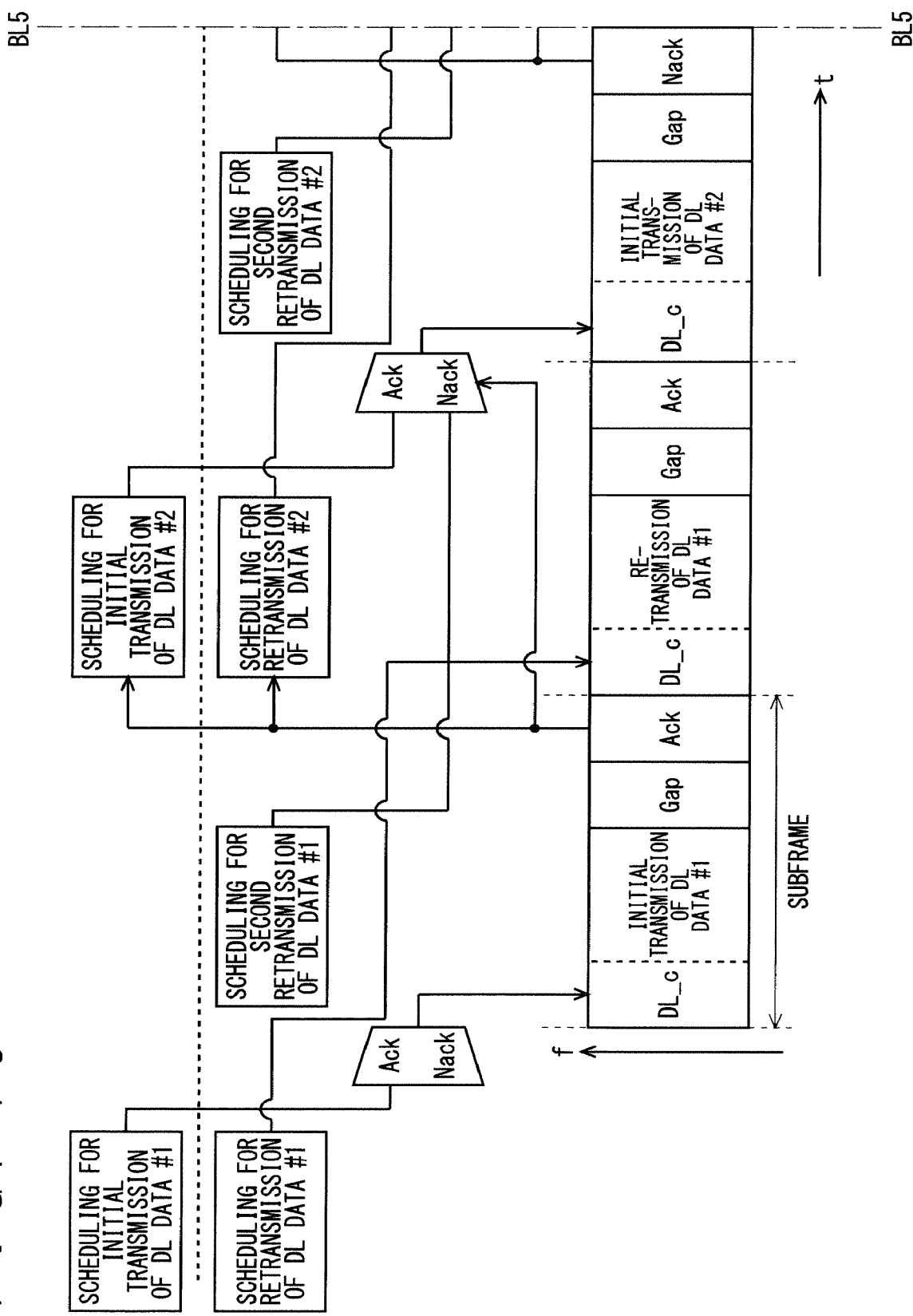
FIG. 19 illustrates an example method for scheduling retransmission two frames ahead when the retransmission is performed once according to the third modification of the first embodiment.
Figure 20:
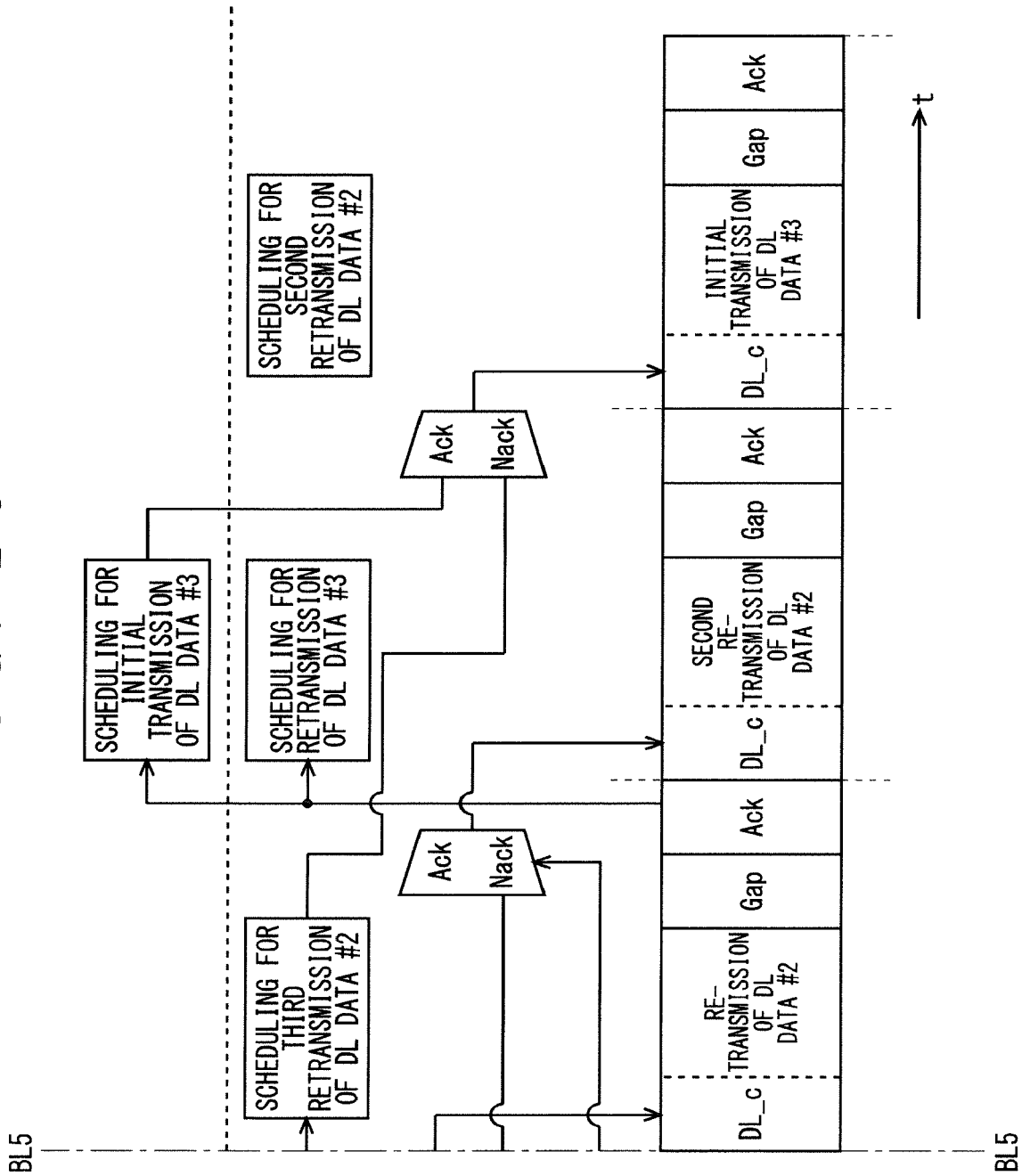
FIG. 20 illustrates the example method for scheduling retransmission two frames ahead when the retransmission is performed once according to the third modification of the first embodiment.

FIGS. 19 and 20 illustrate an example method for scheduling retransmission two frames ahead when the retransmission is performed once according to the third modification of the first embodiment. FIGS. 19 and 20 illustrate one example of the scheduling where m=1 and n=2 according to the third modification of the first embodiment. FIGS. 19 and 20 are connected across a location of a border BL5. In FIGS. 19 and 20, the horizontal axis represents time t, and the vertical axis represents a frequency f.

In FIGS. 19 and 20, the eNB simultaneously schedules the initial transmission and the retransmission of DL data #1, and performs the initial transmission of the DL data #1 and performs the scheduling for the second retransmission of the DL data #1 in the next subframe. The eNB retransmits the DL data #1 in the subframe after the next. Since the eNB also receives Ack from the UE in response to the initial transmission of the DL data #1, the eNB schedules the initial transmission and the retransmission of DL data #2.

In FIGS. 19 and 20, the eNB performs, in the next subframe, the initial transmission of the DL data #2 and the scheduling for the second retransmission of the DL data #2. The eNB retransmits the DL data #2 in the subframe after the next. Since the eNB receives Nack from the UE in response to the initial transmission of the DL data #2, the eNB schedules the third retransmission of the DL data #2.

The eNB transmits the DL data #2 for the second retransmission in the next subframe. Since the eNB receives Ack from the UE in response to the retransmission of the DL data #2, the eNB schedules the initial transmission and the retransmission of DL data #3. The operations for the DL data #3 are the same as those for the DL data #1.

Figure 21:
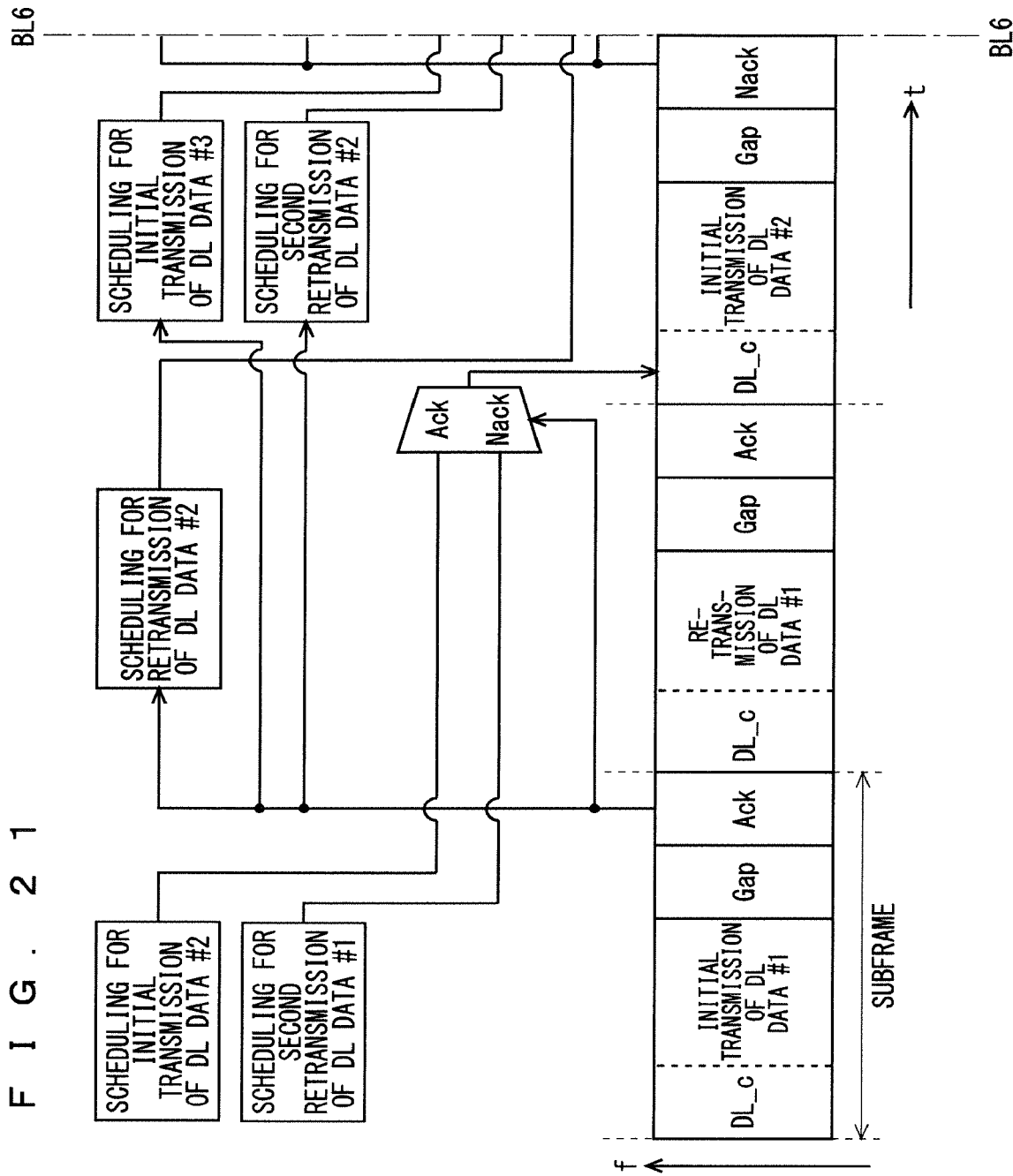
FIG. 21 illustrates an example method for scheduling the initial transmission and retransmission two frames ahead when the retransmission is performed once according to the third modification of the first embodiment
Figure 22:
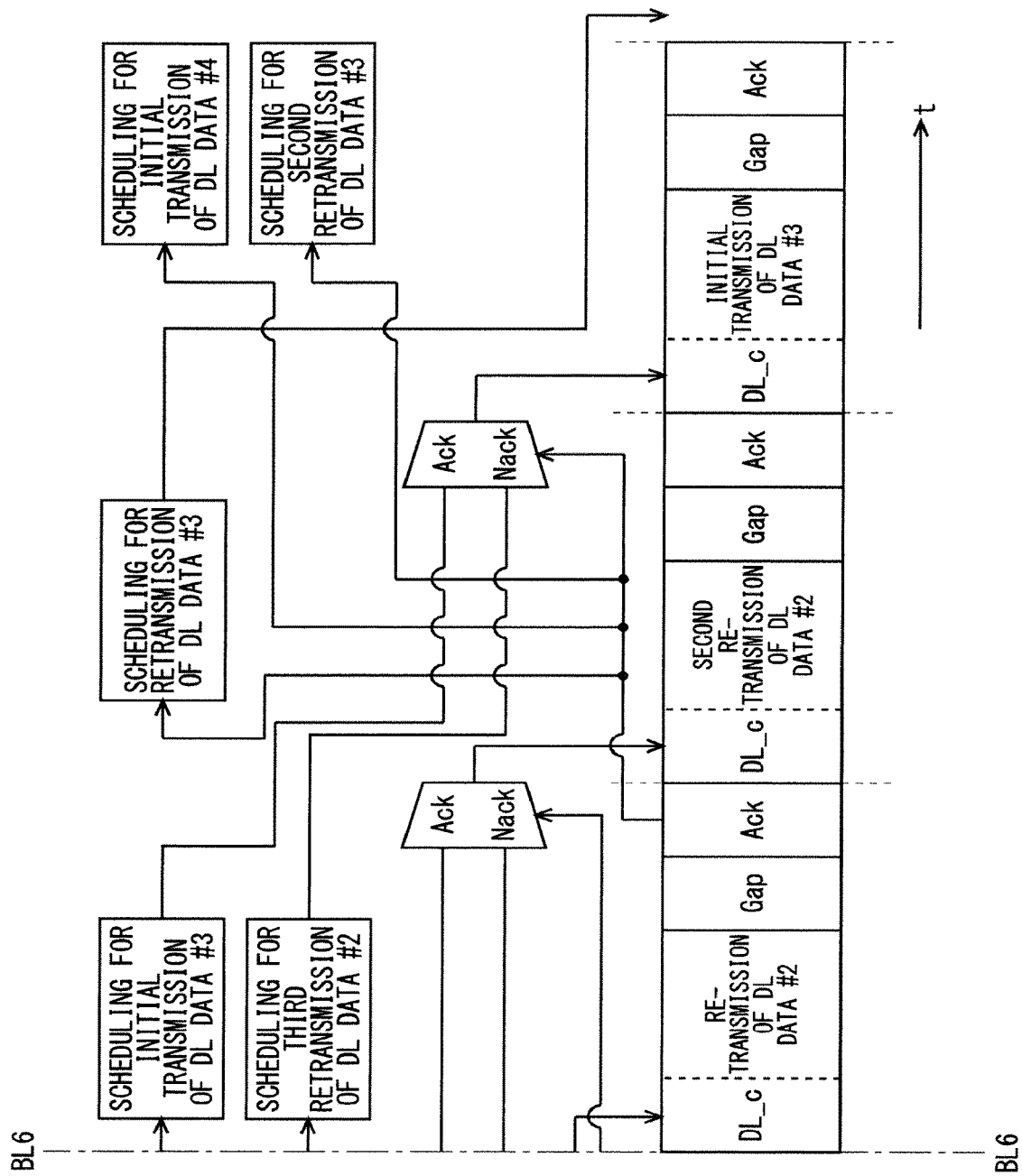
FIG. 22 illustrates the example method for scheduling the initial transmission and retransmission two frames ahead when the retransmission is performed once according to the third modification of the first embodiment

FIGS. 21 and 22 illustrate an example method for scheduling the initial transmission and retransmission two frames ahead when the retransmission is performed once according to the third modification of the first embodiment. FIGS. 21 and 22 illustrate one example of the scheduling for initial transmission n subframes ahead in the scheduling according to the third modification of the first embodiment. FIGS. 21 and 22 illustrate the case where m=1 and n=2. FIGS. 21 and 22 are connected across a location of a border BL6. In FIGS. 21 and 22, the horizontal axis represents time t, and the vertical axis represents a frequency f.

In FIGS. 21 and 22, the eNB performs the scheduling for initial transmission of the DL data #2 and the scheduling for the second retransmission of the DL data #1 in a subframe in which the DL data #1 is to be transmitted. The eNB retransmits the DL data #1 to the UE in the next subframe. Since the eNB receives Ack in response to the initial transmission of the DL data #1, the eNB schedules retransmission of the DL data #2.

Since the eNB receives Ack in response to the initial transmission of the DL data #1, the eNB performs, in the subframe after the next, the initial transmission of the DL data #2 based on the scheduling of the DL data #2 that has been performed two subframes before. The eNB simultaneously schedules the initial transmission of the DL data #3 and the second retransmission of the DL data #2.

The eNB retransmits the DL data #2 to the UE in the next subframe. Since the eNB receives Nack in response to the initial transmission of the DL data #2, the eNB reschedules the initial transmission of the DL data #3, and performs the scheduling for the third retransmission of the DL data #2. The eNB performs the second retransmission of the DL data #2 in the subframe after the next. Since the eNB receives Ack for the DL data #2, the eNB schedules retransmission of the DL data #3. The eNB performs the initial transmission of the DL data #3 in the next subframe. The operations for the DL data #3 are the same as those for the DL data #1.

The following (1) to (3) will be disclosed as specific examples of information necessary for determining the value m according to the third modification:

(1) the time for coding the downlink user data by the eNB;
(2) a ratio of Ack/Nack transmitted from the UE; and
(3) a combination of (1) and (2) above.

The value m may be fixedly given in a standard according to the third modification. The eNB may broadcast the value m to the UE. The broadcast information may be used for the broadcasting. The broadcast information may be SIB 1 or SIB2. The eNB may notify the UE of the value m via the RRC-dedicated signaling. The value m may be set only once when the UE is connected to the eNB, or may be changed after the connection.

Since the information necessary for determining the value n is the same as that according to the second modification of the first embodiment, the description will be omitted in the third modification.

Since the way to give the value n in the third modification is the same as that for the value m, the description will be omitted.

Since the third modification enables the eNB to retransmit the downlink user data to the UE in a subframe next to a subframe in which Ack/Nack has been received, the communication latency can be reduced. Since the gap after transmission of the uplink signal can be eliminated, the efficiency in communication can be increased.

Fourth Modification of First Embodiment

The fourth modification will describe a scheduling method to enable retransmission in a subframe next to a subframe in which Ack/Nack has been received, without using, in the self-contained subframe, the downlink control information on the subframe in retransmission.

Although the eNB transmits the downlink control information to the UE also in its retransmission in the methods according to the second and third modifications of the first embodiment, the eNB performs scheduling without transmitting the downlink control information to the UE in the retransmission according to the fourth modification.

The eNB allocates, to the retransmission, the same frequency resources and the same modulating method as those for the initial transmission. In the retransmission, the redundancy version (RV) may be changed from that for the initial transmission. Consequently, the error correction capability in the retransmission can be increased.

The eNB and the UE may preferably share the association between the number of retransmissions and the RV. The association between the number of retransmissions and the RV may be predefined in a standard. The eNB may broadcast the association between the number of retransmissions and the RV to the UE. The broadcast information may be used for the broadcasting. The broadcast information may be SIB1 or SIB2.

The eNB may notify the UE of the association between the number of retransmissions and the RV via the RRC-dedicated signaling or the MAC signaling. While maintaining the reliability through the retransmission control, the MAC signaling enables notification of the association between the number of retransmissions and the RV more promptly than that by using the broadcast information and the RRC-dedicated signaling. The RV in the retransmission may be identical to that in the initial transmission.

The eNB may allocate, to the downlink user data in retransmission, a symbol allocated to the downlink control information. Consequently, the number of physical channel bits and the error correction capability in retransmission can be increased. The eNB may notify the UE of an identifier indicating whether an area for the downlink control information is allocated to the downlink user data in retransmission, or whether the area for the downlink control information is allocated to the downlink user data may be defined in a standard.

The eNB may broadcast the identifier to the UE. The broadcast information may be used for the broadcasting. The broadcast information may be SIB1 or SIB2. The eNB may notify the UE of the identifier via the RRC-dedicated signaling, via the MAC signaling, or as the downlink control information for the initial transmission.

The UE may obtain the identifier. The UE may determine a receiving area for the downlink user data in retransmission, using the identifier.

The fourth modification may be applied to a conventional method for scheduling the next subframe using Ack/Nack from the UE. The fourth modification may be applied to the scheduling method described in the second modification of the first embodiment. The fourth modification may be applied to the scheduling method described in the third modification of the first embodiment.

The operations of the eNB and the UE according to the fourth modification will be described. The eNB performs scheduling for the initial transmission data. The eNB transmits the scheduling information for the initial transmission data. The scheduling information may be transmitted using a downlink control signal. The eNB transmits the initial transmission data. The UE receives the initial transmission data. The UE transmits, to the eNB, Ack/Nack in response to the initial transmission data.

The eNB determines whether the retransmission is necessary for the initial transmission data. The Ack/Nack from the UE may be used for the determination. Alternatively, the eNB may always perform retransmissions for the designated number of subframes or longer after the initial transmission.

The eNB transmits the retransmission data to the UE based on the determination. The eNB may use the transmission area for the downlink control information as the receiving area for the downlink user data in transmitting the retransmission data.

The UE determines whether the downlink signal to be received is for the initial transmission or the retransmission. The determination may be made using the Ack/Nack transmitted to the eNB. Alternatively, the arrangement for the eNB to always perform retransmissions for the designated number of subframes or longer after the initial transmission may be used.

The UE receives the retransmission data from the eNB. Whether the eNB uses the transmission area for the downlink control information as the area for the downlink user data may be used in receiving the retransmission data. The UE transmits, to the eNB, Ack/Nack in response to the retransmission data.

The UE may transmit a scheduling request to the eNB. The UE may transmit the scheduling request during the HARQ retransmission of the downlink user data from the eNB. The eNB may transmit scheduling information to the UE using the scheduling request from the UE as a trigger. The eNB may transmit the scheduling information in response to the retransmission data. Consequently, the eNB can transmit the downlink control information when retransmitting the downlink user data. Thus, recover from the malfunction caused by the eNB misjudging Ack/Nack from the UE is possible.

Figure 23:
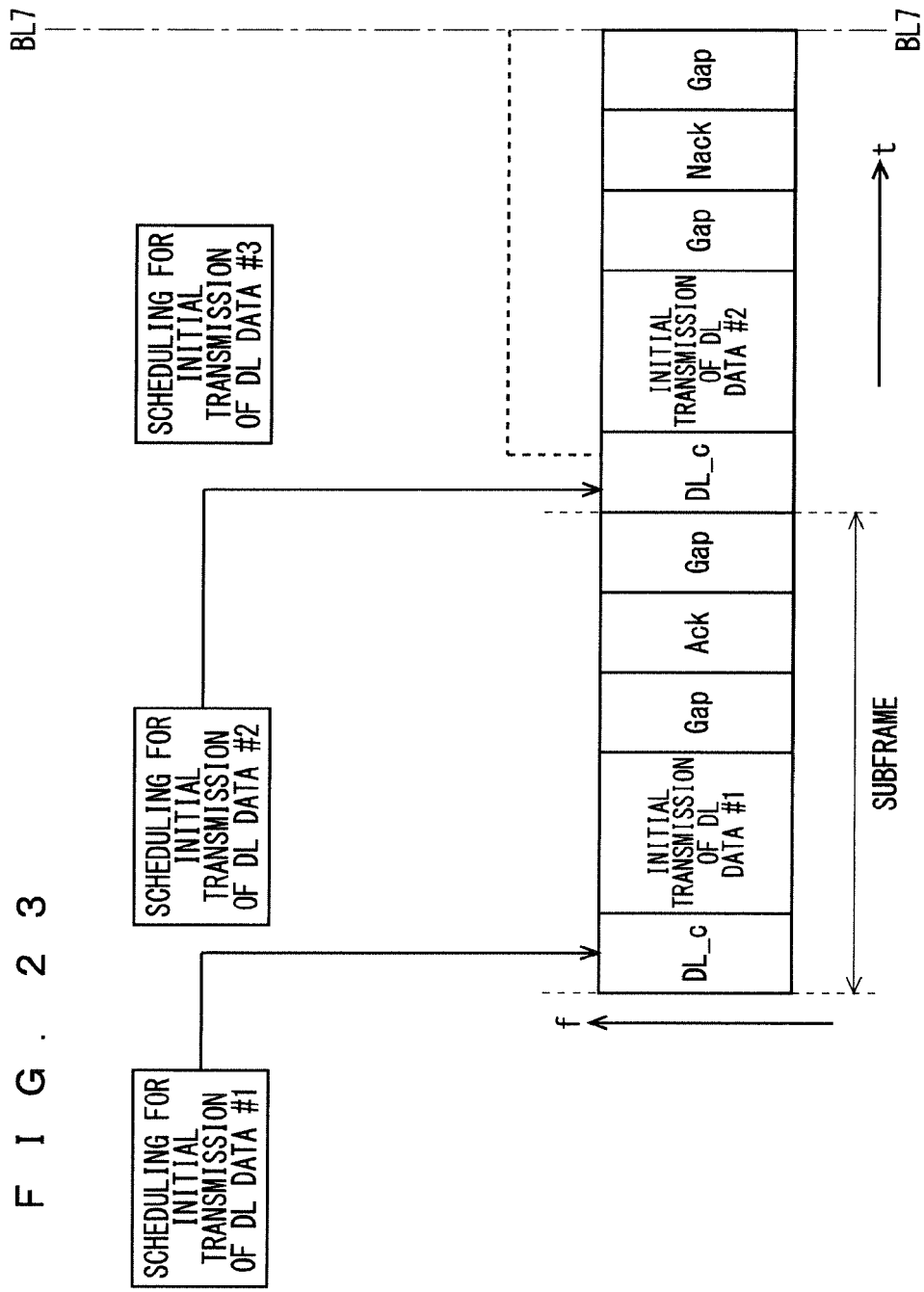
FIG. 23 illustrates an example method for scheduling one frame ahead according to the fourth modification of the first embodiment.
Figure 24:
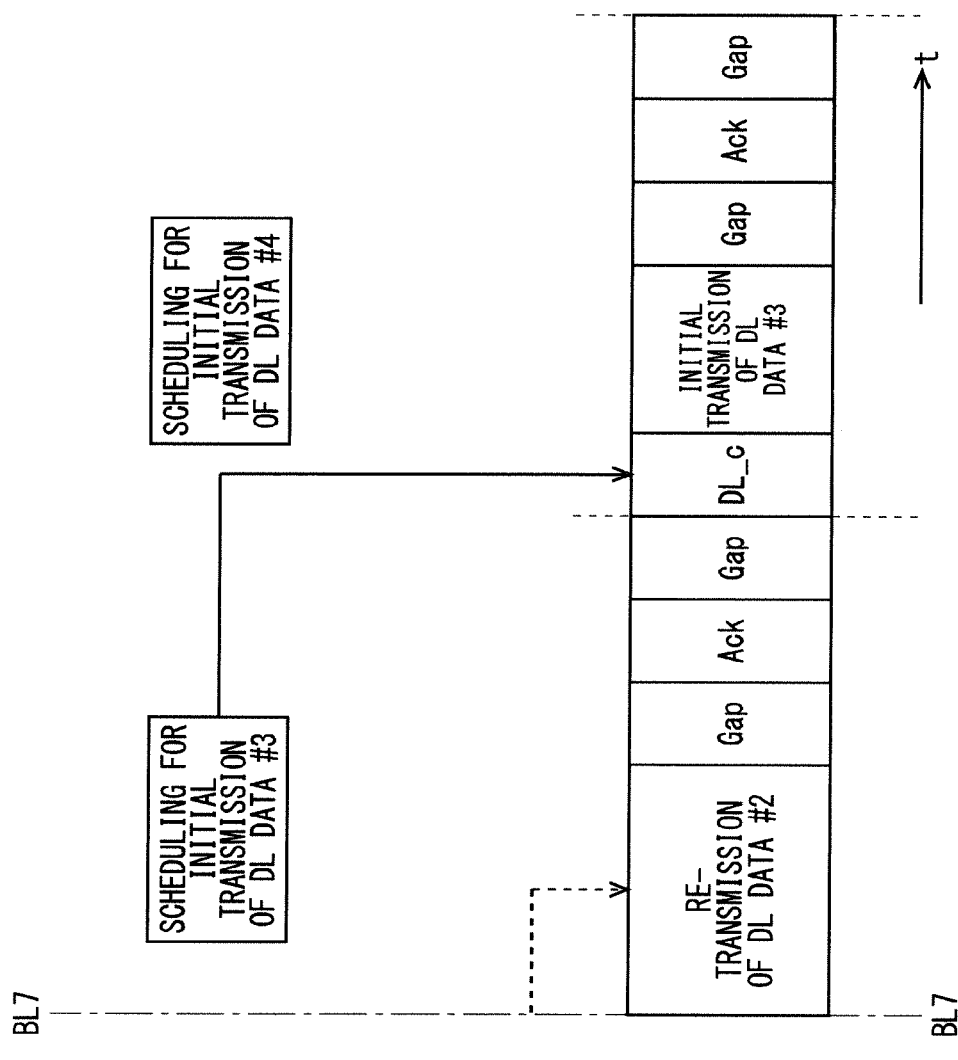
FIG. 24 illustrates the example method for scheduling one frame ahead according to the fourth modification of the first embodiment.

FIGS. 23 and 24 illustrate an example method for scheduling one frame ahead according to the fourth modification of the first embodiment. FIGS. 23 and 24 illustrate one example of applying the fourth modification to the scheduling method described in the second modification of the first embodiment when n=1. FIGS. 23 and 24 are connected across a location of a border BL7. In FIGS. 23 and 24, the horizontal axis represents time t, and the vertical axis represents a frequency f.

Since the UE returns Nack in response to the initial transmission of the DL data #2 in FIGS. 23 and 24, the DL data #2 is retransmitted to the UE without any downlink control signal in the next subframe. Furthermore, the initial transmission of the DL data #3 is rescheduled. In FIGS. 23 and 24, an area for the downlink control signal in transmitting the retransmission data is allocated to the area for the downlink user data.

Figure 25:
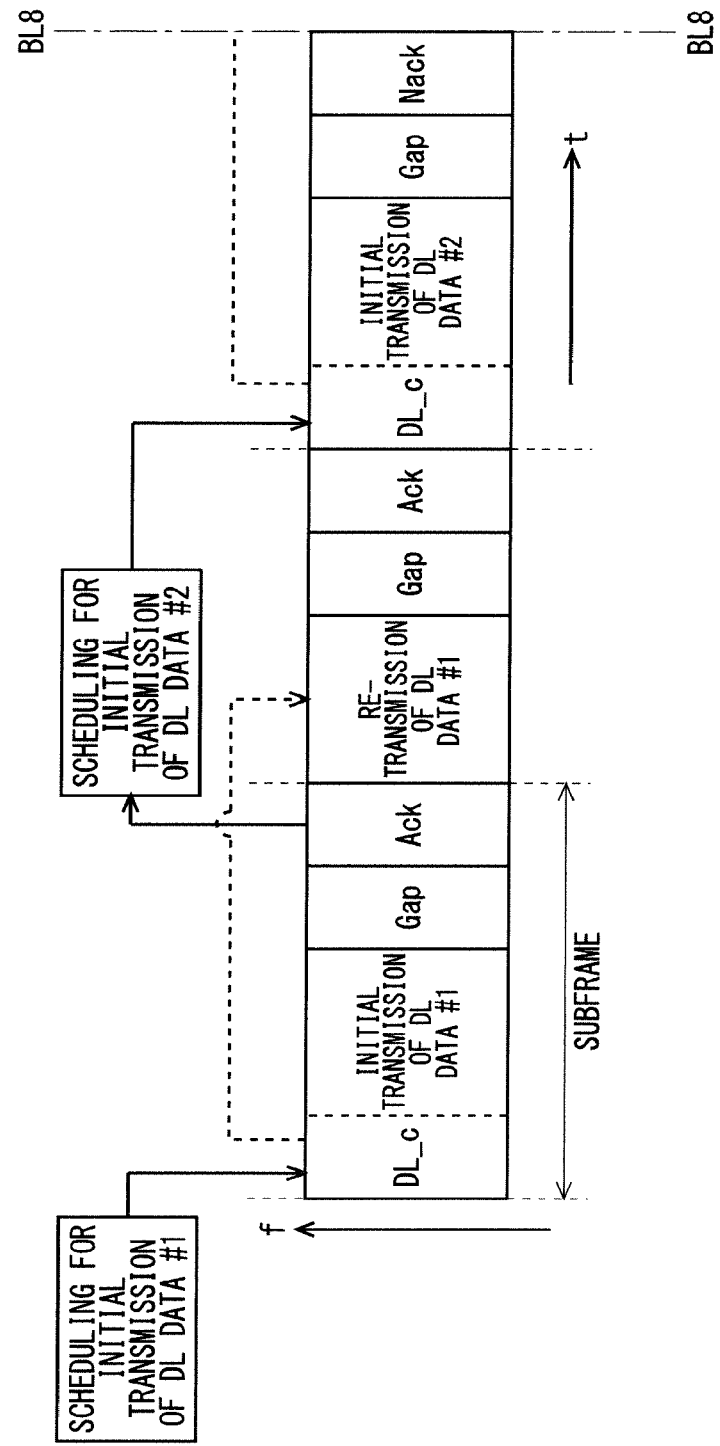
FIG. 25 illustrates an example method for scheduling one frame ahead when retransmission is performed once according to the fourth modification of the first embodiment.
Figure 26:
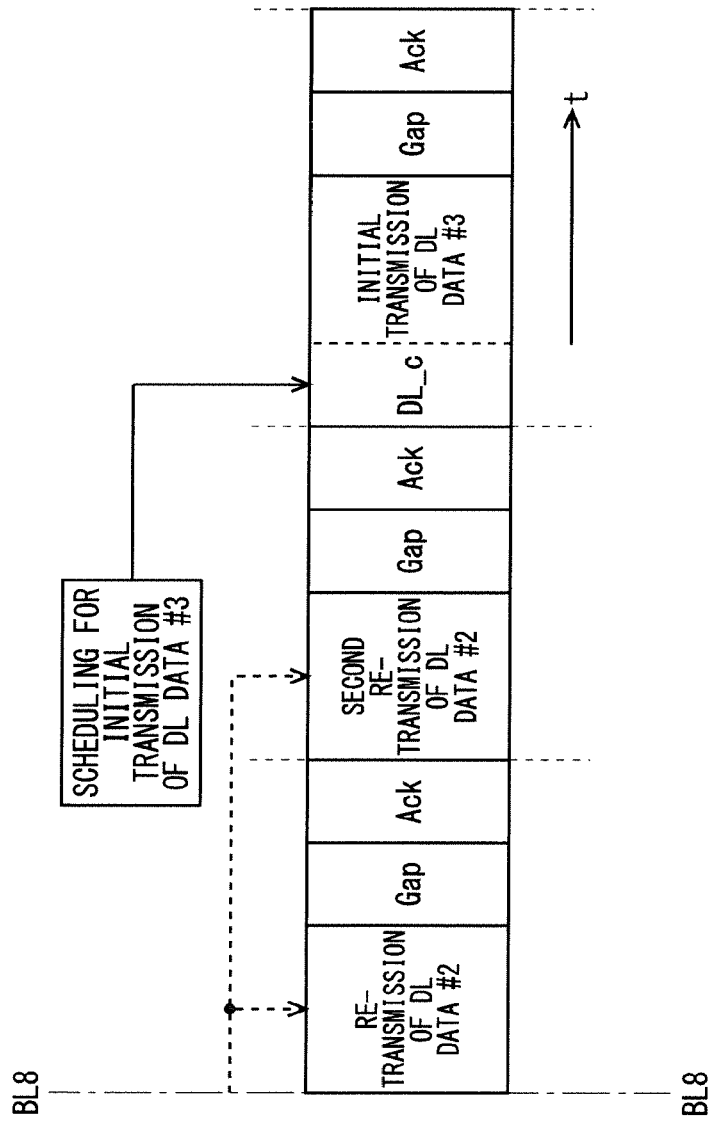
FIG. 26 illustrates the example method for scheduling one frame ahead when retransmission is performed once according to the fourth modification of the first embodiment.

FIGS. 25 and 26 illustrate an example method for scheduling one frame ahead when retransmission is performed once according to the fourth modification of the first embodiment. FIGS. 25 and 26 illustrate one example of applying the fourth modification to the scheduling method described in the third modification of the first embodiment when m=1 and n=1. FIGS. 25 and 26 are connected across a location of a border BL8. In FIGS. 25 and 26, the horizontal axis represents time t, and the vertical axis represents a frequency f.

The transmission area for the downlink user data is allocated to each retransmission in FIGS. 25 and 26, instead of the downlink control signal. Since the UE returns Nack to the eNB in response to the initial transmission of the DL data #2, the second retransmission of the DL data #2 is performed, and the transmission area for the downlink user data is allocated to the second retransmission instead of the downlink control signal, similarly as in the retransmission.

Thus, the fourth modification can produce the following advantages in addition to the advantages of the second or the third modification of the first embodiment. Specifically, the elimination of notification of the downlink control information in retransmission can reduce the amount of signaling from the eNB to the UE. Furthermore, allocation of a downlink user signal to the area for the downlink control information in retransmission can increase the error correction capability for the downlink user data in retransmission. Consequently, the reliability can be increased.

Fifth Modification of First Embodiment

The fifth modification will describe another specific example of the scheduling method to enable retransmission in a subframe next to a subframe in which Ack/Nack has been received, without using, in the self-contained subframe, the downlink control information on the subframe in retransmission.

The fourth modification of the first embodiment poses a problem where radio resources that are the same as those for the initial transmission data sometimes cannot be used depending on a subframe, for example, a subframe in which a synchronization signal and a physical broadcast information channel are transmitted.

The fifth modification will disclose a method for solving such a problem.

In the scheduling for initial transmission, scheduling for the k retransmissions is performed. Here, k may be an integer ranging from 1 to the maximum number of retransmissions. k may not be the value indicating the maximum number of retransmissions. The retransmission is performed according to a scheduling different from that for the initial transmission. The retransmission and the initial transmission may have the same scheduling. The retransmission may be different in coding rate from the initial transmission.

The eNB may notify the UE of information on the scheduling for the k retransmissions via the L1/L2 signaling. The information on the scheduling for the k retransmissions may be notified together with the scheduling for initial transmission.

The eNB may notify the UE of the downlink control information in a subframe next to a subframe in which the k retransmissions are completed. Consequently, when Ack is not returned even with the k retransmissions, the retransmission can be continued.

The value k may be common within a cell according to the fifth modification. Alternatively, the value k may be set for each UE. Alternatively, the value k may be set for each process ID.

The value k may be statically defined in a standard. Alternatively, the eNB may broadcast the value k to the UE. For example, the broadcast information may be used in the broadcasting. The broadcast information may be, for example, SIB1 or SIB2. The notification may be made from the eNB to the UE via the RRC-dedicated signaling, the MAC signaling, or the L1/L2 signaling.

The following (1) to (4) will be disclosed as specific examples of information necessary for the eNB to determine the value k:

(1) the maximum number of retransmissions;

(2) a ratio of Ack/Nack received from the UE, for example, a block error rate (=Nack/(Ack+Nack));

(3) statistical information on the number of actual retransmissions; and (4) combinations of (1) to (3) above.

For example, the maximum number of actual retransmissions may be used as the statistical information in (3). Alternatively, an upper limit to the number of retransmissions performed more than or equal to a designated number of times may be used. The statistical information in (3) may be sourced from information since start of the eNB or for a predefined period of time in the past.

The fifth modification may be applied to the conventional method for scheduling the next subframe using Ack/Nack from the UE. The fifth modification may be applied to the scheduling method described in the second modification of the first embodiment. The fifth modification may be applied to the scheduling method described in the third modification of the first embodiment.

The operations of the eNB and the UE according to the fifth modification will be described. The eNB performs scheduling for the initial transmission data. The eNB also performs the scheduling for the k retransmissions. The scheduling information may be different between the initial transmission and the retransmissions. Examples of the scheduling information may include frequency resources, a coding rate, and a modulating method.

The eNB transmits, to the UE, the scheduling information for the initial transmission data and the scheduling information for the k retransmissions. The eNB may use the area for the downlink control information in transmitting the scheduling information for the initial transmission data and the scheduling information for the k retransmissions. The eNB transmits, to the UE, the initial transmission data together with the scheduling information for the initial transmission data and the scheduling information for the k retransmissions.

The eNB determines whether the retransmission is necessary for the initial transmission data. The Ack/Nack from the UE may be used for the determination. Alternatively, the eNB may always perform retransmissions for the designated number of subframes or longer after the initial transmission.

The eNB transmits the retransmission data to the UE based on the determination. The eNB may use the transmission area for the downlink control information as the receiving area for the downlink user data in the retransmission. The eNB may schedule the next initial transmission and the k retransmissions before receiving Ack from the UE. The eNB may reschedule the next initial transmission and the k retransmissions that have already been scheduled.

The UE receives the scheduling information for the initial transmission and for the k retransmissions.

The UE determines whether the downlink signal to be received is for the initial transmission or the retransmission. The determination may be made using the Ack/Nack transmitted to the eNB. Alternatively, the arrangement for the eNB to always perform retransmissions for the designated number of subframes or longer after the initial transmission may be used.

The UE receives the retransmission data from the eNB. Whether the eNB uses the transmission area for the downlink control information as the area for the downlink user data may be used in receiving the retransmission data. The UE transmits, to the eNB, Ack/Nack in response to the retransmission data. The UE may discard or hold the scheduling information for the k retransmissions.

The UE may transmit a scheduling request to the eNB, similarly as the fourth modification of the first embodiment. The UE may transmit the scheduling request during the HARQ retransmission of the downlink user data from the eNB. The eNB may transmit scheduling information to the UE, using the scheduling request from the UE as a trigger. The eNB may transmit the scheduling information in response to the retransmission data. Consequently, the eNB can transmit the downlink control information when retransmitting the downlink user data. Thus, recover from the malfunction caused by the eNB misjudging Ack/Nack from the UE is possible.

Figure 27:
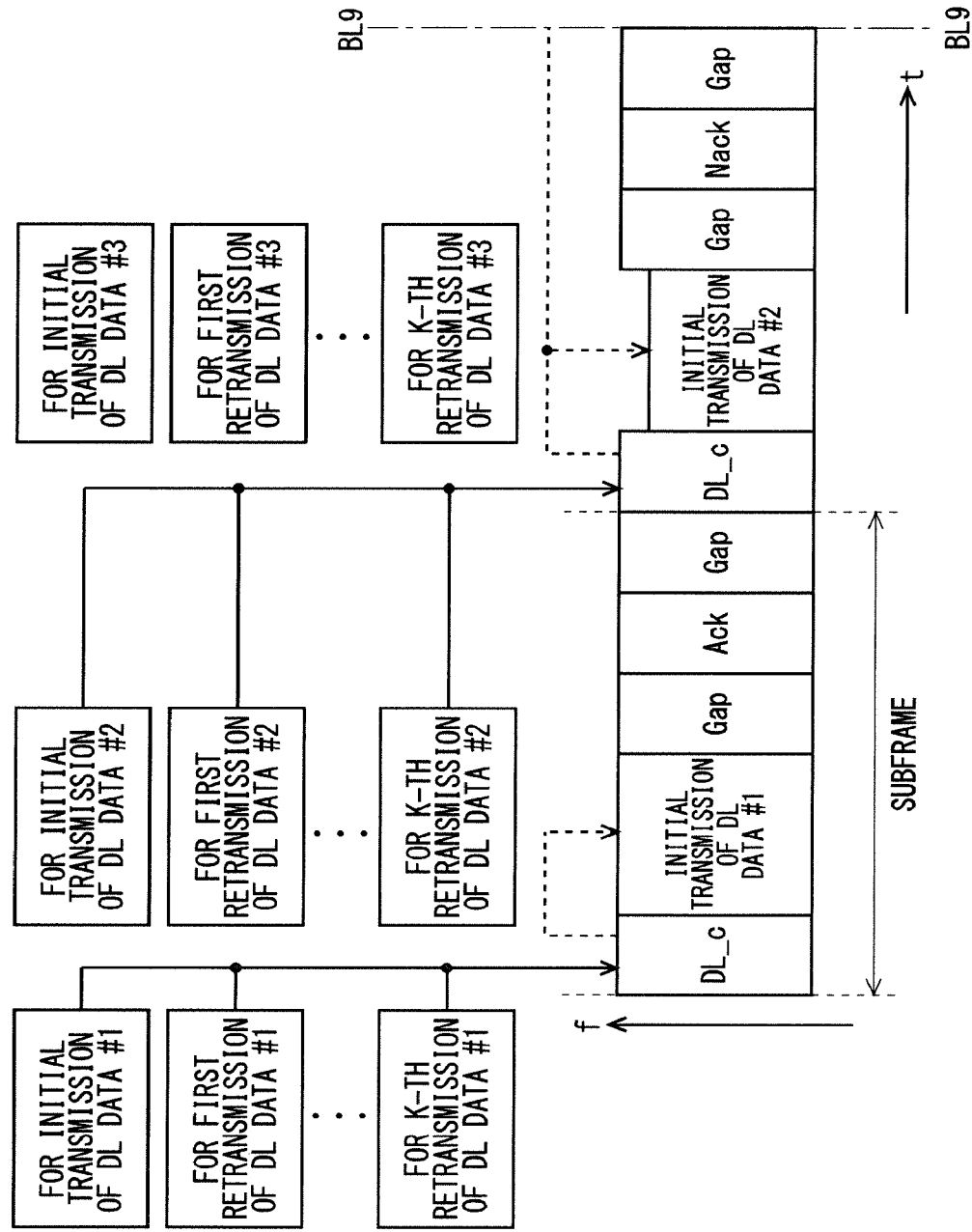
FIG. 27 illustrates an example method for scheduling one frame ahead according to the fifth modification of the first embodiment.
Figure 28:
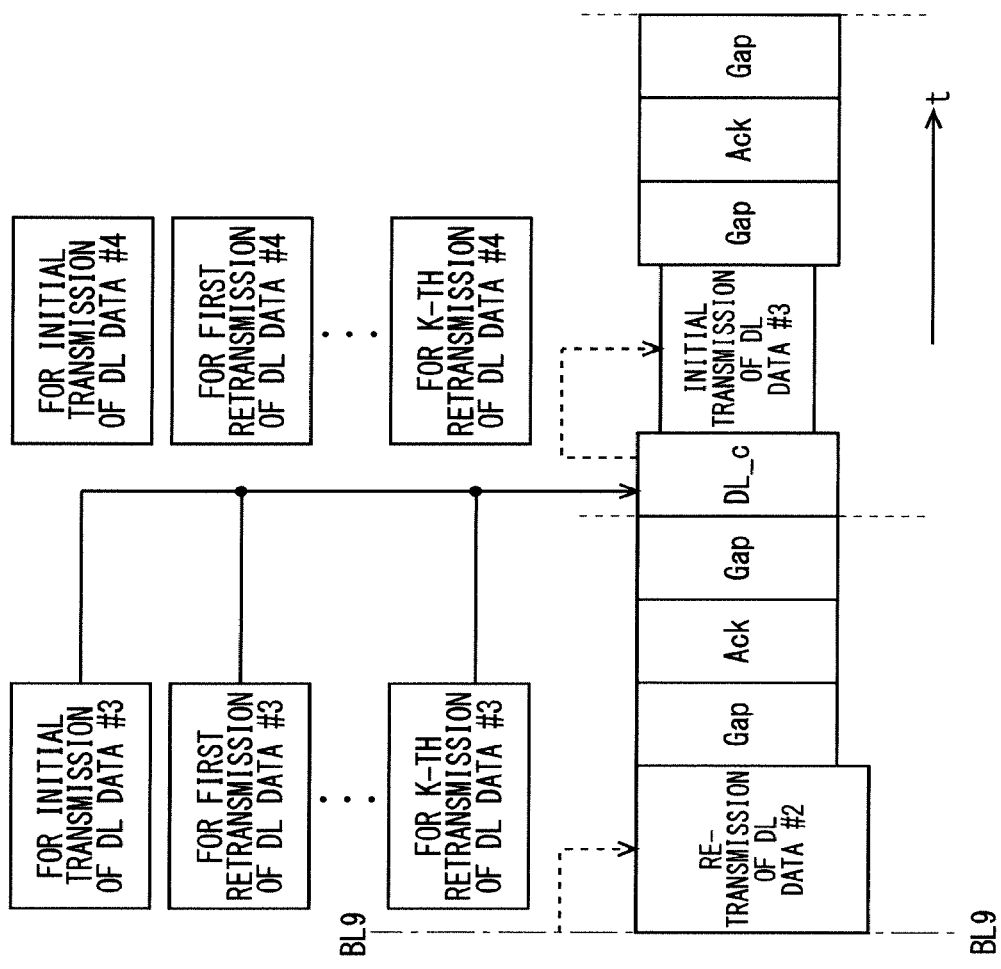
FIG. 28 illustrates the example method for scheduling one frame ahead according to the fifth modification of the first embodiment.

FIGS. 27 and 28 illustrate an example method for scheduling one frame ahead according to the fifth modification of the first embodiment. FIGS. 27 and 28 illustrate one example of applying the fifth modification to the scheduling method described in the second modification of the first embodiment when n=1. FIGS. 27 and 28 are connected across a location of a border BL9. In FIGS. 27 and 28, the horizontal axis represents time t, and the vertical axis represents a frequency f.

In FIGS. 27 and 28, the eNB schedules the initial transmission and the k retransmissions of the DL data #2 during initial transmission of the DL data #1. In the next subframe, the eNB transmits the scheduling information for the initial transmission and the k retransmissions of the DL data #2, and the initial transmission data of the DL data #2.

Similarly, the eNB schedules the initial transmission and the k retransmissions of the DL data #3 during the initial transmission of the DL data #2. In the next subframe, the eNB transmits the scheduling information for the initial transmission and the k retransmissions of the DL data #3, and the initial transmission data of the DL data #3.

Since the UE returns Nack in response to the initial transmission of the DL data #2 in FIGS. 27 and 28, the eNB retransmits the DL data #2 and reschedules the initial transmission and the k retransmissions of the DL data #3. Since the UE returns Ack in response to the retransmission of the DL data #2, the eNB transmits, in the next subframe, the scheduling information for the initial transmission and the k retransmissions of the DL data #3, and the initial transmission data of the DL data #3.

Figure 29:
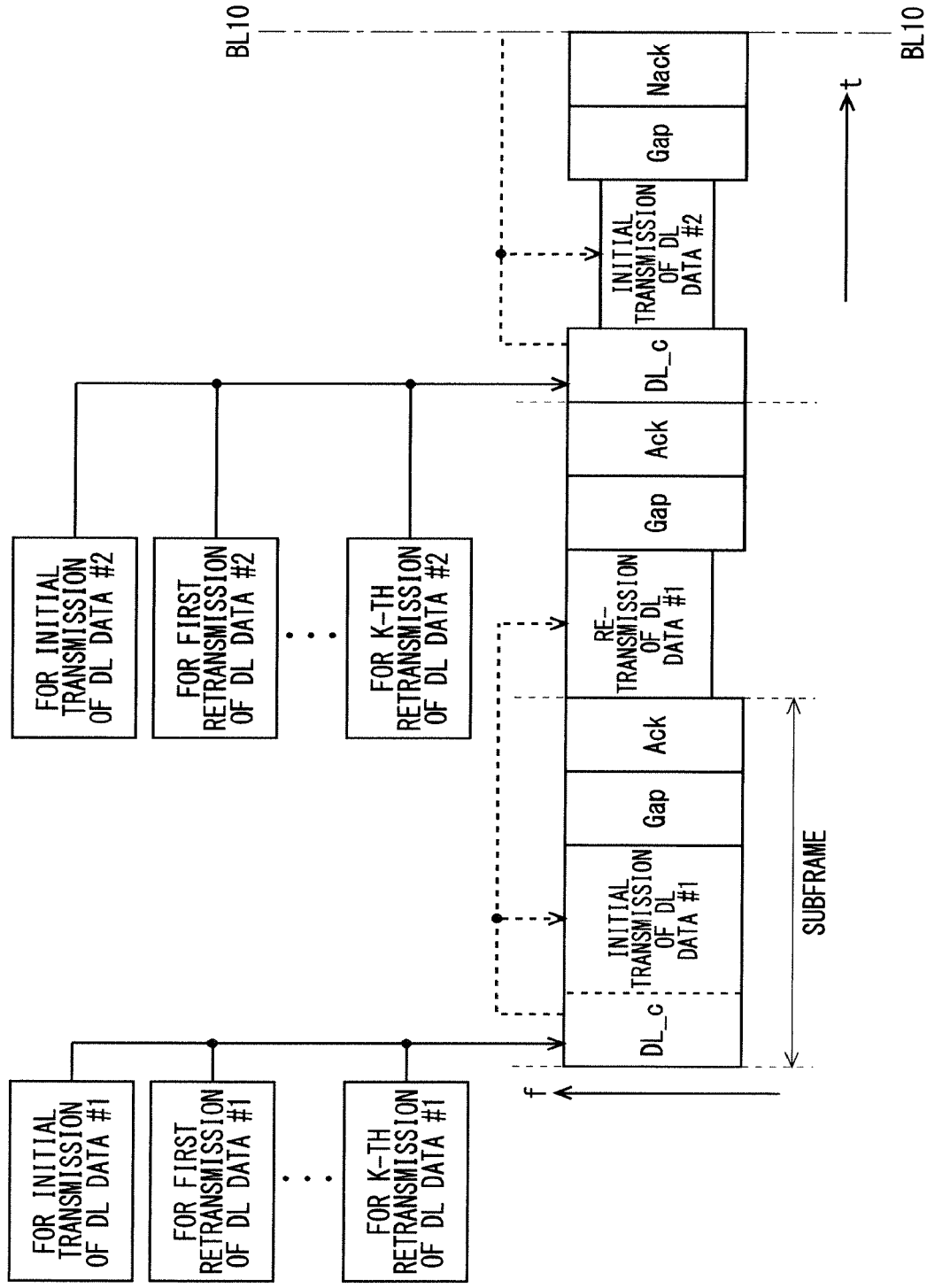
FIG. 29 illustrates an example method for scheduling one frame ahead when retransmission is performed once according to the fifth modification of the first embodiment.
Figure 30:
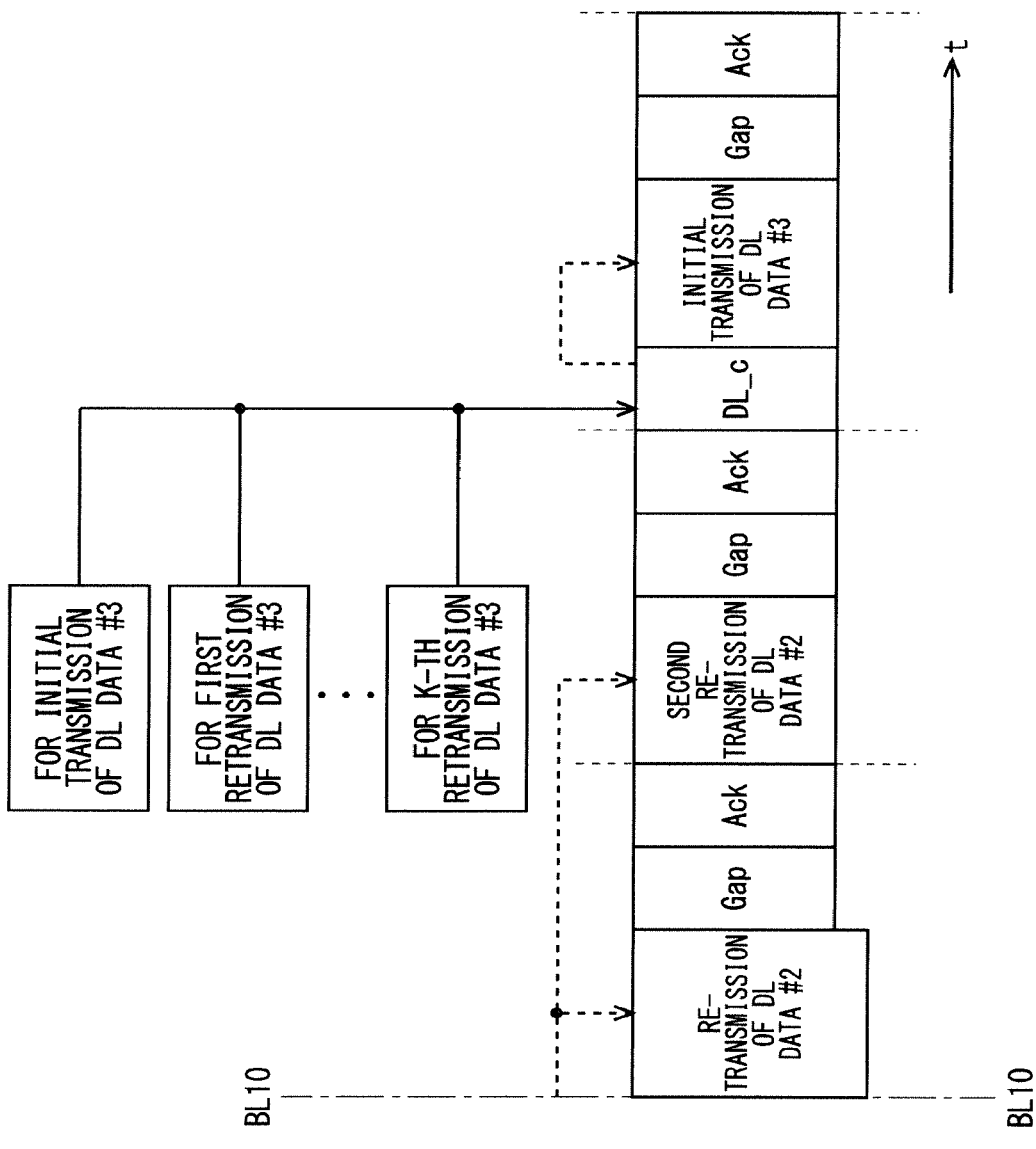
FIG. 30 illustrates the example method for scheduling one frame ahead when retransmission is performed once according to the fifth modification of the first embodiment.

FIGS. 29 and 30 illustrate an example method for scheduling one frame ahead when retransmission is performed once according to the fifth modification of the first embodiment. FIGS. 29 and 30 illustrate one example of applying the fifth modification to the scheduling method described in the third modification of the first embodiment when m=1 and n=1. FIGS. 29 and 30 are connected across a location of a border BL10. In FIGS. 29 and 30, the horizontal axis represents time t, and the vertical axis represents a frequency f.

After transmitting the DL data, the eNB schedules the next initial transmission data and the k retransmissions in a subframe next to a subframe in which the first Ack has been received. Since Ack is returned in response to the initial transmission of the DL data #1, the eNB schedules the initial transmission and the k retransmissions of the DL data #2 in retransmitting the DL data #1. However, Nack is returned in response to the initial transmission of the DL data #2, and Ack is returned in response to the first retransmission of the DL data #2. Thus, the eNB schedules the initial transmission and the k retransmissions of the DL data #3 during the second retransmission of the DL data #2.

The fifth modification can produce the same advantages as those according to the fourth modification of the first embodiment even when the available frequency resources are different between the initial transmission and the retransmissions.

Sixth Modification of First Embodiment

The sixth modification will describe a scheduling method to enable retransmission in a subframe next to a subframe in which Ack/Nack has been received, when asynchronous scheduling is performed in the self-contained subframe.

Since the synchronous scheduling is performed in the methods according to the second to fifth modifications of the first embodiment, the retransmission data is always transmitted in a subframe next to that for the initial transmission. However, when the frequency resources in the subframe next to that for the initial transmission are smaller than those for the initial transmission or when the radio environment in the next subframe is worse than that in the initial transmission, transmission of the retransmission data in the subframe next to that for the initial transmission causes problems of the low probability of Ack and the inefficiency.

The sixth modification will disclose a method for solving such a problem.

The eNB and the UE use the asynchronous scheduling. The eNB schedules the initial transmission data or the retransmission data to be transmitted in the next subframe, before receiving Ack/Nack from the UE.

The eNB determines whether to perform retransmission in the next subframe. The eNB transmits the downlink control information to the UE for each retransmission. The UE receives the downlink control information from the eNB in each subframe. The UE receives the initial transmission data or the retransmission data according to an instruction of the downlink control information.

In the sixth modification, the downlink control information may include a HARQ process number. Alternatively, the downlink control information may include an identifier indicating retransmission.

The following (1) to (5) will be disclosed as specific examples of information necessary for the eNB to determine whether retransmission is possible according to the sixth modification:

(1) the number of available REs;
(2) a channel state;
(3) a coding rate of the retransmission data;
(4) the number of retransmissions; and
(5) combinations of (1) to (4) above.

The presence or absence of a common signaling channel may be used in (1). The presence or absence of a common signaling channel may be, for example, the presence or absence of a synchronization channel. Alternatively, the presence or absence of a common signaling channel may be the presence or absence of a physical broadcast channel.

The channel state in (2) may be a CQI to be transmitted by the UE. The CQI may be a periodic CQI or an aperiodic CQI. The eNB may find the channel state using an uplink reference signal to be transmitted by the UE. Examples of the uplink reference signal to be used may include an uplink demodulation reference signal, an uplink sounding reference signal, and another uplink reference signal.

The coding rate of the retransmission data in (3) may have a threshold, and whether the retransmission is possible may be determined when the coding rate is higher than or equal to the threshold or when the coding rate is lower than or equal to the threshold. Regarding the determination on whether the retransmission is possible using the threshold of the coding rate, it may be determined that the retransmission is possible, for example, when the coding rate is lower than or equal to 1, that is, when the number of bits to be coded is less than or equal to the number of coded bits, or based on the other criteria.

The following (1) to (4) will be disclosed as specific examples of the criteria to be used for the scheduling by the eNB according to the sixth modification:

(1) whether there are sufficient frequency resources for performing retransmission in a subframe in which scheduling will be performed;

(2) whether the eNB has data to be coded for initial transmission;
(3) whether Ack has been received from the UE; and
(4) combinations of (1) to (3) above.

In (4), the scheduling may be performed, for example, in the order of (1), (2), and (3). Alternatively, the scheduling may be performed, for example, in the order of (3), (1), and (2).

The eNB may determine whether the retransmission is possible simultaneously when the eNB schedules the retransmission data according to the sixth modification. For example, whether the first retransmission is possible may be determined when the eNB transmits the initial transmission data. Whether the second retransmission is possible may be determined when the eNB transmits the first retransmission data.

Among a plurality of DL data requiring scheduling for retransmission, scheduling for a part of the DL data as well as scheduling of retransmission of DL data whose initial transmission has been performed earlier may be performed according to the sixth modification. Alternatively, scheduling for a part of the DL data including retransmission of DL data whose initial transmission or retransmission has been performed the most recently may be performed. Alternatively, a plurality of DL data requiring retransmission may be scheduled. Then, which DL data is to be transmitted may be selected when the downlink user data is transmitted.

The sixth modification may be applied to the scheduling for predetermining retransmission scheduling n subframes ahead, similarly as the second modification of the first embodiment.

The sixth modification may be applied to the scheduling for retransmission in m subframes after the initial transmission, similarly as the third modification of the first embodiment. The eNB may perform, among a plurality of DL data requiring scheduling for retransmission, scheduling for a part of the DL data as well as scheduling of retransmission of DL data whose initial transmission has been performed earlier. Alternatively, the eNB may schedule a part of the DL data including retransmission of DL data whose initial transmission or retransmission has been performed the most recently. Alternatively, the eNB may schedule a plurality of DL data requiring retransmission, and select which DL data is to be transmitted when transmitting the downlink user data.

Figure 31:
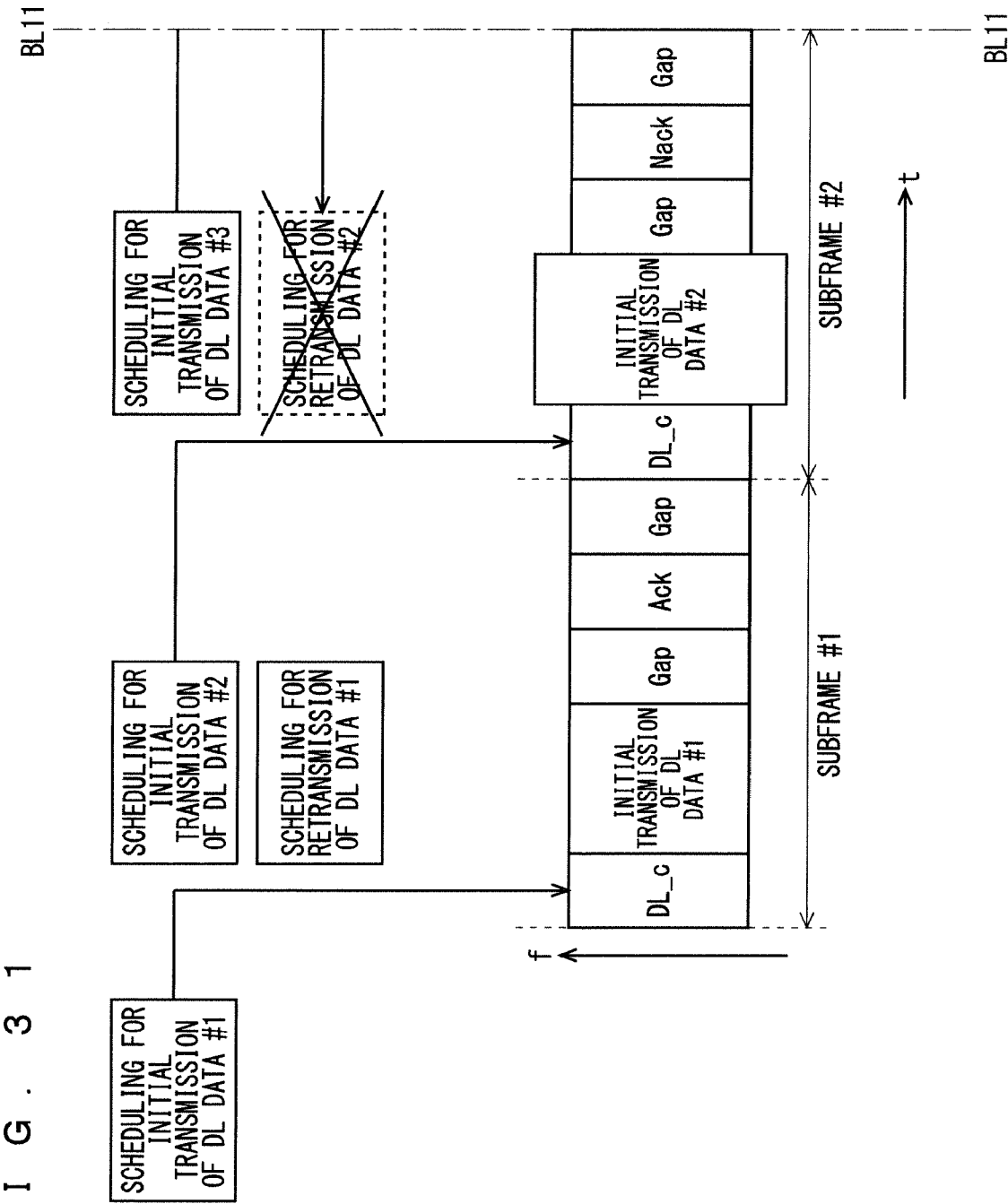
FIG. 31 illustrates an example method for scheduling one frame ahead according to the sixth modification of the first embodiment.
Figure 32:
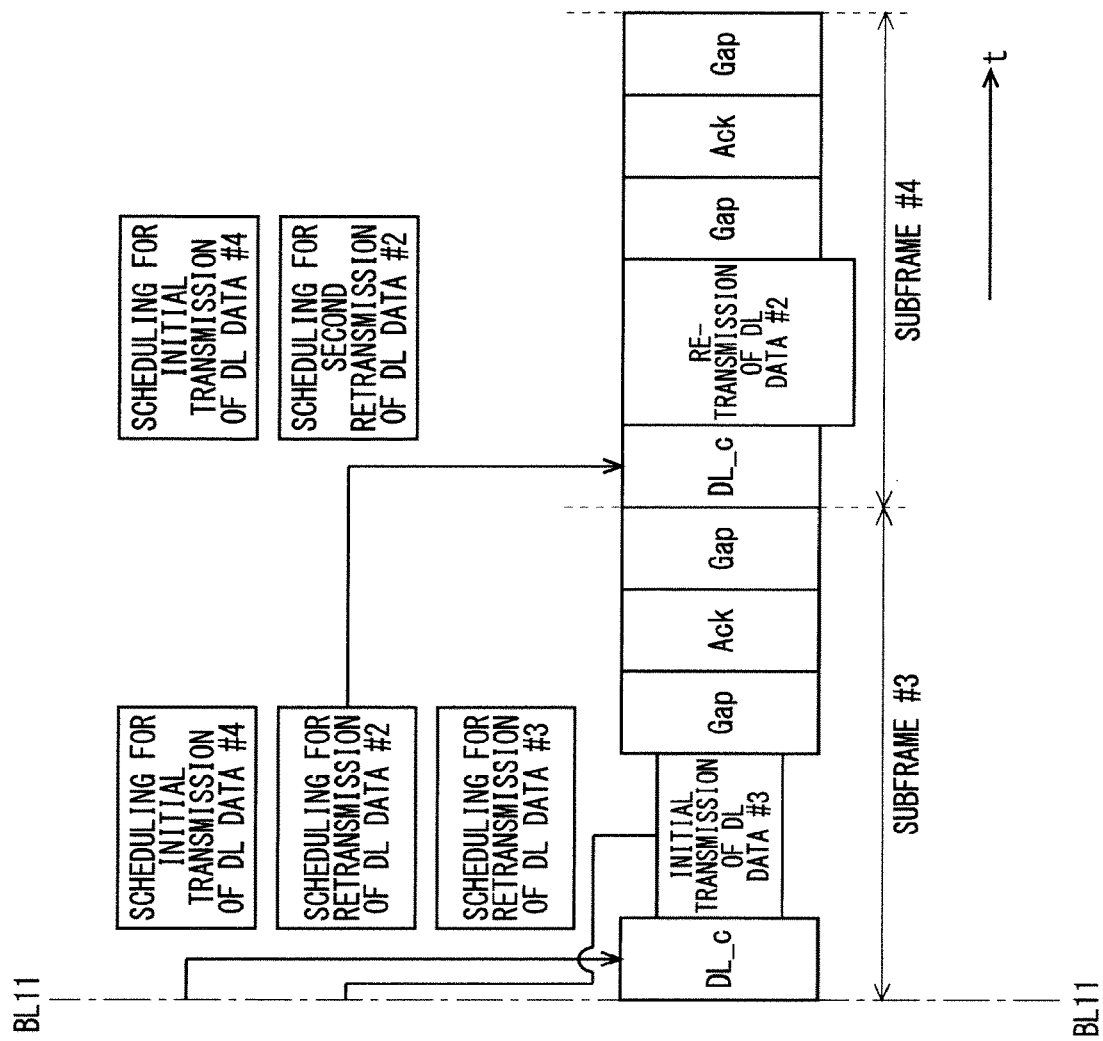
FIG. 32 illustrates the example method for scheduling one frame ahead according to the sixth modification of the first embodiment.

FIGS. 31 and 32 illustrate an example method for scheduling one frame ahead according to the sixth modification of the first embodiment. FIGS. 31 and 32 illustrate one example of the scheduling for predetermining retransmission scheduling in the next subframe (n=1) according to the sixth modification. FIGS. 31 and 32 are connected across a location of a border BL11. In FIGS. 31 and 32, the horizontal axis represents time t, and the vertical axis represents a frequency f.

The eNB performs the initial transmission of the DL data #1 in a subframe #1. Since the next subframe #2 has frequency resources for retransmitting the DL data #1, the eNB schedules retransmission of the DL data #1 as well as the initial transmission of the DL data #2.

Since the UE returns Ack in the subframe #1 illustrated in FIGS. 31 and 32, the eNB performs the initial transmission of the DL data #2 in the subframe #2. However, the next subframe #3 does not have frequency resources necessary for retransmitting the DL data #2. Thus, the eNB only schedules the initial transmission of the DL data #3 without scheduling the retransmission of the DL data #2.

Although the UE returns Nack in the subframe #2 illustrated in FIGS. 31 and 32, only the scheduling for the DL data #3 for initial transmission is completed in the subframe #2. Thus, the eNB performs the initial transmission of the DL data #3 in the subframe #3.

The candidates for the scheduling for the next subframe #4 are the DL data #2 for retransmission, the DL data #3 for retransmission, and the DL data #4 for initial transmission. The next subframe #4 has sufficient frequency resources for performing retransmission of the DL data #2 and the DL data #3.

The eNB schedules the retransmission of the DL data #2, the retransmission of the DL data #3, and the initial transmission of the DL data #4. The eNB may perform any one or two of the three schedulings above.

Since the UE returns Ack in the subframe #3 illustrated in FIGS. 31 and 32, the scheduling for retransmission of the DL data #3 is not necessary at the end of the subframe #3. The eNB selects, from among the DL data #2 for retransmission and the DL data #4 for initial transmission, the DL data #2 for retransmission whose data number is smaller, and transmits the DL data #2 in the subframe #4. The eNB may select and transmit the DL data #4 for initial transmission.

Figure 33:
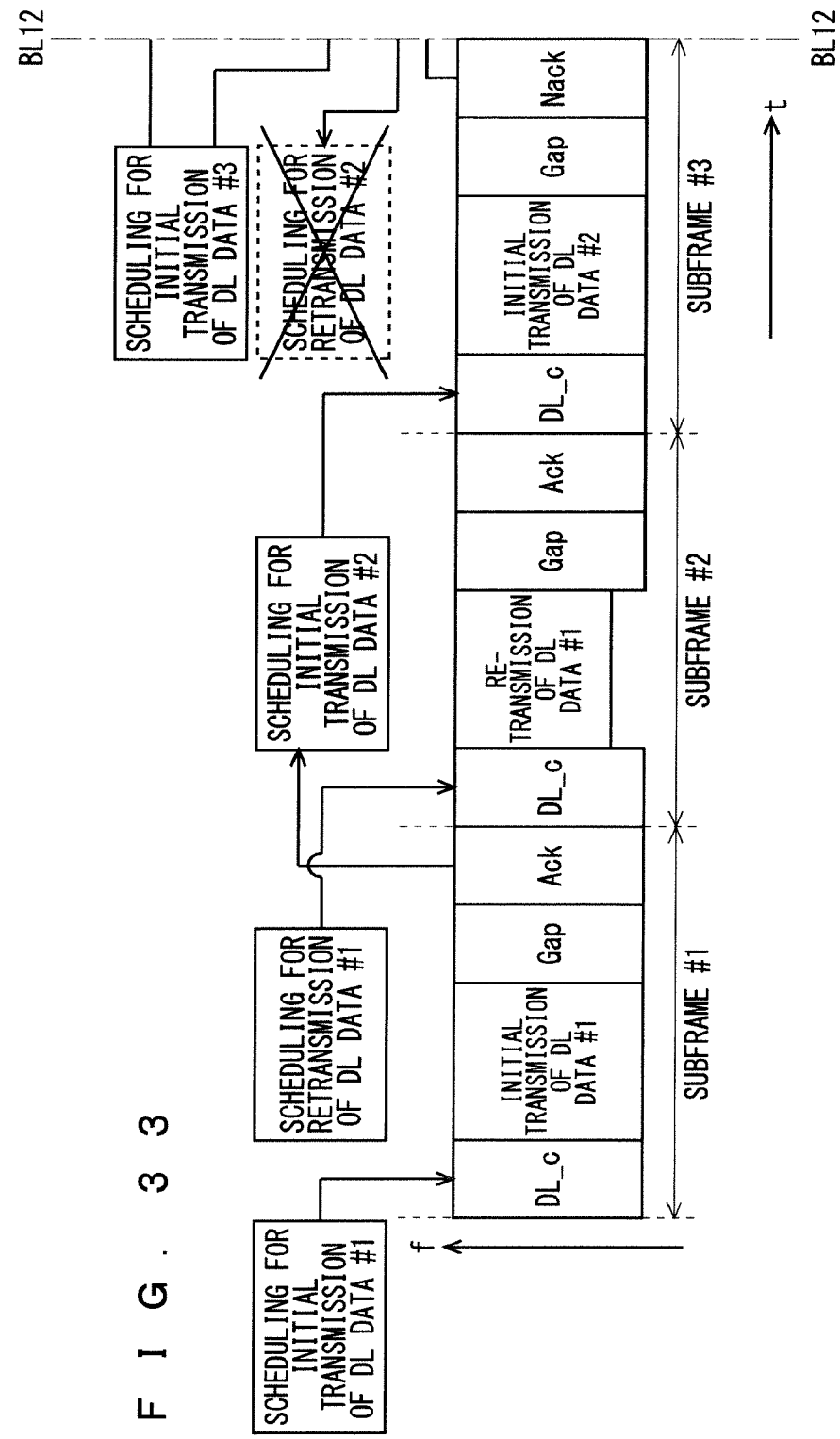
FIG. 33 illustrates an example method for scheduling one frame ahead when retransmission is performed once according to the sixth modification of the first embodiment.
Figure 34:
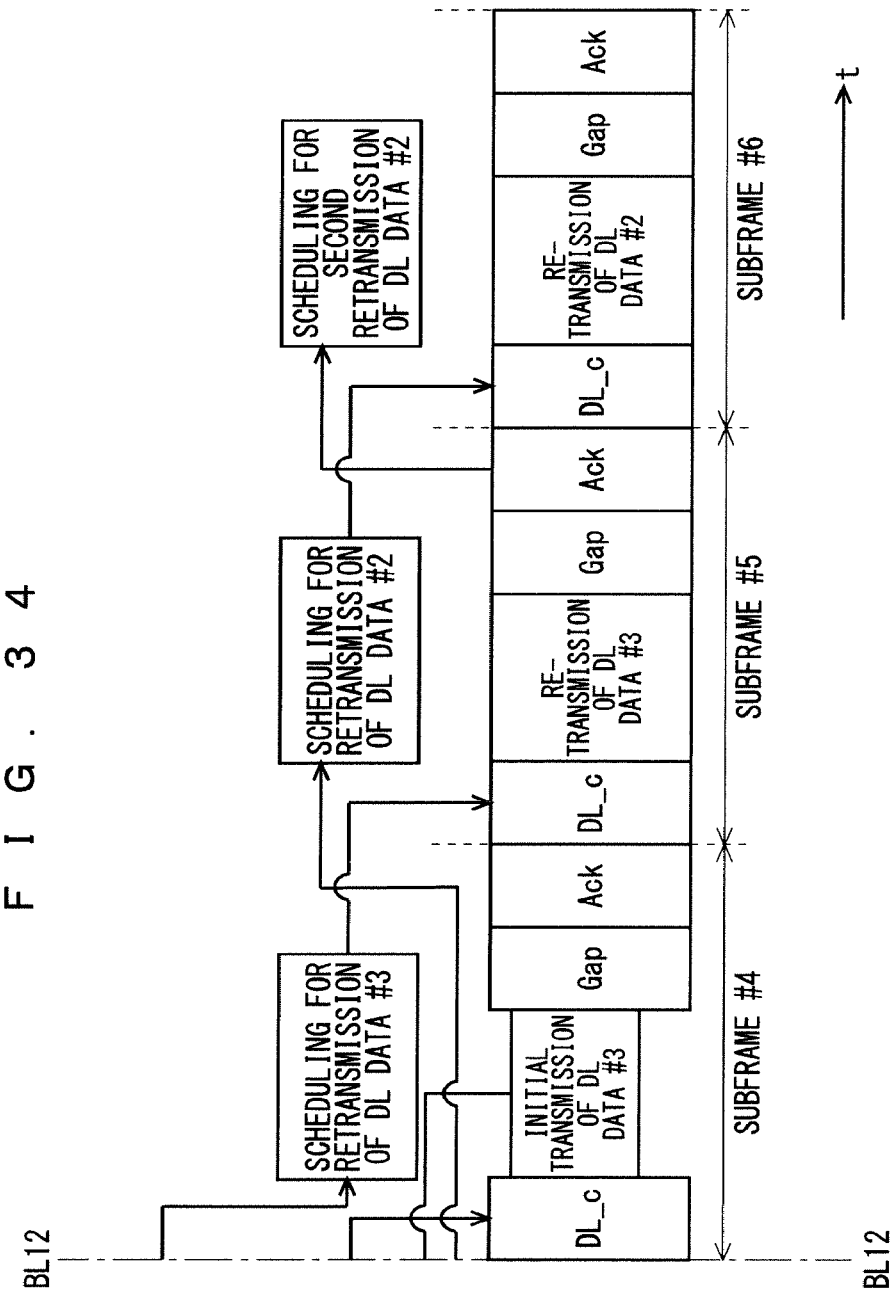
FIG. 34 illustrates the example method for scheduling one frame ahead when retransmission is performed once according to the sixth modification of the first embodiment.

FIGS. 33 and 34 illustrate an example method for scheduling one frame ahead when retransmission is performed once according to the sixth modification of the first embodiment. FIGS. 33 and 34 illustrate one example of scheduling for performing retransmission for one subframe after the initial transmission (m=1, n=1) according to the sixth modification. FIGS. 33 and 34 are connected across a location of a border BL12. In FIGS. 33 and 34, the horizontal axis represents time t, and the vertical axis represents a frequency f.

The eNB performs the initial transmission of the DL data #1 in the subframe #1. Since the next subframe #2 has frequency resources for retransmitting the DL data #1, the eNB schedules retransmission of the DL data #1.

The eNB retransmits the DL data #1 in the subframe #2 illustrated in FIGS. 33 and 34. Since the UE returns Ack in the subframe #1, the eNB schedules the initial transmission of the DL data #2 in the subframe #2.

The eNB performs the initial transmission of the DL data #2 in the subframe #3 illustrated in FIGS. 33 and 34. However, the next subframe #4 does not have frequency resources necessary for retransmitting the DL data #2. Thus, the eNB schedules the initial transmission of the DL data #3 without scheduling the retransmission of the DL data #2.

The eNB performs the initial transmission of the DL data #3 in the subframe #4 illustrated in FIGS. 33 and 34. Since the subframe #5 has frequency resources for retransmitting the DL data #3, the eNB schedules retransmission of the DL data #3.

Since the UE returns Nack in the subframe #3, the eNB may schedule the retransmission of the DL data #2 in the subframe #4 illustrated in FIGS. 33 and 34.

The eNB retransmits the DL data #3 in the subframe #5 illustrated in FIGS. 33 and 34. Since the subframe #6 has frequency resources for retransmitting the DL data #2, the eNB schedules retransmission of the DL data #2.

Thus, the sixth modification can produce the following advantage in addition to the advantages of the second or the third modification of the first embodiment. Specifically, the user data can be efficiently communicated upon change in the radio environment.

Seventh Modification of First Embodiment

The seventh modification will describe a scheduling method to abort the HARQ retransmission in the self-contained subframe.

Under a continued situation with the methods according to the second to the fifth modifications of the first embodiment where frequency resources and a modulating method vary for the reason of, for example, worsening of the radio environment during retransmission, the UE fails in accurate reception even with many retransmissions, and the eNB continues the retransmission until the expiration of the maximum number of retransmissions. This will waste the communication.

If the situation is continued in the method according to the sixth modification of the first embodiment, no transmission of the retransmission data to the UE for a long time will cause a problem of missing user data.

The seventh modification will disclose a method for solving such a problem.

The eNB determines whether to abort the retransmission of the downlink user data. The eNB aborts the retransmission of the downlink user data based on the determination.

The initial transmission data after aborting the retransmission of the downlink user data may or may not include elements included in the data whose retransmission has been aborted. Examples of the elements may include a protocol data unit (PDU) in an upper layer of HARQ, and MAC signaling information. The upper layer may be, for example, an RLC layer.

The retransmission may be aborted for each UE or for each HARQ process according to the seventh modification.

The following (1) to (7) will be disclosed as information necessary for determining whether to abort the retransmission according to the seventh modification:

(1) the number of available REs;
(2) a channel state;
(3) a period with which information indicating a channel state is updated;
(4) a coding rate of retransmission data;
(5) the number of retransmissions;
(6) the maximum number of retransmissions; and
(7) combinations of (1) to (6) above.

The presence or absence of a common signaling channel may be used in (1). The presence or absence of a common signaling channel may be, for example, the presence or absence of a synchronization channel. Alternatively, the presence or absence of a common signaling channel may be the presence or absence of a physical broadcast channel.

The channel state in (2) may be a CQI to be transmitted by the UE. The CQI may be a periodic CQI or an aperiodic CQI. The eNB may find the channel state using an uplink reference signal to be transmitted by the UE. Examples of the uplink reference signal to be used may include an uplink demodulation reference signal, an uplink sounding reference signal, and another uplink reference signal.

The period in (3) may be, for example, a transmission period of the CQI. Alternatively, the period may be a transmission period of the uplink reference signal. The transmission period of the uplink reference signal may be, for example, a transmission period of the uplink demodulation reference signal, a transmission period of a sounding reference signal, and a transmission period of the other uplink reference signal.

The coding rate of the retransmission data in (4) may have a threshold, and whether the retransmission is possible may be determined when the coding rate is higher than or equal to the threshold or when the coding rate is lower than or equal to the threshold. Regarding the determination on whether the retransmission is possible using the threshold of the coding rate, it may be determined that the retransmission is aborted, for example, when the coding rate is lower than or equal to 1, that is, when a predefined number of subframes whose number of bits to be coded is less than or equal to the number of coded bits are continued, or based on the other criteria.

In (1) to (6) above, not only information on the subframe in which scheduling will be performed but also information up to a plurality of subframes ahead may be used.

In the seventh modification, it may be determined that the retransmission is aborted, for example, when the retransmission is scheduled. An alternative time may be the time upon receipt of the information indicating the channel state in (2).

In the seventh modification, whether the initial transmission data after aborting the retransmission includes the constituent elements of the data whose retransmission has been aborted may be determined using the presence or absence of the retransmission control in the upper layer of HARQ, for example, in the RLC layer. Alternatively, the presence or absence of reordering in the upper layer of HARQ may be used. Alternatively, both of the presence or absence of the retransmission control and the presence or absence of the reordering may be used in combination.

For example, a mode of RLC may be used as information for identifying the presence or absence of the retransmission control and the presence or absence of the reordering. For example, an acknowledge mode (AM) of the RLC indicates the presence of the retransmission control and the presence of the reordering. For example, an unacknowledged mode (UM) of the RLC indicates the absence of the retransmission control and the presence of the reordering. For example, a transparent mode (TM) of the RLC indicates the absence of the retransmission control and the absence of the reordering.

In the seventh modification, the eNB may notify the UE to abort the HARQ retransmission. The notification of aborting the HARQ retransmission may be made using the downlink control signal. The downlink control signal may include an identifier indicating new data. The identifier may be, for example, a new data indicator (NDI). The downlink control signal may also include a HARQ process ID. The downlink control signal may include both the identifier and the process ID. For example, the eNB may include, in the downlink control signal for the initial transmission after aborting the retransmission, a process ID in which the retransmission has been aborted and the NDI indicating the initial transmission. Alternatively, the eNB may notify the UE to abort the HARQ retransmission via the MAC signaling.

In the seventh modification, the UE may determine whether the eNB has aborted the retransmission, based on the downlink control signal from the eNB. For example, when the downlink control signal received from the eNB includes a HARQ process ID indicating a wait for the retransmission and the NDI indicating the initial transmission, the UE may determine that the eNB has aborted the retransmission in the process ID.

In the seventh modification, a MAC layer of the eNB may notify the upper layer to abort the HARQ retransmission. The upper layer may be, for example, an RLC layer.

In the seventh modification, a MAC layer of the UE may notify the upper layer to abort the HARQ retransmission. The upper layer may be, for example, an RLC layer. The MAC layer of the UE may discard the HARQ-received data subject to aborting of the HARQ retransmission.

The seventh modification may be applied to the scheduling for predetermining retransmission scheduling n subframes ahead, similarly as the second modification of the first embodiment.

The seventh modification may be applied to the scheduling for retransmission in m subframes after the initial transmission, similarly as the third modification of the first embodiment. The eNB may perform, among a plurality of DL data requiring scheduling for retransmission, scheduling for a part of the DL data as well as scheduling of retransmission of DL data whose initial transmission has been performed earlier. Alternatively, the eNB may schedule a part of the DL data including retransmission of DL data whose initial transmission or retransmission has been performed the most recently. Alternatively, the eNB may schedule a plurality of DL data requiring retransmission, and select which DL data is to be transmitted when transmitting the downlink user data.

Figure 35:
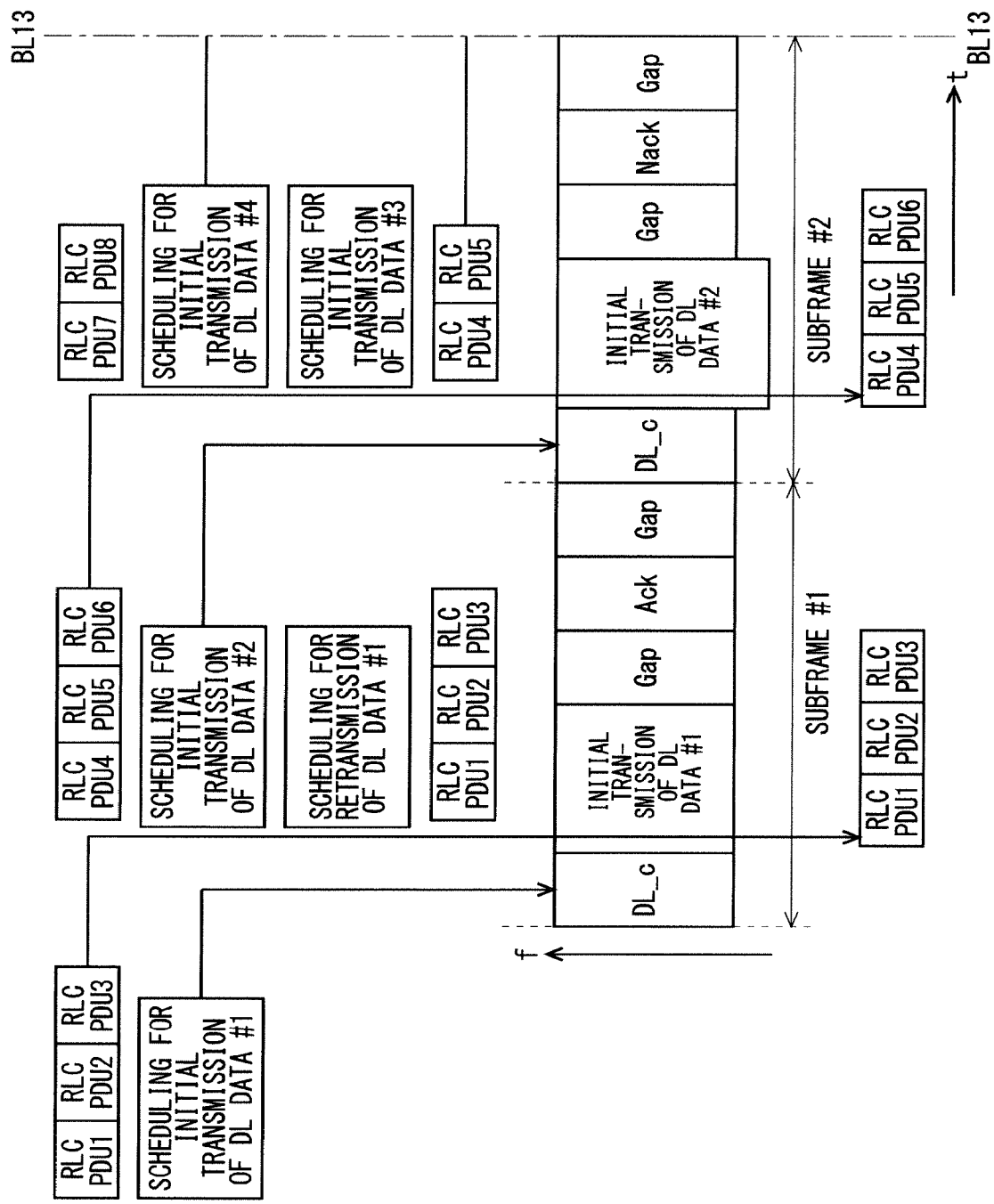
FIG. 35 illustrates an example method for scheduling one frame ahead according to the seventh modification of the first embodiment.
Figure 36:
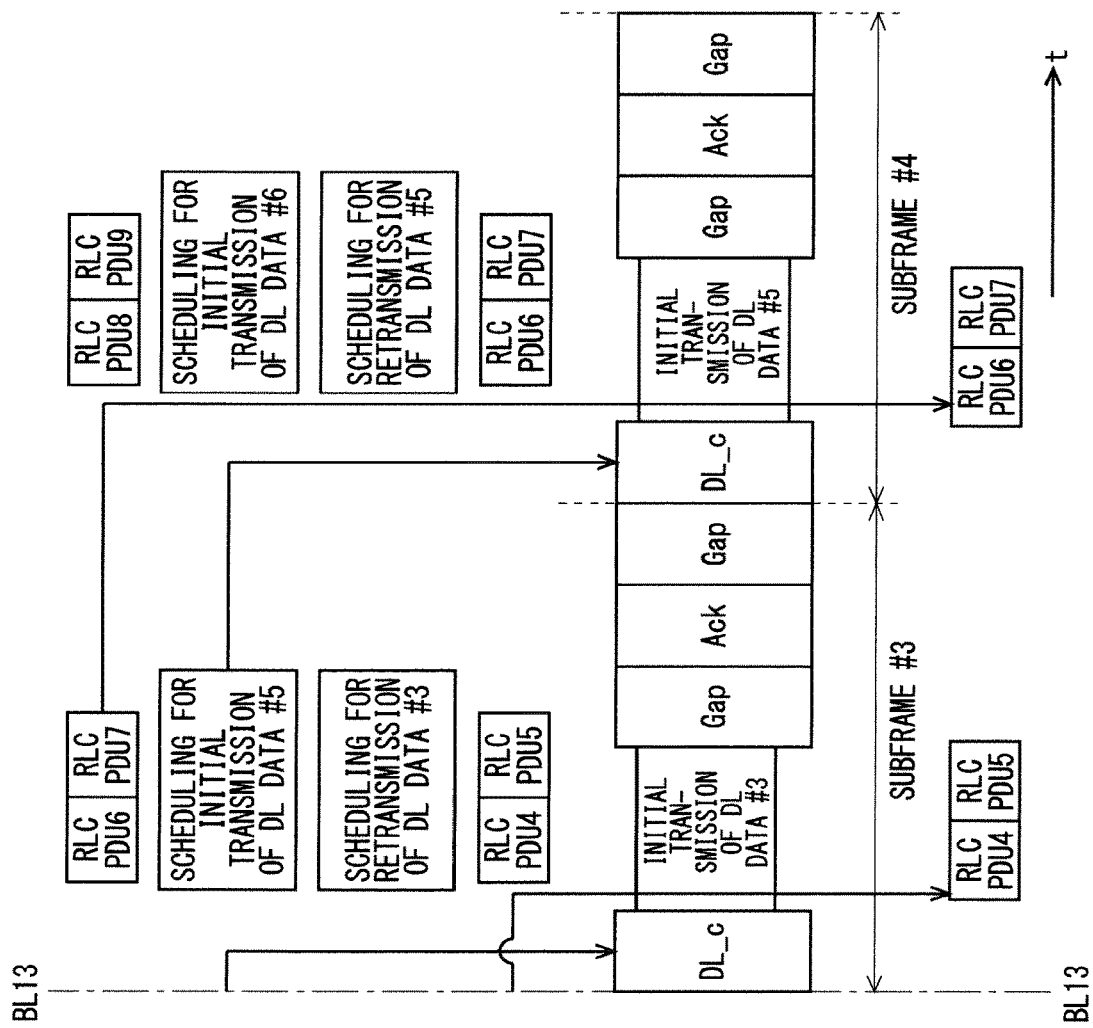
FIG. 36 illustrates the example method for scheduling one frame ahead according to the seventh modification of the first embodiment.

FIGS. 35 and 36 illustrate an example method for scheduling one frame ahead according to the seventh modification of the first embodiment. FIGS. 35 and 36 illustrate one example of scheduling for predetermining retransmission scheduling in the next subframe (n=1) according to the seventh modification. FIGS. 35 and 36 are connected across a location of a border BL13. In FIGS. 35 and 36, the horizontal axis represents time t, and the vertical axis represents a frequency f.

In the scheduling illustrated in FIGS. 35 and 36, the MAC layer receives RLC PDUs from the upper RLC layer, and generates data to be transmitted to the UE. Assume the frequency resources necessary for transmitting the DL data in or before the subframe #2 are insufficient in or after the subframe #3.

In the subframe #1 illustrated in FIGS. 35 and 36, the eNB transmits, to the UE, the DL data #1 generated from the RLC PDUs 1 to 3 as the initial transmission. The eNB schedules retransmission of the DL data #1 as well as the initial transmission of the DL data #2. The DL data #2 is data generated from the RLC PDUs 4 to 6.

Since the UE returns Ack in the subframe #1 illustrated in FIGS. 35 and 36, the eNB performs the initial transmission of the DL data #2 in the subframe #2. However, the next subframe #3 or the subsequent subframes do not have resources for transmitting the DL data #2. Thus, the eNB aborts retransmission of the DL data #2. The eNB schedules the initial transmission of the DL data #4 in preparation for Ack from the UE. The eNB schedules the initial transmission of the DL data #3 in preparation for Nack from the UE. The DL data #4 is data generated from the RLC PDUs 7 and 8 that are not included in the DL data #2. The DL data #3 is data generated from the RLC PDUs 4 and 5 that are included in the DL data #2. The eNB may not schedule the initial transmission of the DL data #3 in the scheduling in the subframe #2.

Since the UE returns Nack in the subframe #2 illustrated in FIGS. 35 and 36, the eNB performs the initial transmission of the DL data #3 in the subframe #3. The eNB schedules the initial transmission of the DL data #5 and retransmission of the DL data #3.

Since the UE returns Ack in the subframe #3 illustrated in FIGS. 35 and 36, the eNB performs the initial transmission of the DL data #5 in the subframe #4. The eNB schedules the initial transmission of the DL data #6 and retransmission of the DL data #5.

Figure 37:
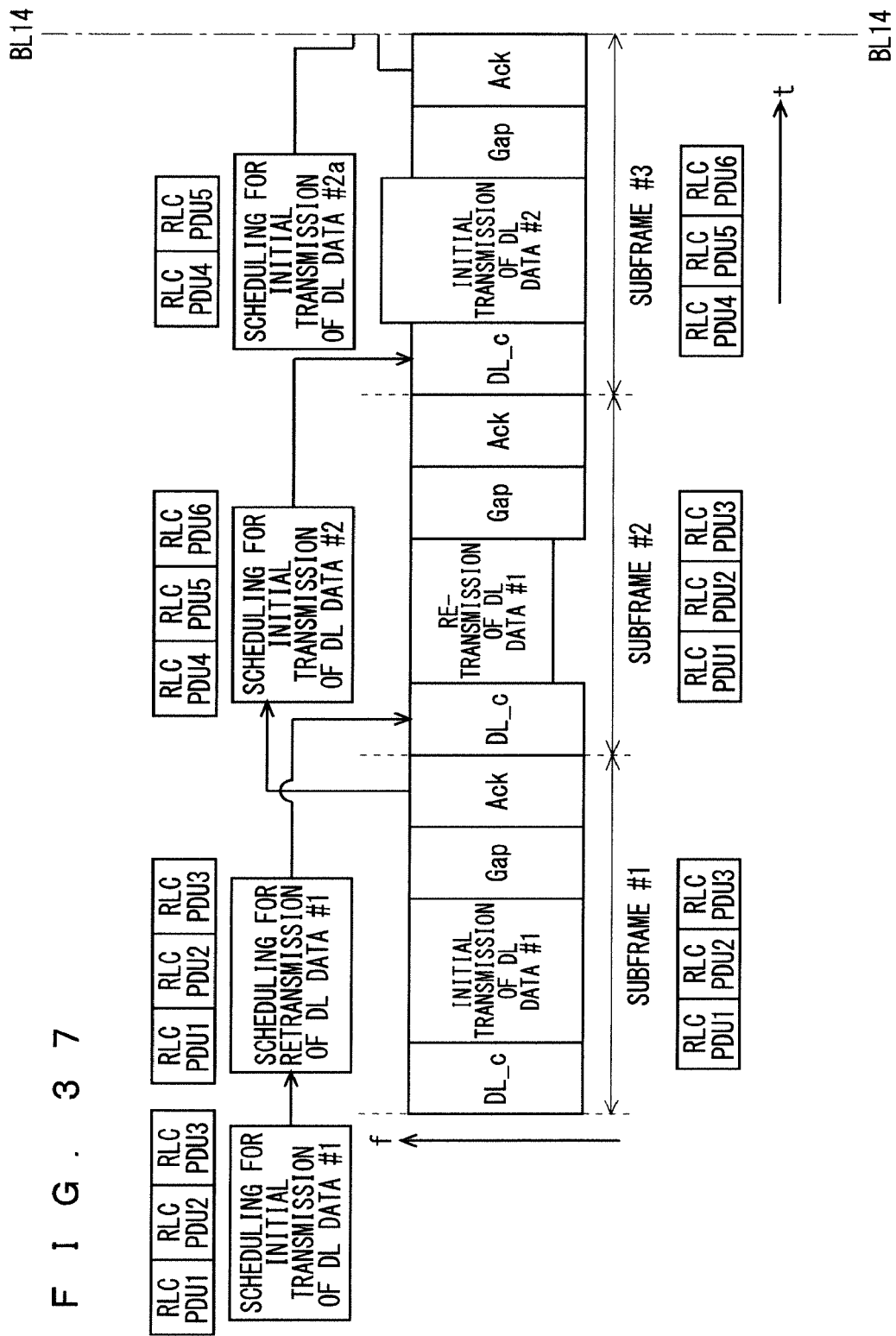
FIG. 37 illustrates an example method for scheduling one frame ahead when retransmission is performed once according to the seventh modification of the first embodiment.
Figure 38:
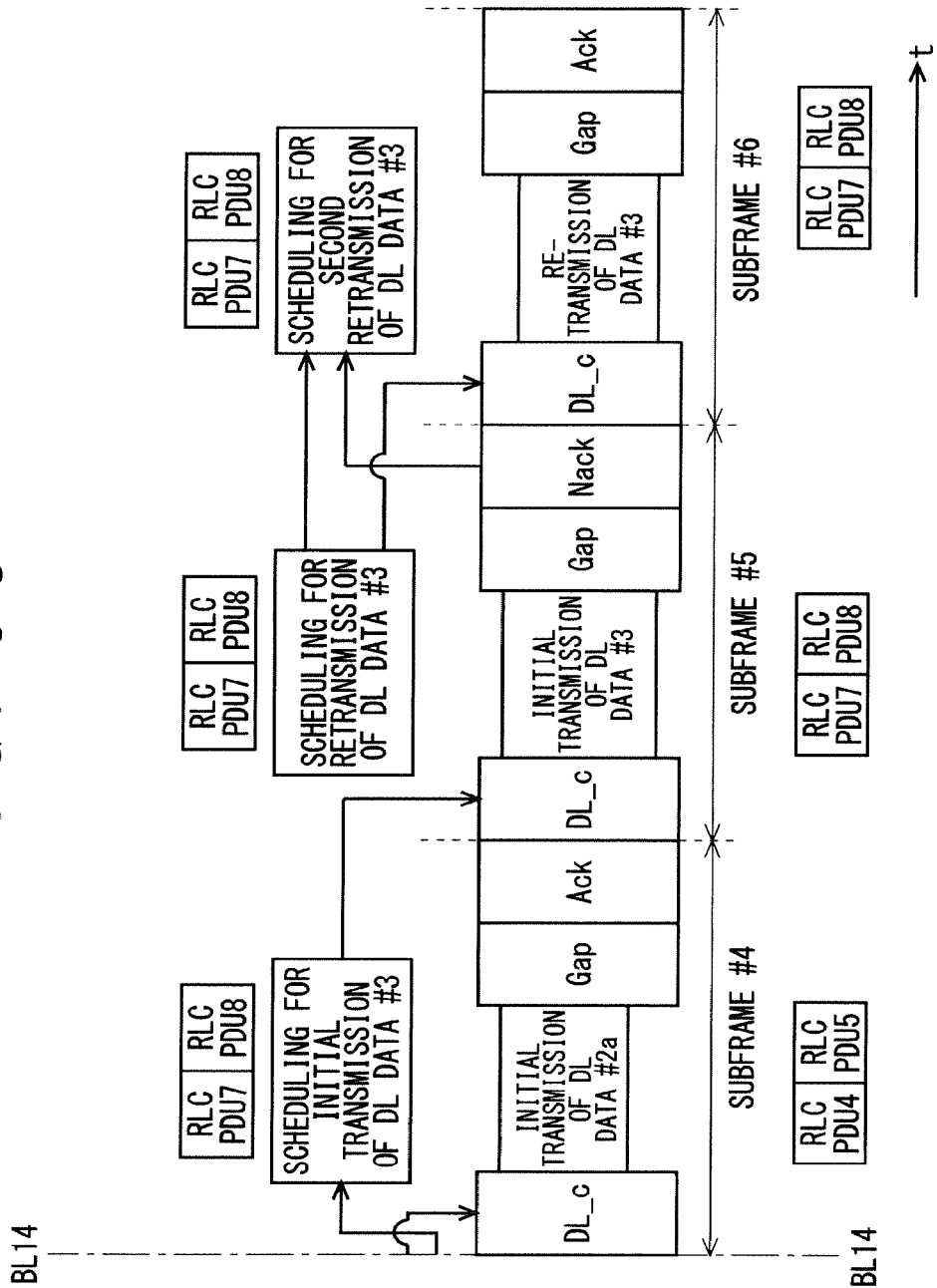
FIG. 38 illustrates the example method for scheduling one frame ahead when retransmission is performed once according to the seventh modification of the first embodiment.

FIGS. 37 and 38 illustrate an example method for scheduling one frame ahead when retransmission is performed once according to the seventh modification of the first embodiment. FIGS. 37 and 38 illustrate one example of scheduling for performing retransmission for one subframe after the initial transmission (m=1, n=1) according to the seventh modification. FIGS. 37 and 38 are connected across a location of a border BL14. In FIGS. 37 and 38, the horizontal axis represents time t, and the vertical axis represents a frequency f.

In the scheduling illustrated in FIGS. 37 and 38, the MAC layer receives RLC PDUs from the upper RLC layer, and generates data to be transmitted to the UE. Assume the frequency resources necessary for transmitting the DL data in or before the subframe #3 are insufficient in or after the subframe #4.

In the subframe #1 illustrated in FIGS. 37 and 38, the eNB transmits, to the UE, the DL data #1 generated from the RLC PDUs 1 to 3 as the initial transmission. The eNB schedules retransmission of the DL data #1.

The eNB retransmits the DL data #1 in the subframe #2 illustrated in FIGS. 37 and 38. Since the UE returns Ack in the subframe #1, the eNB schedules the initial transmission of the DL data #2. The DL data #2 is data generated from the RLC PDUs 4 to 6.

The eNB performs the initial transmission of the DL data #2 in the subframe #3 illustrated in FIGS. 37 and 38. However, the next subframe #4 or the subsequent subframes do not have resources for transmitting the DL data #2. Thus, the eNB aborts retransmission of the DL data #2. The eNB schedules the initial transmission of DL data #2a. The DL data #2a is data generated from the RLC PDUs 4 and 5 that are included in the DL data #2. The eNB may schedule transmission of data including the RLC PDU 7 and the subsequent RLC PDUs that are not included in the DL data #2, instead of the DL data #2a.

The eNB performs the initial transmission of the DL data #2a in the subframe #4 illustrated in FIGS. 37 and 38. Since the UE returns Ack in response to the DL data #2, the eNB schedules the initial transmission of the DL data #3. The eNB may schedule retransmission of the DL data #2a, regardless of the presence or absence of reception of Ack in response to the DL data #2 from the UE.

Since the operations in and after the subframe #5 illustrated in FIGS. 37 and 38 are the same as those in FIGS. 17 and 18, the description thereof will be omitted.

The scheduling method described in the seventh modification may be applied to the uplink scheduling. The entity that determines to abort retransmission of the uplink user data may be the eNB or the UE. The eNB may notify the UE to abort the retransmission of the uplink user data. The eNB may notify the UE to abort the retransmission via the L1/L2 signaling or the MAC signaling. The UE may notify the eNB to abort the retransmission of the uplink user data. The UE may notify the eNB to abort the retransmission via the L1/L2 signaling or the MAC signaling.

Thus, the seventh modification can produce the following advantages in addition to the advantages of the second or the third modification of the first embodiment. Specifically, repetition of the retransmission under the worse radio environment can be prevented, and the user data can be efficiently communicated.

Eighth Modification of First Embodiment

The eighth modification will describe another method for reducing or eliminating the gap length after transmission of the uplink signal in the self-contained subframe.

Reducing or eliminating the gap length after transmission of the uplink signal in the self-contained subframe causes a problem of delay in the transmission of information on scheduling of the subframe with respect to the timing of transmitting the downlink control information in the next subframe.

The eighth modification will disclose a method for solving such a problem.

The eNB allocates the scheduling information in a user data area.

The eNB may apply the structure of the enhanced physical downlink control channel (EPDCCH) for the allocation in the user data area. The eNB may decode Ack/Nack from the UE along with the timing of transmitting the downlink control information. The eNB may schedule the next subframe. The eNB may code the user data to be transmitted in the next subframe.

The UE may receive an area for EPDCCH for each subframe.

The eNB may notify the UE of information on the structure of the EPDCCH. The information may be notified via the RRC-dedicated signaling, the MAC signaling, or the L1/L2 signaling. The L1/L2 signaling may be transmitted using the PDCCH.

The eNB and the UE may apply the scheduling method described in the eighth modification to both the synchronous and the asynchronous schedulings. The scheduling method may also be applied to both the adaptive and the non-adaptive schedulings.

Since the gap after transmission of the uplink signal can be reduced or eliminated, the efficiency in communication between the eNB and the UE can be increased.

Second Embodiment

Studies have been made to adopt, in the Time Division Duplex (TDD) using reciprocity of channels, the sounding reference signal (SRS) to be transmitted in the uplink for deriving a precoding weight for downlink MIMO. Although the LTE supports the periodic sounding reference signal (SRS), change in the transmission period of the periodic SRS requires change in the settings via the RRC-dedicated signaling (see 3GPP TS 36.331 V13.2.0 (hereinafter referred to as "Reference 3")).

However, when the moving speed of the UE greatly fluctuates with a short period of time, the required transmission period of the SRS varies depending on the fluctuations in the Doppler frequency. Here, the application of the RRC-dedicated signaling in changing the transmission period of the SRS makes it difficult to respond in a short time and degrades the precoding performance. Even when sudden change in the radio propagation environment and in the traffic occurs, the application of the RRC-dedicated signaling in changing the transmission period of the SRS also makes it difficult to respond in a short time and degrades the precoding performance.

According to the conventional method for changing the transmission period of the SRS, the periodic settings of the SRS cannot be changed in a short time, and the SRS cannot be transmitted when necessary. Thus, a problem of degradation in the precoding performance for the downlink MIMO occurs.

The second embodiment will disclose a method for solving such a problem.

A period with which the UE actually transmits the periodic SRS (hereinafter may be referred to as a "SRS transmission period") is set as L1/L2 control information. Examples of the SRS transmission period include information indicating a value of the SRS transmission period. The cell notifies the UE of the SRS transmission period via the L1/L2 control signaling. The cell may notify the SRS transmission period as the downlink control information (DCI) to be transmitted via the downlink L1/L2 control signaling. The cell may map the SRS transmission period to a downlink physical control channel and notify the downlink physical control channel.

The notification of the SRS transmission period from the cell to the UE may make the UE start transmitting the periodic SRS. Upon receipt of the SRS transmission period from the cell, the UE may start transmitting the periodic SRS. The UE starts transmitting the periodic SRS after changing the period, along with the timing of a subframe which is the earliest since receipt of the SRS transmission period from the cell and in which the SRS can be transmitted.

Information for making the UE stop the SRS transmission may be provided. The information may be provided separately from the SRS transmission period, or as one value of the SRS transmission period. For example, 0 may be provided as a value of the SRS transmission period, and the SRS transmission may be stopped when 0 is set. The UE stops transmitting the SRS when the value of the SRS transmission period is 0.

The subframe in which the SRS is to be actually transmitted is set as a part or the entirety of the subframe in which the SRS can be transmitted. The cell may preset, individually to each UE, a subframe structure in which the SRS can be transmitted. The cell sets, individually to each UE, for example, a period (hereinafter may be referred to as a "SRS transmission possible period"), a bandwidth, a sub-carrier interval (a comb value), a cyclic shift (CS), etc. of the subframe in which the SRS can be transmitted. The subframe structure in which the SRS can be transmitted is transmitted via the RRC signaling. In consideration of multiplexing of the SRSs among a plurality of UEs, the cell may set the subframe structure in which each of the UEs can transmit the SRS.

The subframe in which the SRS is to be actually transmitted is set as a part or the entirety of the subframe in which the SRS can be transmitted, so that a subframe structure except for the SRS transmission period of the subframe in which the SRS is to be actually transmitted is set identical to the subframe structure in which the SRS can be transmitted.

Consequently, setting the subframe in which the SRS is to be actually transmitted as a part or the entirety of a subframe in which the SRS can be transmitted for each UE in consideration of multiplexing of the SRSs among the plurality of UEs allows the multiplexing with the SRS of another UE without any problem even when the SRS transmission period is changed.

Figure 39:
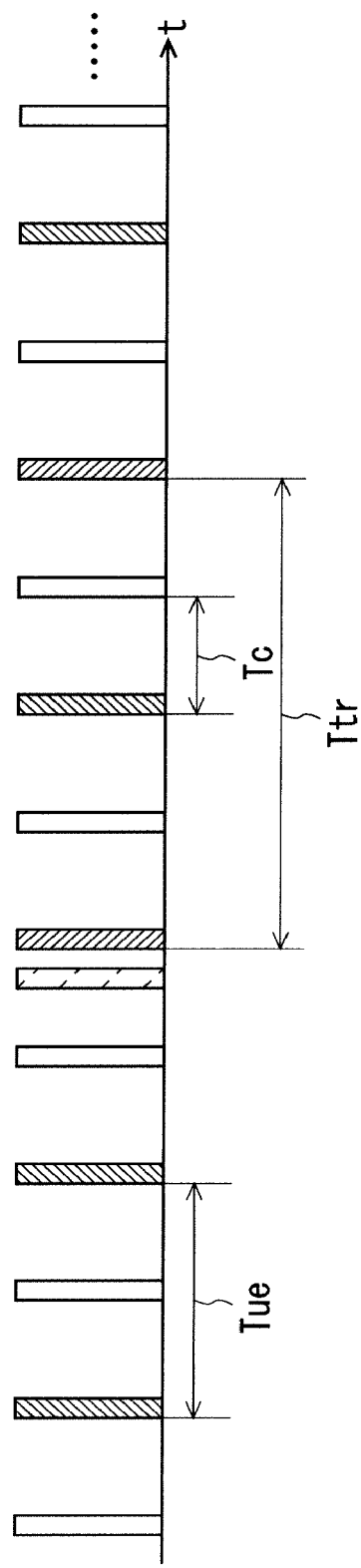
FIG. 39 illustrates a method for setting a SRS transmission period according to the second embodiment.

FIG. 39 illustrates a method for setting the SRS transmission period according to the second embodiment. In FIG. 39, the horizontal axis represents time t. An allowable subframe is a subframe in which the SRS can be transmitted and which is set for each cell. A configured subframe is a subframe in which the SRS can be transmitted for each UE and which is set for each UE. The configured subframe is set in the subframe in which the SRS can be transmitted and which is set for each cell. A transmission subframe is a subframe in which the SRS is to be actually transmitted. The subframe in which the SRS is to be actually transmitted is set as a part or the entirety of the subframe in which the SRS can be transmitted for each UE.

In FIG. 39, the allowable subframe is represented by a non-hatched box. The configured subframe is represented by diagonal-hatched solid lines that descend to the left. The transmission subframe is represented by diagonal-hatched solid lines that descend to the right. The notification of the SRS transmission period from the cell to the UE is represented by diagonal-hatched broken lines that descend to the right.

The cell broadcasts, to the UE, a subframe structure in which the SRS can be transmitted for each cell. Here, the subframe structure is broadcast using system information (SI). The subframe structure in which the SRS can be transmitted for each cell includes a subframe period with which the SRS can be transmitted for each cell. The cell notifies the UE of a subframe structure in which the SRS can be transmitted for each UE via the UE-dedicated signaling. The structure is notified via the RRC-dedicated signaling herein. The subframe structure in which the SRS can be transmitted for each UE includes a subframe period with which the SRS can be transmitted for each UE.

The SRS transmission period that is a period of the SRS to be actually transmitted by the UE is provided as one piece of DCI. The cell sets the SRS transmission period, includes the SRS transmission period in the DCI, maps the DCI to a physical dedicated control channel, and notifies the UE of the physical dedicated control channel. Here, the physical dedicated control channel is the PDCCH in the LTE. The UE starts transmitting the SRS with the SRS transmission period, from the subframe in which the SRS can be transmitted for each UE with the earliest timing since receipt of the SRS transmission period. The cell receives the SRS transmitted from the UE with the SRS transmission period, from the subframe in which the SRS can be transmitted for each UE with the earliest timing since notification of the SRS transmission period to the UE.

In FIG. 39, the eNB notifies the UE of the subframe structure in which the SRS can be transmitted for each UE. As an alternative method, the eNB may not notify the UE of the subframe structure in which the SRS can be transmitted for each UE. The eNB may notify the UE of the subframe structure in which the SRS can be transmitted for each cell. The eNB may notify the UE of the subframe structure in which the SRS is to be actually transmitted.

The subframe structure in which the SRS is to be actually transmitted may be notified via the MAC signaling or the L1/L2 signaling. The UE may start transmitting the SRS with the SRS transmission period, from the subframe in which the SRS can be transmitted for each cell with the earliest timing since receipt of the SRS transmission period. Since this can omit the notification of the subframe structure in which the SRS can be transmitted for each UE, the amount of signaling can be reduced, and the efficient communication is possible.

As an alternative method, the eNB may not notify the UE of the subframe structure in which the SRS can be transmitted for each cell. The eNB may notify the UE of the subframe structure in which the SRS can be transmitted for each UE. The eNB may notify the UE of the subframe structure in which the SRS is to be actually transmitted.

The subframe structure in which the SRS is to be actually transmitted may be notified via the MAC signaling or the L1/L2 control signaling. The UE may start transmitting the SRS with the SRS transmission period, from the subframe in which the SRS can be transmitted for each UE with the earliest timing since receipt of the SRS transmission period. Since this can omit the notification of the subframe structure in which the SRS can be transmitted for each cell, the amount of signaling can be reduced, and the efficient communication is possible.

As an alternative method, the eNB may notify the UE of only the subframe structure in which the SRS is to be actually transmitted. The eNB may successively determine a subframe structure in which the UE actually transmits the SRS, in consideration of multiplexing of the SRSs with the other UEs. The subframe structure may be periodic or aperiodic. The subframe structure may be notified via the L1/L2 signaling. Consequently, the SRS transmission timing for each UE can be flexibly changed.

As described above, examples of the subframe structure include a period, a bandwidth, a sub-carrier interval (a comb value), and a cyclic shift (CS) of the subframe. There may be a plurality of bandwidths. The bandwidths may be per resource block or per sub-carrier. The subframe structure may include the number of SRS transmission symbols, the SRS transmission symbols, a sequence identifier of the SRS, a frequency hopping pattern of the SRS, a sequence hopping pattern of the SRS, etc. One or more of these elements may be combined to be applied to the subframe structure.

The subframe structure may include the number of consecutive SRS transmission symbols and the first SRS transmission symbol. 3GPP is studying a method for the UE to transmit the SRS using a plurality of consecutive symbols. For example, notification of these pieces of information as such a subframe structure eliminates the need for notifying information on the SRS transmission symbols as many as the number of the SRS transmission symbols. The amount of information required for the notification can be reduced.

The subframe structure may include, for example, a bandwidth for each SRS symbol. The subframe structure may include elements of the other subframe structures for each SRS symbol. This is effective when, for example, the bandwidth varies for each SRS symbol.

A table indicating associations on information of the subframe structure may be provided. The cell notifies the UE of one or more pieces of information in the information of the subframe structure. The UE derives another information from the notified one or more pieces of information, using the table. For example, a table indicating an association between the SRS transmission period and the SRS transmission bandwidth is provided. Then, the cell notifies the UE of the SRS transmission period. Upon receipt of the SRS transmission period, the UE derives the SRS transmission bandwidth using the table.

As such, the UE sets a subframe structure derived using the table and one or more pieces of information in the subframe structure information notified from the cell. The UE transmits the SRS according to the derived subframe structure. The table indicating associations on information of the subframe structure may be statically predetermined in, for example, a standard or semi-statically notified from the cell to the UE. The semi-static notification may be made via the RRC signaling.

As such, the cell need not specify information derivable using a table to the UE. The cell implicitly notifies the information using the other information. Thus, the information to be notified to the UE can be reduced.

According to the method illustrated in FIG. 39, the notification of the SRS transmission period from the cell to the UE makes the UE start transmitting the periodic SRS. As an alternative method, information for starting to transmit the periodic SRS may be separately provided. Notification of the information for starting to transmit the periodic SRS from the cell to the UE makes the UE start transmitting the periodic SRS. Upon receipt of the information for starting to transmit the periodic SRS from the cell, the UE may start transmitting the periodic SRS. The UE starts transmitting the periodic SRS after changing the period, along with the timing of a subframe which is the earliest since receipt of the information for starting to transmit the periodic SRS from the cell and in which the SRS can be transmitted.

The cell may notify the UE of the SRS transmission period together with the information for starting to transmit the periodic SRS. The UE starts transmitting the periodic SRS according to the received SRS transmission period together with the information for starting to transmit the periodic SRS.

The cell may notify the UE of the SRS transmission period separately from the information for starting to transmit the periodic SRS. Here, the UE may treat the initial value of the SRS transmission period as a SRS transmission possible period. Until the cell separately notifies the UE of the SRS transmission period, the UE sets the preset SRS transmission possible period as the SRS transmission period, and starts transmitting the periodic SRS. When the cell separately notifies the UE of the SRS transmission period, the UE sets the SRS transmission period as the transmission period of the periodic SRS.

Consequently, transmission of the periodic SRS can be started independently from the setting of the SRS transmission period. Thus, transmission of the periodic SRS can be started flexibly according to, for example, the radio propagation environment.

As an alternative method, information for starting to transmit the periodic SRS may not be provided. The notification of the subframe structure in which the SRS can be transmitted from the cell to the UE may make the UE start transmitting the periodic SRS. Here, the UE may treat the initial value of the SRS transmission period as the SRS transmission possible period. Until the cell separately notifies the UE of the SRS transmission period, the UE sets the preset SRS transmission possible period as the SRS transmission period, and starts transmitting the periodic SRS. When the cell separately notifies the UE of the SRS transmission period, the UE sets the SRS transmission period as the transmission period of the periodic SRS.

When the cell desires to change the SRS transmission period, the cell only needs to notify the UE of the SRS transmission period via the L1/L2 control signal. Thus, the amount of information required for the notification can be reduced.

The information indicating a value of the SRS transmission period is used as the SRS transmission period in the aforementioned method. Here, another example method for setting the SRS transmission period will be described. For example, the SRS transmission period is n times a base period (n is a positive integer), assuming that the base period is a SRS transmission possible period that is a period of the subframe in which the SRS can be transmitted for each UE. The subframe in which the SRS is to be actually transmitted can be set to be included in the subframe in which the SRS can be transmitted.

The amount of information indicating the value n suffices for the amount of information indicating the SRS transmission period. Thus, the amount of information can be less than that when the value of the SRS transmission period is directly given. The amount of information to be notified from the cell to the UE can be reduced. Furthermore, n=0 may be added. The SRS transmission may be stopped when n=0.

The SRS transmission period may be $2^{(n-1)}$ times the base period (n is a positive integer) as another setting method thereof. Consequently, the subframe in which the SRS is to be actually transmitted can be set to be included in the subframe in which the SRS can be transmitted. The period can be changed more greatly than that when the SRS transmission period is n times the base period, with the same amount of information used. Furthermore, n=0 may be added. The SRS transmission may be stopped when n=0. Alternatively, the SRS transmission period may be $2^n$ times the base period (n is an integer larger than or equal to 0). When all the bits indicating n indicate 1, the SRS transmission may be stopped.

When the SRS transmission is stopped, n=0. The value may be a specific value of another n. For example, when all the bits indicating n indicate 1, the SRS transmission may be stopped. Statically predetermining the value indicating stopping the SRS transmission in, for example, a standard enables both the cell and the UE to recognize the stop of the SRS transmission.

Another example setting method will be disclosed. A table with the SRS transmission period indexed by a number is provided. The table may be predetermined in, for example, a standard. Alternatively, the table may be broadcast from the cell to the UE, or notified from the cell to the UE via the RRC-dedicated signaling. Information indicating the SRS transmission period is represented by the number. The cell selects the SRS transmission period from the table, and notifies the UE of the number indexed to the selected SRS transmission period. The UE derives the SRS transmission period from the received number and the table, and sets the SRS transmission period as the transmission period of the periodic SRS.

Consequently, any SRS transmission period can be set. Narrowing down the SRS transmission periods to the number needed enables reduction in the amount of information.

Another example method for setting the SRS transmission period will be described. Information indicating an increment or a decrement from the SRS transmission period currently set is provided. The initial value of the SRS transmission period may be of the SRS transmission possible period. The SRS transmission period currently set is assumed to be once per "a" times of SRS transmission possible subframes. To increase the SRS transmission period, the SRS transmission period is prolonged as once per (a+1) times of SRS transmission possible subframes. To reduce the SRS transmission period, the SRS transmission period is shortened as once per (a−1) times of SRS transmission possible subframes.

The maximum and minimum setting values of the SRS transmission period may be determined. Even if the SRS transmission period is greater than the maximum setting value in the setting according to the increment and decrement information of the SRS transmission period, the SRS transmission period is maintained at the maximum setting value. Similarly, if the SRS transmission period is less than the minimum setting value in the setting, the SRS transmission period is maintained at the minimum setting value. The minimum setting value may be of the SRS transmission possible period. The maximum and minimum setting values of the SRS transmission period may be predetermined in, for example, a standard, or notified from the cell to the UE.

Another method for setting the SRS transmission period includes setting, as the SRS transmission period, the information indicating an increment or a decrement from the SRS transmission period currently set, which enables the amount of information to equal 1 bit and further enables reduction in the amount of information to be notified from the cell to the UE.

An offset value of the SRS subframe to be actually transmitted (hereinafter may be referred to as a "SRS transmission offset value") may be set separately from the SRS transmission period. The SRS transmission offset value may be, for example, time. The SRS transmission offset value may be, for example, the number of SRS transmission possible subframes from the setting of the SRS transmission period to starting to transmit the periodic SRS. For example, when the cell sets 3 to the SRS transmission offset value, the UE starts transmitting the periodic SRS in the third SRS transmission possible subframe since receipt of the setting of the SRS transmission period.

The cell may notify the UE of offset information on the SRS subframe to be actually transmitted (hereinafter may be referred to as "SRS transmission offset information") together with the SRS transmission period. The UE starts transmitting the periodic SRS, with the received SRS transmission period and the SRS transmission offset information.

Alternatively, the cell may notify the UE of the SRS transmission offset information separately from the SRS transmission period. The UE may treat the initial value of the SRS transmission offset as an offset up to the earliest subframe in which the SRS can be transmitted since receipt of the SRS transmission period. When the cell separately notifies the UE of the SRS transmission offset value, the UE reconfigures a subframe in which the periodic SRS is to be transmitted, with the received SRS transmission offset value. Setting the offset value in such a manner enables the cell to flexibly set the transmission start timing of the periodic SRS.

The offset information may be a remainder obtained by dividing the subframe number in which the SRS is to be transmitted by the SRS transmission period. This enables designation of a unique offset to the UE, regardless of the notification timing of the SRS transmission period from the cell to the UE.

When the cell notifies the UE of the offset information together with information for stopping transmission of the periodic SRS, the offset information indicates the SRS transmission time or the number of SRS transmission possible subframes from setting of the SRS transmission stopping information to stopping transmission of the periodic SRS. The UE stops transmitting the periodic SRS after a lapse of the offset information from receipt of the information for stopping the SRS transmission.

The offset information that is information for starting the SRS transmission and the offset information that is information for stopping the SRS transmission may be different parameters. The cell sets these pieces of information to different parameters, and notifies the UE of the parameters. The UE can recognize whether the offset information is the information for starting the SRS transmission or the information for stopping the SRS transmission.

Figure 40:
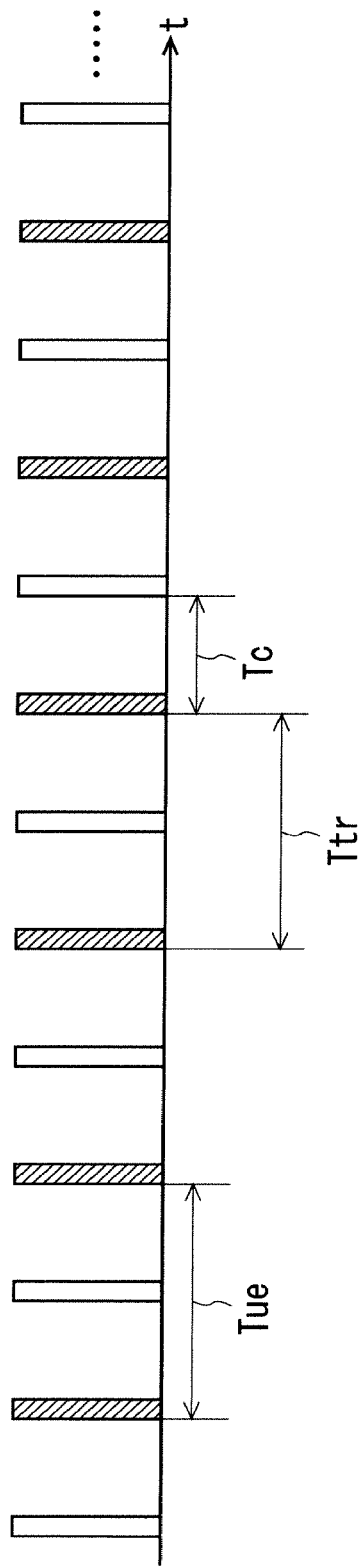
FIG. 40 illustrates a method for transmitting a periodic SRS when a SRS transmission offset is set together with the SRS transmission period.
Figure 41:
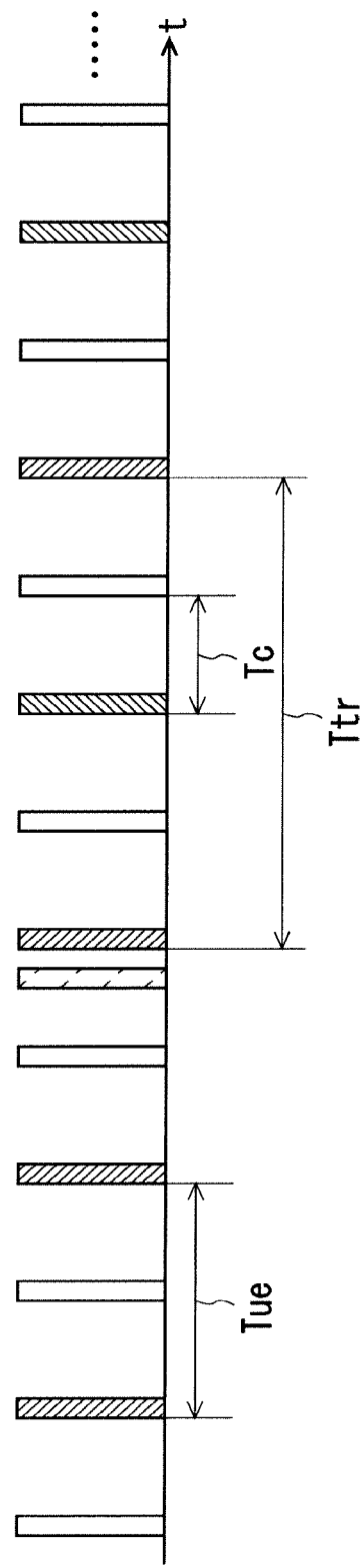
FIG. 41 illustrates a method for transmitting the periodic SRS when the SRS transmission offset is set together with the SRS transmission period.
Figure 42:
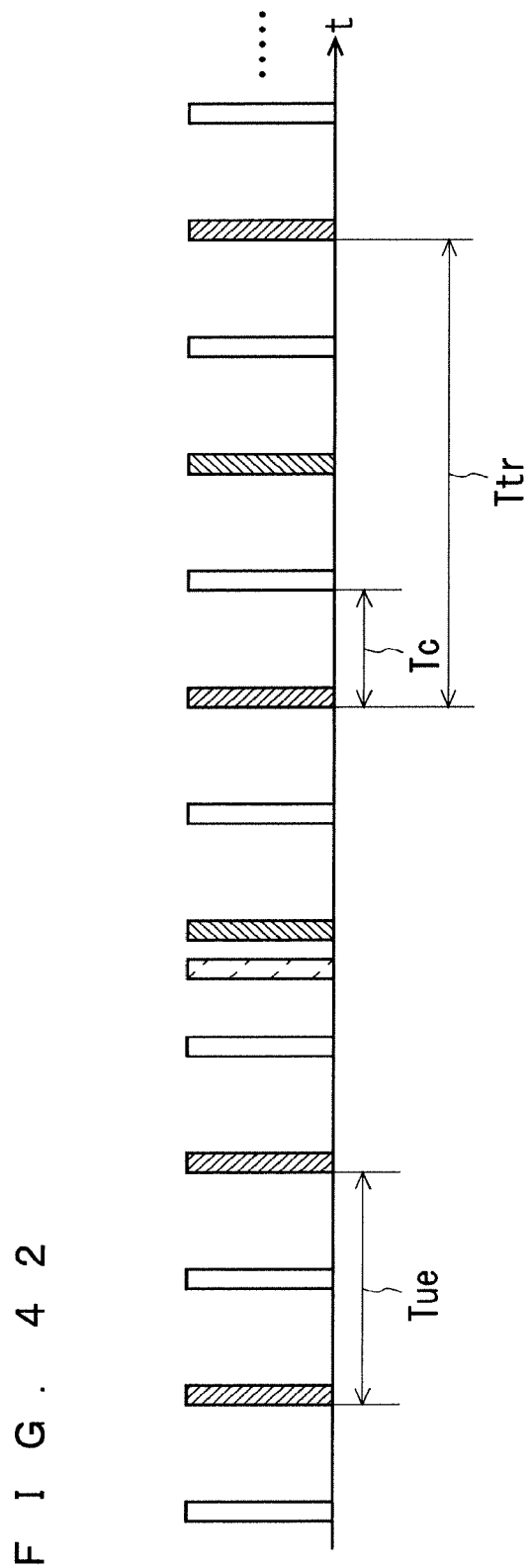
FIG. 42 illustrates a method for transmitting the periodic SRS when the SRS transmission offset is set together with the SRS transmission period.

FIGS. 40 to 42 illustrate methods for transmitting the periodic SRS when the SRS transmission offset is set together with the SRS transmission period. Since FIGS. to 42 are similar to FIG. 39, the differences will be mainly described. In FIGS. 40 to 42, the horizontal axis represents time t.

FIG. 40 illustrates a method for transmitting the periodic SRS with the SRS transmission period identical to the SRS transmission possible period for each UE. The cell includes the changed SRS transmission period in the DCI, maps the DCI to a physical control channel, and notifies the UE of the physical control channel to change the period of the periodic SRS. The cell also includes the SRS transmission offset in the DCI together with the SRS transmission period, and notifies the UE of the DCI.

FIG. 41 illustrates a method for transmitting the periodic SRS after changing the SRS period when the SRS transmission offset value is 1. The cell sets the SRS transmission period to the UE, and sets 1 to the SRS transmission offset value. Upon receipt of the SRS transmission period and the SRS transmission offset value from the cell, the UE changes the period into the SRS transmission period that has been set from the first SRS transmission possible subframe since setting of the SRS transmission offset. Then, the UE starts transmitting the periodic SRS.

FIG. 42 illustrates a method for transmitting the periodic SRS after changing the SRS period when the SRS transmission offset value is 2. The cell sets the SRS transmission period to the UE, and sets 2 to the SRS transmission offset value. Upon receipt of the SRS transmission period and the SRS transmission offset value from the cell, the UE changes the period into the SRS transmission period that has been set from the second SRS transmission possible subframe since setting of the SRS transmission offset. Then, the UE starts transmitting the periodic SRS.

Consequently, the cell can set a different offset value to each UE with the same SRS transmission period. According to this setting, a different SRS transmission subframe can be set to each UE. Furthermore, the SRS transmission timing appropriate for each UE can be flexibly set to a plurality of the UEs.

The following (1) to (7) will be disclosed as specific examples of a judgment indicator for changing the SRS transmission period:

(1) channel quality information of the UE;
(2) the moving speed of the UE;
(3) acceleration (change in the speed) of the UE;
(4) the rotational speed of the UE;
(5) rotational acceleration (change in the rotational speed) of the UE;
(6) the number of multiplexed UEs; and
(7) combinations of (1) to (6) above.

Taking, as the judgment indicator, the channel quality information of the UE in (1), for example, when the channel quality is inferior, the SRS transmission period is set shorter. When the channel quality is superior, the SRS transmission period is set longer. The UE transmits the SRS to the cell with a short period when the channel quality is inferior, so that the cell can increase the probability of receiving the SRS. The cell can also reflect a state where the channel quality is inferior on deriving of a pre-coding weight with low latency. Consequently, the precoding performance can be improved.

Taking, as the judgment indicator, the moving speed of the UE in (2), for example, when the moving speed is higher, the SRS transmission period is set shorter. When the moving speed is lower, the SRS transmission period is set longer. When the moving speed is higher, the UE transmits the SRS to the cell with a short period, and the cell receives the SRS with the short period. Thus, the influence of the Doppler frequency due to the moving speed of the UE can be reduced. Thus, precision of the SRS can be increased, and the precoding performance can be improved.

Taking, as the judgment indicator, the acceleration (change in the speed) of the UE in (3), for example, when the acceleration is greater, the SRS transmission period is set shorter. When the acceleration is less, the SRS transmission period is set longer. When the acceleration is greater, the UE transmits the SRS to the cell with a short period, and the cell receives the SRS with the short period. Thus, change in the moving speed of the UE can be reflected earlier. Consequently, the precoding performance can be improved.

Taking, as the judgment indicator, the rotational speed of the UE in (4), for example, when the rotational speed is higher, the SRS transmission period is set shorter. When the rotational speed is lower, the SRS transmission period is set longer. When the rotational speed is higher, the UE transmits the SRS to the cell with a short period, and the cell receives the SRS with the short period. Thus, the rotation of the UE can be reflected earlier. Consequently, the precoding performance can be improved.

Taking, as the judgment indicator, the rotational acceleration (change in the rotational speed) of the UE in (5), for example, when the rotational acceleration is greater, the SRS transmission period is set shorter. When the rotational acceleration is less, the SRS transmission period is set longer. When the rotational acceleration is greater, the UE transmits the SRS to the cell with a short period, and the cell receives the SRS with the short period. Thus, change in the rotational speed of the UE can be reflected earlier. Consequently, the precoding performance can be improved.

Taking, as the judgment indicator, the number of multiplexed UEs in (6), for example, when the number of multiplexed UEs is many, the SRS transmission period is set shorter. When the number of multiplexed UEs is few, the SRS transmission period is set longer. When the number of multiplexed UEs in the MIMO is many, the UE transmits the SRS to the cell with a short period, and the cell receives the SRS with the short period. Thus, the precision of the SRS can be increased for each UE. Consequently, even when the number of multiplexed UEs is many, the precoding weight with higher precision can be derived, and the precoding performance can be improved.

The cell obtains information on the judgment indicator for changing the SRS transmission period. The cell may measure the information, or obtain the information from the UE. The cell may appropriately determine, for each piece of information on the judgment indicators, whether to measure or obtain the information. In the examples of the judgment indicators described above, the cell may measure (1) and (6), and the UE may measure (2) to (5).

When the cell obtains information on a judgment indicator from the UE, the UE measures the information, and notifies it to the cell. The notification method may be the RRC signaling. Alternatively, the notification method may be the MAC signaling. The information may be included in the MAC control information to be notified via the MAC signaling. Consequently, the cell can obtain the information on the judgment indicator measured by the UE earlier than that via the RRC signaling.

Alternatively, the notification method may be the L1/L2 control signaling. The information may be included in the uplink L1/L2 control information (UCI) to be notified via the L1/L2 control signaling. Consequently, the cell can obtain the information on the judgment indicator measured by the UE much earlier than that via the MAC signaling.

When the information on the judgment indicator consists of measurement values thereof, the amount of information increases. A table indicating a range of the measurement values and an index given to the range may be created. The table may be statically predetermined in, for example, a standard. The index is used as the information on the judgment indicator. Use of the index can reduce the amount of information on the judgment indicator. The amount of information carried by the MAC control information or the L1/L2 control information should be less. Thus, application of indices to these is effective.

Figure 43:
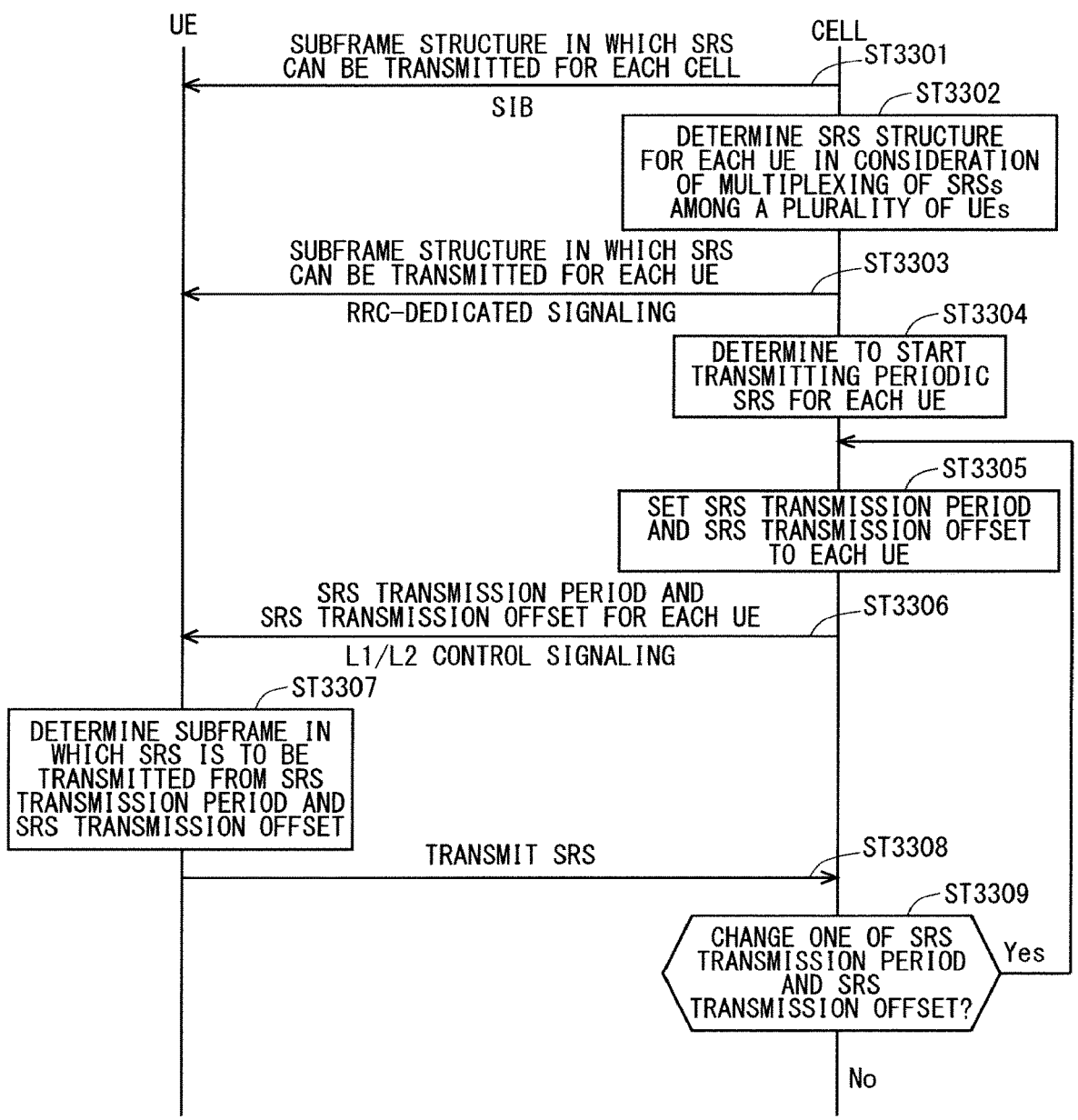
FIG. 43 illustrates an example sequence for setting the SRS transmission period according to the second embodiment.

FIG. 43 illustrates an example sequence for setting the SRS transmission period according to the second embodiment. The example illustrated in FIG. 43 discloses a method for starting or changing transmission of the periodic SRS according to the setting of the SRS transmission period for each UE.

In Step ST3301, the cell includes, in SIB, a subframe structure in which the SRS can be transmitted for each cell, and broadcasts the SIB to the UEs being served thereby.

In Step ST3302, the cell determines a subframe structure in which the SRS can be transmitted for each UE, in consideration of multiplexing of SRSs among a plurality of UEs that set the SRSs. The cell may determine the SRS transmission possible period for each UE.

In Step ST3303, the cell notifies the UE of the subframe structure in which the SRS can be transmitted for each UE. This notification may be made via the RRC-dedicated signaling. The UE does not start transmitting the periodic SRS upon this notification.

In Step ST3304, the cell determines to start transmitting the periodic SRS for each UE.

In Step ST3305, the cell sets the SRS transmission period and the SRS transmission offset value to each of the UEs for which the cell has determined to start transmitting the periodic SRS. In these settings, the SRS transmission possible period may be set to the SRS transmission period, and 1 may be set to the SRS transmission offset value as the initial value. The UE transmits the periodic SRS in a subframe in which the SRS can be transmitted for each UE.

In Step ST3306, the cell notifies the SRS transmission period and the SRS transmission offset value to each of the UEs for which the cell has determined to start transmitting the periodic SRS. These pieces of information may be included in the DCI as L1/L2 control information to be notified via the L1/L2 signaling. Consequently, the cell can notify the UE of the SRS transmission period and the SRS transmission offset value earlier, after setting the SRS transmission period and the SRS transmission offset value.

Upon receipt of the SRS transmission period and the SRS transmission offset value in Step ST3306, the UE derives a subframe in which the SRS is to be transmitted, according to the received SRS transmission period and the received SRS transmission offset value in Step ST3307.

In Step ST3308, the UE starts transmitting the periodic SRS in the subframe derived in Step ST3307.

In Step ST3309, the cell determines whether to change at least one of the SRS transmission period and the SRS transmission offset value for the UE that has started transmitting the periodic SRS. The aforementioned judgment indicators for changing the SRS transmission period are used in this determination.

When it is determined that at least one of the SRS transmission period and the SRS transmission offset value needs to be changed in Step ST3309, the process returns to Step ST3305, and at least one of the SRS transmission period and the SRS transmission offset value for each UE is set. In these settings, how much change is necessary is derived using the judgment indicators for changing the SRS transmission period, so that at least one of the SRS transmission period and the SRS transmission offset value may be set.

In Step ST3309, the cell may determine whether to stop transmitting the periodic SRS, in addition to the determination on whether to change at least one of the SRS transmission period and the SRS transmission offset value.

Upon determination of stopping transmission of the periodic SRS, the cell returns to the process in Step ST3305, and sets stopping of transmitting the periodic SRS as the SRS transmission period for each UE.

The cell that determines not to stop transmitting the periodic SRS and determines that it is not necessary to change the SRS transmission period and the SRS transmission offset value in Step ST3309 continues to receive the periodic SRS in the same settings. Without any notification of changing or stopping the periodic SRS, the UE continues to transmit the periodic SRS in the same settings.

The second embodiment enables the UE to stop transmitting the periodic SRS according to information for stopping transmission of the periodic SRS. Thus, the timing to transmit, to the UE, the information for stopping transmission of the SRS may be after the timing to transmit, to the UE, the information for starting the SRS. The cell may transmit, for example, the offset information for specifying a duration for stopping transmission of the SRS to the UE together with the information for starting to transmit the SRS. The cell may transmit the offset information for specifying a duration for stopping transmission of the SRS, for example, at the desired timing to make the UE stop transmitting the SRS. The UE stops transmitting the SRS according to the received offset information for specifying a duration for stopping transmission of the SRS.

Transmission of the offset information for specifying a duration for stopping transmission of the SRS together with the information for starting to transmit the SRS enables the UE to stop transmitting the SRS after the duration since transmission of the SRS. This eliminates the need for separately notifying the information for stopping transmission of the SRS.

When the SRS transmission period is set and changed, setting the SRS transmission period as the L1/L2 control information and notifying the SRS transmission period via the L1/L2 control signaling allows notification with a shorter period of time than that by changing the SRS transmission period using the conventional RRC signaling, as disclosed in this second embodiment. The time from when the cell determines to change at least one of the SRS transmission period and the SRS transmission offset value to when the UE transmits the periodic SRS in the changed setting can be shorter than the conventional time.

Since this enables reduction in the latency in the periodic settings of the SRS, the UE can transmit the SRS when necessary. Thus, the precoding performance for the downlink MIMO can be improved.

As described above, the subframe structure in which the SRS is to be actually transmitted may be notified via the MAC signaling or the L1/L2 control signaling. A subframe structure in which the other SRSs are to be actually transmitted may be notified together with the transmission period of the subframe in which the SRS is to be actually transmitted. The subframe structure in which the SRS is to be actually transmitted may be notified together with information for starting to transmit the SRS.

A plurality of subframe structures in which the SRS can be transmitted for each cell may be set. A plurality of subframe structures in which the SRS can be transmitted for each UE may be set. One of the plurality of subframe structures in which the SRS can be transmitted for each UE may be selected, and the subframe structure in which the SRS is to be actually transmitted for each UE may be set to be a part or the entirety of the selected subframe structure in which the SRS can be transmitted for each UE.

For example, one of the plurality of subframe structures in which the SRS can be transmitted for each cell may be selected, and a part or the entirety of the selected subframe structure may be applied to the subframe structure in which the SRS is to be actually transmitted for each UE. These are appropriately set in the aforementioned setting methods, for example, in a setting method depending on whether the eNB notifies the UE of only the subframe structure in which the SRS is to be actually transmitted.

This increases patterns of the subframe structures in which the SRS is to be actually transmitted for each UE. Thus, the SRS more appropriate for, for example, the moving speed and the radio propagation environment of the UE can be transmitted.

Figure 44:
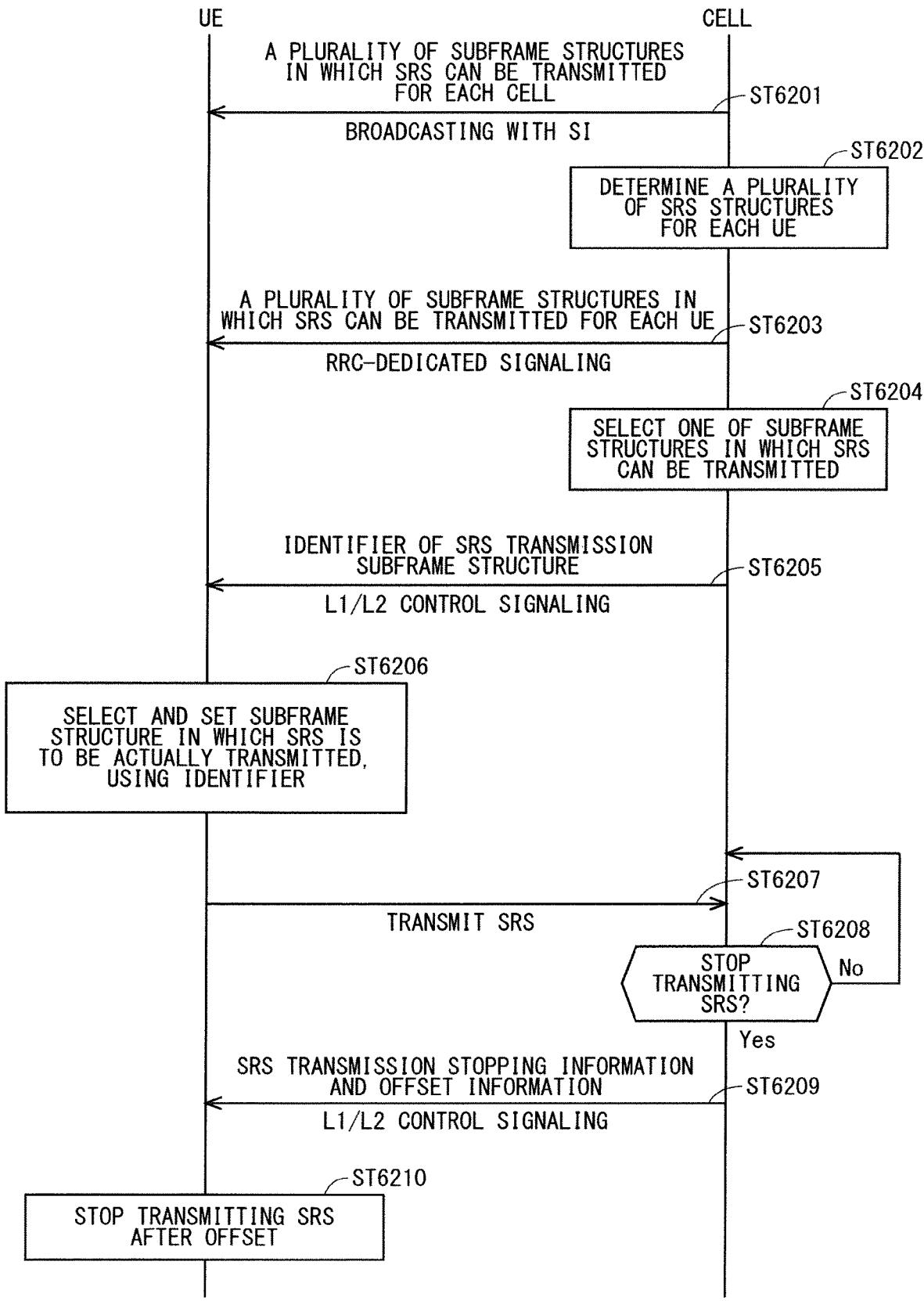
FIG. 44 illustrates an example SRS transmission sequence when a plurality of subframes in which a SRS can be transmitted are configured.

FIG. 44 illustrates an example SRS transmission sequence when a plurality of subframes in which the SRS can be transmitted are configured. In Step ST6201, the cell sets a plurality of subframe structures in which the SRS can be transmitted for each cell, and notifies the UE of the setting. The cell may notify information on the set subframe structure as system information. In Step ST6202, the cell determines a plurality of SRS structures for each UE. In Step ST6203, the cell notifies the UE of the determined plurality of subframe structures in which the SRS can be transmitted for each UE. This notification may be made via the UE-dedicated RRC signaling.

In Step ST6204, the cell selects one of the determined plurality of subframe structures in which the SRS can be transmitted for each UE to make the UE actually transmit the SRS. In Step ST6205, the cell notifies the UE of the selected SRS transmission subframe structure. In the previous Step ST6203, identifiers may be assigned to the respective subframe structures in which the SRS can be transmitted for each UE, and such identifiers may also be transmitted. In such a case, the cell may notify the UE of the identifier of the selected subframe structure in which the SRS can be transmitted in Step ST6205.

In the example illustrated in FIG. 44, notification of one of the SRS transmission subframe structures or an identifier indicating the one of the SRS transmission subframe structures is used as information for starting to transmit the SRS. In Step ST6206, the UE selects the subframe structure in which the SRS is to be actually transmitted, using the plurality of subframe structures in which the SRS can be transmitted for each UE that are notified in Step ST6203, and the identifier notified in Step ST6205. In Step ST6207, the UE starts transmitting the SRS according to the selected subframe structure.

Making the notification in Step ST6205 via the L1/L2 control signaling enables the UE to start transmitting the SRS dynamically with low latency.

In Step ST6208, the cell determines whether to stop transmission of the SRS by the UE. When determining not to stop the transmission, the cell continues to receive the SRS. When determining to stop the transmission of the SRS, the cell notifies the UE of information for stopping the SRS in Step ST6209.

In Step ST6210, the UE stops transmitting the SRS according to the information for stopping transmission of the SRS that has been notified in Step ST6209. Making the notification in Step ST6209 via the L1/L2 control signaling enables the UE to stop transmitting the SRS dynamically with low latency.

Although notification of one of the SRS transmission subframe structures or the identifier indicating the one of the SRS transmission subframe structures is used as information for starting to transmit the SRS in the example illustrated in FIG. 44, the information for starting to transmit the SRS may be notified instead. The information for starting to transmit the SRS may be notified together with one of the SRS transmission subframe structures or the identifier indicating the one of the SRS transmission subframe structures. The UE selects the subframe structure in which the SRS is to be actually transmitted, using the notified plurality of subframe structures in which the SRS can be transmitted for each UE, and the notified identifier, and starts transmitting the SRS according to the notified information for starting to transmit the SRS.

Notifying the UE of a plurality of subframe structures in which the SRS can be transmitted and selecting one of the subframe structures can reduce the amount of information to be notified via the L1/L2 control signal. This can increase the use efficiency of the radio resources.

When not the plurality of subframe structures in which the SRS can be transmitted, but only one of the subframe structures in which the SRS can be transmitted is notified in Step ST6203, the cell only needs to determine in Step ST 6204 whether to make the UE start transmitting the SRS and to notify the UE of the information for starting to transmit the SRS in Step ST6205. The UE starts transmitting the SRS according to the notified information for starting to transmit the SRS.

Figure 45:
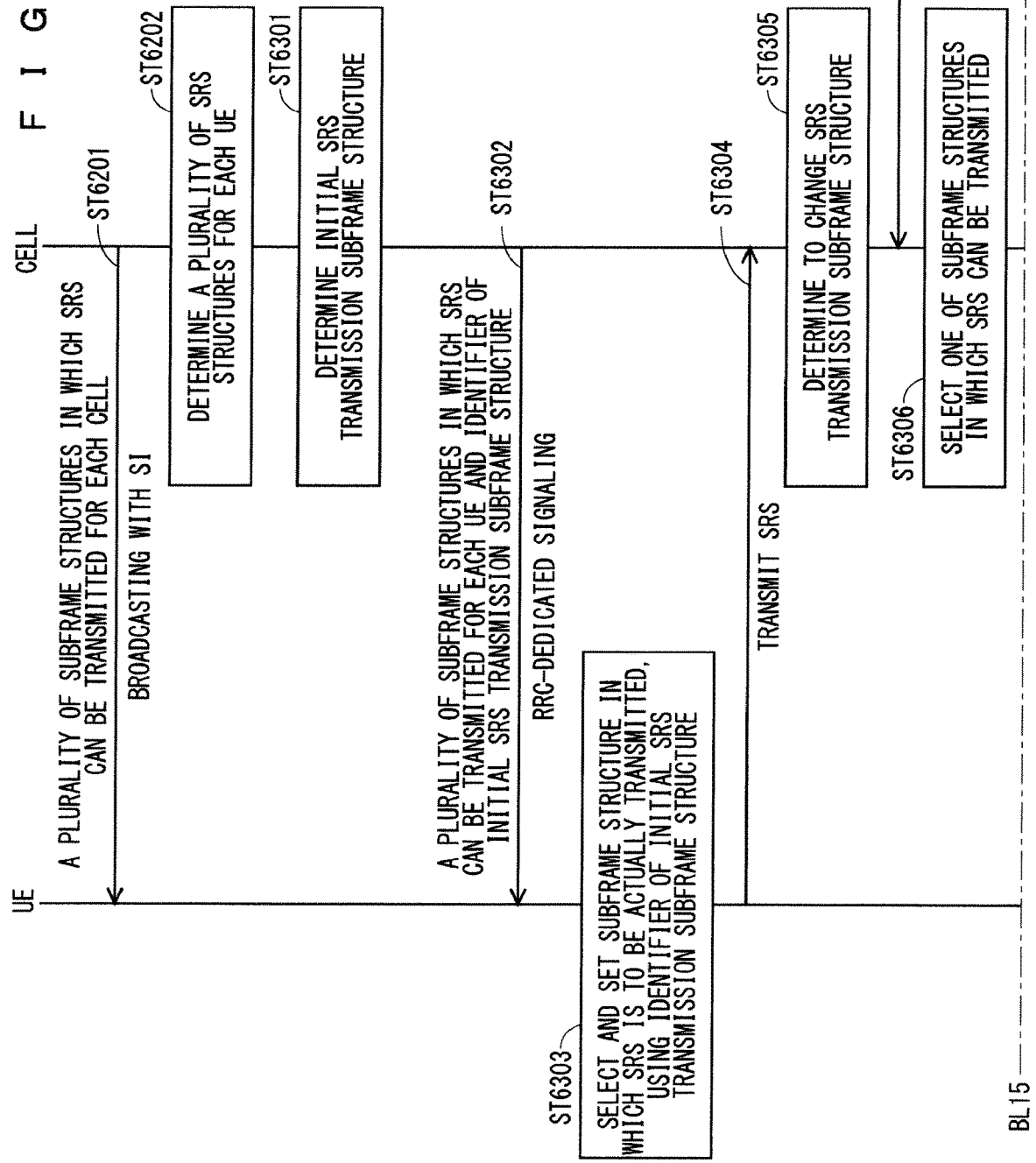
FIG. 45 illustrates an example SRS transmission sequence when the plurality of subframes in which the SRS can be transmitted are configured to change a SRS subframe structure.

FIGS. 45 and 46 illustrate an example SRS transmission sequence when a plurality of subframes in which the SRS can be transmitted are configured to change the SRS subframe structure. FIGS. 45 and 46 are connected across a location of a border BL15. In Step ST6301, the cell determines the initial SRS transmission subframe structure. In Step ST6302, the cell notifies the UE of a plurality of subframe structures in which the SRS can be transmitted for each UE. The cell notifies the UE of an identifier of the initial SRS transmission subframe structure together with the plurality of SRS subframe structures. This notification may be made via the UE-dedicated RRC signaling.

In Step ST6303, the UE selects the subframe structure in which the SRS is to be actually transmitted, using the plurality of subframe structures in which the SRS can be transmitted for each UE and the identifier of the initial SRS transmission subframe structure all of which have been notified in Step ST6302. In Step ST6304, the UE starts transmitting the SRS according to the selected subframe structure.

In Step ST6305, the cell determines to change the SRS transmission subframe structure. In Step ST6306, the cell selects one of the plurality of subframe structures in which the SRS can be transmitted that have been determined in Step ST6302. In Step ST6307, the cell notifies the UE of the selected SRS transmission subframe structure. Here, the cell may notify the UE of the selected SRS transmission subframe structure using the identifier.

In Step ST6308, the UE selects the subframe structure in which the SRS is to be actually transmitted, using the plurality of subframe structures in which the SRS can be III transmitted for each UE that have been notified in Step ST6302, and the identifier notified in Step ST6307. In Step ST6309, the UE starts transmitting the SRS according to the selected subframe structure.

Making the notification in Step ST6307 via the L1/L2 control signaling enables the UE to start transmitting the SRS dynamically with low latency.

In Step ST6310, the cell determines whether to make the UE stop transmitting the SRS. When determining not to stop the transmission, the cell continues to receive the SRS. In Step ST6312, the cell determines whether to change the SRS transmission subframe structure. When the cell determines to change the SRS transmission subframe structure, the sequence returns to Step ST6306. When the cell determines not to change the SRS transmission subframe structure, the cell continues to receive the SRS in Step ST6309.

When determining to stop the transmission of the SRS in Step ST6310, the cell notifies the UE of information for stopping transmission of the SRS in Step ST6209.

In Step ST6210, the UE stops transmitting the SRS according to the information for stopping transmission of the SRS that has been notified in Step ST6209. Making the notification in Step ST6209 via the L1/L2 control signaling enables the UE to stop transmitting the SRS dynamically with low latency.

As such, the UE is notified of a plurality of subframe structures in which the SRS can be transmitted, and one of the subframe structures is selected. Consequently, the UE only needs to be notified of the identifier even in changing the subframe in which the SRS is to be actually transmitted, which can reduce the amount of information to be notified via the L1/L2 control signal. This can increase the use efficiency of the radio resources.

A plurality of subframe structures in which the SRS is to be actually transmitted for each UE may be set to one UE. This can increase the transmission patterns of the SRS. A subframe structure in which the SRS is to be actually transmitted for each UE may be set to each of the subframe structures in which the SRS can be transmitted for each UE. This can further increase the transmission patterns of the SRS. Thus, the SRS more appropriate for, for example, the moving speed and the radio propagation environment of the UE can be transmitted.

The information for stopping transmission of the SRS may include the SRS transmission subframe structure or information indicating the SRS transmission subframe structure. The information indicating the SRS transmission subframe structure may be, for example, the aforementioned identifier. Since the transmission pattern of the SRS whose transmission is to be stopped can be uniquely identified from the plurality of subframe structures in which the SRS is to be actually transmitted for each UE, flexibility can be provided to the settings for transmitting the SRS. The same may hold true for information for changing transmission of the SRS.

Application of the aforementioned method enables setting of transmitting a plurality of SRSs at one time. For example, a plurality of subframe structures are set to the UE as subframe structures in which the SRS can be transmitted for each cell or for each UE, and a plurality of subframe structures in which the SRS is to be actually transmitted among the set plurality of subframe structures are set to the UE. Alternatively, only a plurality of subframe structures may be set to the UE as the subframe structures in which the SRS is to be actually transmitted for each UE. The UE transmits the SRS according to the set plurality of subframe structures in which the SRS is to be actually transmitted. As described above, the subframe structure may be configured per symbol. The SRS can be transmitted using a plurality of symbols in one subframe.

Changing the number of settings for transmitting the SRS at one time enables setting of a plurality of SRS transmission patterns. The cell may dynamically change the number of settings for transmitting the SRS at one time. The cell may set the number of settings for transmitting the SRS at one time, simultaneously when changing the SRS transmission period. The cell may set the number of settings for transmitting the SRS at one time, in the same method as that for changing the SRS transmission period.

A plurality of SRS transmission patterns may be prepared in advance, and one of the SRS transmission patterns may be selected. The plurality of SRS transmission patterns can be prepared by changing, for example, the number of settings for transmitting the SRS that is included in the subframe structure or the SRS transmission period in each of the settings for transmitting the SRS, etc. The plurality of SRS transmission patterns may be statically predetermined in, for example, a standard or semi-statically notified from the cell to the UE via, for example, the RRC signaling. Each of the SRS transmission patterns may have an identifier. The cell notifies the UE of the identifier of the pattern. The UE starts transmitting the SRS, according to the received identifier of the pattern and the setting for the SRS corresponding to the pattern.

Consequently, various SRS transmission patterns including the plurality of SRS transmission patterns can be set, and the UE can transmit the SRS with the various SRS transmission patterns. The settings appropriate for various communication services of the UE and appropriate for transmitting the SRS in various situations are possible.

The LTE allows not only the settings for the periodic SRS but also the settings for the aperiodic SRS. The settings for the periodic SRS according to the methods disclosed in the second embodiment may be combined with a method for setting the periodic SRS and a method for setting the aperiodic SRS in the LTE for use. When the SRS period needs to be changed with low latency, the periodic SRS disclosed in the second embodiment may be set, or the SRS transmission period of the periodic SRS that is disclosed in the second embodiment may be changed. Which SRS is to be set or changed may be appropriately determined according to, for example, a required latency amount.

The subframe structure in which the SRS can be transmitted for each cell may be notified between adjacent eNBs. The subframe structure in which the SRS can be transmitted for each UE may be notified between adjacent eNBs. The subframe structure in which the SRS is to be actually transmitted for each UE may be notified between adjacent eNBs. The notification between adjacent eNBs may be made directly or through a core network (CN) node. This enables the UE to transmit the SRS coordinated among the adjacent eNBs.

For example, in a handover (HO) between eNBs, a source eNB (S-eNB) that is a HO-source eNB may notify a target eNB (T-eNB) that is a HO-target eNB of a subframe structure in which the SRS can be transmitted for each cell that is a HO-source cell, a subframe structure in which the SRS can be transmitted for each UE that is a UE subject to the HO, and a subframe structure in which the SRS is to be actually transmitted for each UE. The subframe structures may be notified via a signaling for a HO request.

Consequently, the T-eNB can set, in consideration of the SRS subframe structure of the UE in the HO-source cell, a subframe structure in which the SRS can be transmitted for each cell that is a HO-target cell, the subframe structure in which the SRS can be transmitted for each UE that is the UE subject to the HO, and the subframe structure in which the SRS is to be actually transmitted for each UE.

3GPP is studying a transmission reception point (TRP) and a distributed unit (DU) as NR nodes. The methods disclosed in the second embodiment may be applied to the TRP and the DU. The methods disclosed in the second embodiment may be applied, using the TRP and the DU instead of the cells.

Alternatively, only the subframe structure in which the SRS can be actually transmitted may be set for each TRP or each DU. The subframe structure in which the SRS can be transmitted for each cell and the subframe structure in which the SRS can be transmitted for each UE may be set for each high-level node of the TRP or for each high-level node of the DU, for example, for each central unit (CU). For example, even when the UE moves between the TRPs or between the DUs, the subframe structure in which the SRS can be actually transmitted only needs to be set, without any need for reconfiguring the subframe structure in which the SRS can be transmitted for each cell and the subframe structure in which the SRS can be transmitted for each UE.

The subframe structure in which the SRS can be actually transmitted for each UE may be notified between the TRP or the DU and its high-level node. When the UE moves between the TRPs or between the DUs, the subframe structure in the UE that moves between the TRPs or between the DUs and in which the SRS can be actually transmitted may be notified. This notification may be made via the high-level node.

Application of the methods disclosed in the second embodiment to the TRPs and the DUs enables improvement in the precoding performance even when the downlink MIMO using the TRPs and the DUs is performed.

First Modification of Second Embodiment

The first modification will disclose another method for solving the problems disclosed in the second embodiment.

A period with which the UE actually transmits the periodic SRS (hereinafter may be referred to as a "SRS transmission period") is set as the MAC control information. The period may be provided as a MAC control element (CE). The cell notifies the UE of the period via the MAC signaling. The first embodiment may be applied to information to be set.

The HARQ is applied in making the notification via the MAC signaling. When the UE cannot accurately receive the MAC signaling notified from the cell, the UE transmits Nack to the cell. Then, the cell performs the retransmission to the UE under the retransmission control.

Thus, the setting with consideration given to the retransmission is a must, unlike the notification via the L1/L2 control signaling.

When acknowledging that the UE has accurately received the MAC signaling including the SRS transmission period transmitted to the UE, the cell changes reception of the periodic SRS with the set SRS transmission period. Upon the accurate receipt of the MAC signaling including the SRS transmission period transmitted from the cell, the UE changes transmission of the periodic SRS with the set SRS transmission period.

When acknowledging receipt of Ack from the UE in response to the MAC signaling including the SRS transmission period transmitted to the UE, the cell changes reception of the periodic SRS with the set SRS transmission period. After accurately receiving the MAC signaling including the SRS transmission period transmitted from the cell and then transmitting Ack, the UE changes transmission of the periodic SRS with the set SRS transmission period.

The same holds true when transmission of the periodic SRS is started upon notification of the SRS transmission period.

When acknowledging that the UE has accurately received the MAC signaling including the SRS transmission period transmitted to the UE, the cell starts receiving the periodic SRS with the set SRS transmission period. Upon the accurate receipt of the MAC signaling including the SRS transmission period transmitted from the cell, the UE starts transmitting the periodic SRS with the set SRS transmission period.

The same holds true when the SRS transmission offset is set.

When acknowledging that the UE has accurately received the MAC signaling including the SRS transmission period transmitted to the UE, the cell counts the SRS transmission offset. Upon the accurate receipt of the MAC signaling including the SRS transmission period transmitted from the cell, the UE counts the SRS transmission offset.

For example, when the SRS transmission offset value is the number of subframes in which the SRS can be transmitted since the setting of the SRS transmission period until start of transmission of the periodic SRS, the cell acknowledges that the UE has accurately received the MAC signaling including the SRS transmission period transmitted to the UE, and then changes reception of the periodic SRS with the set SRS transmission period in a subframe after the SRS transmission offset that is a subframe in which the SRS can be transmitted. Upon the accurate receipt of the MAC signaling including the SRS transmission period transmitted from the cell, the UE changes transmission of the periodic SRS with the set SRS transmission period in the subframe after the SRS transmission offset that is the subframe in which the SRS can be transmitted.

Consequently, the timing for the UE to start transmission and reception of the periodic SRS can coincide with that in the cell. Consequently, the process of transmitting the periodic SRS can be executed without any malfunction in a system. This holds true for starting and stopping the periodic SRS.

Similarly, when information for starting to transmit the SRS or information for stopping transmitting the SRS is notified via the MAC signaling, the timing for the UE to start or stop transmission and reception of the periodic SRS can coincide with that in the cell. Consequently, the process of transmitting the periodic SRS can be executed without any malfunction in a system.

Similarly as the second embodiment, the offset information may be a remainder obtained by dividing the subframe number in which the SRS is to be transmitted by the SRS transmission period. Consequently, the cell and the UE can use a unique offset, regardless of the presence or absence of retransmission of the MAC signaling to the UE.

When the SRS transmission period is changed, setting the SRS transmission period as the MAC control information and notifying the SRS transmission period via the MAC signaling allows the notification with a shorter period of time than that in changing the SRS transmission period via the conventional RRC signaling, as disclosed in this second embodiment. The time from when the cell determines to change at least one of the SRS transmission period and the SRS transmission offset value to when the UE transmits the periodic SRS in the changed setting can be shorter than the conventional time.

Since this enables reduction in the latency in the periodic settings of the SRS, the UE can transmit the SRS when necessary. Thus, the precoding performance for the downlink MIMO can be improved.

The retransmission control is applied when the MAC signaling is used, unlike when the L1/L2 control signaling is used as disclosed in the second embodiment. Consequently, the cell can receive the SRS transmitted from the UE at a lower error rate. Thus, the precoding performance can be improved.

Second Modification of Second Embodiment

The SRS transmission period is set according to the determination by the eNB in the second embodiment and the first modification of the second embodiment. However, while the eNB measures a reception condition of the UE using the SRS with reciprocity, if the set SRS period is long, the eNB cannot understand sudden change in the reception condition of the UE. Here, the eNB cannot receive the SRS with a period appropriate for fluctuations in the moving speed of the UE with a short period of time and appropriate for sudden change in the radio propagation environment. Thus, a problem of degradation in the precoding performance occurs.

The second modification will disclose a method for solving such a problem.

The UE requests the cell to change the SRS transmission period. Information for requesting change in the SRS transmission period is provided. Then, the UE notifies the cell of the information. The information for requesting change in the SRS transmission period may be information indicating whether to make the request. The information may be information of 1 bit.

A method for notifying the information for requesting change in the SRS transmission period (hereinafter may be referred to as "SRS period change request information") will be disclosed. The SRS period change request information is set as uplink L1/L2 control information. The UE notifies the cell of the SRS period change request information via the L1/L2 control signaling. The UE may notify the SRS period change request information as uplink control information (UCI) to be transmitted via the uplink L1/L2 control signaling. The UE may map the SRS period change request information to an uplink physical control channel and notify the uplink physical control channel.

The UE may include the SRS period change request information in the UCI, map the UCI to a physical dedicated control channel, and notify the cell of the physical dedicated control channel. Here, the physical dedicated control channel is the PUCCH in the LTE. The cell may preset a configuration of the physical dedicated control channel and a method for mapping the physical dedicated control channel to the physical resources that are used for notifying the SRS period change request information, and notify the UE of the configuration and the method. This notification may be made via the RRC-dedicated signaling. Alternatively, the configuration and the method may be statically determined in, for example, a standard. The methods identical to those for the scheduling request (SR) in the LTE may be applied to these methods (see 3GPP TS 36.211 V13.2.0 (hereinafter referred to as "Reference 4") and 3GPP TS 36.213 V13.2.0 (hereinafter referred to as "Reference 5")).

Although the minimum period of the SR is 5 ms in the LTE, a period much shorter than this period may be set. For example, 2 ms or 1 ms, etc. may be provided as a period for requesting change in the SRS period. Consequently, the time from when the UE determines to request changing the SRS transmission period to when the UE transmits the request for changing the SRS transmission period can be shortened.

Another method for notifying the SRS period change request information will be disclosed. An uplink RS is used. The RS to be transmitted simultaneously when the UE transmits the PUCCH or the PUSCH in the uplink may be used. The following (1) to (3) will be disclosed as specific examples of a method in which the RS can be recognized as a request for changing the SRS period, unlike that for a normal RS:

(1) setting a specific sequence number for requesting change in the SRS period;
(2) setting a specific cyclic shift (CS) for requesting change in the SRS period; and
(3) modulating the bits of the RS according to the presence or absence of a request for change in the SRS period.

In the method for setting a specific sequence number for requesting change in the SRS period in (1), a sequence number different from that for a normal RS may be set. Consequently, the cell can recognize whether the RS indicates the request for change in the SRS period, based on the sequence number of the RS that has been transmitted by the UE.

In the method for setting a specific CS for requesting change in the SRS period in (2), a CS different from that for a normal RS may be set. Consequently, the cell can recognize whether the RS indicates the request for change in the SRS period, based on the CS of the RS that has been transmitted by the UE. Since the orthogonality is maintained between different CSs in the case of CS, the cell can recognize whether the RS is the normal RS or indicates the request for change in the SRS period at a lower error rate.

In the method for modulating the bits of the RS according to the presence or absence of a request for change in the SRS period in (3), for example, binary phase-shift keying (BPSK) modulation may be performed. In the presence of the request for change in the SRS period, the bits of the normal RS are multiplied by 1. In the absence of the request for change in the SRS period, the bits of the normal RS are multiplied by minus 1. Upon receipt of the modulated RS, the cell can recognize whether the RS indicates the request for change in the SRS period.

Application of the method for notifying the request for change in the SRS period using the uplink RS eliminates the need for new radio resources on the frequency axis and the time axis. Thus, the request for change in the SRS period can be made without reducing the use efficiency of the radio resources.

The SRS may be used as an uplink RS. The methods identical to those above may be applied even when the SRS is used.

Another method for notifying the SRS period change request information will be disclosed. The SRS period change request information is set as the MAC control information. The information may be provided as a MAC control element (CE). The UE notifies the cell of the information via the MAC signaling. Since the HARQ is applied when the information is notified via the MAC signaling, the cell can receive the SRS period change request information transmitted from the UE at a lower error rate.

Yet another method for notifying the SRS period change request information will be disclosed. The SRS period change request information is set as the RRC information. The UE notifies the cell of the RRC information via the RRC signaling. Since the HARQ is applied even when the information is notified via the RRC signaling, the cell can receive the SRS period change request information transmitted from the UE at a lower error rate. The application of the RRC signaling is particularly effective when the set SRS period is longer than a duration for the notification via the RRC signaling.

The UE may transmit a judgment indicator for the cell to change the SRS transmission period, together with notification of the SRS period change request information. The judgment indicators for changing the SRS transmission period that are disclosed in the second embodiment may be applied as the judgment indicators for the cell to change the SRS transmission period.

Upon receipt of the SRS period change request information from the UE, the cell starts a process of changing the setting of the SRS transmission period for the UE. Here, the cell may determine whether to change the SRS transmission period for the UE. If the change is necessary, the cell may change the setting of the SRS transmission period. If the change is unnecessary, the cell may not change the setting of the SRS transmission period.

The cell may notify the UE that the change is not possible on the determination whether to change the SRS transmission period. The cell may notify the UE of a reason why the change is not possible as well. Consequently, the cell can notify the UE that another UE has already transmitted the SRS with the same timing, in response to the SRS period change request from the UE. The UE can request, from the cell, a period different from that in a previous SRS period change request. Thus, the cell can maintain the precoding performance in the communication with the UE, even when the other UE transmits the SRS.

The UE may notify a SRS transmission offset change request together with the SRS period change request. Alternatively, the UE may notify the SRS transmission offset change request separately from the SRS period change request. The SRS transmission offset change request may be notified in the same method as that for the SRS period change request.

Upon receipt of information on the SRS transmission offset change request from the UE, the cell starts a process of changing the setting of the SRS transmission offset for the UE. Here, the cell may determine whether to change the SRS transmission offset for the UE. If the change is necessary, the cell may change the setting of the SRS transmission offset. If the change is unnecessary, the cell may not change the setting of the SRS transmission offset.

The cell may notify the UE that the change is not possible on the determination whether to change the SRS transmission offset. The cell may notify the UE of a reason why the change is not possible as well. Consequently, the cell can notify the UE that another UE has already transmitted the SRS with the same timing, in response to the SRS offset change request from the UE. The UE can also request, from the cell, a period different from that of the previous SRS transmission offset change request. Thus, the cell can maintain the precoding performance in the communication with the UE, even when the other UE transmits the SRS.

Figure 47:
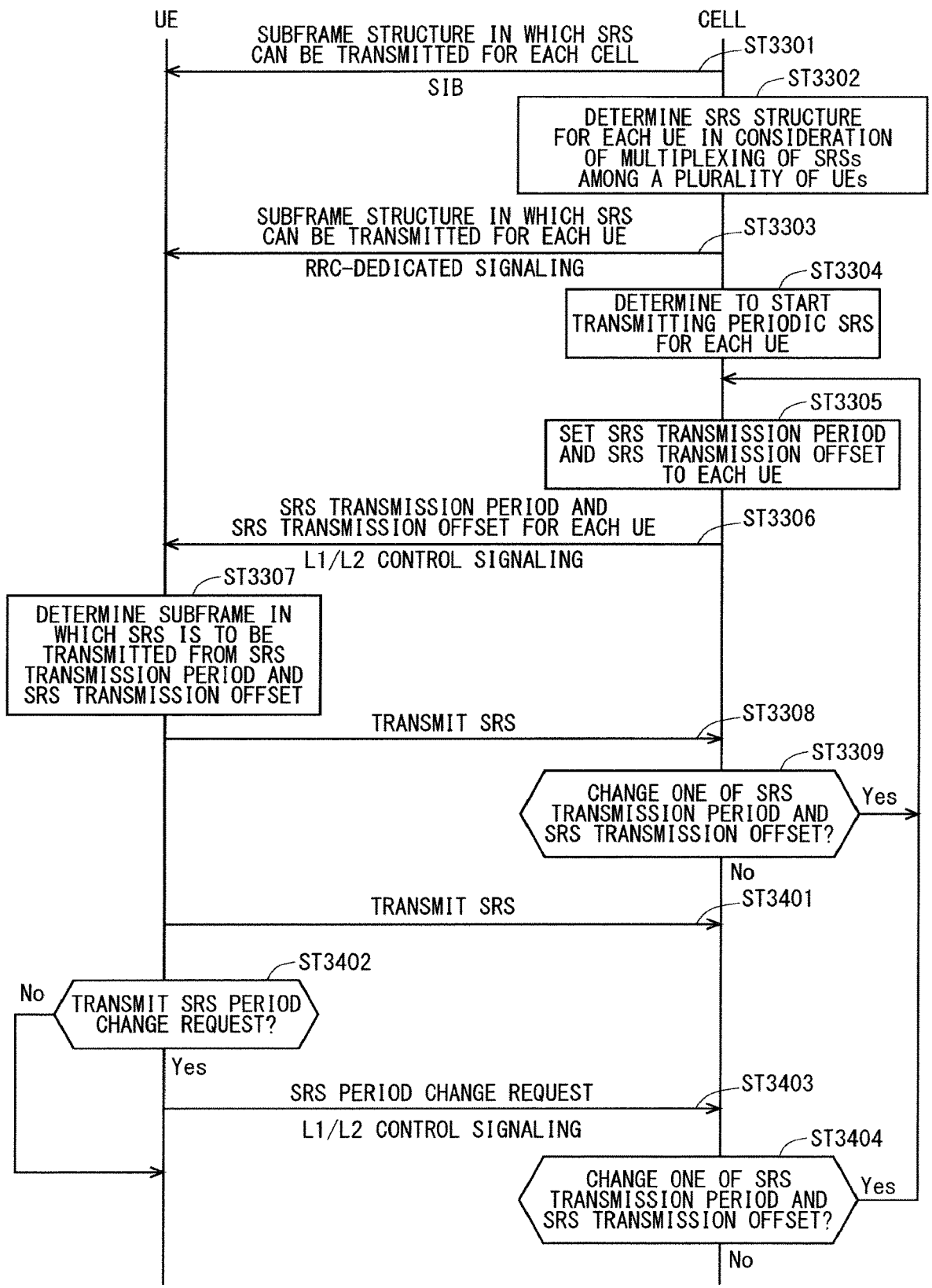
FIG. 47 illustrates an example sequence for transmitting SRS period change request information from the UE according to the second modification of the second embodiment.

FIG. 47 illustrates an example sequence for transmitting the SRS period change request information from the UE according to the second modification of the second embodiment. Since the sequence illustrated in FIG. 47 includes the same Steps as those in the sequence illustrated in FIG. 43, the same step numbers will be assigned to the same Steps and the common description thereof will be omitted.

In Step ST3401, the UE transmits the SRS to the cell with the set SRS transmission period.

In Step ST3402, the UE determines whether to transmit a SRS period change request. The judgment indicators for changing the SRS transmission period that are disclosed in the second embodiment may be applied in this determination. Since the UE cannot recognize the number of multiplexed UEs, the number of multiplexed UEs is excluded from the judgment indicators.

When determining that transmission of the SRS period change request is unnecessary in Step ST3402, the UE transmits the SRS with the set SRS transmission period.

When determining that transmission of the SRS period change request is necessary in Step ST3402, the process proceeds to Step ST3403.

In Step ST3403, the UE transmits the SRS period change request to the cell. The UE sets the presence of the request to the SRS period change request information in the uplink L1/L2 control information, and makes the notification via the L1/L2 control signaling.

Upon receipt of the presence of the SRS period change request from the UE in Step ST3403, the cell determines whether to change at least one of the SRS transmission period and the SRS transmission offset value for the UE in Step ST3404. The judgment indicators for changing the SRS transmission period that are disclosed in the second embodiment may be applied in this determination.

When it is determined that at least one of the SRS transmission period and the SRS transmission offset value needs to be changed in Step ST3404, the process returns to Step ST3305, and at least one of the SRS transmission period and the SRS transmission offset value for each UE is set. At least one of the SRS transmission period and the SRS transmission offset value may be set in these settings by deriving how much change is necessary using the judgment indicators for changing the SRS transmission period.

When the cell determines that it is not necessary to change the SRS transmission period and the SRS transmission offset value in Step ST3404, the cell continues to receive the periodic SRS in the same settings. Without any notification of changing or stopping the periodic SRS, the UE continues to transmit the periodic SRS in the same settings.

When determining not to change at least one of the SRS transmission period and the SRS transmission offset value for the UE in Step ST3404, the cell continues to receive the SRS with the SRS period set to the UE.

According to the methods disclosed in the second modification, the UE can notify the cell of information for requesting change in the SRS transmission period. Consequently, even if the set SRS has a long period, the UE can notify the cell of the information for requesting change in the SRS transmission period upon detection of fluctuations in the moving speed of its own UE with a short period of time and sudden change in the radio propagation environment. Thus, the cell can set, to the UE, the SRS transmission period appropriate for the fluctuations in the moving speed of the UE with a short period of time and appropriate for sudden change in the radio propagation environment. The cell can receive the SRS from the UE with the appropriate period. Consequently, the degradation in the precoding performance for the downlink MIMO can be reduced.

The UE may notify the cell of a request for a termination of change in the SRS transmission period. Information for requesting a termination of change in the SRS transmission period is provided. Then, the UE notifies the cell of the information. The information may be information of 1 bit. Information indicating the information for requesting change in the SRS transmission period or the information for requesting a termination of change in the SRS transmission period may be provided. The information may be information of 1 bit.

Upon receipt of information for requesting a termination of change in the SRS transmission period from the UE, the cell terminates the settings in which the SRS transmission period of the UE has been changed, and restores the settings to the original settings. The cell notifies the UE of the SRS transmission period in the original settings. Information indicating restoration to the original settings may be provided. The cell may notify the UE of the information when the settings of the SRS transmission period that have been changed for the UE are restored to the original settings. Since there is no need to notify the SRS transmission period in the original settings, the amount of information necessary for communication can be reduced.

The notification methods disclosed on the information for requesting change in the SRS transmission period may be appropriately applied to, for example, a method for making the notification from the UE to the cell. Consequently, the UE can notify the cell of the desire to terminate change in the SRS transmission period. For example, the UE notifies the cell of a request for changing the SRS transmission period because the moving speed of the UE becomes faster. Accordingly, the cell makes the setting for changing the SRS transmission period. After the moving speed is restored to its original speed, the UE requires a termination of change in the SRS transmission period. Here, the UE requests the cell to terminate change in the SRS transmission period. As such, the SRS transmission period appropriate for, for example, a state of the UE or the communication quality between the UE and the cell can be set.

The UE may notify the cell of a request for shortening or extending the SRS transmission period. Information for the request for shortening or extending the SRS transmission period is provided. Then, the UE notifies the cell of the information. Information indicating whether the request is for shortening the SRS transmission period or extending the SRS transmission period may be provided. The information may be information of 1 bit.

Upon receipt of the information indicating the request for shortening the SRS transmission period from the UE, the cell makes the settings for shortening the SRS transmission period of the UE. The cell notifies the UE of the set SRS transmission period. Upon receipt of the information indicating the request for extending the SRS transmission period from the UE, the cell makes the settings for extending the SRS transmission period of the UE. The cell notifies the UE of the set SRS transmission period.

The notification methods disclosed on the information for requesting change in the SRS transmission period may be appropriately applied to, for example, a method for making the notification from the UE to the cell. Consequently, the UE can notify the cell of the desire about whether to shorten or extend the SRS transmission period. For example, the UE makes the request for shortening the SRS transmission period when the moving speed of the UE becomes faster. For example, the UE makes the request for extending the SRS transmission period when the amount of remaining battery power of the UE becomes less. As such, the SRS transmission period appropriate for, for example, a state of the UE or the communication quality between the UE and the cell can be set.

The UE may notify the cell of a request for stopping or starting transmission of the SRS. Information for a request for stopping transmission of the SRS or information for a request for starting transmission of the SRS is provided. Then, the UE notifies the cell of the information. Information indicating whether the request is for stopping or starting transmission of the SRS may be provided. The information may be information of 1 bit.

Upon receipt of the information for the request for stopping transmission of the SRS from the UE, the cell sets the transmission of the SRS by the UE to a stop. The cell notifies the UE of information for stopping transmission of the SRS. The UE stops transmitting the SRS according to the information for stopping transmission of the SRS. Upon receipt of the information for the request for starting transmission of the SRS from the UE, the cell sets the transmission of the SRS by the UE to a start. The cell notifies the UE of information for starting to transmit the SRS. The UE starts transmitting the SRS according to the information for starting to transmit the SRS.

The notification methods disclosed on the information for requesting change in the SRS transmission period may be appropriately applied to, for example, a method for making the notification from the UE to the cell. Consequently, the UE can notify the cell of the desire to stop or start transmission of the SRS. Transmission of the SRS may be temporarily stopped when, for example, the UE is still and the communication quality is stable and superior. Here, the UE may notify the cell of a request for stopping transmission of the SRS to request a temporary stop of the transmission of the SRS. The transmission of the SRS needs to be resumed when the UE starts moving and the communication quality state is not stable. Here, the UE may notify the cell of a request for starting transmission of the SRS to request resumption of the transmission of the SRS. As such, the settings for stopping or resuming the transmission of the SRS appropriate for, for example, a state of the UE or the communication quality between the UE and the cell can be made.

Third Modification of Second Embodiment

When the UE cannot receive information for stopping transmission of the SRS from the cell, a problem of continuing to transmit the SRS while failing to stop the transmission of the SRS may arise.

For example, in the case where the cell transmits information for stopping transmission of the SRS and information for starting the transmission of the SRS with separate timings, if the UE cannot receive the information for stopping the transmission of the SRS, the transmission of the SRS that has been started according to the information for starting the transmission of the SRS cannot be stopped. Then, the problem that the UE continues to transmit the SRS will occur.

The maximum transmission time may be provided as a method for solving such a problem. The cell notifies the UE of the maximum transmission time. After starting to transmit the SRS according to the information for starting the transmission of the SRS, the UE stops transmitting the SRS after a lapse of the maximum transmission time. Consequently, the problem for the UE which continues to transmit the SRS while failing to stop the transmission of the SRS can be solved.

The timer of the UE may manage the maximum transmission time. The UE starts the timer with the start timing according to the information for starting to transmit the SRS. The information for starting to transmit the SRS includes SRS transmission starting information and SRS transmission offset information. The timer may be started in consideration of the offset information if the offset information is present.

Alternatively, the UE starts the timer with the timing to start transmitting the SRS, when starting to transmit the periodic SRS with notification of the SRS transmission period to the UE. As such, the timer may be started with the timing for the UE to start the transmission of the SRS.

The UE stops transmitting the SRS after a lapse of the maximum transmission time since starting of the timer, regardless of reception of the information for stopping transmission of the SRS. The UE resets the timer simultaneously with stopping of the transmission of the SRS. Consequently, the transmission of the SRS can be stopped after a lapse of the maximum transmission time since start of the first transmission of the SRS.

Here, receipt of the information for stopping transmission of the SRS before the lapse of the maximum transmission time since start of the first transmission of the SRS may cause a problem. The timer will not be reset even if the UE stops transmitting the SRS upon receipt of the information for stopping transmission of the SRS. When the UE receives information for starting to transmit the next SRS or information on the SRS transmission period before the lapse of the maximum transmission time, the UE starts transmitting the SRS according to these pieces of information.

Such a case may cause the UE to stop transmitting the SRS because the maximum transmission time will elapse soon after the UE starts transmitting the SRS. As a method for solving such a problem, the timer may be reset when the UE receives the information for stopping the transmission of the SRS before the lapse of the maximum transmission time since start of the first transmission of the SRS. Alternatively, the timer may be reset when the UE stops transmitting the SRS.

Consequently, a problem of stopping the transmission of the SRS soon after start of the second transmission of the SRS onward can be avoided.

The maximum transmission time may be statically predetermined in, for example, a standard. The cell may semi-statically or dynamically notify the UE of information on the maximum transmission time. The information on the maximum transmission time may be notified via the RRC signaling. Alternatively, the information on the maximum transmission time may be notified via the L1/L2 control signal. Alternatively, the information on the maximum transmission time may be notified via the MAC signaling.

The maximum transmission time may be set for each cell. The complexity in the control can be avoided. The maximum transmission time may be set for each beam as an alternative method. For example, a coverage to be provided for each beam differs. Here, setting a different value to each beam can give flexibility to the structure of the beam. The maximum transmission time may be set for each UE as an alternative method. Since the value for each UE can be set, the maximum transmission time can be set according to a state of the UE, for example, the capability of the UE or a service through which the UE is communicating, etc.

The maximum transmission time is measured in time in the aforementioned method. Managing the maximum transmission time by the timer is disclosed. The maximum number of transmissions of the SRS may be provided as an alternative method. The cell notifies the UE of the maximum number of transmissions. Once starting to transmit the SRS, the UE stops transmitting the SRS after transmitting the SRS the maximum number of times. The number of transmissions is reset when the UE stops transmitting the SRS.

Consequently, the same advantages as those in setting the maximum transmission time can be produced. For example, the transmission period of the SRS may be set according to a state of the UE, as in the specific examples of the judgment indicators for changing the SRS transmission period that are disclosed in the second embodiment. Here, application of the maximum transmission time requires setting of a different maximum transmission time for each UE, which complicates the control. However, application of, for example, the maximum number of transmissions enables setting of the maximum transmission time according to the SRS transmission period, even when the SRS transmission periods differ.

Third Embodiment

In the LTE, the PUCCH to which an uplink control signal such as Ack/Nack, CQI/CSI, or SR is mapped is mapped to all symbols in one subframe. The SRS is transmitted in the last one symbol in one subframe (see Reference 4).

When one UE has a conflict in transmission timing between Ack/Nack and the SRS, the last symbol of the PUCCH to which Ack/Nack is mapped and in which the conflict with the SRS occurs is punctured to perform transmission. Among 14 symbols (including the RS) of the PUCCHs in one subframe, only the last symbol is punctured, and the other symbols are transmitted.

Figure 48:
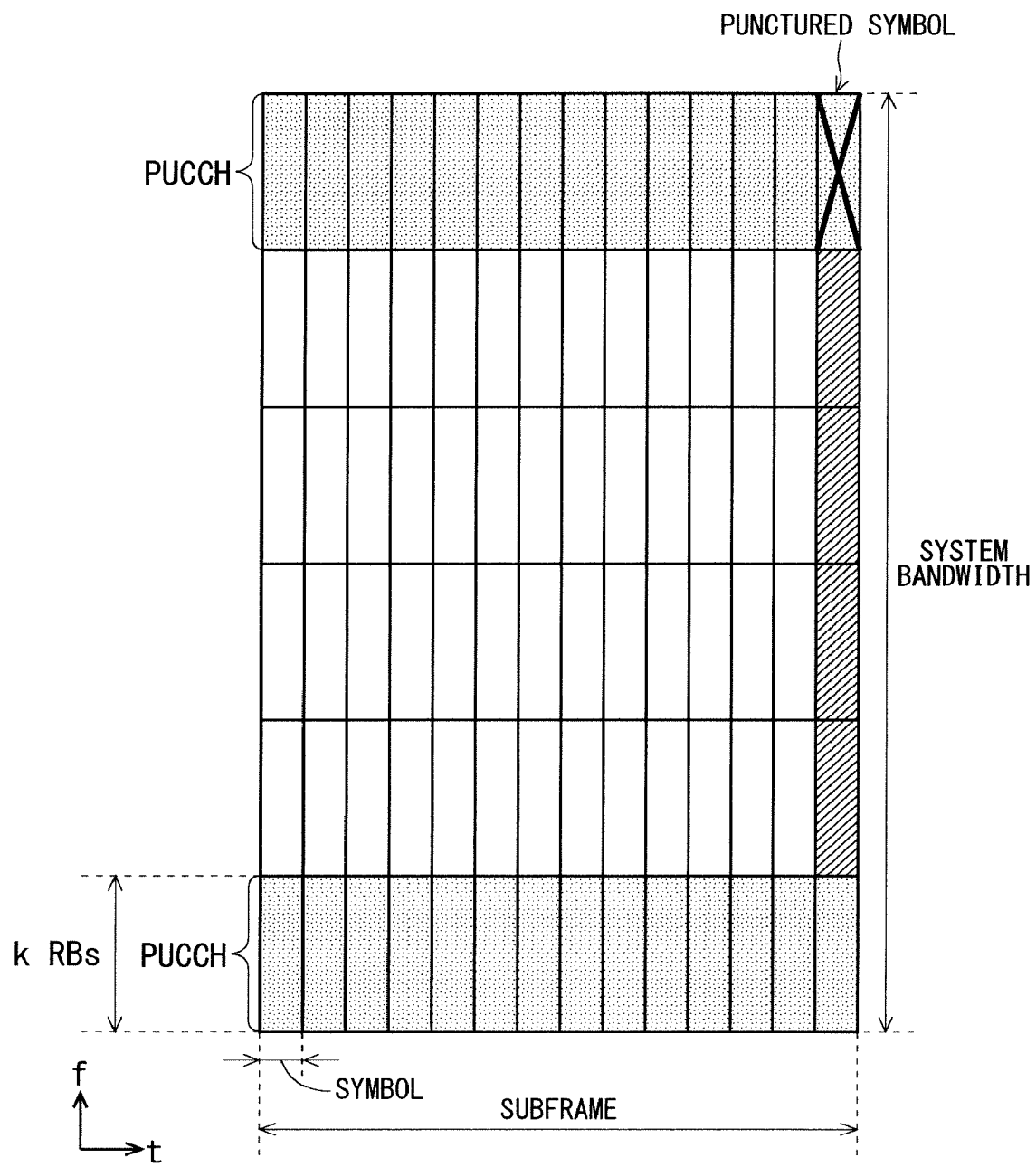
FIG. 48 illustrates a conflict in transmission timing between Ack/Nack and the SRS in the LTE.

FIG. 48 illustrates the conflict in transmission timing between Ack/Nack and the SRS in the LTE. In FIG. 48, the horizontal axis represents time t, and the vertical axis represents a frequency f. FIG. 48 illustrates an uplink subframe that consists of 14 symbols. The PUCCHs are mapped to both ends of the system bandwidth per resource block (RB), and the PUSCHs are mapped between the ends. Although FIG. 48 omits the illustration of the RS, the RS is mapped to predefined symbols in areas to which the PUCCHs are mapped and in areas to which the PUSCHs are mapped.

The SRS is set to the last symbol of one subframe. The PUSCH is not mapped to the last symbol in the subframe to which the SRS is set. When transmission of the SRS and the PUCCH is set within the same subframe of a UE, the UE punctures the last symbol of the PUCCH in the subframe to perform transmission. In other words, the UE does not transmit the PUCCH in the last symbol of the subframe. The UE transmits the SRS in the subframe with a predefined resource.

A signal to which such a method is applied is uplink Ack/Nack for the downlink data. Ack/Nack consists of 1 bit or 2 bits, and is spread and mapped to the PUCCH. Among 14 symbols (including the RS) of the PUCCHs in one subframe, only the last symbol is punctured, and the other symbols are transmitted. Thus, the cell can recognize Ack/Nack upon receipt of the PUCCHs in the other symbols that have been transmitted.

Consequently, even if transmission of Ack/Nack conflicts with transmission of the SRS in the same subframe, the UE can transmit both the Ack/Nack and the SRS, and the eNB can receive both the Ack/Nack and the SRS from the UE in the same subframe.

On the other hand, not mapping an uplink control signal such as Ack/Nack to all symbols in one subframe but mapping the uplink control signal to a symbol at the end of the subframe are proposed as a subframe structure in the NR. Transmitting the SRS in a symbol at the end of the one subframe is also proposed. For example, a proposal is made on transmitting, in a self-contained subframe, the uplink control signal such as Ack/Nack and the SRS in the last one symbol in a subframe (see Non-Patent Document 9 and 3GPP R1-167203 (hereinafter referred to as "Reference 6")).

When one UE has a conflict in transmission timing between an uplink control signal such as Ack/Nack and the SRS, puncturing the last symbol to which the uplink control signal such as Ack/Nack is mapped to prevent transmission in the last symbol as according to the conventional method in the LTE causes a problem of failing to transmit the uplink control signal such as Ack/Nack.

The uplink control signal such as Ack/Nack is transmitted not in the other symbols but only in the last symbol in one subframe. Thus, if the last symbol is punctured, the uplink control signal such as Ack/Nack that is mapped only to the last symbol in which a conflict with the SRS occurs is not transmitted, which is the cause of the problem.

The third embodiment will disclose a method for solving such a problem.

The uplink control signal is frequency-division multiplexed with the SRS in the same symbol. The uplink control signal such as Ack/Nack is transmitted in a symbol in which the SRS is transmitted. An uplink control signal, and a SRS of a UE different from the UE that transmits the uplink control signal may be transmitted in the same symbol. An uplink control signal, and a SRS of a UE identical to the UE that transmits the uplink control signal may be transmitted in the same symbol.

Flexible scheduling for the uplink control signal in the frequency axis direction is possible to frequency-division multiplex the uplink control signal with the SRS in the same symbol. The uplink control signal may be allocated to the frequency resources different from those for the other information to be mapped in the same subframe for its own UE. Examples of the other information to be mapped in the same subframe for its own UE include downlink data, downlink control information, and uplink data. The allocation methods include a method for allocating consecutive sub-carriers in a frequency range and a method for allocating distributed sub-carriers in a frequency range.

The uplink control signal may be allocated to the frequency resources that are not scheduled for the other UEs. Since the multiplexing with the other UEs is unnecessary, the reception error rate in the cell can be reduced. The complexity caused by control for the multiplexing can be reduced.

The uplink control signal may be allocated to the frequency resources that are scheduled for the other UEs. Here, the multiplexing with the other UEs is performed. The multiplexing method using the same frequency resources among a plurality of UEs may be code-multiplexing. The code-multiplexing is multiplexing using a code orthogonal between the UEs. Alternatively, the multiplexing may be performed using a scrambling code between the UEs. Consequently, the uplink control signal can be multiplexed with an uplink control signal or uplink information of another UE. Thus, flexible scheduling for the uplink control signal in the frequency axis direction is possible.

The cell includes, in the L1/L2 control information, scheduling information including information for allocation to the frequency resources and a multiplexing method, and transmits the L1/L2 control information to the UE via the L1/L2 control signaling. The scheduling information may be notified in the same subframe or in a different subframe. When the scheduling information is notified in the different subframe, information indicating which subframe is scheduled may be notified together.

Consequently, the uplink control signal can be allocated to the frequency resources different from those for the other information to be mapped in the same subframe. Although the Description may omit the description on the RS to be transmitted in association with the uplink control signal, the RS to be transmitted in association with the uplink control signal is transmitted in association with the uplink control signal, similarly as the uplink control signal.

When the uplink control signal is frequency-division multiplexed with the SRS in the same symbol, the cell may allocate the frequency resources to which the SRS to be actually transmitted in the symbol is not set, as the frequency resources for the uplink control signal. The cell notifies, according to the aforementioned method, the UE of the scheduling information on the frequency resources for the uplink control signal.

FIG. 49 illustrates one example of frequency-division multiplexing the uplink control signal with the SRS in the same symbol and transmitting the resulting signal according to the third embodiment. In FIG. 49, the horizontal axis represents time t, and the vertical axis represents a frequency f. 1 subframe consists of 14 symbols. The downlink L1/L2 control information is mapped to the first three symbols in the one subframe. The last symbol of the one subframe is set as a symbol in which the SRS can be transmitted. In FIG. 49, diagonal-hatched solid lines that descend to the left represent the SRS to be actually transmitted in the symbol.

A self-contained subframe is structured in a frequency range "a" for a UE # a. For the UE # a, the DL data is mapped to the fourth symbol to the tenth symbol in the one subframe, and gaps are arranged from the 11th symbol to the 13th symbol of the one subframe. FIG. 49 illustrates the case where the uplink control signal is Ack/Nack.

In a conventional self-contained subframe, an Ack/Nack signal for the downlink data is transmitted in the last symbol of one subframe. Since the last symbol of the subframe is set as a symbol in which the SRS can be transmitted, the symbol may have a conflict with transmission of the SRS. For example, when a subframe in which the SRS of another UE is to be actually transmitted is set to the subframe, the SRS of the other UE is transmitted in the last symbol of the subframe. Alternatively, when a subframe in which the SRS of its own UE is to be actually transmitted is set to the subframe, the SRS of its own UE is transmitted in the last symbol of the subframe.

Here, without any ingenuity, transmission of Ack/Nack of its own UE conflicts with transmission of the SRS of another UE or its own UE, and the cell cannot accurately receive these transmissions.

As illustrated in FIG. 49, an Ack/Nack signal for the downlink data is frequency-division multiplexed with the SRS in the last symbol of one subframe for transmission of the resulting signal according to the third embodiment. The cell allocates, to the Ack/Nack signal for the downlink data, frequency resources different from frequency resources with which the SRS is to be actually transmitted. The frequency resources different from the frequency resources with which the SRS is to be actually transmitted may be different from the frequency resources to which the DL data of its own UE is mapped. In the example illustrated in FIG. 49, the frequency resources in a frequency range b are allocated to the Ack/Nack signal.

The scheduling information for Ack/Nack is included in the L1/L2 control information for the UE # a, and is transmitted via the L1/L2 control signaling. The UE receives the L1/L2 control signaling to receive the L1/L2 control information addressed to its own UE, thus obtaining the allocation information on the frequency resources for Ack/Nack in response to the downlink data. Consequently, the UE can transmit the Ack/Nack in response to the downlink data without conflicting with the SRS.

Even when the SRS that is to be actually transmitted in the subframe in which the UE # a has received the DL data is set, Ack/Nack in response to the DL data can be transmitted in the same subframe in which the DL data has been received.

Figure 50:
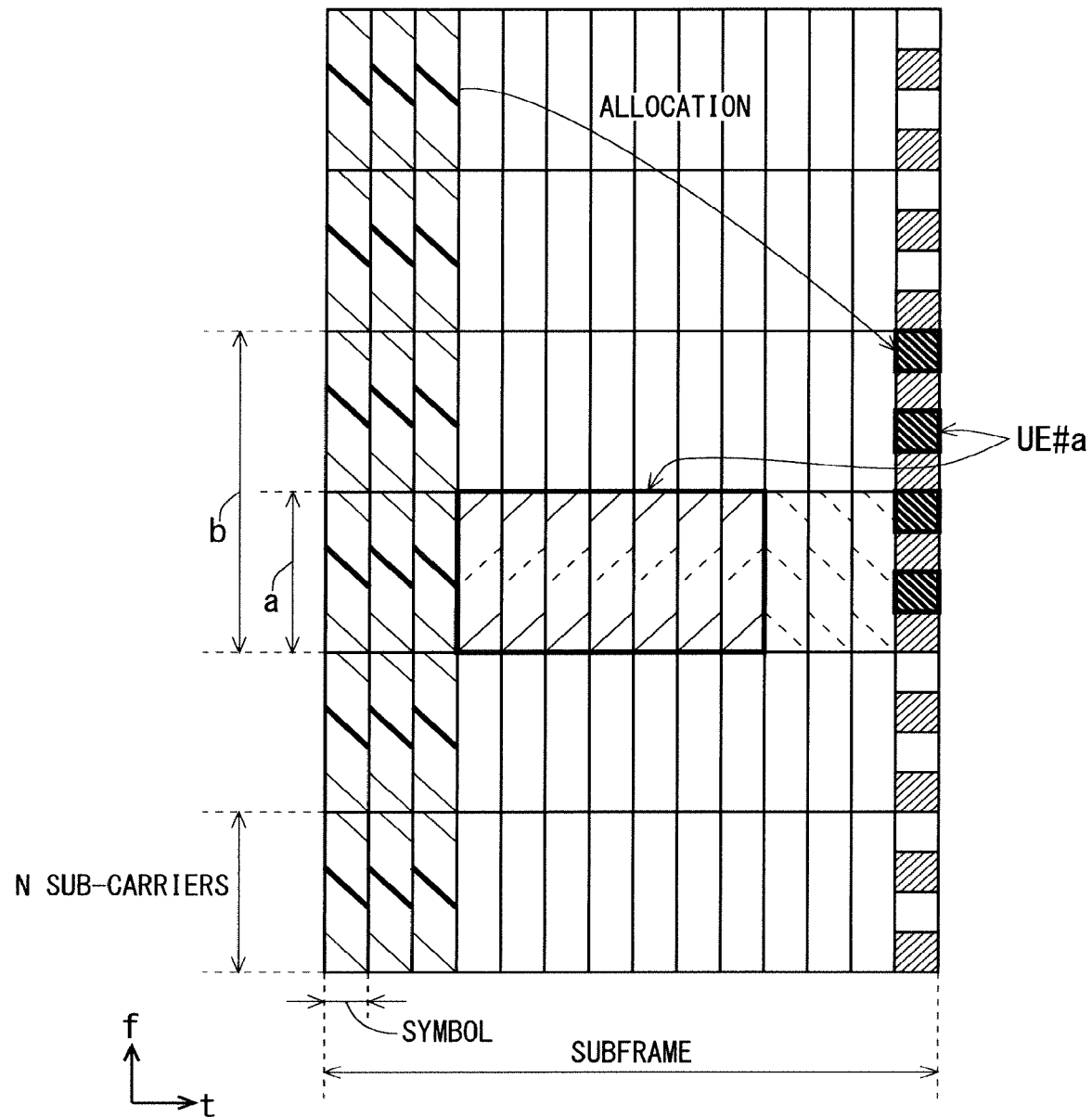
FIG. 50 illustrates another example of frequency-division multiplexing the uplink control signal with the SRS in the same symbol and transmitting the resulting signal according to the third embodiment.

FIG. 50 illustrates another example of frequency-division multiplexing the uplink control signal with the SRS in the same symbol and transmitting the resulting signal according to the third embodiment. In FIG. 50, the horizontal axis represents time t, and the vertical axis represents a frequency f. Since FIG. 50 is similar to FIG. 49, the differences will be mainly described, and the common description will be omitted.

An Ack/Nack signal for the downlink data is frequency-division multiplexed with the SRS in the last symbol of one subframe for transmission of the resulting signal. The cell allocates, to the Ack/Nack signal for the downlink data, distributed frequency resources different from those of the SRS that is to be actually transmitted. In the example illustrated in FIG. 50, the distributed frequency resources in the frequency range b are allocated to the Ack/Nack signal. This may be applied when the SRS that is to be actually transmitted is transmitted with the distributed frequency resources. Consequently, this can increase the use efficiency of the radio resources.

Figure 51:
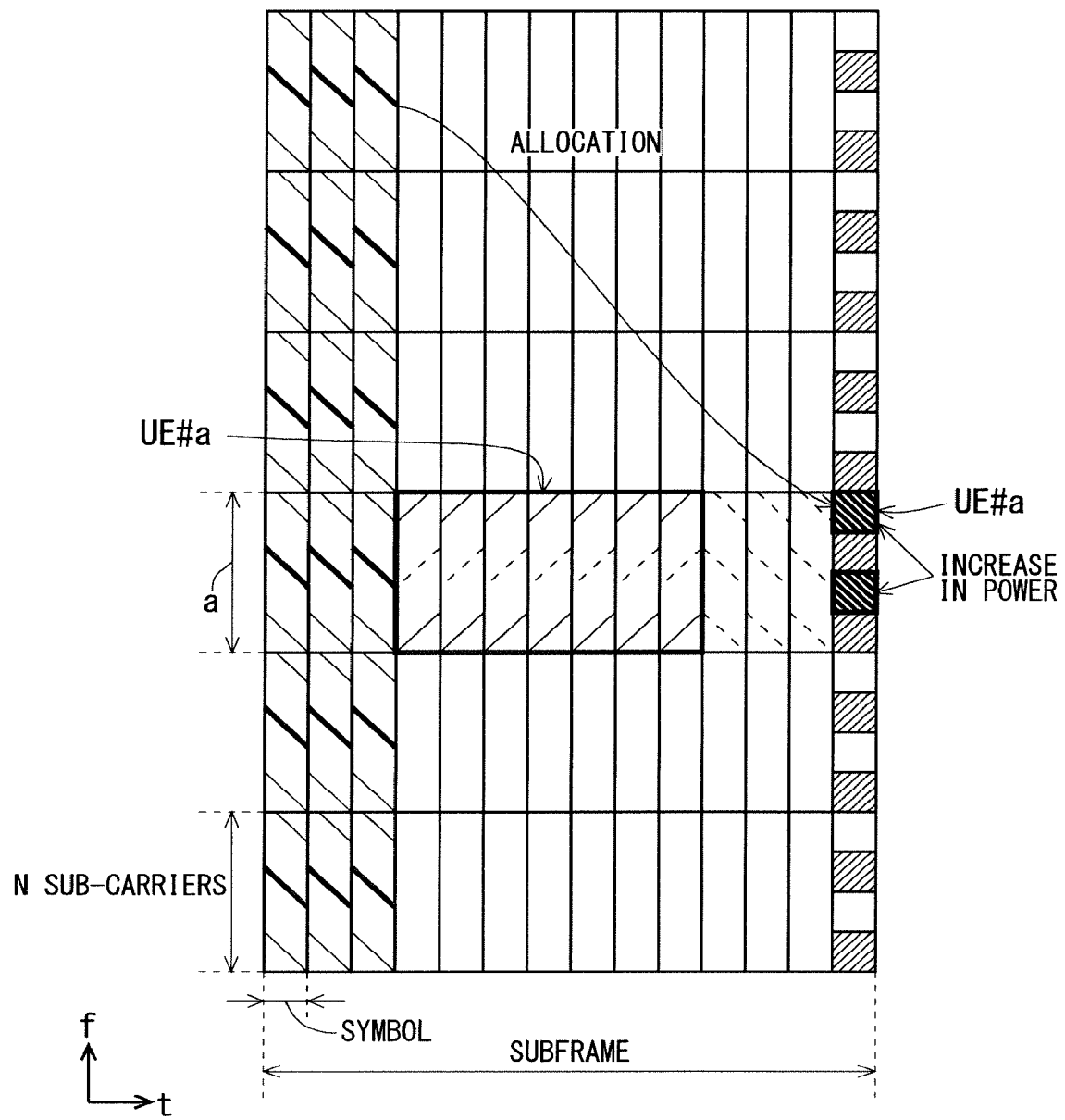
FIG. 51 illustrates yet another example of frequency-division multiplexing the uplink control signal with the SRS in the same symbol and transmitting the resulting signal according to the third embodiment.

FIG. 51 illustrates another example of frequency-division multiplexing the uplink control signal with the SRS in the same symbol and transmitting the resulting signal according to the third embodiment. In FIG. 51, the horizontal axis represents time t, and the vertical axis represents a frequency f. Since FIG. 51 is similar to FIG. 50, the differences will be mainly described, and the common description will be omitted.

An Ack/Nack signal for the downlink data is frequency-division multiplexed with the SRS in the last symbol of one subframe for transmission of the resulting signal. The cell allocates, to the Ack/Nack signal for the downlink data, the distributed frequency resources different from those of the SRS that is to be actually transmitted. The frequency resources with which Ack/Nack is transmitted are a part of frequency resources to which the DL data of its own UE is mapped. In the example illustrated in FIG. 51, the distributed frequency resources in the frequency range "a" are allocated to the Ack/Nack signal. This may be applied when the SRS that is to be actually transmitted is transmitted with the distributed frequency resources. Consequently, this can increase the use efficiency of the radio resources.

Here, the frequency resources with which Ack/Nack is transmitted may be less than predefined frequency resources. In the example illustrated in FIG. 51, although the predefined frequency resources are equal to the frequency resources to which the DL data of its own UE is mapped, the frequency resources with which Ack/Nack is transmitted are half the predefined frequency resources. Here, the transmission power of the frequency resources with which Ack/Nack is transmitted may be increased. Increasing the transmission power will increase the received power of the cell. Thus, even when the frequency resources with which Ack/Nack is transmitted are less than the predefined frequency resources, the cell can receive an Ack/Nack signal from the UE at a lower error rate.

Information indicating increase in the transmission power of the frequency resources is included in the L1/L2 control information as scheduling information, and transmitted to the UE via the L1/L2 control signaling. The information may be included in the scheduling information together with the information for allocation to the frequency resources and a multiplexing method. The scheduling information may be notified in the same subframe or in a different subframe. When the scheduling information is notified in the different subframe, information indicating which subframe is scheduled may be notified together.

As an alternative method, information indicating a method for increasing the transmission power of the frequency resources may be included in broadcast information to be broadcast. The method for increasing the transmission power of the frequency resources may be determined for each cell to be broadcast. Alternatively, the method for increasing the transmission power of the frequency resources may be determined for each cell, and notified to each UE individually via the RRC-dedicated signaling. Alternatively, the method for increasing the transmission power of the frequency resources may be determined for each UE individually, and notified to each of the UEs individually via the RRC-dedicated signaling.

As an alternative method, the method for increasing the transmission power of the frequency resources may be statically predetermined in, for example, a standard. The cell may notify the UE of only a parameter required for the method for increasing the transmission power of the frequency resources. The methods previously described may be applied to the notification method Increasing the transmission power of the radio resources with which Ack/Nack is transmitted can reduce the radio resources with which Ack/Nack is transmitted. The radio resources to be used can be reduced, and many UEs can be supported even when at least one of the followings occurs in the same symbol: increase in the number of UEs to which the SRS to be actually transmitted is set; and increase in the number of UEs that transmit the uplink control signal.

Application of the methods disclosed in the third embodiment enables transmission of an uplink control signal such as Ack/Nack and the SRS in the NR even when these signals conflict with each other in the same subframe. Thus, the cell can receive the uplink control signal such as Ack/Nack and the SRS with predefined timing. Enabling reception of the Ack/Nack with the predefined timing allows the cell to perform retransmission control without any latency. Enabling reception of the SRS with the predefined timing allows the cell to perform precoding with high precision.

Although the conflict between the uplink control signal and the SRS in the last one symbol in one subframe is disclosed, the uplink control signal and the SRS may be mapped to the other symbols in the one subframe. When the uplink control signal and the SRS conflict with each other in the other symbols, the methods disclosed in the third embodiment such as the frequency-multiplexing may be performed in the other symbols. Even in such a case, the same advantages as those according to the third embodiment can be produced.

Although what is disclosed is that the uplink control signal and the SRS are mapped to the same symbol in one subframe and conflict with each other, the uplink control signal and the SRS may be mapped separately to symbols with different symbol numbers. Even when the uplink control signal and the SRS conflict with each other in a part of the symbols, the methods disclosed in the third embodiment such as the frequency-multiplexing may be similarly applied to the symbols in which the conflict has occurred. Even in such a case, the same advantages as those according to the third embodiment can be produced.

Although what is disclosed is that the uplink control signal and the SRS are mapped to the same symbol in one subframe and conflict with each other, the uplink control signal and the SRS may be mapped separately to symbols with different symbol numbers. Here, when the uplink control signal and the SRS conflict with each other in a part of the symbols, all the symbols to which the uplink control signal is mapped may be transmitted with the frequency resources with which the SRS is not actually transmitted. The methods disclosed in the third embodiment may be appropriately applied to all the symbols to which the uplink control signal is mapped and including the symbols in which the conflict has occurred. Even in such a case, the same advantages as those according to the third embodiment can be produced.

Transmissions of different uplink control signals may conflict with each other in the same subframe in the same UE. The methods disclosed in the third embodiment may be appropriately applied to the conflict of transmissions of different uplink control signals in one symbol or a part of the symbols in the same subframe. For example, when transmissions of Ack/Nack and CQI/CSI conflict with each other in the same symbol in the same subframe in a UE, the UE transmits the CQI/CSI without changing the radio resources for transmitting the CQI/CSI, and allocates the Ack/Nack to the other frequency resources to transmit the Ack/Nack.

Consequently, even if the Ack/Nack and the CQI/CSI conflict with each other in one symbol or a part of the symbols in the same subframe, the UE can transmit both of the signals in the same subframe. The cell can receive both of the signals in the same subframe.

Among the uplink control signals, information on which signal is transmitted without changing the radio resources and on which signal is allocated to the other frequency resources to be transmitted may be statically predetermined in a standard. Alternatively, the cell may include the information in broadcast information and broadcast the broadcast information. Consequently, the information can be determined for each cell in consideration of a state of each of the cells. Alternatively, the cell may separately notify each UE of the information via the RRC-dedicated signaling. The information may be determined for each cell or for each UE. Consequently, the information can be determined for each UE in consideration of a state of each of the UEs.

Alternatively, the information may be notified via the MAC signaling when it is notified to each UE. The MAC signaling can make the setting earlier than that via the RRC signaling. Alternatively, the information may be included in the L1/L2 control information to be notified via the L1/L2 control signaling. The L1/L2 control signaling can make the setting much earlier than that via the RRC signaling. When the information is included in the L1/L2 control information, it may be included in the scheduling information together with the information for allocation to the frequency resources and a multiplexing method.

The number of uplink control signals is not limited to two, but may be three or more. One uplink control signal may be transmitted without changing the radio resources, and two uplink control signals may be allocated to the other frequency resources to be transmitted. Methods similar to the aforementioned methods may be applied thereto.

Consequently, even if different uplink control signals conflict with each other in one symbol or a part of the symbols in the same subframe, the UE can transmit both of the signals in the same subframe. The cell can receive both of the signals in the same subframe.

Since the cell can receive information from the UE in a predefined subframe, the cell can timely control the UE. For example, the cell can perform retransmission control using Ack/Nack without any latency. For example, the cell can execute precoding for the downlink MIMO using CQI/CSI with high precision. Alternatively, the cell can start the uplink communication early by making an early uplink scheduling request using a SR.

First Modification of Third Embodiment

The first modification will disclose another method for solving the problems disclosed in the third embodiment.

When the uplink control signal such as Ack/Nack conflicts with the SRS, the uplink control signal is time-division multiplexed with the SRS. When the uplink control signal such as Ack/Nack conflicts with the SRS, the number of UL symbols in the same subframe may be increased. The number of UL symbols is increased, the uplink control signal is mapped to the increased UL resources, and the uplink control signal is time-division multiplexed with the SRS.

The number of UL symbols to be increased is not limited to one, but may be two or more. The number of UL symbols to be increased may be set according to the number of symbols to which the uplink control signal is mapped. The UL symbols to be increased may be set to be consecutive with the existing UL symbols. When the UL symbols to be increased are discretely set, for example, when a DL symbol exists between the UL symbols that are discretely set, a gap needs to be newly provided, which will decrease the use efficiency of the radio resources. When a gap exists between the UL symbols that are discretely set, a new gap sometimes needs to be provided between the DL symbol and the forward UL symbol to maintain a predefined duration, which will decrease the use efficiency of the radio resources.

The time-division multiplexing method is, for example, while placing the SRS in the last symbol without any change from die normal setting, mapping the uplink control signal such as Ack/Nack to a symbol immediately preceding that of the SRS. Since not only the SRS of the conflicting UE but also the SRS of another UE are to be transmitted, no change from the normal setting of the SRS saves, for example, a process of changing the setting into that for the other UE. This can avoid complexity in the control.

The number of symbols in one subframe is predetermined. Thus, when the number of uplink symbols is increased by one symbol for the uplink control signal, the other symbols needs to be reduced. The following (1) to (3) will be disclosed as specific examples of the reduction method:

(1) the number of gap symbols is reduced;
(2) the number of DL symbols is reduced; and
(3) a combination of (1) and (2) above.

Since the number of gap symbols is reduced in (1), the number of symbols for data can be maintained. Thus, reduction in the data transmission rate can be suppressed. This is effective when suppressing reduction in the data transmission rate is desired. Since the number of DL symbols is reduced in (2), the number of gap symbols can be maintained. Since the number of gap symbols is determined from, for example, the cell coverage and the demodulation performance of the UE, the number of gap symbols may be desirably fixed. The method is effective in such a case. In (3), for example, when the number of uplink symbols is increased by two or more symbols, the data transmission rate and the number of gap symbols can be maintained to a certain extent.

The cell and the UE may switch (1) to (3) above to use them. The cell may notify the UE of the switching via the RRC signaling, the MAC signaling, or the L1/L2 signaling. For example, when the UE moves from a boundary of a cell to a neighborhood of the cell and the number of gap symbols may be reduced due to less propagation time, switching from (2) to (1) above can maintain the data transmission rate.

Figure 52:
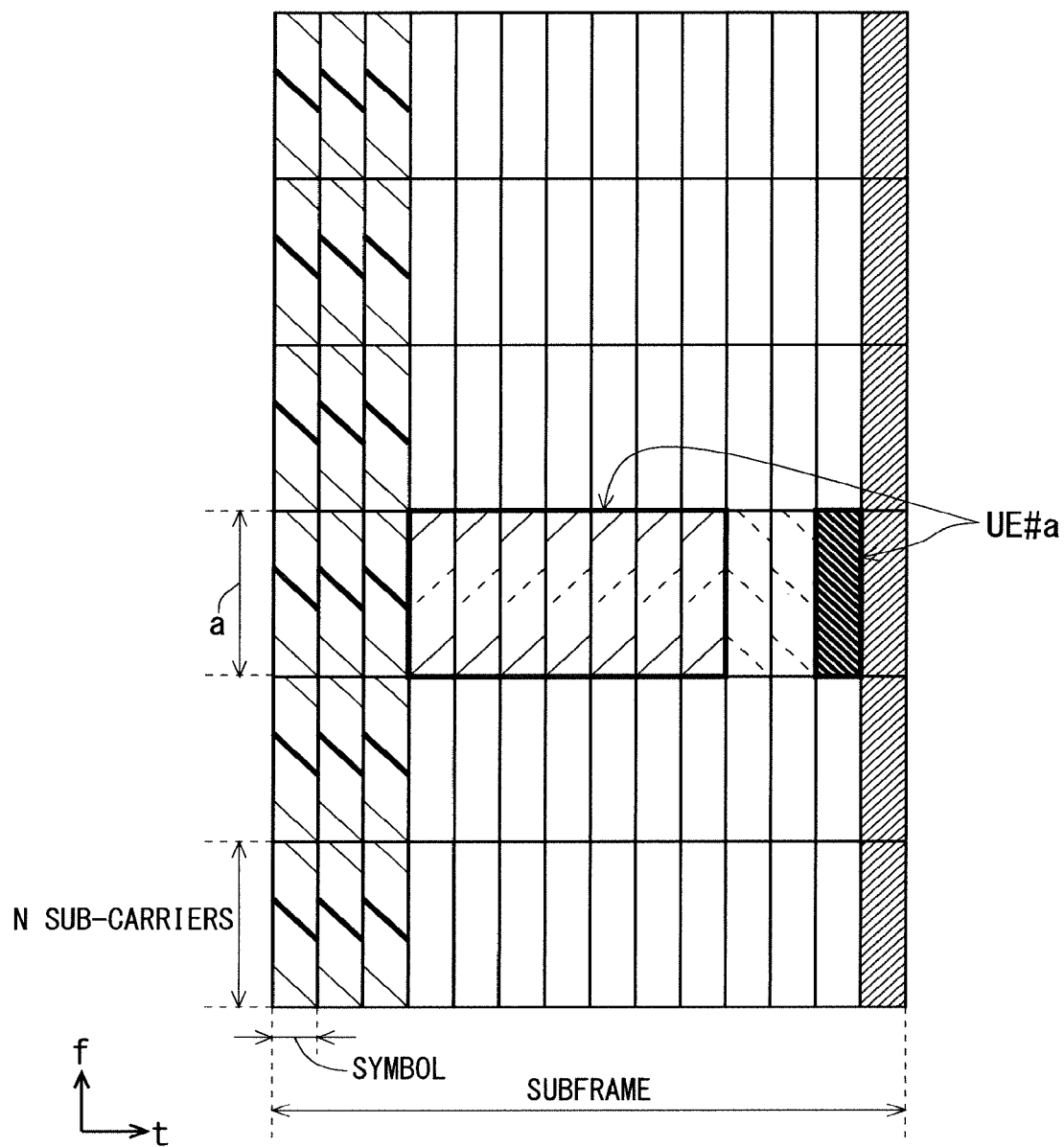
FIG. 52 illustrates one example of increasing the number of UL symbols by one symbol and time-division multiplexing Ack/Nack with the SRS.

FIG. 52 illustrate one example of increasing the number of UL symbols by one symbol and time-division multiplexing Ack/Nack with the SRS. In FIG. 52, the horizontal axis represents time t, and the vertical axis represents a frequency f. Since FIG. 52 is similar to FIG. 49, the differences will be mainly described, and the common description will be omitted.

When an uplink control signal such as Ack/Nack conflicts with the SRS in the last symbol in the same subframe, the second symbol from the end of the subframe in which a gap is formed is configured as the UL symbol. The SRS is mapped to the last symbol without being changed from the normal setting. The Ack/Nack is mapped to the second symbol from the end of the subframe which is configured as the UL symbol.

The gap may be formed as the UL symbol only for the frequency resources that are scheduled for the UE having a conflict between the Ack/Nack and the SRS. Alternatively, when at least one UE has a conflict between the Ack/Nack and the SRS, the gap may be formed as the UL symbol over the entire bandwidth.

Since the Ack/Nack and the SRS are mapped to the different symbols, the UE can transmit the Ack/Nack and the SRS in the same subframe. The cell can receive the Ack/Nack and the SRS from the UE in the same subframe.

Figure 53:
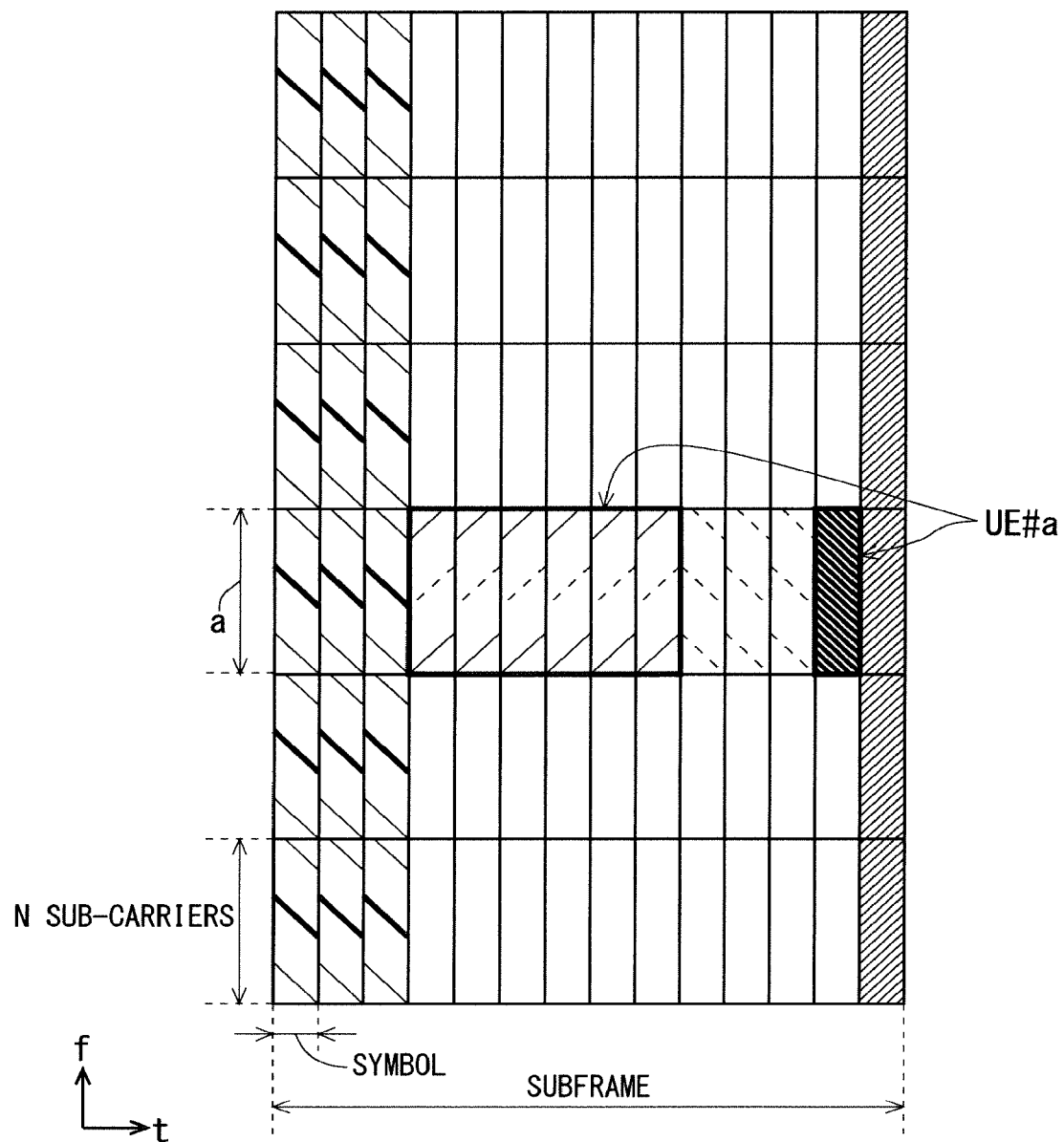
FIG. 53 illustrates another example of increasing the number of UL symbols by one symbol and time-division multiplexing Ack/Nack with the SRS.

FIG. 53 illustrate another example of increasing the number of UL symbols by one symbol and time-division multiplexing Ack/Nack with the SRS. In FIG. 53, the horizontal axis represents time t, and the vertical axis represents a frequency f. Since FIG. 53 is similar to FIG. 52, the differences will be mainly described, and the common description will be omitted.

When an uplink control signal such as Ack/Nack conflicts with the SRS in the last symbol in the same subframe, the second symbol from the end of the subframe in which a gap is formed is configured as the UL symbol, and the last symbol in which the DL data is formed is configured as a gap. In other words, 3 symbols for gap are maintained, the last one symbol for the DL data is eliminated, and one UL symbol is increased in the second symbol from the end of the subframe.

Such a configuration may be intended only for the frequency resources that are scheduled for the UE having a conflict between the Ack/Nack and the SRS. Alternatively, such a configuration may be intended for all the UEs in the same subframe when at least one of the UEs has a conflict between the Ack/Nack and the SRS.

Since the Ack/Nack and the SRS are mapped to the different symbols, the UE can transmit the Ack/Nack and the SRS in the same subframe. The cell can receive the Ack/Nack and the SRS from the UE in the same subframe.

Information indicating how the uplink control signal is time-division multiplexed with the SRS (hereinafter may be referred to as "information on time-division multiplexing") may be provided. The following (1) to (8) will be disclosed as specific examples of the information on time-division multiplexing:

(1) the number of UL symbols to be increased;
(2) the symbol number in which each uplink control signal is mapped;
(3) information on which signal is transmitted without changing the radio resources and on which signal is allocated to the increased UL resources to be transmitted;
(4) information indicating whether the number of gap symbols or the number of DL symbols is reduced;
(5) the number of gaps after reducing the gaps;
(6) the number of DL symbols after reducing the DL symbols;
(7) the symbol numbers of the respective UL symbol to be increased; and
(8) combinations of (1) to (7) above.

When the uplink control signal such as Ack/Nack conflicts with the SRS, the uplink control signal can be time-division multiplexed with the SRS by setting the information on time-division multiplexing.

When the symbol in which the SRS is transmitted and the uplink control signal are time-division multiplexed, information indicating a position relationship between the symbol in which the SRS is transmitted and the uplink control signal may be provided. For example, information indicating whether the SRS transmission symbol is placed consecutively with the symbol to which the uplink control signal is mapped may be provided. When the symbols are arranged consecutively, a signal for which the radio resources are changed is mapped consecutively with a signal for which the radio resources are not changed. When the symbols are not arranged consecutively, information for identifying a symbol to which the signal for which the radio resources are not changed is mapped is notified.

The cell notifies the UE of the information indicating the position relationship. When the symbols are arranged consecutively, a symbol to which the signal for which the radio resources are changed is mapped may be derived without using the information on time-division multiplexing. Here, the cell does not need to notify the UE of the information on time-division multiplexing, and can reduce the amount of information required for the notification.

The information indicating the position relationship may be included in the information on time-division multiplexing. Setting the information indicating the position relationship in combination with the information on time-division multiplexing enables flexible setting of the symbols in which the uplink control signal is time-division multiplexed with the SRS.

The information on time-division multiplexing may be statically predetermined in, for example, a standard. Consequently, both the eNB and the UE can recognize the information. This eliminates the need for signaling for notification between nodes, and can reduce the signaling load.

Alternatively, the eNB may set the information on time-division multiplexing, and notify it to the UE. The information may be set for each cell or individually to each UE. The eNB may include the information in the L1/L2 control information, and notify the UE of the information via the L1/L2 control signaling. The information may be included in the L1/L2 control information together with the other scheduling information for the UE and notified via the L1/L2 control signaling. Methods similar to those disclosed in the third embodiment may be applied thereto.

Notification of the information via the L1/L2 control signaling can make the setting earlier. Thus, a method for time-division multiplexing the uplink control signal with the SRS can be supported earlier according to, for example, time fluctuations in a radio propagation situation or change in the speed of the UE.

The eNB may notify the UE of the information via the MAC signaling. The reception error rate can be reduced with application of the retransmission control. Alternatively, the information may be notified via the RRC signaling. When the information is set for each cell, it may be included in the broadcast information to be broadcast. Alternatively, the information may be notified to each UE via the RRC-dedicated signaling. When the information is set individually to each UE, it may be notified to each of the UEs via the RRC-dedicated signaling. When the information is notified via the RRC signaling, it may be notified together with the configuration information of the SRS. This can reduce the signaling load.

Application of the methods disclosed in the third embodiment enables transmission of both of the uplink control signal such as Ack/Nack and the SRS in the NR even when these signals conflict with each other in the same subframe. Thus, the cell can receive the uplink control signal such as Ack/Nack and the SRS with predefined timing. Enabling reception of Ack/Nack with the predefined timing allows the cell to perform retransmission control without any latency. Enabling reception of the SRS with the predefined timing allows the cell to perform precoding with high precision.

Since there is no need to separately set the frequency resources in addition to those for the normal SRS as disclosed in the third embodiment, the required frequency resources can be reduced. Since a conflict with the resources in which the information for the other UEs is scheduled can be avoided, complexity in the control can also be avoided.

Although the conflict between the uplink control signal and the SRS in the last one symbol in one subframe is disclosed, the uplink control signal and the SRS may be mapped to the other symbols in the one subframe. The methods disclosed in the first modification such as the time-division multiplexing may be applied similarly when the uplink control signal and the SRS conflict with each other in the other symbols. Even in such a case, the same advantages as those according to the first modification can be produced.

Although the conflict between the uplink control signal and the SRS in the same symbol in one subframe is disclosed, the uplink control signal and the SRS may be mapped separately to symbols with different symbol numbers. Even when the uplink control signal and the SRS conflict with each other in a part of the symbols, the methods disclosed in the first modification such as the time-division multiplexing may be similarly applied to the symbols in which the conflict has occurred. Even in such a case, the same advantages as those according to the first modification can be produced.

Transmissions of different uplink control signals may conflict with each other in the same subframe in the same UE. The methods disclosed in the first modification may be appropriately applied to the conflict of transmissions of different uplink control signals in one symbol or a part of the symbols in the same subframe. For example, when transmissions of Ack/Nack and CQI/CSI conflict with each other in the same symbol in the same subframe in a UE, the number of UL symbols will be increased, and the UE transmits the CQI/CSI without changing the radio resources for transmitting the CQI/CSI, and allocates the Ack/Nack to the increased UL symbols to transmit the Ack/Nack.

Consequently, even if the Ack/Nack and the CQI/CSI conflict with each other in one symbol or a part of the symbols in the same subframe, the UE can transmit both of the signals in the same subframe. The cell can receive both of the signals in the same subframe. When the symbol of the CQI/CSI is placed prior to the symbol of the Ack/Nack, a response to the Ack/Nack for the downlink data can be transmitted in the same subframe in a self-contained subframe.

The number of uplink control signals is not limited to two, but may be three or more. One uplink control signal may be transmitted without changing the radio resources, and two uplink control signals may be allocated to the increased UL symbols to be transmitted. Methods similar to the aforementioned methods may be applied thereto.

Consequently, even if different uplink control signals conflict with each other in one symbol or a part of the symbols in the same subframe, the UE can transmit both of the signals in the same subframe. The cell can receive both of the signals in the same subframe.

Since the cell can receive information from the UE in a predefined subframe, the cell can timely control the UE. For example, the cell can perform retransmission control using Ack/Nack without any latency. For example, the cell can execute precoding for the downlink MIMO using CQI/CSI with high precision. Alternatively, the cell can start the uplink communication early by making an early uplink scheduling request using a SR.

According to the disclosed methods, when the uplink control signal such as Ack/Nack conflicts with the SRS, the number of UL symbols in the same subframe is increased, the uplink control signal is mapped to the increased UL resources, and the uplink control signal is time-division multiplexed with the SRS. An alternative method when the other UL symbols exist in the same subframe may be mapping an uplink control signal to the existing UL symbols without increasing the number of UL symbols. When such a conflict does not occur and the UL information is mapped to the existing UL symbols, the UL information may be reduced, and an uplink control signal may be mapped to the existing UL symbols. The UL information may be, for example, UL user data. Even in such a case, the same advantages as those according to the first modification can be produced.

When the existing UL symbols are used without increasing the number of UL symbols, the "UL symbols to be increased" in the specific examples of the information on time-division multiplexing may be read as the "UL symbols in which the other UL information is to be reduced". The same holds true for the UL symbols to which the other UL information is not mapped.

When a UE has a conflict between a SRS symbol and an uplink control signal, the SRS symbol may be moved forward, and a SRS symbol of another UE to be transmitted in the subframe may also be moved forward. The SRS transmission symbol of a UE may be identical to that of another UE. The cell notifies the other UE to move the SRS forward by symbols of the uplink control signal. This notification may be made via the L1/L2 control signaling.

Here, when the number of symbols to which the uplink control signal is mapped is different for each UE, the number of symbols of the uplink control signal has to be notified individually to each of the UEs, which will complicate the control. The maximum number of symbols to be used for the uplink control signal may be notified to solve such a problem. The maximum number of symbols for the uplink control signal is notified to the UE whose number of symbols for the uplink control signal is fewer than the maximum number of symbols. Consequently, the same number of symbols for the uplink control signal has only to be notified to UEs. This can avoid complexity in the control.

As an alternative method, the number of symbols to which the uplink control signal is mapped may be set for each cell. The cell notifies, via the RRC, the UE of the symbols to which the uplink control signal is mapped for each cell. Consequently, the cell has only to notify, via the L1/L2 control signaling, the UE to move the SRS forward. Information indicating moving the SRS forward may be provided, and the cell may notify the UE of the information. There is no need to notify by how many symbols the SRS should be moved forward.

Although disclosed is setting, for each cell, the number of symbols to which uplink control signal is mapped, the number of symbols may be set not for each cell but for each numerology. Alternatively, the number of symbols may be set for each frequency bandwidth to which the same numerology is applied. Alternatively, the number of symbols may be set for each UE with the same numerology.

Examples of the numerology to be set include a symbol time interval and a sub-carrier spacing. The 3GGP proposes setting different numerologies in the same cell. The different settings vary the symbol timing and the frequency bandwidth of the SRS. Here, the setting for each numerology can avoid complexity therein.

Setting the numerology for each UE with the same service, for each UE of the same type, or for each UE with the same capability can also avoid complexity therein.

Prevention of transmission of the SRS in the SRS transmission symbol may be set to another UE that does not transmit the SRS in the SRS transmission symbol. The UE that transmits the SRS in the SRS transmission symbol may set, in an RB in which the SRS is transmitted, prevention of transmission of the SRS in the SRS transmission symbol to another UE for which an uplink channel or an uplink signal is scheduled. The cell may notify the UE of such a setting via the L1/L2 control signaling.

Consequently, the interference with the UE that transmits the SRS can be reduced.

Although information on the UL symbols to be increased and the UL symbols in which the other UL information is reduced is disclosed as the information on time-division multiplexing, these pieces of information are information on the symbols in which the SRS is to be transmitted.

The eNB may notify the UE of not only information on the SRS to be transmitted by the UE but also information on the SRS to be transmitted in the same subframe by the other UE. Examples of the information on the SRS include a symbol in which the SRS is transmitted and information on the RB in which the SRS is transmitted. The eNB may include the information in the L1/L2 control information, and notify the L1/L2 control information to the UE via the L1/L2 control signaling. The eNB may include the information in the L1/L2 control information together with the other scheduling information, and notify the L1/L2 control information to the UE via the L1/L2 control signaling.

When the eNB does not transmit, to the UE, another channel or another signal in a SRS transmission symbol of the other UE, the eNB may set prevention of transmission of the other channel or the other signal in the SRS transmission symbol, and notify the UE of the setting. Alternatively, prevention of transmission of the other channel or the other signal in the SRS transmission symbol of the other UE may be predetermined in, for example, a standard, and the UE may prevent the other channel or the other signal from being transmitted in the SRS transmission symbol of the other UE.

Consequently, the interference with the UE that transmits the SRS can be reduced.

Although the setting of the SRS is made per symbol, a time interval shorter than a symbol may be applied. The SRS may be set, for example, per half a symbol.

The information on the RB in which the SRS is transmitted may be set per RB or a plurality of RBs. Alternatively, subcarrier information may be set not based on the RB but per subcarrier or a plurality of sub-carriers.

The eNB may notify the UE of the information on the SRS to be transmitted by the UE and/or the information on the SRS to be transmitted by the other UE, together with the subframe structure of the SRS disclosed in the second embodiment. Alternatively, the eNB may notify the UE of the information on the SRS to be transmitted by the UE and/or the information on the SRS to be transmitted by the other UE, together with the information for starting to transmit the SRS. Alternatively, the eNB may notify the UE of the information on the SRS to be transmitted by the UE and/or the information on the SRS to be transmitted by the other UE, together with the information for stopping transmission of the SRS.

These pieces of information may be appropriately combined. The combined pieces of information may be included in the L1/L2 control information and notified via the L1/L2 control signaling. Alternatively, the combined pieces of information may be included in the L1/L2 control information together with the other scheduling information for the UE, and notified via the L1/L2 control signaling.

Consequently, transmission and stop of the SRS can be dynamically and flexibly set to the UE. The SRS can be transmitted to correspond to the capability and a situation of each UE in the cell.

Second Modification of Third Embodiment

The second modification will disclose another method for solving the problems disclosed in the third embodiment.

When the SRS conflicts with Ack/Nack, the Ack/Nack can be determined using the SRS. A SRS in a sequence with a sequence number different from that to be set to a normal SRS is provided, and the sequence number of the SRS to be transmitted varies depending on Ack or Nack.

When a UE has a conflict in transmission between the SRS and Ack/Nack, for example, sequences different from the sequence of the normal SRS of its own UE are used for both Ack and Nack. When the Ack is issued, the SRS in a sequence different from that of the SRS to be transmitted by its own UE is transmitted. When the Nack is issued, the SRS in a sequence different from that of the SRS to be transmitted by its own UE and different from that of the SRS to be transmitted when the Ack is issued is transmitted.

The cell can determine whether the Ack or the Nack is issued by receiving the SRS and recognizing which sequence is used. Since the signal is transmitted as the SRS, it has an uplink sounding function as a function of the SRS. The cell can obtain an uplink channel state by receiving the SRS.

As another example, a sequence different from the sequence of the normal SRS of its own UE is used only when Ack is issued. When the Ack is issued, the SRS in the sequence different from that of the SRS to be transmitted by its own UE is transmitted. When the Nack is issued, the SRS in the same sequence as that of the SRS to be transmitted by its own UE is transmitted. In other words, the normal SRS of its own UE is transmitted.

The cell can determine whether the Ack or the Nack is issued by receiving the SRS and recognizing which sequence is used. When a sequence for Ack is used, the cell can recognize the Ack. When a normal sequence is used, the cell can recognize Nack. Here, there is no need to provide a sequence for Nack in comparison with the former example. Thus, the number of sequences to be used can be reduced.

Although application of the sequence number to be set to the SRS is disclosed in the aforementioned examples, the cyclic shift (CS) may be used as an alternative method. A SRS of a CS different from a CS to be set to the normal SRS is provided, and the CS of the SRS to be transmitted varies depending on Ack or Nack.

For example, the CS different from the CS of the normal SRS of its own UE is used for both Ack and Nack. When the Ack is issued, the SRS of the CS different from that of the SRS to be transmitted by its own UE is transmitted. When the Nack is issued, the SRS of the CS different from that of the SRS to be transmitted by its own UE and different from that of the SRS to be transmitted when the Ack is issued is transmitted. The cell can determine whether the Ack or the Nack is issued by receiving the SRS and recognizing which CS is used. Since the signal is transmitted as the SRS, it has an uplink sounding function as a function of the SRS. The cell can obtain an uplink channel state by receiving the SRS.

As another example, the CS different from the CS of the normal SRS of its own UE is used only when the Ack is issued. When the Ack is issued, the SRS of the CS different from that of the SRS to be transmitted by its own UE is transmitted. When the Nack is issued, the SRS with the same CS as that of the SRS to be transmitted by its own UE is transmitted. In other words, the normal SRS of its own SRS is transmitted. The cell can determine whether the Ack or the Nack is issued by receiving the SRS and recognizing which CS is used. When a CS for Ack is used, the cell can recognize the Ack. When the normal CS is used, the cell can recognize Nack. Here, there is no need to provide a CS for Nack in comparison with the former example. Thus, the number of CSs to be used can be reduced.

When the CSs are used, the orthogonality exists between different CSs. Thus, when the SRS indicating Ack or Nack of its own UE is multiplexed with the SRS of the other UE, a reception error rate of Ack or Nack in the cell can be reduced.

Although the aforementioned example discloses application of the CS to be set to the SRS, information on the SRS may be modulated as an alternative method. When the SRS conflicts with Ack/Nack, information on the SRS to be transmitted is modulated depending on Ack or Nack.

For example, the BPSK modulation is performed. When the Ack is issued, each of bits of the SRS to be transmitted by its own UE is multiplied by minus 1. When the Nack is issued, each of the bits of the SRS to be transmitted by its own UE is multiplied by 1. The SRS modulated in such a manner is mapped to the normal resources and then transmitted.

The cell can determine whether the Ack or the Nack is issued by receiving the SRS and determining whether the bit is multiplied by minus 1 or 1. Since the signal is transmitted as the SRS, it has an uplink sounding function as a function of the SRS. The cell can obtain an uplink channel state by receiving the SRS.

Information on the method for multiplexing the Ack/Nack with the SRS that is disclosed in the second modification may be provided. The following (1) to (6) will be disclosed as specific examples of the information:

(1) a sequence to be used for Ack;
(2) a sequence to be used for Nack;
(3) a CS to be used for Ack;
(4) a CS to be used for Nack;
(5) a method for modulating the SRS information; and
(6) information on which modulating method is applied.

When the uplink control signal such as Ack/Nack conflicts with the SRS, the uplink control signal can be multiplexed with the SRS by setting such information. The method for setting the information on time-division multiplexing and the method for notifying the information from the eNB to the UE which are disclosed in the first modification of the third embodiment may be applied to a method for setting the information and a method for notifying the information from the eNB to the UE, respectively.

The sequence to be used for the SRS sometimes varies for each cell. Here, the other cells may use the sequence for Ack/Nack. Thus, a problem of interference in uplink signal between UEs may arise. As a method for solving such a problem, the sequences for Ack/Nack may vary between cells. Since the different sequences are used between the cells, the interference in uplink signal between the UEs can be reduced.

Methods for varying sequences for Ack/Nack between cells include a method for determining a sequence to be used for each cell in, for example, a standard. The sequence may be a sequence for Ack/Nack that can be derived using an ID unique to the cell.

Alternatively, when the cell has determined the sequence for Ack/Nack, the cell notifies an adjacent cell of the sequence number. Upon receipt of the sequence number, the adjacent cell determines a sequence for Ack/Nack except for the received sequence number. Notification of the sequence number for Ack/Nack between these cells can avoid use of the same sequence between the cells.

A CN node may determine the sequence number. The cell may notify the CN node of the sequence number. The CN node may notify each cell of the sequence for Ack/Nack. Since this eliminates the need for notification of the sequence number between the cells, the signaling between the cells can be reduced.

When the cell finishes using the different sequences for Ack/Nack, it notifies the adjacent cell of the end sequence number. Upon receipt of the sequence number, the adjacent cell determines a sequence for Ack/Nack by including the received sequence number. Notification of the sequence number indicating the end of the use for Ack/Nack between these cells can increase the use efficiency of the sequence.

Application of the methods disclosed in the second modification enables transmission of both of Ack/Nack, etc. and the SRS in the NR, even when these signals conflict with each other in the same subframe. Thus, the cell can receive the Ack/Nack and the SRS with predefined timing. Enabling reception of Ack/Nack with the predefined timing allows the cell to perform retransmission control without any latency. Enabling reception of the SRS with the predefined timing allows the cell to perform precoding with high precision.

Since there is no need to set the frequency resources and the time resources aside from the radio resources to be used for the SRS, information that can be transmitted is never reduced. Even when the frequency resources and the time resources are limited, the SRS and the uplink control signal can be transmitted with the same radio resources. Thus, the use efficiency of the radio resources can be increased, and reduction in the transmission rate and in the transmission capacity can be suppressed.

Although the conflict between Ack/Nack and the SRS in a UE is disclosed, the methods disclosed in the second modification may be applied even to a conflict between a SR and the SRS. The SR may correspond to Ack/Nack to be applied. For example, the presence of the SR may correspond to Ack, and the absence of the SR may correspond to Nack.

Both signals of the SR and the SRS can be transmitted in the NR even when the SR and the SRS conflict with each other. Thus, the cell can receive the SR and the SRS with predefined timing. Enabling reception of the SR with the predefined timing allows the cell to start transmission of the uplink signal earlier. Enabling reception of the SRS with the predefined timing allows the cell to perform precoding with high precision.

Third Modification of Third Embodiment

The third modification will disclose another method for solving the problems disclosed in the third embodiment.

When a UE has a conflict between the SRS and the uplink control signal, priorities are assigned to the SRS and the uplink control signal to determine which one should be preferentially transmitted. For example, Ack/Nack is prioritized, or the SRS is prioritized. The other example methods for assigning the priorities include assuming that the priorities increase in ascending order of values indicating the priorities, e.g., the Ack/Nack is given the highest priority, the CQI/CSI is given the second highest priority, and the SRS is given the third highest priority.

A method for determining the priorities will be disclosed. For example, the priorities may be statically predetermined in, for example, a standard. The UE transmits the SRS or the uplink control signal according to the determined priority. For example, it is determined, in a standard, that the Ack/Nack is given the highest priority, the CQI/CSI is given the second highest priority, and the SRS is given the third highest priority. Giving the Ack/Nack a higher priority enables the Ack/Nack to be transmitted earlier without any latency, which can shorten the latency until the retransmission.

For another example, it is determined, in a standard, that the Ack/Nack is given the highest priority, the SRS is given the second highest priority, and the CQI/CSI is given the third highest priority. Giving the SRS a higher priority than the CQI/CSI enables the cell to evaluate fluctuations in a downlink channel state without any latency. This is effective when the fluctuations in the downlink channel state take priority over fluctuations in an uplink channel state.

For another example, it is determined, in a standard, that the SRS is given the highest priority, the Ack/Nack is given the second highest priority, and the CQI/CSI is given the third highest priority. Giving the SRS a higher priority to prioritize the SRS enables evaluation of fluctuations in the uplink channel state without any latency. This is effective when the fluctuations in the downlink channel state are evaluated in the TDD using the fluctuations in the uplink channel state.

When which signal is to be transmitted has been determined according to the set priorities, the other signals are not transmitted. Specifically, the other signals are discarded. Discarding the other signals enables reduction in the signaling load and avoidance of complexity in the control.

When which signal is to be transmitted has been determined according to the set priorities, the other signals may be transmitted in a subframe after a subframe in which a conflict has occurred as an alternative method. A part or the entirety of the SRS and the uplink control signal may be transmitted in a subframe after the subframe in which the conflict has occurred. These settings may be made for each signal.

For example, when it is determined that the SRS and the CQI/CSI are not transmitted in a subframe in which a conflict has occurred, they are not transmitted in the subsequent subframes. For example, when it is determined that the Ack/Nack and the SR are not transmitted in the subframe in which the conflict has occurred, they may be transmitted in the subsequent subframes.

Since the SRS and the CQI/CSI are transmitted to measure or recognize a previous state of a radio channel, they can be newly transmitted even if they are not transmitted in the subsequent subframes. In contrast, the Ack/Nack has a slight latency in the retransmission control if it is not transmitted in the subsequent subframes. If the SR is not transmitted in the subsequent subframes, the SR has to wait the transmission timing of the SR again, which causes the latency for starting to transmit the uplink signal.

As described above, whether to perform transmission in a subframe subsequent to the subframe in which the conflict has occurred is set according to a type of a signal, which enables the setting to correspond to the characteristics of the type of the signal.

For another method, an algorithm for determining the priorities may be statically predetermined in, for example, a standard. The UE transmits the SRS or the uplink control signal according to the priority determined by the determined algorithm. The example method may include deriving a prioritized probability of the next SRS from the number of transmissions of the SRS since n preceding times, comparing the prioritized probability with a threshold $\alpha$ for determining the presence or absence of the transmission, and determining whether to transmit the SRS. For example, the SRS is not transmitted when the prioritized probability is larger than or equal to the threshold $\alpha$, and the SRS is transmitted when the prioritized probability is smaller than the threshold $\alpha$. Parameters to be used for the algorithm for determining the priorities may be statically predetermined in, for example, a standard. The parameters in the example of the algorithm are n and $\alpha$.

A simple and specific example thereof will be disclosed. The parameters in the algorithm are predetermined in a standard as n=1 and $\alpha$=0.5. A prioritized probability x is derived from a sum of the number of transmissions of the SRS since one immediate preceding time. If the SRS is not transmitted at the one immediate preceding time, the prioritized probability x is x=0/1=0. When this prioritized probability x is compared with the threshold $\alpha$=0.5, x<$\alpha$ holds. Thus, it is determined that the next SRS is to be transmitted. If the SRS is transmitted at the one immediate preceding time, the prioritized probability x is x=1/1=1. When this prioritized probability x is compared with the threshold $\alpha$=0.5, x>$\alpha$ holds. Thus, it is determined that the next SRS is not transmitted.

Each of the uplink control signals may have a threshold. A threshold may be determined not only for each of the SRSs but also for each of the uplink control signals. The prioritized probability may be derived and the threshold may be determined so that the priorities of not only the SRSs but also the uplink control signals are determined. A signal to be transmitted next may be determined through comparison of the prior probabilities of the SRSs and the uplink control signals. This enables determination of the signal to be transmitted next according to a transmission state in n preceding times.

Although statically predetermining, in, for example, a standard, the algorithm and the parameters for determining the priorities is disclosed, the eNB may set the parameters and notify the UE of the parameters. The notification method is to include the parameters in the broadcast information and broadcast the broadcast information. Here, the parameters are set for each cell, and notified to the UEs being served by the cell. Alternatively, the parameters may be notified via the RRC-dedicated signaling. The parameters are set for each cell, and notified individually to each of the UEs. Alternatively, the parameters may be set for each UE. The parameters are set for each UE, and notified individually to each of the UEs.

Upon notification of the parameters, the UE determines the priorities by substituting the parameters for the algorithm for determining the priorities.

Consequently, the parameters can be changed according to a state of the cell, for example, a load state and a state in which the MIMO is applied, so that settings appropriate for the state of the cell can be made.

Consequently, both the cell and the UE can recognize which one of the uplink control signal and the SRS is prioritized when the uplink control signal conflicts with the SRS, by statically predetermining which one is prioritized in, for example, a standard. Thus, malfunctions in a system can be reduced. Since notification of the priorities between the cell and the UE or between eNBs is unnecessary, the signaling load can be reduced.

Although statically predetermining, in, for example, a standard, the priorities as a method for determining the priorities is disclosed, the priorities may be semi-statically or dynamically determined.

The following (1) to (9) will be disclosed as specific examples of a judgment indicator for determining the priorities:

(1) whether the subframe is self-contained;
(2) whether precoding for the downlink MIMO using the SRS is performed;
(3) channel quality information of the UE;
(4) the moving speed of the UE;
(5) acceleration (change in the speed) of the UE;
(6) the rotational speed of the UE;
(7) rotational acceleration of the UE;
(8) the number of multiplexed UEs; and
(9) combinations of (1) to (8) above.

Taking, as the judgment indicator, whether the subframe is self-contained in (1), for example, when the subframe is self-contained, Ack/Nack is prioritized. Specifically, the Ack/Nack is given the highest priority. When the subframe is not self-contained, another uplink control signal or the SRS is prioritized. For example, the SRS is given the highest priority. When the subframe is self-contained, Ack/Nack can be transmitted earlier. Thus, prioritizing the Ack/Nack when the Ack/Nack is set can lower the latency in the retransmission process.

Taking, as the judgment indicator, whether precoding for the downlink MIMO using the SRS is performed in (2), for example, when the precoding for the downlink MIMO using the SRS is performed, the SRS is prioritized. Specifically, the SRS is given the highest priority. When the precoding for the downlink MIMO using the SRS is not performed, the SRS is not prioritized but the other uplink control signal is prioritized. When the precoding for the downlink MIMO using the SRS is performed, the cell can receive the SRS with predefined timing by prioritizing the SRS. The SRS can be reflected to derive a pre-coding weight for the downlink MIMO. Consequently, the precoding performance can be improved.

Taking, as the judgment indicator, the channel quality information of the UE in (3), for example, when the channel quality is inferior, the SRS is prioritized. Specifically, the SRS is given the highest priority. When the channel quality is superior, the SRS is not prioritized but the other uplink control signal is prioritized. When the channel quality is inferior, the cell can receive the SRS with predefined timing by prioritizing the SRS. The SRS can be reflected to derive a pre-coding weight for the downlink MIMO. Consequently, the precoding performance can be improved.

Taking, as the judgment indicator, the moving speed of the UE in (4), for example, when the moving speed is higher, the SRS is prioritized. Specifically, the SRS is given the highest priority. When the moving speed is lower, the SRS is not prioritized but the other uplink control signal is prioritized. When the moving speed is higher, the cell can receive the SRS with predefined timing by prioritizing the SRS, and can reduce the influence of the Doppler frequency due to the moving speed of the UE. Thus, precision of the SRS can be increased, and the precoding performance can be improved.

Taking, as the judgment indicator, the acceleration (change in the speed) of the UE in (5), for example, when the acceleration is greater, the SRS is prioritized. Specifically, the SRS is given the highest priority. When the acceleration is less, the SRS is not prioritized but the other uplink control signal is prioritized. When the acceleration is greater, the cell can receive the SRS with predefined timing by prioritizing the SRS, and can reflect change in the moving speed of the UE earlier. Consequently, the precoding performance can be improved.

Taking, as the judgment indicator, the rotational speed of the UE in (6), for example, when the rotational speed is higher, the SRS is prioritized. Specifically, the SRS is given the highest priority. When the rotational speed is lower, the SRS is not prioritized but the other uplink control signal is prioritized. When the rotational speed is higher, the cell can receive the SRS with predefined timing by prioritizing the SRS, and can reflect the rotation of the UE earlier. Consequently, the precoding performance can be improved.

Taking, as the judgment indicator, the rotational acceleration (change in the rotational speed) of the UE in (7), for example, when the rotational acceleration is greater, the SRS is prioritized. Specifically, the SRS is given the highest priority. When the rotational acceleration is less, the SRS is not prioritized but the other uplink control signal is prioritized. When the rotational acceleration is greater, the cell can receive the SRS with predefined timing by prioritizing the SRS, and can reflect change in the rotational speed of the UE earlier. Consequently, the precoding performance can be improved.

Taking, as the judgment indicator, the number of multiplexed UEs in (8), for example, when the number of multiplexed UEs is many, the SRS is prioritized. Specifically, the SRS is given the highest priority. When the number of multiplexed UEs is fewer, the SRS is not prioritized but the other uplink control signal is prioritized. When the number of multiplexed UEs in the MIMO is many, the cell can receive the SRS with predefined timing by prioritizing the SRS, and can increase the precision of the SRS for each UE. Thus, even when the number of multiplexed UEs is many, the precoding weight with higher precision can be derived, and the precoding performance can be improved.

A method for determining the priorities will be disclosed. The UE determines the priorities. When the UE determines the priorities and the SRS conflicts with the uplink control signal, the eNB does not know which one is to be transmitted. Here, the eNB may demodulate all types of the signals. Although it takes time to demodulate the signals, the eNB can demodulate any one of the signals.

As an alternative method, the UE may notify the eNB of the determined priorities. The notification method may be the RRC signaling, the MAC signaling, or the L1/L2 control signaling. Consequently, the eNB can demodulate the signals as predefined signals according to the priorities determined by the UE. The aforementioned judgment indicators may be appropriately applied as the judgment indicators for the UE to determine the priorities. For example, the UE may apply (3) to (7) above that can be evaluated by its own UE. Alternatively, the UE may apply (1) above when the UE can recognize whether the subframe is self-contained, from the scheduling information.

A threshold for determination (hereinafter may be referred to as a "determination threshold") may be provided as an alternative method. The eNB may notify the UE of the determination threshold. The determination threshold is, for example, a threshold for determining the moving speed of the UE, etc. The disclosed judgment indicators may have appropriate thresholds for determination. The UE determines the priorities according to the received determination thresholds. For example, when the moving speed of the UE is higher than or equal to the determination threshold, the SRS is prioritized. When the moving speed of the UE is less than the determination threshold, the SRS is not prioritized but the other uplink control signal is prioritized. Consequently, which signal the eNB prioritizes can be controlled to some extent.

Another method for determining the priorities will be disclosed. The eNB determines the priorities. When the eNB determines the priorities, the eNB obtains a judgment indicator for the priorities. The eNB may evaluate the judgment indicator, or the UE may evaluate the judgment indicator and notify it to the eNB. Whether the eNB or the UE evaluates the judgment indicator may be set according to the judgment indicator. The methods disclosed in the second embodiment may be applied to a method for the UE to evaluate the judgment indicator and notify it to the eNB.

The eNB notifies the UE of the priorities. When the eNB determines the priorities, the UE does not know the priorities. Thus, notification of the priorities from the eNB to the UE enables the UE to recognize the priorities, which enables the same priorities to be set between the eNB and the UE.

A method for notifying the priorities from the eNB to the UE will be disclosed. The eNB determines the priorities for each cell. The eNB includes the determined priorities in the broadcast information to broadcast the broadcast information.

As an alternative method, the eNB determines the priorities for each UE. The eNB notifies the determined priorities via the UE-dedicated signaling. For example, the priorities are included in the RRC-dedicated signaling and notified. Alternatively, the priorities may be included in a MAC CE to be notified via the MAC signaling. Since the HARQ is applied similarly as via the RRC signaling, the setting can be made earlier at a lower error rate than that via the RRC signaling. Alternatively, the priorities may be included in the L1/L2 control signal to be notified via the L1/L2 control signaling. Consequently, the setting can be made earlier than that via the MAC signaling.

Application of such methods enables flexible setting of the priorities according to, for example, a state of a frame structure, the number of multiplexed UEs in the downlink MIMO, and a state of the UE as described in the examples of the judgment indicators. The priorities can be semi-statically or statically set according to time fluctuations in such a state. Furthermore, the latency in retransmission can be reduced and the preceding performance can be improved, according to the time fluctuations in a state.

Setting the priorities eliminates the need for using symbols for new frequency resources and the other information as described in the third embodiment and the first modification of the third embodiment. Thus, the use efficiency of the radio resources and the transmission rate can be increased. Increase in the required number of sequences and the CSs can be suppressed as described in the second modification of the third embodiment. Consequently, many cells and many UEs are operable.

The methods disclosed in the third modification may be used when the third embodiment, and the first and the second modifications of the third embodiment are not applicable. The eNB may determine whether the third embodiment, and the first and the second modifications of the third embodiment are applicable according to a use state of the radio resources in the cell and use states of a sequence and a CS, and may determine application of the third modification of the third embodiment when the third embodiment, and the first and the second modifications of the third embodiment are not applicable.

For example, the time-division multiplexing method is performed if the time-division multiplexing can be performed, and a method based on the priorities is performed if the time-division multiplexing cannot be performed. The UE does not transmit either the uplink control signal or the SRS according to the set priorities. For example, the frequency-division multiplexing method is performed if the frequency-division multiplexing can be performed, and the method based on the priorities is performed if the frequency-division multiplexing cannot be performed. The UE does not transmit either the uplink control signal or the SRS according to the set priorities.

Without being limited to this, the time-division multiplexing method may be performed if the time-division multiplexing can be performed, and the frequency-division multiplexing may be performed if the time-division multiplexing cannot be performed. Alternatively, the frequency-division multiplexing method may be performed if the frequency-division multiplexing can be performed, and the time-division multiplexing method may be performed if the frequency-division multiplexing cannot be performed.

The eNB may semi-statically notify the UE of a method for avoiding a conflict. The notification may be made via the RRC signaling. Alternatively, the eNB may dynamically notify the UE of the method for avoiding a conflict. The notification may be made via the L1/L2 control signaling or the MAC signaling. The method for avoiding a conflict may be set when a subframe structure of the SRS or a structure of the uplink control signal is set.

The eNB may determine the priorities and notify the UE of the determined priorities when determining to apply the third modification of the third embodiment. Consequently, the UE can determine that the setting according to the priorities has been made. The UE performs transmission according to the received priorities. Consequently, the eNB can apply the third modification according to a state of the cell.

Specific examples of the judgment indicators (1) to (10) will be described as follows:
(1) the number of UL symbols in one subframe;
(2) the number of DL symbols in one subframe;
(3) the number of symbols of gaps in one subframe;
(4) the number of RBs for transmitting the SRS;
(5) the number of RBs that are not used for transmitting the SRS;
(6) a system bandwidth;
(7) the number of symbols necessary for an uplink control signal;
(8) the number of symbols necessary for the SRS;
(9) a period of the SRS; and
(10) combinations of (1) to (9) above.

For example, when the number of UL symbols in one subframe is fewer than a predetermined number of symbols, it is determined that the time-division multiplexing cannot be performed. For example, when the number of symbols necessary for an uplink control signal is more than a predetermined number of symbols, it is determined that the time-division multiplexing cannot be performed. For example, when the number of RBs for transmitting the SRS is more than a predetermined number of RBs, it is determined that the frequency-division multiplexing cannot be performed. The predetermined number may be of a predetermined value. Alternatively, the eNB may notify the UE of the predetermined value. The predetermined value may be notified together with a method for setting combinations of the methods for avoiding a conflict.

Although the judging entity is the eNB in the previous examples, the judging entity may be the UE. The UE may obtain a judgment indicator and make the determination.

The methods disclosed in the third embodiment, and the first to the third modifications of the third embodiment may be appropriately combined and used. Even in such a case, the same advantages as those according to the third modification can be produced.

It is possible to select which one of the methods disclosed in the third embodiment, and the first to the third modifications of the third embodiment is applied and set the selected one. The method may be changed.

Information indicating which method in the third embodiment, and the first to the third modifications of the third embodiment may be provided. The eNB may select which method is to be applied, and notify the UE of the information. The methods disclosed in the third modification of the third embodiment may be applied to a method for notifying the information. Consequently, the eNB can select the method according to a state of the cell, and a radio propagation situation and a state of the UE.

An identifier may be assigned to each of the methods for avoiding a conflict, and may be notified to the UE. This can reduce the amount of signaling information.

Fourth Embodiment

The 3GGP proposes measuring an uplink signal from the UE on the NW side as a technique of the NR (see 3GPP R1-167200 (hereinafter referred to as "Reference 7"), 3GPP R1-166393 (hereinafter referred to as "Reference 8"), 3GPP R1-166387 (hereinafter referred to as "Reference 9"), and 3GPP R1-165213 (hereinafter referred to as "Reference 10")). In the NR, for example, a transmission reception point (TRP) or a distributed unit (DU) (see 3GPP R3-161013 (hereinafter referred to as "Reference 11")) is proposed as a device or a node on the NW side. The proposal includes that the TRP and the DU receive and measure an uplink signal.

Figure 54:
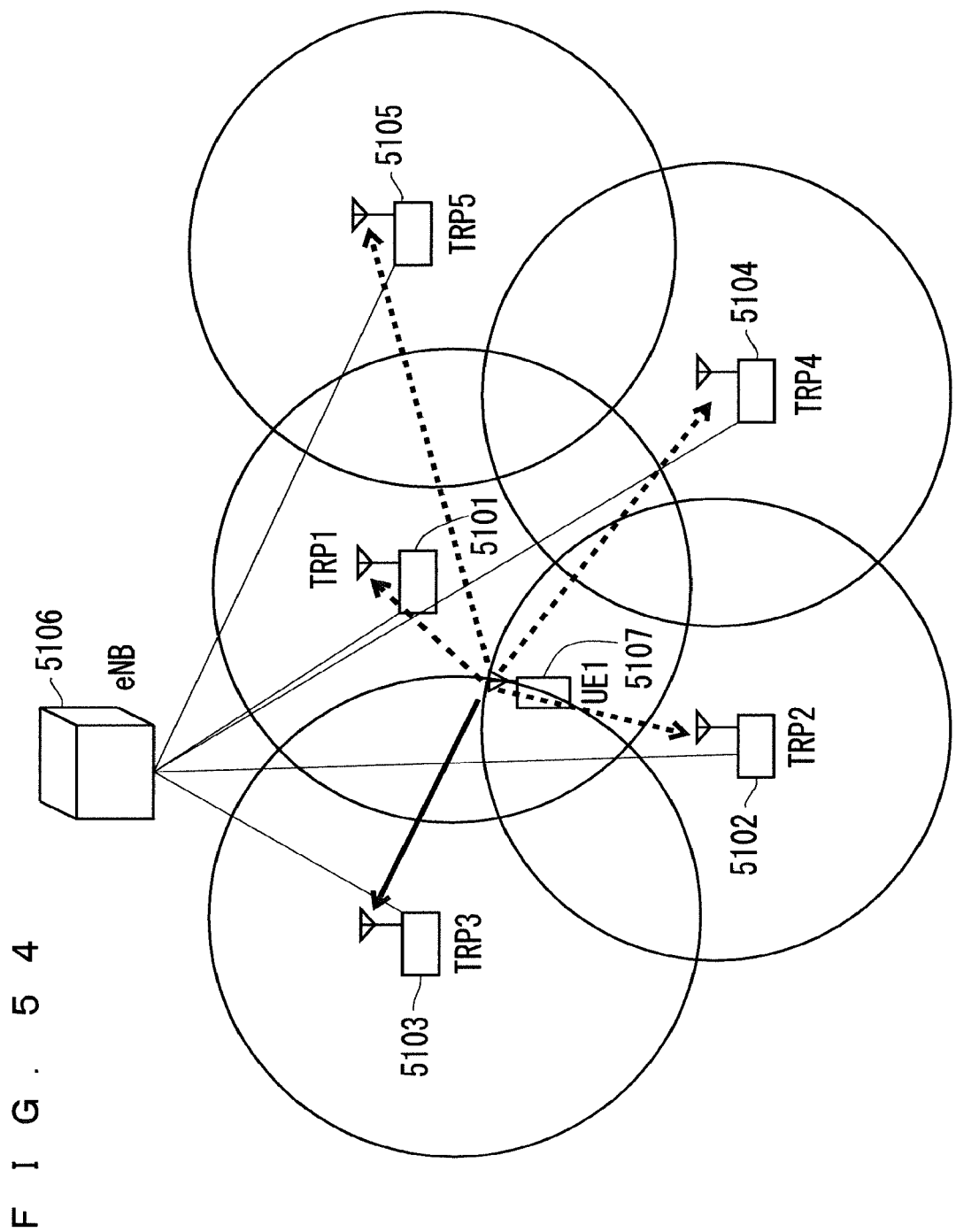
FIG. 54 illustrates the uplink signal from the UE when an eNB is configured by a plurality of TRPs.

Although the UE performs transmission and reception with one TRP (will be referred to as a "serving TRP"), a plurality of TRPs receive an uplink signal for measurement that has been transmitted from the UE. FIG. 54 illustrates the uplink signal from the UE when an eNB is configured by a plurality of TRPs.

Each of a TRP1 5101, a TRP2 5102, a TRP3 5103, a TRP4 5104, and a TRP5 5105 is connected to an eNB 5106, and has at least a transmission/reception function. The transmission/reception timings of the TRP 5101 to the TRP 5105 are synchronized with each other. A UE1 5107 is communicating with the TRP3 5103. The TRP3 5103 is a serving TRP of the UE1 5107. Since the UE1 5107 performs transmission and reception with the serving TRP 5103, the UE1 5107 follows a preset timing advance (TA) (see Reference 4) with the serving TRP 5103 as the timing of the uplink signal.

When the other TRPs, specifically, the TRP1 5101, the TRP2 5102, the TRP4 5104, and the TRP5 5105 receive the uplink signal transmitted from the UE1 5107 using the TA set with the serving TRP 5103, the other TRPs have differences in the reception timings.

This is because, for example, a distance and a radio propagation environment between the UE1 5107 and each of the TRP 5101 to the TRP 5105 differ, and thus, the radio propagation time between the UE1 5107 and the serving TRP 5103 is different from the radio propagation time between the UE1 5107 and each of the other TRP 5101, the TRP 5102, the TRP 5104, and the TRP 5105. Thus, the other TRPs may not be able to receive the uplink signal for measurement that has been transmitted from the UE1 5107 using the TA set with the serving TRP 5103.

FIG. 55 illustrates the timing of receiving, by the TRPs, the uplink signal transmitted from the UE 1. FIG. 55 illustrates the case where the TRP 3 is the serving TRP. FIG. 55 illustrates the TDD. FIG. 55 illustrates one subframe including a downlink signal (DL), a gap (Gap) without any transmission and reception, and an uplink signal (UL). In FIG. 55, Rw denotes a reception duration of the uplink signal by the TRP. Tw denotes a duration of the uplink signal, and Tw=Rw holds herein.

T1 denotes a radio propagation time from the UE1 to the TRP1. T2 denotes a radio propagation time from the UE1 to the TRP2. T3 denotes a radio propagation time from the UE 1 to the TRP 3. T4 denotes a radio propagation time from the UE 1 to the TRP 4. T5 denotes a radio propagation time from the UE 1 to the TRP 5. Each of the radio propagation times T1, T2, T3, T4, and T5 represents a time from transmission of the uplink signal by the UE 1 to the arrival at the corresponding TRP. The TA3 is the TA set between the serving TRP and the UE 1. The TA3 is set twice the radio propagation time T3 from the UE 1 to the TRP 3.

The UE 1 transmits the uplink signal earlier in timing by the TA3 preset with the serving TRP from the downlink reception timing. Consequently, the TRP 3 can receive the uplink signal from the UE 1 in synchronization with the reception timing of the uplink signal.

The radio propagation time between the UE 1 and the TRP 1 or the TRP 2 is shorter than that between the UE 1 and the TRP 3.

Thus, the arrival timing of the uplink signal from the UE 1 at the TRP 1 is earlier than the reception timing of the uplink signal. The arrival timing is earlier by T3–T1 in the example of FIG. 55.

Similarly, the arrival timing of the uplink signal from the UE 1 at the TRP 2 is earlier than the reception timing of the uplink signal. The arrival timing is earlier by T3–T2 in the example of FIG. 55. T2 denotes the radio propagation time from the UE 1 to the TRP 2.

On the other hand, the radio propagation time between the UE 1 and the TRP 4 or the TRP 5 is longer than that between the UE 1 and the TRP 3.

Thus, the arrival timing of the uplink signal from the UE 1 at the TRP 4 is later than the reception timing of the uplink signal. The arrival timing is later by T4–T3 in the example of FIG. 55.

Similarly, the reception timing of the uplink signal from the UE 1 at the TRP 5 is later than the arrival timing of the uplink signal. The arrival timing is later by T5–T3 in the example of FIG. 55.

Thus, when the arrival timing of the uplink signal from the UE 1 is earlier or later than the reception timing of the uplink signal at each of the TRPs, the uplink signal does not fall within the uplink signal reception duration Rw at the TRP, and a duration for actually receiving the uplink signal is shortened. Consequently, the uplink signal cannot be sometimes accurately demodulated.

Thus, when not only the serving TRP but also the other TRPs measure a uplink signal for measurement from the UE such as the uplink signal for measurement that has been proposed in the NR, the other TRPs will have a problem of failing to accurately receive and demodulate the uplink signal for measurement.

The fourth embodiment will disclose a method for solving such a problem.

An adjustment value is set to the TA. The TA not only for the serving TRP but also for the UE that transmits an uplink signal receivable at neighboring TRPs, for example, an uplink signal for measurement may have an adjustment value. The adjustment value is denoted by α. The UE delays the uplink transmission timing by the adjustment value α for the TA set with the serving TRP. The UE may set TA−α as the TA including the adjustment value.

The TA may include an offset value indicating a switching duration between transmission and reception in the eNB or the UE if the offset value is present as in the TDD. Assuming the offset value as TAoff, (TA+TAoff−α) may be set as the TA including the adjustment value.

For example as conventionally described in Reference 4 (Section 8), the UE sets the uplink transmission timing earlier than the downlink reception timing by (NTA+NTAoffset)×TS seconds. Here, NTA represents a value of the TA set in units of TS. NTAoffset represents a value of the TAoffset set in units of TS. A fixed value is preset to the TAoffset in a standard. In contrast, the UE may set the uplink transmission timing earlier than the downlink reception timing by (NTA+NTAoffset−α)×TS seconds. α denotes the adjustment value set in units of TS.

Provision of the adjustment value α in setting the uplink transmission timing of the UE enables adjustment of a duration during which the serving TRP and the other TRPs actually receive the uplink signal transmitted from the UE, specifically, a duration of the uplink signal in the uplink signal reception duration Rw. Setting the adjustment value α to an appropriate value enables not only the serving TRP but also the other TRPs to receive the uplink signal transmitted from the UE. The TA may be a value obtained by including an adjustment value in the conventional TA, without separately providing the adjustment value. Even in such a case, the same advantages can be produced.

Figure 56:
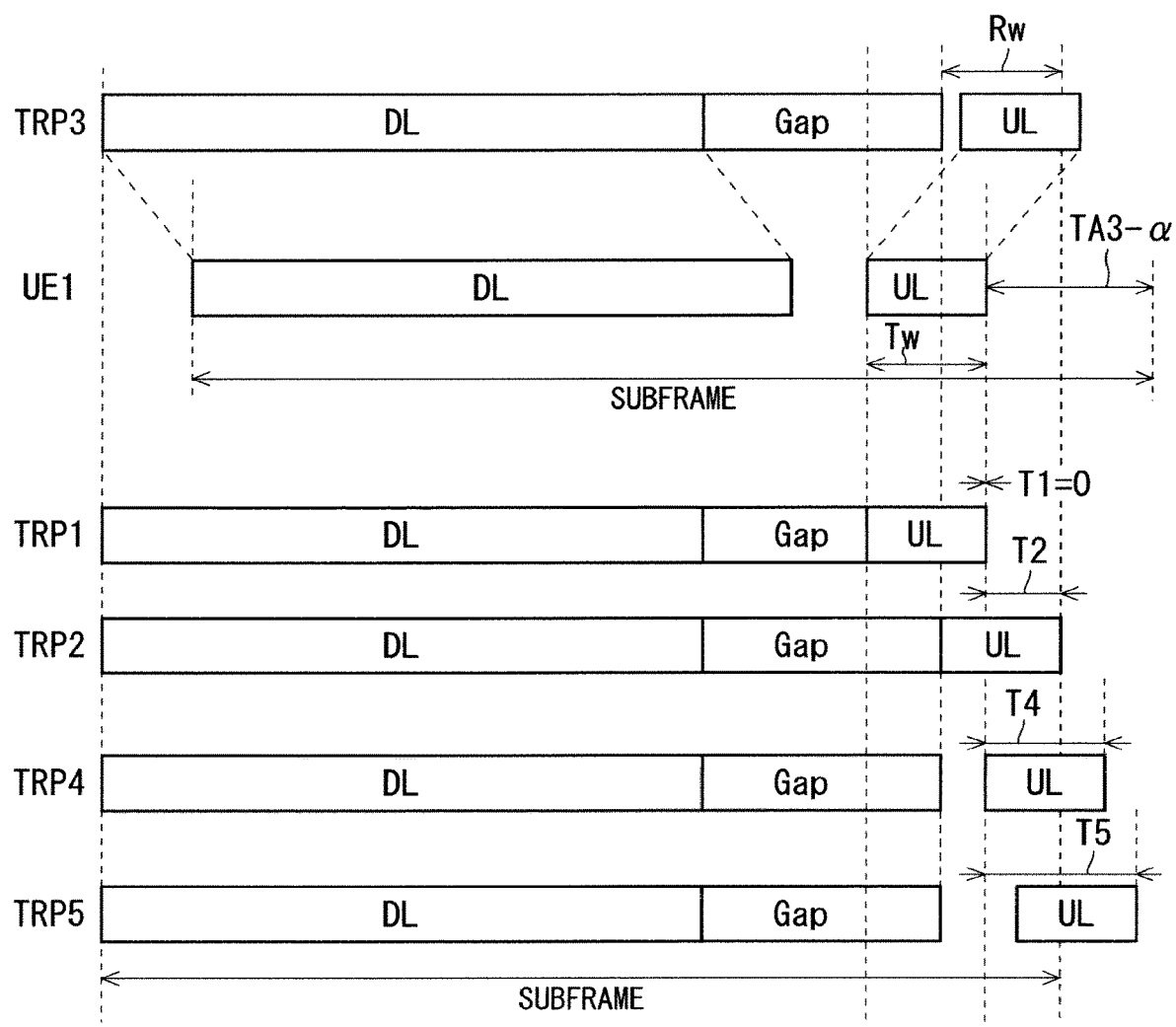
FIG. 56 illustrates the timing of receiving, by the TRPs, the uplink signal transmitted from the UE 1 when an adjustment value α is provided.

FIG. 56 illustrates the timing of receiving, by the TRPs, the uplink signal transmitted from the UE 1 when the adjustment value α is provided. FIG. 56 illustrates the case where the TRP 3 is the serving TRP. FIG. 56 illustrates the TDD. Since FIG. 56 is similar to FIG. 55, the differences will be mainly described. Unlike FIG. 55, TA 1 is 0 in FIG. 56. In other words, T1=0. This assumes a case where the distance between the TRP 1 and the UE 1 is the shortest.

The TA is preset between the UE 1 and the serving TRP. The adjustment value α is set to the UE 1 in consideration of radio propagation times with the serving TRP and the neighboring TRPs, here, the TRP 1 to the TRP 5. The UE 1 transmits, using the TA3 and the adjustment value α that have been set, the uplink signal earlier than the downlink reception timing by TA3−α. The TA3 is set twice the radio propagation time T3 from the UE 1 to the TRP 3. TA3 may include the TAoffset. TA3=2×T3+TAoff may hold.

Here, the arrival timing of the uplink signal from the UE 1 at the TRP 3 is later than the reception timing of the uplink signal by the adjustment value α.

In contrast, the arrival timing of the uplink signal from the UE 1 at the TRP 1 is earlier than the reception timing of the uplink signal by T3−T1. However, the arrival timing is later than the arrival timing using only the conventional TA3 by the adjustment value α. Thus, the duration during which the uplink signal from the UE 1 can be received by the TRP 1 is increased by the adjustment value α.

Similarly, the arrival timing of the uplink signal from the UE 1 at the TRP 2 is earlier than the reception timing of the uplink signal by T3−T2. However, the arrival timing is later than the arrival timing using only the conventional TA3 by the adjustment value α. Thus, the duration during which the uplink signal from the UE 1 can be received by the TRP 2 is increased by the adjustment value α.

The arrival timing of the uplink signal from the UE 1 at the TRP 4 is later than the reception timing of the uplink signal by T4−T3. Moreover, the arrival timing is later than the arrival timing using only the conventional TA3 by the adjustment value α. Thus, the duration during which the uplink signal from the UE 1 can be received by the TRP 4 is decreased by the adjustment value α.

Similarly, the arrival timing of the uplink signal from the UE 1 at the TRP 5 is later than the reception timing of the uplink signal by T5-T3. Moreover, the arrival timing is later than the arrival timing using only the conventional TA3 by the adjustment value α. Thus, the duration during which the uplink signal from the UE 1 can be received by the TRP 5 is decreased by the adjustment value α.

Setting the adjustment value α to the UE in such a manner enables adjustment of the arrival timing of the uplink signal from the UE at the neighboring TRPs. The actual reception duration of the uplink signal from the UE at the neighboring TRPs can be adjusted. Thus, provision of the appropriate adjustment value α enables not only the serving TRP but also the neighboring TRPs to receive and demodulate the uplink signal transmitted from the UE.

Examples of deriving the adjustment value α will be disclosed. The adjustment value α for the UE may be derived using the TA of the neighboring TRPs for the UE. Examples of the derivation using the TA of the serving TRP and the neighboring TRPs will be disclosed. Here, Tw=Rw holds. The serving TRP of the UE is the TRP 3. Assuming an uplink-signal receivable duration from the UE at the closest TRP as "a", a=Tw−(T3−α−min(Tj)) holds. Assuming an uplink-signal receivable duration from the UE at the farthest TRP as "b", a signal can be received during b=Tw−(max(Tj)−T3+α). Here, j denotes the TRP number. Tj=TAj/2 holds.

The uplink-signal receivable duration from the UE at the closest TRP is set equal to the uplink-signal receivable duration from the UE at the farthest TRP. α=T3−(max(Tj)+min(Tj))/2 may hold. Here, a=b=Tw−(max(Tj)−min(Tj))/2.

Figure 57:
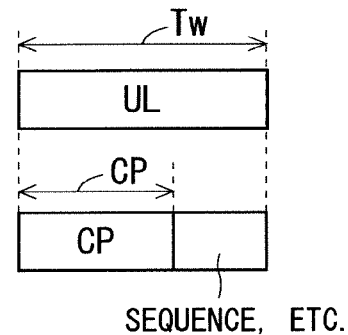
FIG. 57 illustrates an example structure of the uplink signal.

FIG. 57 illustrates an example structure of the uplink signal. The uplink signal consists of signals such as sequences and Cyclic Prefix (CP). The uplink-signal receivable duration "a" is a duration (Tw−CP duration) during which at least the signals such as sequences in the uplink signal are to be transmitted. The uplink-signal receivable duration may be any duration in the Tw because of the presence of the CP.

The CP may be set to satisfy CP=(max(Tj)=min(Tj))/2 so that a=Tw−CP holds. The CP length may be set according to a distance to the TRP at which the uplink signal from the UE can be received. Under the setting of a=b, the uplink-signal receivable duration at the farthest TRP from the UE is also Tw−CP. Consequently, reception at the closest TRP and at the farthest TRP from the UE is possible for a duration corresponding to at least data such as the sequences in the uplink signal.

When the duration of the uplink signal is fixed and the CP is set, the duration of the uplink signal may be maintained constant by changing the ratio of Tw−CP.

The CP may be set to an uplink signal that can be desirably received by the neighboring TRPs. Alternatively, the CP may be set to a symbol including the uplink signal that can be desirably received by the neighboring TRPs. Consequently, the serving TRP and the neighboring TRPs can receive the uplink signal from the UE.

The CP may be set to a transmission unit including an uplink signal that can be desirably received by the neighboring TRPs, for example, to each symbol in a slot or a subframe. This is effective when uplink signals to be consecutively transmitted are present in the uplink signal that can be desirably received by the neighboring TRPs.

Tj may be set to satisfy CP=(max(Tj)=min(Tj))/2 as an alternative method to achieve a=Tw−CP. The TRP that can receive the uplink signal from the UE is set according to the CP length. This is effective when the CP length is of a fixed value. Consequently, the serving TRP and the neighboring TRPs can receive the uplink signal from the UE.

The reception duration at the serving TRP for receiving the uplink signal can be equal to a reception duration when the conventional TA (TA3) is set. The reception duration at the neighboring TRPs can be equal to a reception duration for receiving the uplink signal form the UEs being served thereby.

The uplink signal of the UE that can be received by the neighboring TRPs may be frequency multiplexed, time multiplexed, or code multiplexed with the uplink signals of the other UEs including the UEs being served by the other TRPs. For example, the eNB maps the uplink signal of the UE that can be received by the neighboring TRPs to frequency-time resources different from those for the uplink signals of the other UEs including the UEs being served by the other TRPs. In other words, the uplink signals of the other UEs including the UEs being served by the other TRPs are not mapped to the frequency-time resources to which the uplink signal of the UE that can be received by the neighboring TRPs is mapped.

For another example, the uplink signal of the UE that can be received by the neighboring TRPs is mapped using an orthogonal code different from those for the uplink signals of the other UEs including the UEs being served by the other TRPs. In other words, the uplink signals of the other UEs including the UEs being served by the other TRPs may be mapped to the frequency-time resources to which the uplink signal of the UE that can be received by the neighboring TRPs is mapped. These signals should maintain the orthogonality using different orthogonal codes.

For example, different cyclic shifts may be used when a Zadoff-Chu (ZC) sequence is used as an uplink signal.

Consequently, the neighboring TRPs can receive, without any conflict, the uplink signal of the UE that can be received by the neighboring TRPs, and the uplink signals of the other UEs including the UEs being served by the other TRPs.

The uplink signal of the UE that can be received by the neighboring TRPs may be mapped to the frequency resources different from those for the other data in the same subframe, for example, the downlink data. Since a degree of freedom in allocating the radio resources for the uplink signal of the UE that can be received by the neighboring TRPs increases, the use efficiency of the radio resources can be increased.

An example method for deriving the TA by the neighboring TRPs will be disclosed.

The PRACH may be used. Studies have been made to apply, in the NR, the PRACH for initial uplink access. Thus, the PRACH may be used. A TRP notifies the neighboring TRPs of a PRACH configuration that is dedicated to the TRP. The PRACH configuration includes timing, allocation, and a sequence. Although disclosed is the notification from the TRP to the neighboring TRPs, the TRP may make the notification to the eNB, and then the eNB may make the notification to the neighboring TRPs. Alternatively, when the eNB sets each PRACH configuration, the eNB may notify each of the TRPs of the PRACH configuration of the neighboring TRPs.

When the PRACH configuration for each TRP is used, the PRACH of the UE for the serving TRP may conflict with the uplink transmission of the UEs being served by the neighboring TRPs. As a method for solving such a problem, the PRACH configuration dedicated to the TRP may be consistent among a plurality of TRPs (a TRP group). The PRACH configuration may be consistent among all the TRPs. The serving TRP and the neighboring TRPs receive the PRACH configuration.

The PRACHs even with such a PRACH configuration may conflict with each other among the UEs being served by the TRPs. When the serving TRP has the conflict, no RA response is notified to the UE. Thus, the UE retransmits the PRACH. However, when not the neighboring TRPs but the serving TRP can receive the PRACH from the UE, the serving TRP transmits the RAR to the UE. Consequently, the UE does not retransmit the PRACH. Thus, the neighboring TRPs cannot receive the PRACH from the UE.

A method for solving such a problem will be disclosed.

The eNB determines whether the PRACH from the UE can be received. Alternatively, each TRP may determine whether the PRACH from the UE can be received, and notify the eNB of information indicating whether the PRACH from the UE can be received. If any of the neighboring TRPs cannot receive the PRACH, the eNB instructs the serving TRP not to transmit the RAR to the UE. Alternatively, the eNB notifies the serving TRP that the neighboring TRPs cannot receive the PRACH. Then, the serving TRP determines not to transmit the RAR to the UE.

Consequently, the UE cannot receive the RAR, and thus retransmits the PRACH. Until the neighboring TRPs can receive the PRACH from the UE, the UE can retransmit the PRACH.

Such a process of transmitting the PRACH to the neighboring TRPs may be separately provided from the normal process of transmitting the PRACH to the serving TRP. For example, when the uplink signal from the UE is desirably received by the neighboring TRPs, the UE may be set to perform the process of transmitting the PRACH to the neighboring TRPs. The PRACH configuration may be notified to the UE via the RRC signaling. The PRACH configuration may be included in the SIB to be broadcast. Alternatively, the PRACH configuration may be notified individually to each UE.

Provision of the process of transmitting the PRACH to the neighboring TRPs separately from the normal process of transmitting the PRACH to the serving TRP can simplify the control, because the normal process of transmitting the PRACH will suffice when the uplink signal is not measured.

The maximum value may be set to the number of retransmissions of the PRACH in the process of transmitting the PRACH to the neighboring TRPs. The neighboring TRPs may not be able to receive the PRACH from the UE not due to the conflict but due to the worse radio propagation environment. Here, repeating the retransmission of the PRACH from the UE is useless. Here, the TRP that cannot receive the PRACH may be excluded from the neighboring TRPs in the setting.

Consequently, wasteful transmission of the PRACH can be eliminated, and the power consumption of the UE and the uplink interference power can be reduced.

Another example method will be disclosed. A PRACH dedicated to the UE is configured. Configuring the PRACH dedicated to the UE enables each TRP to receive the PRACH from the UE. For example, the frequency-time resources different from each UE are set as the PRACH configuration. Consequently, each TRP can receive the PRACH from the UE without any conflict, and recognize of which UE the PRACH is, from the received frequency-time resources.

The serving TRP may set the PRACH dedicated to the UE while the serving TRP is in an RRC connected state with the UE. The serving TRP notifies the UE of the setting. The notification may be made via the RRC signaling. The serving TRP may instruct the UE to transmit the PRACH dedicated to the UE. The instruction may be given via the L1/L2 control signal. Consequently, the serving TRP can make the UE transmit the PRACH dedicated to the UE.

The serving TRP may notify the neighboring TRPs of the PRACH configuration dedicated to the UE. The serving TRP may notify the UE identifier together with the PRACH configuration. Alternatively, the serving TRP may notify the identifier of its own TRP. Notification of the identifier of its own TRP enables the neighboring TRPs to recognize that the TRP that notifies the identifier is the serving TRP of the UE. The methods for notifying the neighboring TRPs of the PRACH configuration may be applied to a method for notifying these pieces of information.

The TRP to which the PRACH configuration has been notified from the neighboring TRPs receives the PRACH from the UE with the timing of the PRACH.

When the PRACH is transmitted from the UE, TA=0. The neighboring TRPs measure the latency from the transmission timing of the PRACH to derive the TA in the uplink transmission of the UE.

Consequently, the TA in the neighboring TRPs for the UE can be derived.

The serving TRP may make the UE appropriately transmit the PRACH dedicated to the UE. Since the position of the UE varies with time, the TA not only in the serving TRP but also in the neighboring TRPs also vary. Thus, the serving TRP makes the UE appropriately transmit the PRACH dedicated to the UE, so that the serving TRP and the neighboring TRPs can measure and derive the varied TA. Consequently, the TA corresponding to the position of the UE that varies with time can be derived.

The TRP that has derived the TA notifies the neighboring TRPs of the derived TA. The TRP may notify not the TA but a radio propagation time T from the UE to the TRP. TA=2×T holds. The TRP may make the notification together with the identifier of its own TRP. The TRP may make the notification together with the UE identifier. When recognizing the serving TRP of the UE, the TRP may notify the derived TA only to the serving TRP of the UE.

Although disclosed is the notification from the TRP to the neighboring TRPs, the TRP may make the notification to the eNB, and then the eNB may make the notification to the neighboring TRPs. Alternatively, when the eNB sets the adjustment value α to each UE, the TRP may notify the eNB of the derived TA. The eNB may derive the adjustment value α using the obtained TA of the neighboring TRPs, and notify it to the serving TRP. The eNB may make the notification together with the UE identifier.

A method for notifying the UE of the adjustment value α will be disclosed. The serving TRP notifies the UE of the adjustment value α. The serving TRP may make the notification via the UE-dedicated signaling. Since an appropriate value corresponding to the position of the UE can be derived as the adjustment value α, the notification via the UE-dedicated signaling enables setting and use of the adjustment value α for each UE.

The following (1) to (3) will be disclosed as specific examples of the UE-dedicated signaling:

(1) the RRC signaling: the adjustment value α may be included in RRC message information and notified;

(2) the MAC signaling: the adjustment value α may be included in the MAC control information and notified; and (3) the L1/L2 signaling: the adjustment value α may be included in the downlink L1/L2 control information and notified.

A method for deriving the adjustment value α using the TA of the neighboring TRPs for the UE is disclosed as an example of deriving the adjustment value α. As an alternative derivation example, the adjustment value α may be derived not for each UE but for each TRP. For example, the adjustment value α is derived using a distance between a TRP and a TRP surrounding the TRP. The TRP surrounding the TRP may be a TRP that can receive the uplink signal from the UE. The adjustment value α is set for each TRP. The adjustment value α is set regardless of the position of the UE.

A method for notifying the UE of the adjustment value α for each TRP will be disclosed. The serving TRP broadcasts the adjustment value α to the UEs being served thereby. The adjustment value α may be included in the system information to be broadcast. The identifier of the serving TRP may be broadcast together with the adjustment value α. Consequently, the UEs being served by the serving TRP can obtain the adjustment value α.

Alternatively, the adjustment value α may be notified via the UE-dedicated signaling. The aforementioned examples may be applied as examples of the signaling to be notified. The notification via the UE-dedicated signaling enables notification only to the UE subject to the uplink transmission for measurement. This eliminates the need for broadcasting to all the UEs being served by the serving TRP, which can reduce the broadcast information to be broadcast.

Consequently, the adjustment value α can be set regardless of the position of the UE, and the process of transmitting an uplink transmission signal can be simplified.

Another method for notifying the UE of the adjustment value α will be disclosed. The serving TRP may notify the UE of the adjustment value α together with the TA for the UE. For example, the method may be used for notification of the initial setting of the adjustment value α. In the aforementioned description, when the UE transmits the PRACH upon start of the uplink access, the eNB derives the TA. Here, the neighboring TRPs may derive the TA upon receipt of the PRACH, and the eNB may derive the adjustment value α.

The serving TRP may notify the UE of the derived adjustment value α together with the TA. Upon initial access, the serving TRP notifies the UE of the TA in the RA response. The adjustment value α may be included in the RA response and notified. The adjustment value α may be an initial value of the adjustment value α to be set to the uplink signal that can be received by the neighboring TRPs.

An uplink serving TRP may notify the UE of the adjustment value α together with a TA command. The TA command is notified via the MAC signaling. The MAC control information (MAC CE) may include information on the adjustment value α, and the adjustment value α may be notified together with the TA via the MAC signaling. The adjustment value α may be updated according to the update of the TA in an RRC connected state.

The serving TRP may set the uplink signal for measurement to the UE, and notify the UE of the setting information on the uplink signal for measurement. The method for notifying the UE of the adjustment value α may be applied to the notification method. Examples of the setting information on the uplink signal for measurement include the scheduling information on the uplink signal. The examples also include the sequence number information on reference signals when the reference signals are used. The examples also include the CS information on ZC sequences when the ZC sequences are used. The examples also include orthogonal code information when the orthogonal codes are used.

The serving TRP may notify the UE of an instruction for transmitting the uplink signal for measurement. The instruction method includes instructing periodic or aperiodic transmission of the uplink signal for measurement. The method for notifying the UE of the adjustment value $\alpha$ may be applied to the notification of this instruction. Since the notification via the L1/L2 signaling can expedite a response, the time from the instruction to the transmission of the uplink signal for measurement can be shortened for the UE. This enables operations with low latency.

The serving TRP may notify the UE of two or more pieces of information from among the adjustment value $\alpha$, the setting information on the uplink signal for measurement, and instruction information for transmitting the uplink signal for measurement together. For example, the serving TRP notifies the UE of the sequence number information and the CS information in the setting information on the uplink signal for measurement first, and then notifies together the scheduling information, the adjustment value $\alpha$, and an instruction for transmitting the uplink signal for measurement in the setting information on the uplink signal for measurement. Consequently, the optimal adjustment value $\alpha$ can be notified to the UE upon instruction of the uplink signal for measurement.

Figure 58:
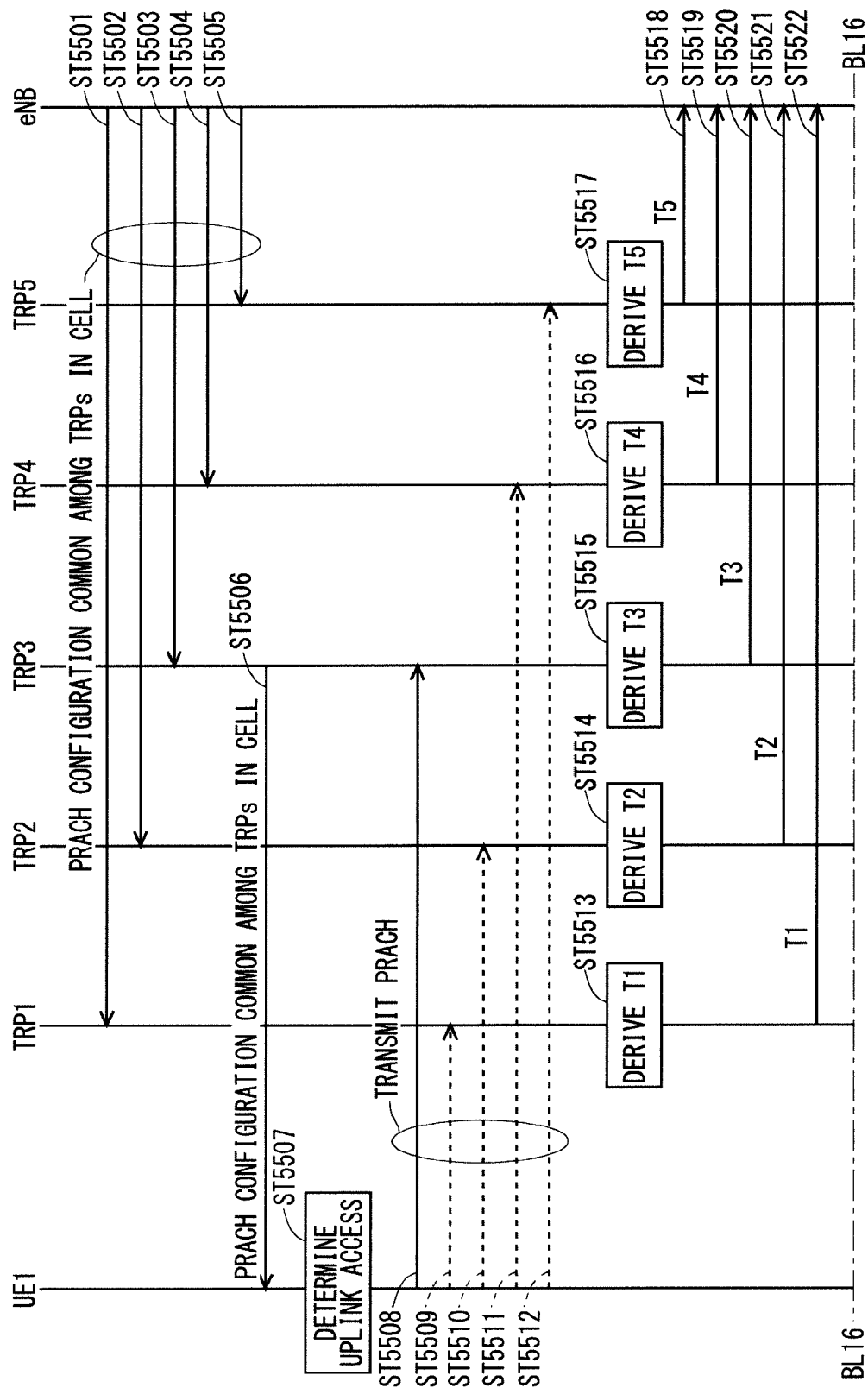
FIG. 58 illustrates an example sequence for setting an adjustment value for an uplink transmission timing according to the fourth embodiment.
Figure 59:
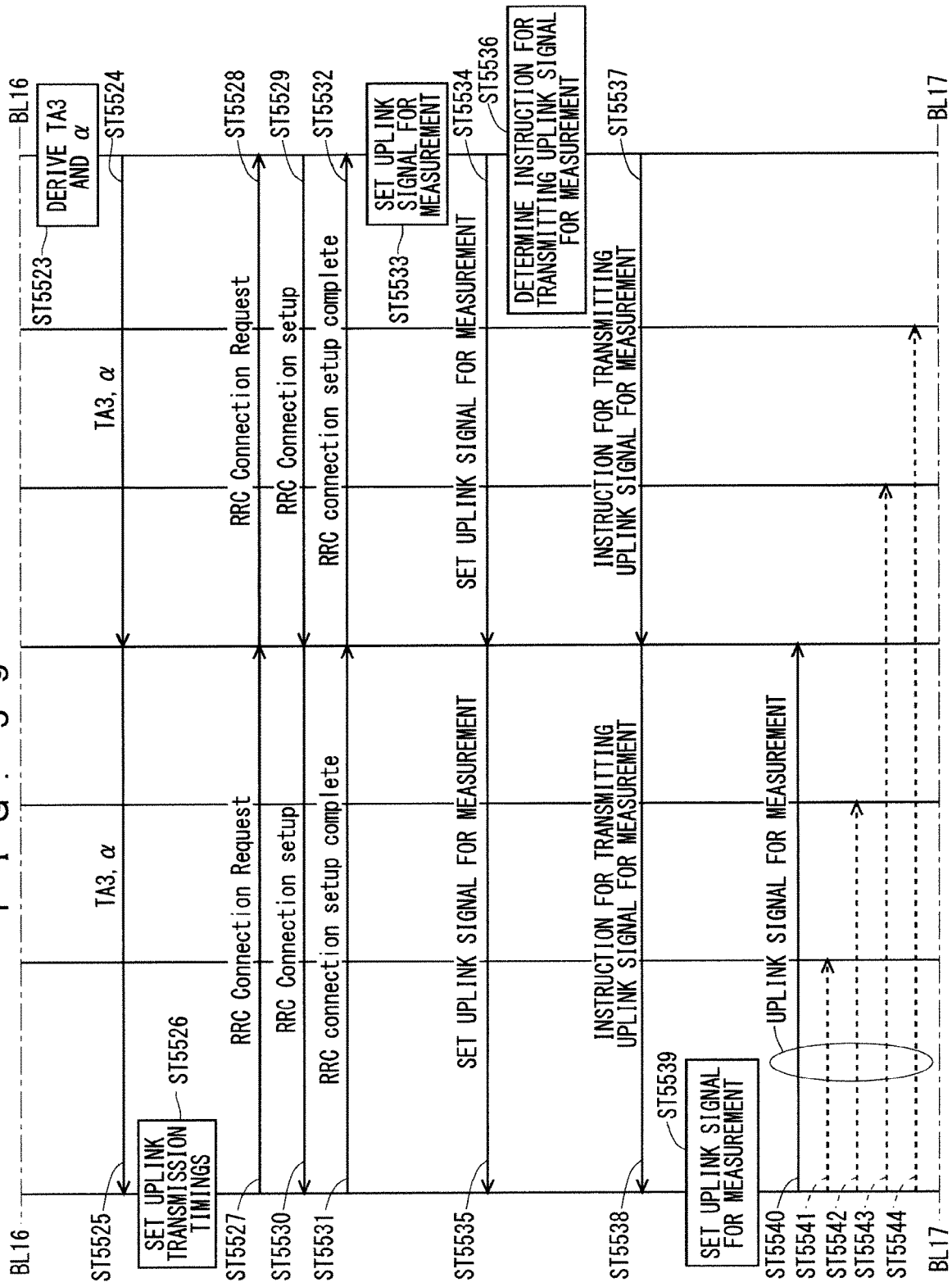
FIG. 59 illustrates the example sequence for setting the adjustment value for the uplink transmission timing according to the fourth embodiment.
Figure 60:
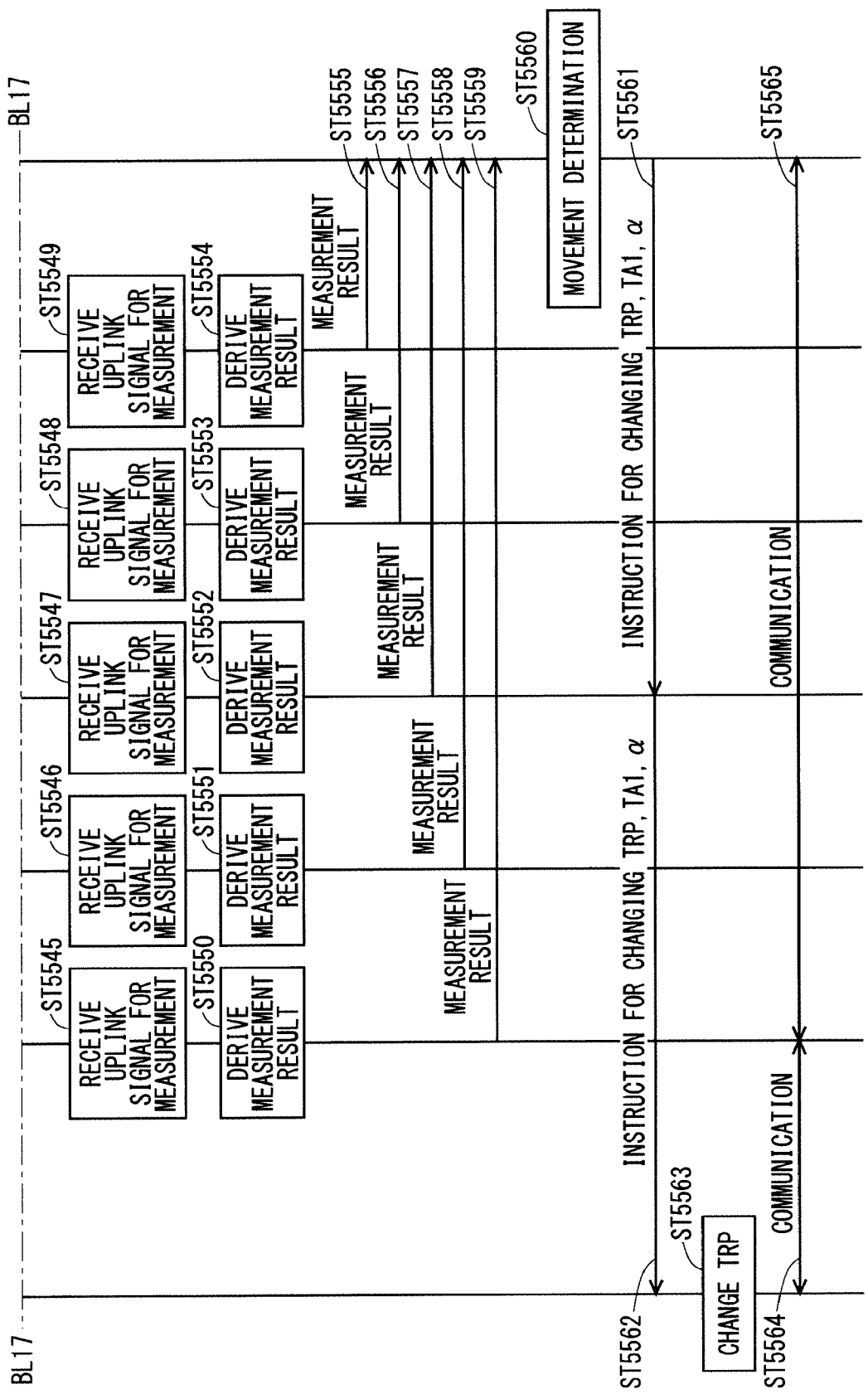
FIG. 60 illustrates the example sequence for setting the adjustment value for the uplink transmission timing according to the fourth embodiment.

FIGS. 58 to 60 illustrate an example sequence for setting an adjustment value for the uplink transmission timing according to the fourth embodiment. FIGS. 58 and 59 are connected across a location of a border BL16. FIGS. 59 and 60 are connected across a location of a border BL17. Here, the eNB sets a PRACH configuration common among the TRPs in a cell.

In Step ST5501 to Step ST5505, the eNB notifies each of the TRPs in the cell of the PRACH configuration common in the cell from a node of the eNB with a function of setting the PRACH configuration. In Step ST5506, the TRP 3 that is the serving TRP of the UE 1 notifies the UE 1 of the PRACH configuration common among the TRPs in the cell. The PRACH configuration may be included in the system information to be broadcast.

In Step ST5507, the UE 1 determines the uplink access.

In Step ST5508, the UE 1 transmits the PRACH using the PRACH configuration received in Step ST5506. Although the UE 1 transmits the PRACH to the TRP 3, the UE 1 also transmits the PRACH to the TRP 1, the TRP 2, the TRP 4, and the TRP 5 that are the neighboring TRPs in Step ST5509, Step ST5510, Step ST5511, and Step ST5512, respectively.

The TRP 3, and the TRP 1, the TRP 2, the TRP 4, and the TRP 5 that are the neighboring TRPs receive the PRACH using the PRACH configuration common among the TRPs in the cell. Upon receipt of the PRACH from the UE 1, the TRP 1 to the TRP 5 derive T1 to T5 that are radio propagation times each between the UE 1 and the corresponding one of the TRP 1 to the TRP 5 in Step ST5513 to Step ST5517, respectively.

In Step ST5518, Step ST5519, Step ST5520, Step ST5521, and Step ST5522, the TRP 5, the TRP 4, the TRP 3, the TRP 2, and the TRP 1 notify a node of the eNB with a function of deriving the TA and the adjustment value of T5, T4, T3, T2, and T1, respectively.

In Step ST5523, the node of the eNB with the function of deriving the TA and the adjustment value derives TA3 that is timing advance between the UE and the TRP 3 and the adjustment value $\alpha$, using T3 of the TRP 3, and T1, T2, T4, and T5 of the neighboring TRPs.

In Steps ST5524 and ST5525, the node of the eNB with the function of deriving the TA and the adjustment value notifies, through the TRP 3, the UE 1 of the TA3 and the adjustment value $\alpha$ that have been derived. The RA response may be used for notifying the TA3 and the adjustment value $\alpha$. This enables the earlier setting of the TA and the adjustment value $\alpha$.

In Step ST5526, the UE 1 derives uplink transmission timings using the TA3 and the adjustment value $\alpha$ that have been notified. Here, the uplink transmission timings of two types are derived. One of them is the uplink transmission timing that is used for transmitting the uplink signal not for measurement. The other is the uplink transmission timing that is used for transmitting the uplink signal for measurement. The uplink signal for measurement may be an uplink signal that can be received by the neighboring TRPs.

The uplink transmission timing that is used for transmitting the uplink signal not for measurement is derived using the TA3. The uplink transmission timing that is used for transmitting the uplink signal for measurement is derived using the TA3 and the adjustment value $\alpha$. The uplink transmission timing may be derived according to the methods previously disclosed.

In Step ST5527 to Step ST5532, the UE 1 performs the RRC connection processes for the eNB through the TRP 3.

In Steps ST5527 and ST5528, the UE 1 notifies the eNB of an RRC connection Request message through the TRP 3.

In Steps ST5529 and ST5530, the eNB notifies the UE 1 of an RRC Connection setup message through the TRP 3.

In Steps ST5531 and ST5532, the UE 1 notifies the eNB of an RRC Connection setup complete message through the TRP 3.

The UE 1 transmits the uplink signal with the uplink transmission timing that is used for transmitting the uplink signal not for measurement and that has been derived in Step ST5526, starting from the notification of the RRC connection Request message in Step ST5527.

In Step ST5533, a node of the eNB with a function of performing a moving process sets the uplink signal for measurement to the UE 1. The uplink signal for measurement in an RRC connected state may be set.

In Steps ST5534 and ST5535, the eNB notifies the UE 1 of the setting of the uplink signal for measurement. The notification may be made via the UE-dedicated signaling. For example, the RRC signaling may be used.

In Step ST5536, the node of the eNB with the function of performing the moving process determines an instruction for transmitting the uplink signal for measurement for the UE 1.

In Steps ST5537 and ST5538, the eNB notifies the UE 1 of the instruction for transmitting the uplink signal for measurement. The notification may be made via the UE-dedicated signaling. For example, the L1/L2 control signaling may be used.

Upon receipt of the setting of the uplink signal for measurement and the instruction for transmitting the uplink signal for measurement, the UE sets the notified uplink signal for measurement in Step ST5539. In Step ST5540, the UE 1 transmits the uplink signal for measurement to the TRP 3. The UE 1 uses the uplink transmission timing that is used for transmitting the uplink signal for measurement and that has been derived in Step ST5526 to transmit the uplink signal for measurement.

Although the UE 1 transmits the uplink signal for measurement to the TRP 3, the UE 1 also transmits the uplink signal for measurement to the TRP 1, the TRP 2, the TRP 4, and the TRP 5 that are the neighboring TRPs in Step ST5541, Step ST5542, Step ST5543, and Step ST5544, respectively.

In Step ST5547, Step ST5545, Step ST5546, Step ST5548, and Step ST5549, the TRP 3, and the TRP 1, the TRP 2, the TRP 4, and the TRP 5 that are the neighboring TRPs, respectively, receive the uplink signal for measurement transmitted from the UE 1.

Since the UE 1 uses, in Step ST5540, the uplink transmission timing that is used for transmitting the uplink signal for measurement using the adjustment value α to transmit the uplink signal for measurement, the TRP 3, and the TRP 1, the TRP 2, the TRP 4, and the TRP 5 that are the neighboring TRPs can receive and demodulate the uplink signal for measurement. Thus, the uplink signal from the UE 1 can be measured.

In Step ST5552, Step ST5550, Step ST5551, Step ST5553, and Step ST5554, the TRP 3, and the TRP 1, the TRP 2, the TRP 4, and the TRP 5 that are the neighboring TRPs, respectively, derive measurement results of the uplink signal for measurement transmitted from the UE 1. Examples of the measurement results of the uplink signal include the received power, the reception quality, and the SINR of a reference signal.

In Step ST5555, Step ST5556, Step ST5557, Step ST5558, and Step ST5559, the TRP 5, the TRP 4, the TRP 3, the TRP 2, and the TRP 1, respectively, notify the node of the eNB with the function of performing the moving process of the results of the uplink signal of the UE 1 measured by its own TRP.

In Step ST5560, the node of the eNB with the function of performing the moving process performs movement determination. Specifically, the node of the eNB with the function of performing the moving process judges and determines whether the TRP connected to the UE 1 is moved and to which TRP the UE 1 is moved, using the results of the uplink signal of the UE 1 measured by the TRPs which have been notified.

The node of the eNB with the function of performing the moving process that has determined to move the TRP for the UE 1 in Step ST5560 notifies the UE 1 of an instruction for changing the TRP through the TRP 3 in Steps ST5561 and ST5562. The instruction may be notified together with the identifier of the changed TRP. Here, the TRP is changed to the TRP 1. The TA of the changed TRP may be notified together with the instruction for changing the TRP. The adjustment value α at the changed TRP may be notified. The notification may be made via the UE-dedicated signaling. For example, the RRC signaling may be used.

Upon receipt of the notification of the instruction for changing the TRP, the UE 1 makes the setting for changing the TRP for communication in Step ST5563. Here, the TRP 3 is changed to the TRP 1 in the setting for communication. In Step ST5564 and Step ST5565, the UE 1 communicates with the eNB through the TRP 1.

Consequently, the neighboring TRPs can receive and demodulate the uplink signal for measurement from the UE to enable the uplink measurement. Thus, the node of the eNB with the function of performing the moving process can judge and determine whether the UE 1 is moved to the TRP and to which TRP the UE 1 is moved.

Measuring not the downlink signal in the UE but the uplink signal on the NW side enables the moving process to be performed earlier since the measurement on the NW side, which can reduce the latency in the moving process.

The nodes with the respective functions in the eNB may be different from each other, though setting the PRACH configuration common among the TRPs in the cell, deriving the TA and the adjustment value α, setting the uplink signal for measurement, the instruction for transmitting the uplink signal for measurement, and judging and determining the moving process are similarly described as the processes of the eNB in FIGS. 58 to 60. For example, a part of the nodes may be the same, and another part thereof may be different.

For example, the TRP or the DU may judge and determine the moving process, and a node of the eNB that is not the TRP may perform the other processes. The measurement result may be notified between the TRPs or between the DUs. Consequently, the latency in the moving process can be further reduced.

Not only the serving TRP but also the neighboring TRPs can receive the uplink signal from the UE with application of the methods disclosed in the fourth embodiment. Each of the TRPs can receive the uplink signal transmitted from the UE in the normal reception duration of the uplink signal. Since each of the TRPs can receive and measure the uplink signal for measurement from the UE, it can omit the measurement of the downlink signal. Thus, the need for the reference signal for measuring the downlink signal can be eliminated, and the radio resources to be spent for the reference signal can be reduced. Thus, the spare radio resources can be used for data communication. This can increase the use efficiency of the radio resources.

Application of a measurement value of the uplink signal on the NW side in the movement between the TRPs or between the DUs eliminates the need for transmitting the measurement result to the NW side, as in the case when a measurement value of the downlink signal is used. This enables the NW side to determine the TRP or the DU at a destination earlier and to determine the moving process. Thus, the movement with low latency is possible. In 5G, the TRP or the DU is assumed to configure a narrow coverage. Since the movement with low latency is possible under such a circumstance, the communication can be continued.

First Modification of Fourth Embodiment

The first modification will disclose another method for solving the problems disclosed in the fourth embodiment.

The CP is added to the uplink signal that can be received by the neighboring TRPs. The CP to be added will be referred to as a guard CP (gCP). The gCP is added consecutively to the uplink signal. The method for configuring the gCP is the same as that for the conventional CP. When transmitting the uplink signal that can be received by the neighboring TRPs, the UE adds the gCP to the uplink signal to transmit the uplink signal.

Increase in an uplink signal duration with the addition of the gCP can increase an uplink signal duration during which the uplink signal can be received and which is included in the uplink signal reception duration in each TRP. Thus, the TRP can make measurement with high precision.

The gCP length may be statically predetermined in, for example, a standard. Alternatively, the serving TRP may semi-statically or dynamically notify the UE of the gCP length. The methods for notifying the UE of the adjustment value α that are disclosed in the fourth embodiment may be appropriately applied to a method for notifying the UE of the gCP length.

Even with the addition of the gCP, the TA may have an adjustment value. The TA for the UE that transmits the uplink signal for measurement may have an adjustment value. The adjustment value is denoted by β. The UE delays the uplink transmission timing by the adjustment value (for the TA set with the serving TRP. In other words, the UE sets TA-β as the TA including the adjustment value.

The methods for setting and notifying the adjustment value α that are disclosed in the fourth embodiment may be appropriately applied to methods for setting the adjustment value β and notifying the UE of the adjustment value β. Provision of the adjustment value β in setting the uplink transmission timing of the UE enables adjustment of a duration during which the serving TRP and the other TRPs actually receive the uplink signal transmitted from the UE, specifically, a duration of the uplink signal in the uplink signal reception duration Rw. Setting the appropriate adjustment value β enables not only the serving TRP but also the other TRPs to receive the uplink signal transmitted from the UE. The TA may be a value obtained by including an adjustment value in the conventional TA, without separately providing the adjustment value. Even in such a case, the same advantages can be produced.

FIG. 61 illustrates the reception timing by the TRPs when the adjustment value β is provided for the uplink signal which is transmitted from the UE 1 and to which the gCP has been added. Since FIG. 61 is similar to FIG. 56, the differences will be mainly described.

The TA is preset between the UE 1 and the serving TRP. The adjustment value β is set to the UE 1 in consideration of the radio propagation times with the serving TRP and the neighboring TRPs, here, the TRP 1 to the TRP 5. The UE 1 adds the gCP to the uplink signal that can be received by the neighboring TRPs. For example, the gCP is added before the uplink signal, in addition to the structure of the uplink signal disclosed in FIG. 57. The UE 1 transmits, using the TA3 and the adjustment value β that have been set, the uplink signal to which the gCP has been added earlier than the downlink reception timing by TA3-β.

Here, the arrival timing at the TRP 3 of the uplink signal from the UE 1 to which the gCP has been added is later than the reception timing of the uplink signal at the TRP 3 by the adjustment value β.

In contrast, the arrival timing at the TRP 1 of the uplink signal from the UE 1 to which the gCP has been added is earlier than the reception timing of the uplink signal by T3-T1. However, the arrival timing is later than the arrival timing using only the conventional TA3 by the adjustment value β. An uplink signal duration Tw to which the gCP has been added is increased by the gCP. Thus, the duration during which the uplink signal from the UE 1 can be received by the TRP 1 is increased by gCP+β.

Similarly, the arrival timing of the uplink signal from the UE 1 at the TRP 2 is earlier than the reception timing of the uplink signal by T3-T2. However, the arrival timing is later than the arrival timing using only the conventional TA3 by the adjustment value β. The uplink signal duration Tw to which the gCP has been added is increased by the gCP. Thus, the duration during which the uplink signal from the UE 1 can be received by the TRP 2 is increased by gCP+β.

The arrival timing of the uplink signal from the UE 1 at the TRP 4 is later than the reception timing of the uplink signal by T4-T3. The arrival timing is later than the arrival timing using only the conventional TA3 by the adjustment value β. Thus, the duration during which the uplink signal from the UE 1 can be received by the TRP 4 is decreased by the adjustment value β.

Similarly, the arrival timing of the uplink signal from the UE 1 at the TRP 5 is later than the reception timing of the uplink signal by T5-T3. Since the arrival timing is later than the arrival timing using only the conventional TA3 by the adjustment value β, the duration during which the uplink signal from the UE 1 can be received by the TRP 5 is decreased by the adjustment value β.

Setting the adjustment value β to the UE in such a manner enables adjustment of the arrival timing of the uplink signal from the UE at the neighboring TRPs. The reception duration of the uplink signal from the UE by the neighboring TRPs can also be adjusted. Thus, setting the appropriate adjustment value β enables not only the serving TRP but also the neighboring TRPs to receive the uplink signal transmitted from the UE.

According to the methods disclosed in the first modification, the addition of the gCP to the uplink signal can increase the uplink signal duration during which the uplink signal can be received by the serving TRP and the neighboring TRPs more than that according to the fourth embodiment. For example in FIG. 61, the duration during which the uplink signal can be actually received by the TRP 1 and the TRP 2 is increased more than that according to the fourth embodiment. Thus, each of the TRPs can receive the uplink signal with high precision. If the uplink signal is an uplink signal for measurement, each of the TRPs can measure the uplink signal with high precision.

Although the gCP is added before the uplink signal in FIG. 61, the gCP may be added after the uplink signal, not limited to before the uplink signal. Alternatively, the gCP may be divided into two to be added before and after the uplink signal. The method for configuring the gCP when the gCP is added before or after the uplink signal or added before and after the uplink signal may be the same as that for the conventional CP.

The transmission of the uplink signal from the UE may span the next subframe, depending on a portion corresponding to the added gCP, or the adjustment value f3. Here, the eNB may perform a method for, for example, preventing scheduling in the next subframe for the UE, etc. Consequently, the uplink signal which spans the next subframe and to which the gCP has been added can be transmitted.

Second Modification of Fourth Embodiment

In the first modification of the fourth embodiment, the gCP is added to the uplink signal that can be received by the neighboring TRPs. Depending on the setting of the adjustment value β, addition of the gCP may require a gap before or after the uplink signal. This is because an overlap between the timing for adding the gCP to the uplink signal and transmitting the uplink signal and for example, the reception timing of downlink data to be received before the uplink signal in the UE is prevented.

Conventionally, when reception of the downlink data is followed by transmission of an uplink signal, a gap is formed in between. However, when an additional uplink signal exists before or after the uplink signal, a gap is not provided in between. Thus, when the gCP has been set to a configuration in which the additional uplink signal exists before or after the uplink signal, a new gap will waste the radio resources.

The second modification will disclose a method for solving such a problem.

When uplink signals are consecutively configured before or after the uplink signal that can be received by the neighboring TRPs, the gCP is set to a part of the consecutive uplink signals.

Figure 62:
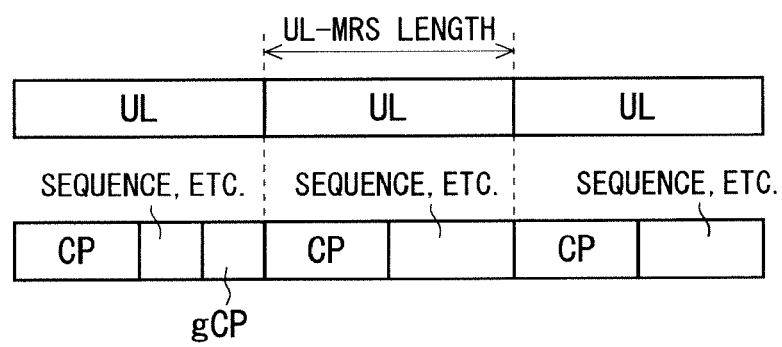
FIG. 62 illustrates an example of setting the gCP to a part of consecutive uplink signals.

FIG. 62 illustrates an example of setting the gCP to a part of the consecutive uplink signals. FIG. 62 illustrates a case where each of the uplink signals consists of the CP and data such as a sequence. The uplink signals are consecutively configured before and after the uplink signal that can be received by the neighboring TRPs. FIG. 62 illustrates an example of setting the gCP to a part of the prior uplink signal.

The gCP is set to a part of the uplink signals consecutively configured before the uplink signal that can be received by the neighboring TRPs. The gCP length is less or equal to the CP length. Although data such as the sequence is reduced from the prior uplink signal configured before the uplink signal that can be received by the neighboring TRPs, the CP exists in the prior uplink signal. Thus, the serving TRP receives and demodulates the data such as the sequence including the CP, and thus can obtain the data such as the sequence.

The gCP length may be shortened to increase a probability of accurately receiving and demodulating the uplink signals consecutively configured before the uplink signal that can be received by the neighboring TRPs. Setting the gCP length according to radio propagation environments between the UE and the serving TRP and between the UE and the neighboring TRPs enables the serving TRP to obtain the uplink signals and also enables the neighboring TRPs to obtain the uplink signal that can be received by the neighboring TRPs.

Figure 63:
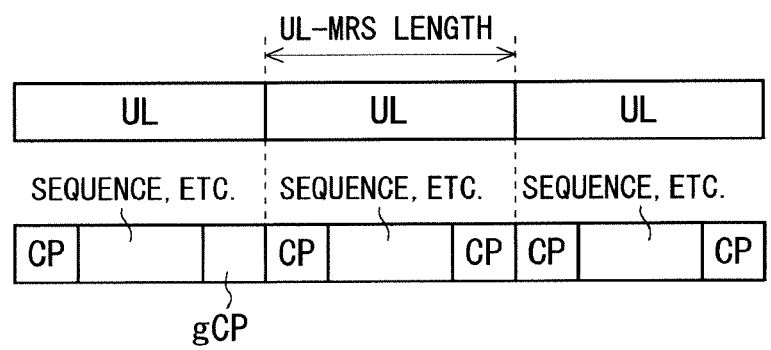
FIG. 63 illustrates another example of setting the gCP to a part of consecutive uplink signals.

FIG. 63 illustrates another example of setting the gCP to a part of the consecutive uplink signals. FIG. 63 illustrates a case where each of the uplink signals consists of CPs and data such as a sequence, and the CPs are added before and after the data such as the sequence. The uplink signals are consecutively configured before and after the uplink signal that can be received by the neighboring TRPs. FIG. 63 illustrates an example of changing, into the gCP, the CP at the end of the prior uplink signal.

The CP at the end of the uplink signal consecutively configured before the uplink signal that can be received by the neighboring TRPs is changed into the gCP. Although the CP is reduced from the prior uplink signal configured before the uplink signal that can be received by the neighboring TRPs, the data such as the sequence and the CP at the beginning exist in the prior uplink signal. Thus, the serving TRP receives and demodulates the data such as the sequence including the CP, and thus can obtain the data such as the sequence. The same advantages as those in the example of FIG. 62 can be produced.

The same holds true for another case where each of the uplink signals consists of the CP and data such as a sequence, and the CP is added after the data such as the sequence. A part or the entirety of the CP at the end of the prior uplink signal may be changed into the gCP. The same advantages as those in the previously disclosed examples will be produced.

With application of the methods disclosed in the second modification, the gCP eliminates the need for newly configuring a gap even in the presence of an additional uplink signal before or after the uplink signal. This can suppress decrease in the use efficiency of the radio resources.

Third Modification of Fourth Embodiment

In the fourth embodiment to the second modification of the fourth embodiment, the uplink signal from the UE may span the next subframe in a TRP whose radio propagation time from the UE is long. In the next subframe, the TRP transmits the downlink signal, and the UEs being served by the TRP receive the downlink signal. Thus, when the uplink signal from the UE spans the next subframe, the uplink signal from the UE interferes with reception of the downlink signal by the UEs being served by the TRP.

The third modification will disclose another method for solving the problems disclosed in the fourth embodiment and further solving the aforementioned problem.

A guard time (hereinafter referred to as a "GT") is provided for the reception timing of the uplink signal that can be received by the neighboring TRPs. A GT is added consecutively to the reception timing of the uplink signal. In the OT, no other signals are transmitted or received. Each of the TRPs receives the uplink signal for a reception duration of the uplink signal that includes the GT.

Consequently, the uplink signal reception duration in each of the TRPs can be increased by the GT. Thus, even when the uplink signal reception timing in each of the TRPs is prior to or subsequent to the normal uplink signal reception timing, the TRP can receive the uplink signal. Consequently, the TRP can make measurement with high precision.

The structure of the GT may be statically predetermined in, for example, a standard. Alternatively, the serving TRP may semi-statically or dynamically notify the UE of the structure of the GT. The methods for notifying the UE of the adjustment value $\alpha$ that are disclosed in the fourth embodiment may be appropriately applied to a method for notifying the UE of the structure of the GT.

Even when the GT is provided, the TA may have an adjustment value. The TA for the UE that transmits the uplink signal for measurement may have an adjustment value. The adjustment value is denoted by $\gamma$. The UE delays the uplink transmission timing by the adjustment value $\gamma$ for the TA set with the serving TRP. In other words, the UE sets TA+$\gamma$ as the TA including the adjustment value.

The methods for setting and notifying the adjustment value $\alpha$ that are disclosed in the fourth embodiment may be appropriately applied to methods for setting the adjustment value $\gamma$ and notifying the UE of the adjustment value $\gamma$. Provision of the adjustment value $\gamma$ in setting the uplink transmission timing of the UE enables adjustment of a duration during which the serving TRP and the other TRPs actually receive the uplink signal transmitted from the UE, specifically, a duration of the uplink signal in the uplink signal reception duration Rw. Setting the appropriate adjustment value $\gamma$ enables not only the serving TRP but also the other TRPs to receive the uplink signal transmitted from the UE. The TA may be a value obtained by including an adjustment value in the conventional TA, without separately providing the adjustment value. Even in such a case, the same advantages can be produced.

The duration for one subframe is predetermined. Thus, durations for the other signals need to be reduced when the GT is provided. The following (1) and (2) will be disclosed as specific examples of the reduction method:

(1) a duration for a gap is reduced; and
(2) a duration for the DL is reduced.

Since the duration for the gap is reduced in (1), the duration for data can be maintained. Thus, reduction in the data transmission rate can be suppressed. This is effective when suppressing reduction in the data transmission rate is desired.

Since the duration for the DL is reduced in (2), the duration for the gap can be maintained. Since the duration for the gap is determined from, for example, the cell coverage and the demodulation performance of the UE, the duration for the gap is sometimes desirably fixed. The method (2) is effective in such a case.

The duration described in the aforementioned example may be replaced with a symbol. Since the number of symbols in one subframe is predetermined, symbols of the other signals are reduced when the GT is provided. The specific examples may include reducing a symbol of a gap and reducing a symbol of the DL, each of which can produce the same advantages.

FIG. 64 illustrates the timing of receiving, by the TRPs, the uplink signal transmitted from the UE 1 when the adjustment value γ is provided in a structure with GTs. Since FIG. 64 is similar to FIG. 56, the differences will be mainly described.

In addition to the uplink signal reception duration disclosed in the fourth embodiment, the GTs are provided in a TRP. The duration of the GTs is denoted by Ta+Tb. The TRP sets the uplink signal reception duration including the duration of the GTs as a new uplink signal reception duration Rw. Thus, the uplink signal reception duration in the TRP is longer than the conventional uplink signal reception duration by the GTs.

The TA is preset between the UE 1 and the serving TRP. The adjustment value γ is preset to the UE 1 in consideration of the GTs and the radio propagation times with the serving TRP and the neighboring TRPs, here, the TRP 1 to the TRP 5. The UE 1 transmits, using the TA3 and the adjustment value γ that have been set, the uplink signal earlier than the downlink reception timing by TA3+γ.

Here, the arrival timing of the uplink signal from the UE 1 at the TRP 3 is earlier than the reception timing of the uplink signal at the TRP 3 by the adjustment value γ. However, since the GTs are provided, reception of the uplink signal from the UE 1 can be started earlier by the shortened time through setting each of the GTs to an appropriate value. Thus, the TRP 3 can receive the entirety of the uplink signal from the UE 1.

The arrival timing of the uplink signal from the UE 1 at the TRP 1 is earlier than the reception timing of the uplink signal by T3−T1. Moreover, the arrival timing is earlier than the arrival timing using only the conventional TA3 by the adjustment value γ. However, since the GTs are provided, reception of the uplink signal from the UE 1 can be started earlier by the shortened time through setting each of the GTs to an appropriate value. Thus, the TRP 1 can receive the entirety of the uplink signal from the UE 1.

Similarly, the arrival timing of the uplink signal from the UE 1 at the TRP 2 is earlier than the reception timing of the uplink signal by T3−T2. Moreover, the arrival timing is earlier than the arrival timing using only the conventional TA3 by the adjustment value γ. However, since the GTs are provided, reception of the uplink signal from the UE 1 can be started earlier by the shortened time through setting each of the GTs to an appropriate value. Thus, the TRP 2 can receive the entirety of the uplink signal from the UE 1.

The arrival timing of the uplink signal from the UE 1 at the TRP 4 is later than the reception timing of the uplink signal by T4−T3. However, the arrival timing is earlier than the arrival timing using only the conventional TA3 by the adjustment value γ. Since the GTs are provided, reception of the uplink signal from the UE 1 can be started earlier by the shortened time through setting each of the GTs to an appropriate value. Thus, the TRP 4 can receive the entirety of the uplink signal from the UE 1.

Similarly, the arrival timing of the uplink signal from the UE 1 at the TRP 5 is later than the reception timing of the uplink signal by T5−T3. However, the arrival timing is earlier than the arrival timing using only the conventional TA3 by the adjustment value γ. Since the GTs are provided, reception of the uplink signal from the UE 1 can be started earlier by the shortened time through setting teach of the GTs to an appropriate value. Thus, the TRP 5 can receive the entirety of the uplink signal from the UE 1.

Setting the adjustment value γ to the UE in such a manner enables adjustment of the arrival timing of the uplink signal from the UE at the neighboring TRPs. The reception duration of the uplink signal from the UE by the neighboring TRPs can also be adjusted. Thus, setting the appropriate adjustment value γ enables not only the serving TRP but also the neighboring TRPs to receive the uplink signal transmitted from the UE.

According to the method disclosed in the third modification, the GTs are added consecutively to the reception timing of the uplink signal, and each of the TRPs receives the uplink signal for the reception duration of the uplink signal that includes the GTs. Thus, the uplink signal duration during which the uplink signal can be received by the serving TRP and the neighboring TRPs can be increased more than that according to the fourth embodiment. Thus, each of the TRPs can receive the uplink signal with high precision. If the uplink signal is an uplink signal for measurement, each of the TRPs can measure the uplink signal with high precision.

Although the GTs are added before and after the uplink signal in FIG. 64, the GT may be added only before or after the uplink signal. When the GT is added after the uplink signal, the subsequent subframe may have a OT. Here, each of the TRPs receives the uplink signal from the UE for a duration until the GT in the subsequent subframe.

When the normal uplink signal reception timing is at the end of a subframe, a GT may be added front. The GT may be added in an appropriate subframe. Since the OT can be configured without changing the other subframe structures, the communication can be established in the normal subframe structure without omitting any signals to be mapped to the other subframes. Thus, the complexity in the control can be suppressed both on the NW side and on the UE side.

The uplink signal for measurement may be the SRS in the NR. The methods disclosed in the fourth embodiment to the third modification of the fourth embodiment may be applied to the SRS. Since the neighboring TRPs can receive the SRS in the NR, the SRS can be used as the uplink signal for measurement. The SRS can be used as a signal for the moving process.

The uplink signal for measurement may be an uplink Ack/Nack signal in response to a downlink signal. A measurement function is provided for the uplink Ack/Nack signal. For example, the Ack/Nack signal may be configured using an uplink RS. Since functions of the Ack/Nack and the RS are multiplexed, the methods for multiplexing the Ack/Nack with the SRS that are disclosed in the second modification of the third embodiment may be applied. Consequently, a node on the NW side can measure the uplink signal from the UE with transmission of Ack/Nack in response to the downlink data, even without transmission of the uplink data.

Although the fourth embodiment to the third modification of the fourth embodiment describe the methods for enabling the neighboring TRPs and the neighboring DUs to receive the uplink signal from the UE, the uplink signal may not be received by the TRPs and the DUs. The methods may be applied to devices or nodes to be operated at different installation points. Consequently, the uplink signal from the UE can be received and measured at the different installation points.

For example, the methods may be applied to cells. Consequently, the neighboring cells can receive the uplink signal from the UE. Alternatively, the methods may be applied to eNBs Consequently, the neighboring eNBs can receive the uplink signal from the UE. Alternatively, the methods may be applied to one or more TRPs in the eNB where the UE is communicating and to one or more TRPs in the neighboring eNBs. Consequently, the neighboring TRPs in different eNBs can receive the uplink signal from the UE.

The embodiments and the modifications are merely illustrations of the present invention, and can be freely combined within the scope of the present invention. Any constituent elements of the embodiments and the modifications can be appropriately modified or omitted. A subframe is an example time unit in communication in the fifth-generation base station communication system in the embodiments and the modifications. The process described per subframe may be performed per TTI, per slot, or per mini-slot in the embodiments and the modifications.

While the invention has been described in detail, the foregoing description is in all respects illustrative and not restrictive. It is therefore understood that numerous modifications and variations can be devised without departing from the scope of the invention.

DESCRIPTION OF REFERENCES

701 coverage of macro cell, 702 coverage of small cell, 703 user equipment (UE).

The invention claimed is:

1. A communication system comprising a base station device and a communication terminal device configured to communicate via radio communication with the base station device,
wherein the base station device communicates with the communication terminal device using a self-contained subframe, the self-contained subframe including a downlink signal to be transmitted from the base station device to the communication terminal device, and an uplink signal to be transmitted from the communication terminal device to the base station device in response to the downlink signal,
the uplink signal, within one self-contained subframe, has a structure including an uplink control signal indicating information for controlling transmission of the uplink signal, and uplink user data to be transmitted before and after the uplink control signal, and
the base station device notifies the communication terminal device of the structure of the uplink signal.

2. The communication system according to claim 1,
wherein the base station device predetermines scheduling for retransmission to retransmit the downlink signal, before performing initial transmission of the downlink signal.

3. The communication system according to claim 1,
wherein the uplink signal includes an uplink sounding reference signal, and
the base station device sets, as control information, a period with which the communication terminal device transmits the uplink sounding reference signal, and transmits the downlink signal including the control information to the communication terminal device.

4. The communication system according to claim 1,
wherein the base station device sets a period with which the communication terminal device transmits an uplink sounding reference signal.

* * * * *